United States Patent [19]

Yang

[11] Patent Number: 5,674,169

[45] Date of Patent: Oct. 7, 1997

[54] TUNNEL TYPE OR DRAGON-GATE TYPE PROCESSING SYSTEM ASSEMBLED WITH SELECTED ELEMENTS AND ITS RELATED INTERFACE MEANS

[76] Inventor: Tai-Her Yang, 5-1 Taipin St., Si-Hu Town, Dzan-Hwa, Taiwan

[21] Appl. No.: 597,600

[22] Filed: Oct. 15, 1990

Related U.S. Application Data

[63] Continuation of Ser. No. 258,088, Oct. 17, 1988, which is a continuation of Ser. No. 426,188, Sep. 28, 1982.

[51] Int. Cl.[6] .................................................. B23Q 7/00
[52] U.S. Cl. .................. 483/32; 29/563; 483/37; 82/159
[58] Field of Search ............. 82/159–161; 483/14–15, 483/30–39

[56] References Cited

U.S. PATENT DOCUMENTS

| | | | |
|---|---|---|---|
| 3,513,734 | 5/1970 | Burroughs et al. | 82/159 |
| 4,006,518 | 2/1977 | Rudolph et al. | 82/159 X |
| 4,018,112 | 4/1977 | Heaton et al. | 82/159 X |
| 4,180,894 | 1/1980 | Link | 82/159 X |
| 4,218,816 | 8/1980 | Dormehl | 82/159 X |
| 4,300,418 | 11/1981 | Gusching et al. | 82/159 |
| 4,962,583 | 10/1990 | Yang . | |
| 5,001,818 | 3/1991 | Kramer et al. | 29/26 B |

Primary Examiner—William M. Shoop, Jr.
Assistant Examiner—David Martin
Attorney, Agent, or Firm—Leonard Bloom

[57] ABSTRACT

A dragon-gate processing machine having a dragon-gate support structure, at least one lateral girder coupled to the support structure for mounting tool holding members and automatic tool exchange devices, a plurality of working tables mounted below the dragon-gate support structure, driving apparatus for driving the working tables, a mechanical transmission for coupling the drive apparatus to the working tables, an auxiliary rotary arm mounted to the dragon-gate support structure for holding auxiliary processing devices, and control means for controlling operation of the dragon-gate machine. The dragon-gate machine allows processing such as drilling, lathing, and planing to be performed on a workpiece mounted on the working table. The novel allows such processing to be performed at any angle and at any desired direction according to the processing requirements of the workpiece.

32 Claims, 118 Drawing Sheets

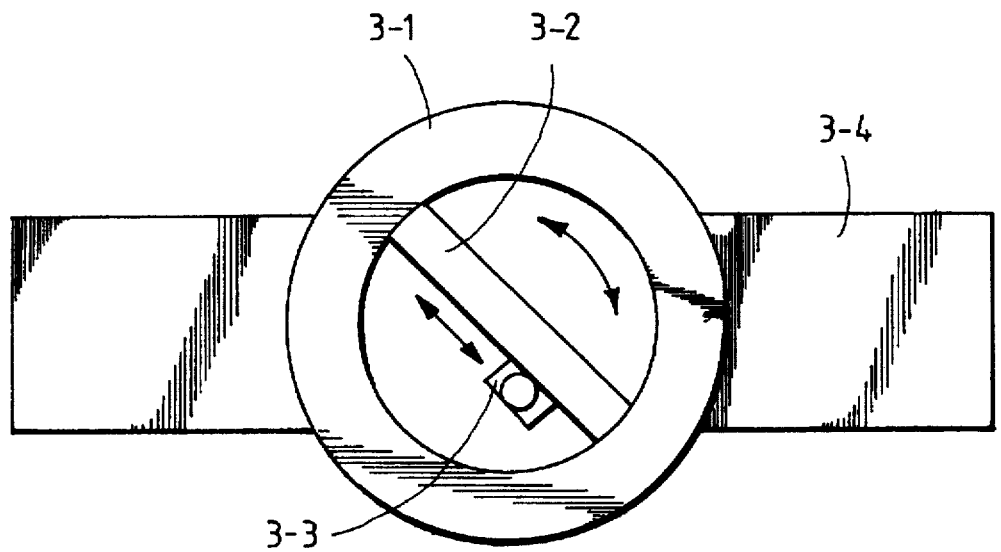
FIG. 3-A
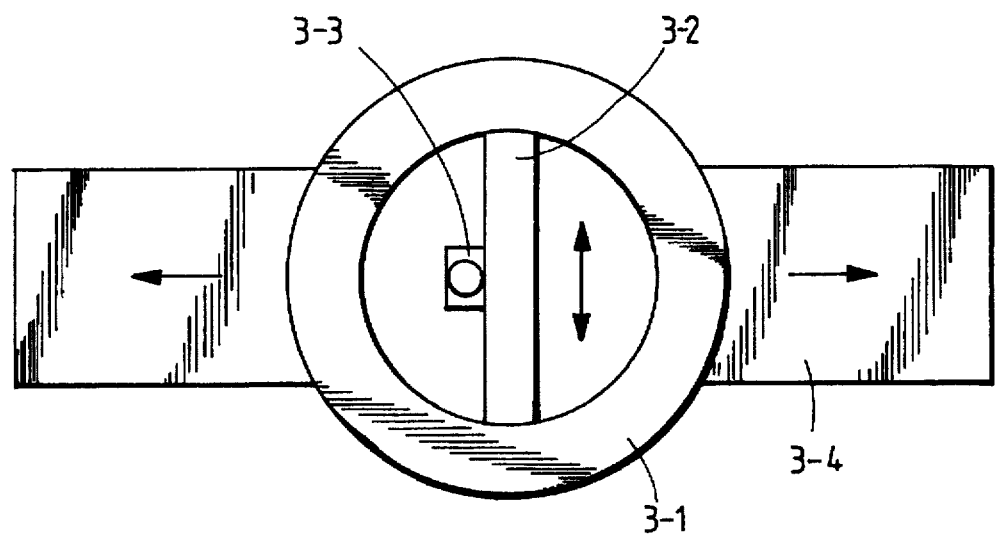
FIG. 3-B

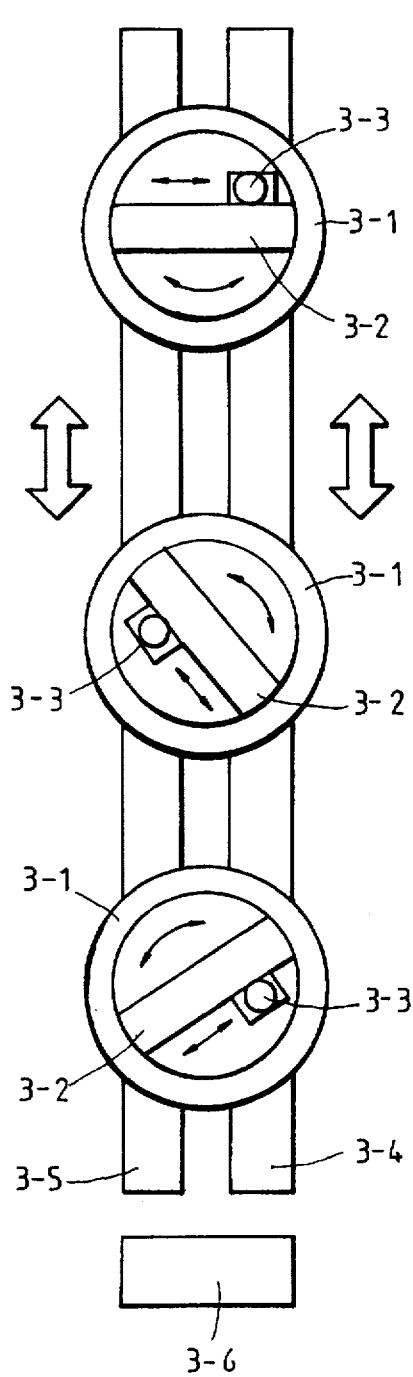
FIG. 3-C
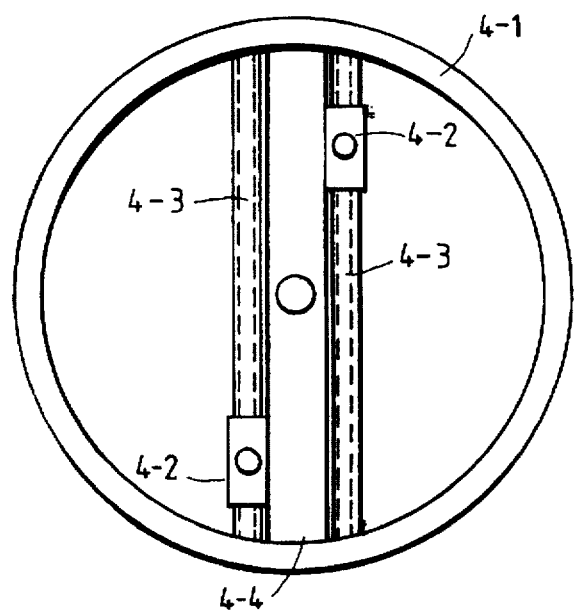
FIG. 4
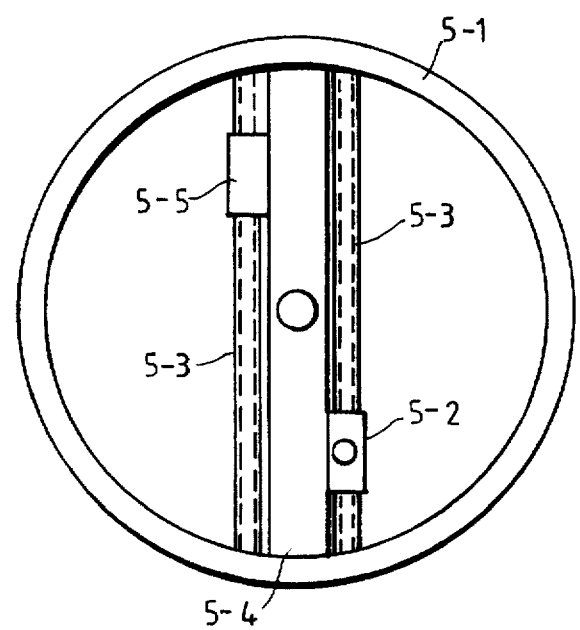
FIG. 5

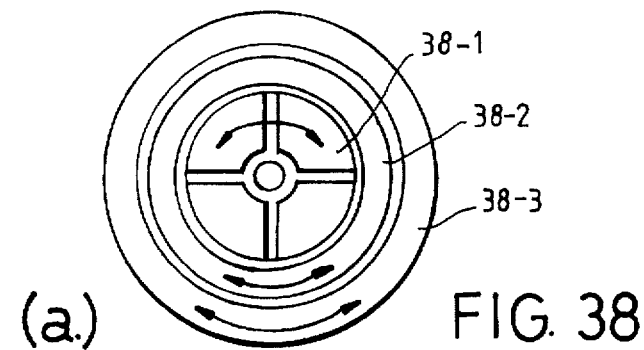
(a.)   FIG. 38
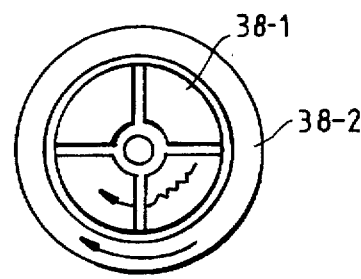
(b.)
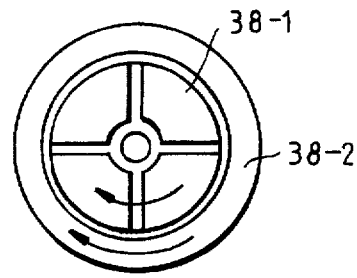
(c.)
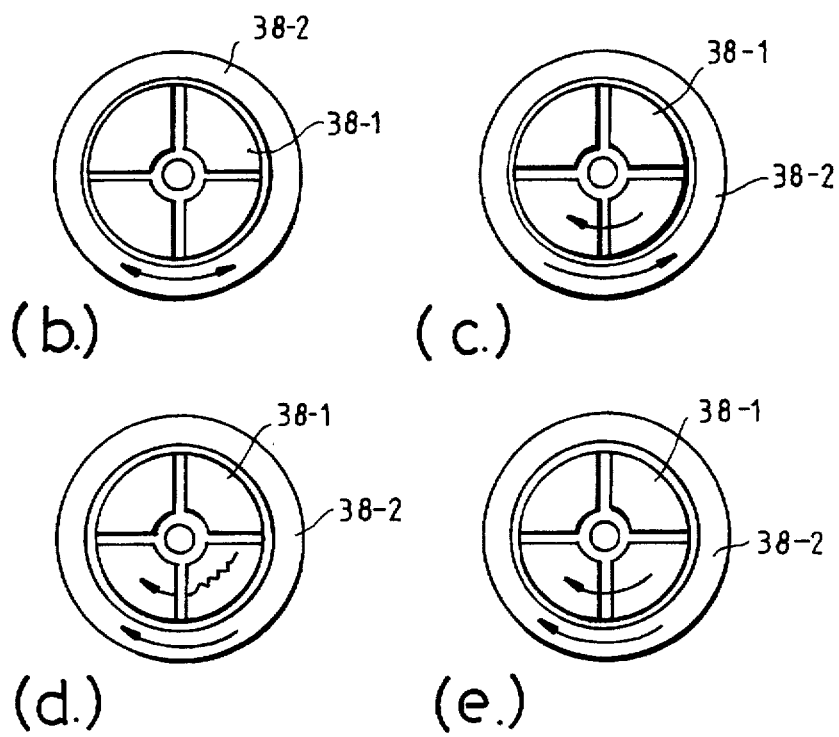
(d.)          (e.)
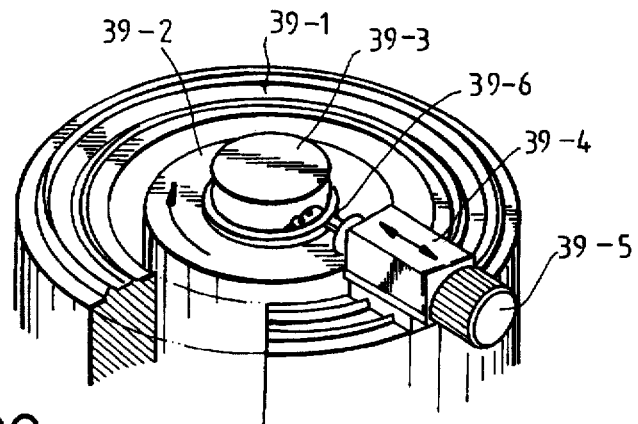
FIG. 39

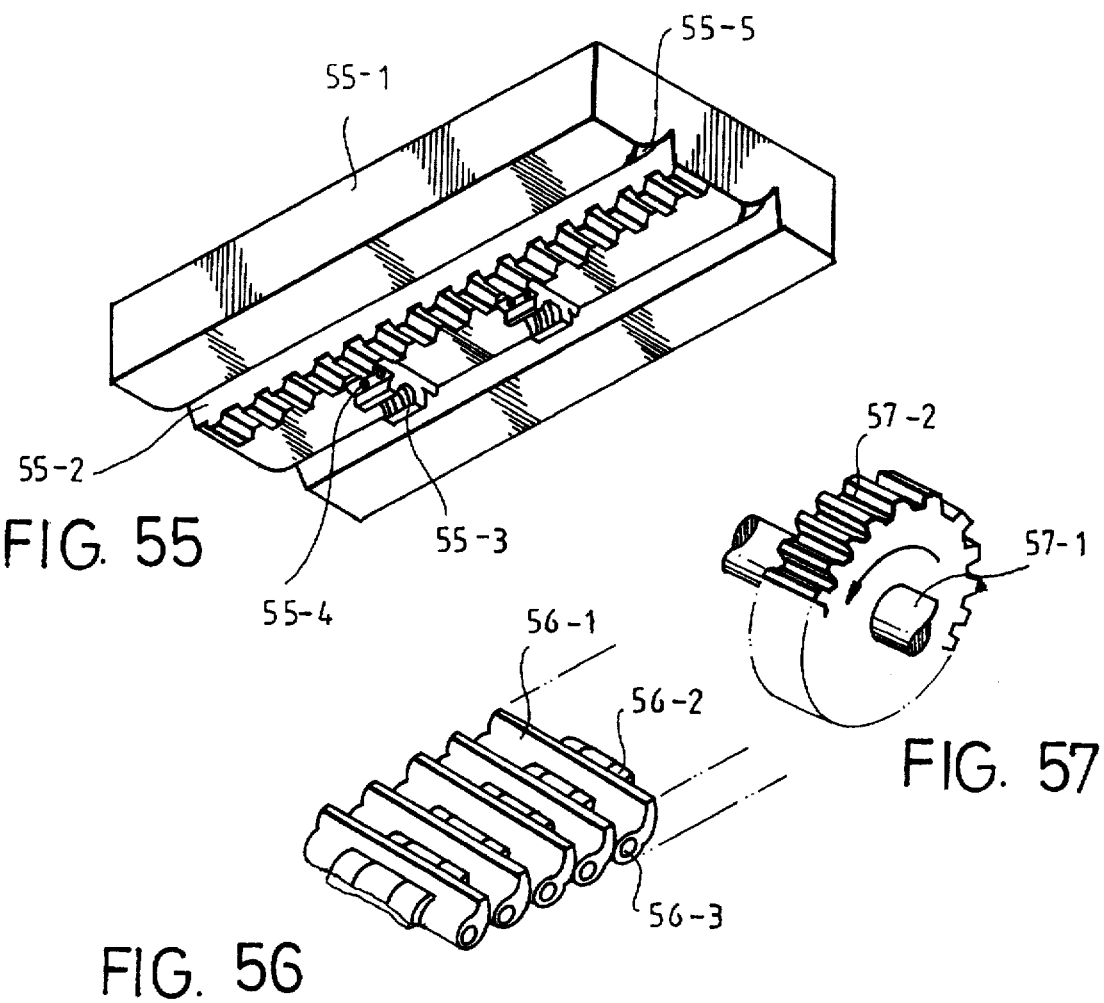
FIG. 55
FIG. 57
FIG. 56
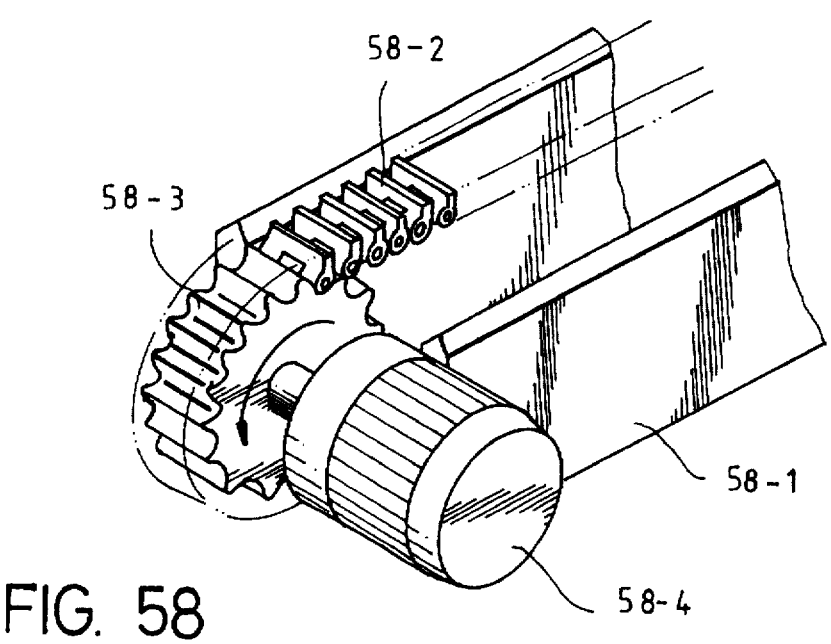
FIG. 58

```
┌─────────────────────────────────────────────────────────┐
│ TOOL EXCHANGING INSTRUCTION: TOOL AT PROCESSING POINT B4 │
│ BEING CONVEYED TO B1.                                    │
└─────────────────────────────────────────────────────────┘
                            │
┌─────────────────────────────────────────────────────────┐
│ B4 ROTATING 180°.                                        │
└─────────────────────────────────────────────────────────┘
                            │
┌─────────────────────────────────────────────────────────┐
│ A1 MOVING TO Y⁺ UNTIL TO POSITION POINT, A1 TOOL SPINDEL │
│ CLAMPING TOOL, AND B1 TOOL SPINDEL UNCLAMPING TOOL.      │
└─────────────────────────────────────────────────────────┘
                            │
┌─────────────────────────────────────────────────────────┐
│ A1 RETURNS TO ZERO POINT AND ROTATES 180°.               │
└─────────────────────────────────────────────────────────┘
                            │
┌─────────────────────────────────────────────────────────┐
│ A1 MOVING TO Y⁻ UNTIL TO POSITION POINT, A4 TOOL SPINDEL │
│ CLAMPING TOOL AND A1 TOOL SPINDEL UNCLAMPING TOOL.       │
└─────────────────────────────────────────────────────────┘
                            │
┌─────────────────────────────────────────────────────────┐
│ A4 MOVING TO Y⁻ UNTIL TO POSITION POINT, A7 TOOL SPINDEL │
│ CLAMPING TOOL, AND A4 TOOL SPINDEL UNCLAMPING TOOL.      │
└─────────────────────────────────────────────────────────┘
                            │
┌─────────────────────────────────────────────────────────┐
│ A4 RETURNS TO ZERO POINT.                                │
└─────────────────────────────────────────────────────────┘
                            │
┌─────────────────────────────────────────────────────────┐
│ A7 ROTATES 90° COUNTER-CLOCKWISE.                        │
└─────────────────────────────────────────────────────────┘
                            │
┌─────────────────────────────────────────────────────────┐
│ A7 MOVING TO Y⁻ UNTIL TO POSITIONING POINT.              │
└─────────────────────────────────────────────────────────┘
                            │
┌─────────────────────────────────────────────────────────┐
│ B1 TOOL SPINDEL CLAMPING TOOL, AND A7 TOOL               │
│ SPINDEL UNCLAMPING TOOL.                                 │
└─────────────────────────────────────────────────────────┘
                            │
┌─────────────────────────────────────────────────────────┐
│ A7 RETURNS TO ZERO POINT.                                │
└─────────────────────────────────────────────────────────┘
                            │
┌─────────────────────────────────────────────────────────┐
│ B1 ROTATES 180°.                                         │
└─────────────────────────────────────────────────────────┘
                            │
┌─────────────────────────────────────────────────────────┐
│ END SYSTEM STAND-BY.                                     │
└─────────────────────────────────────────────────────────┘
```

FIG. 82

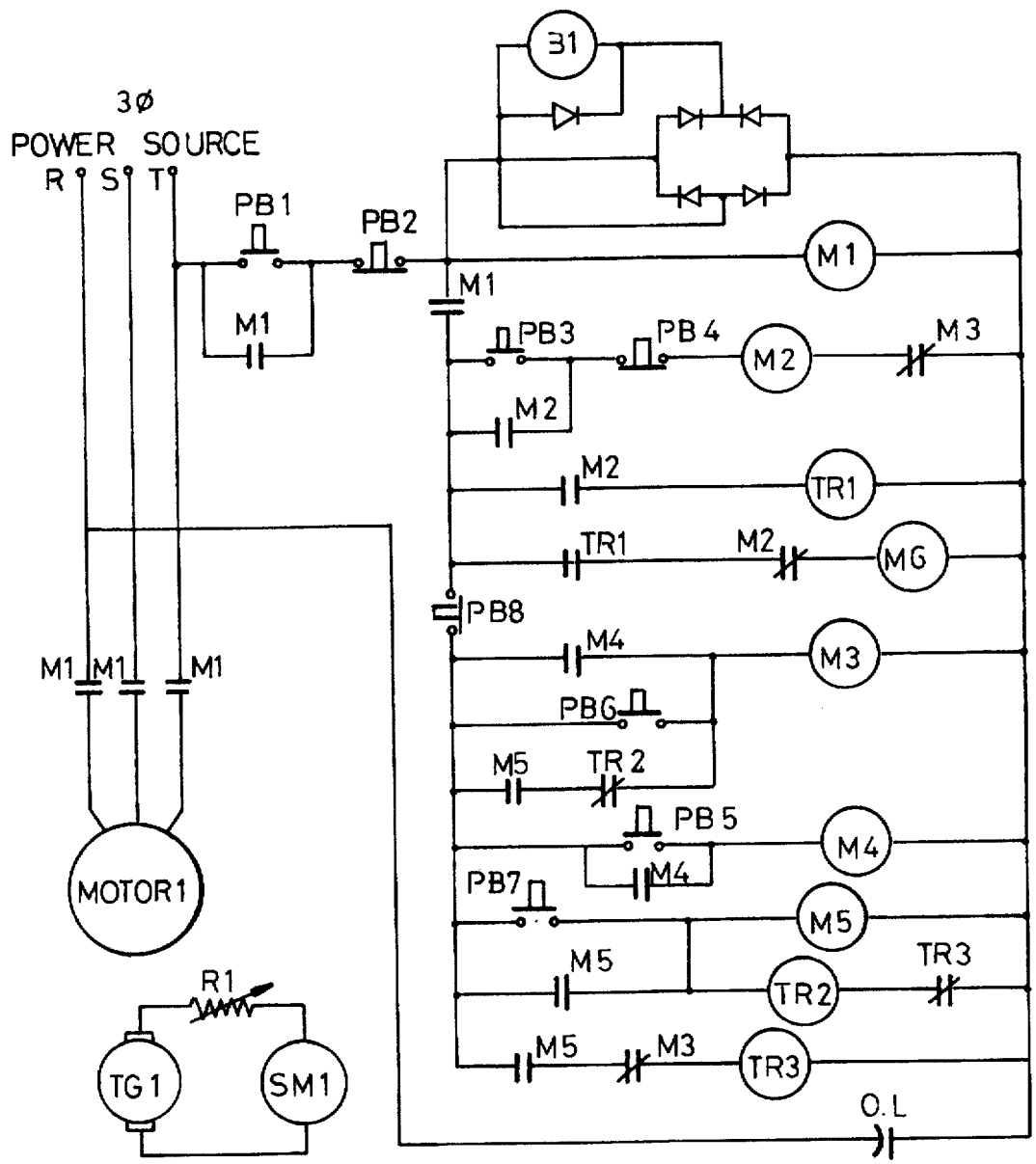
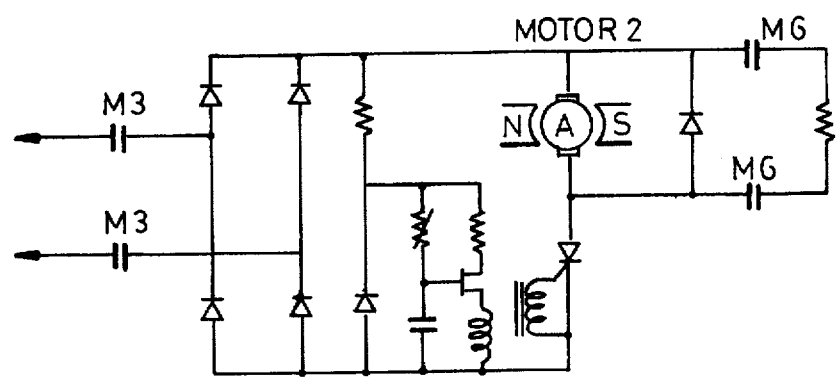
FIG. 91

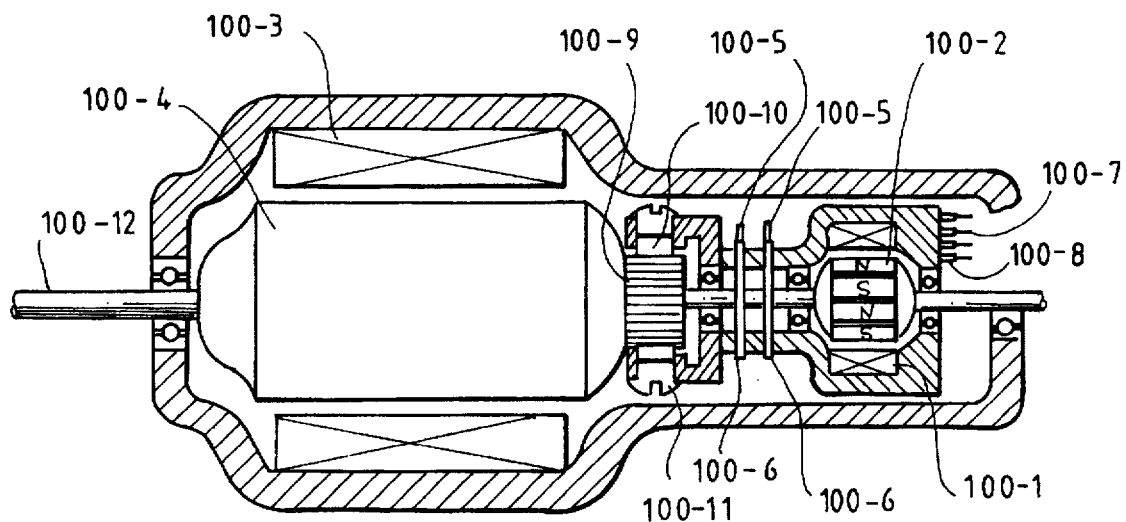
FIG. 100
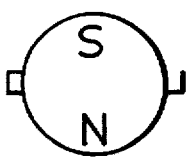
FIG. 101
FIG. 102
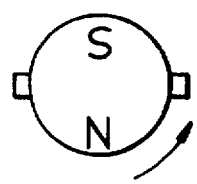
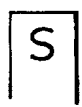
FIG. 103

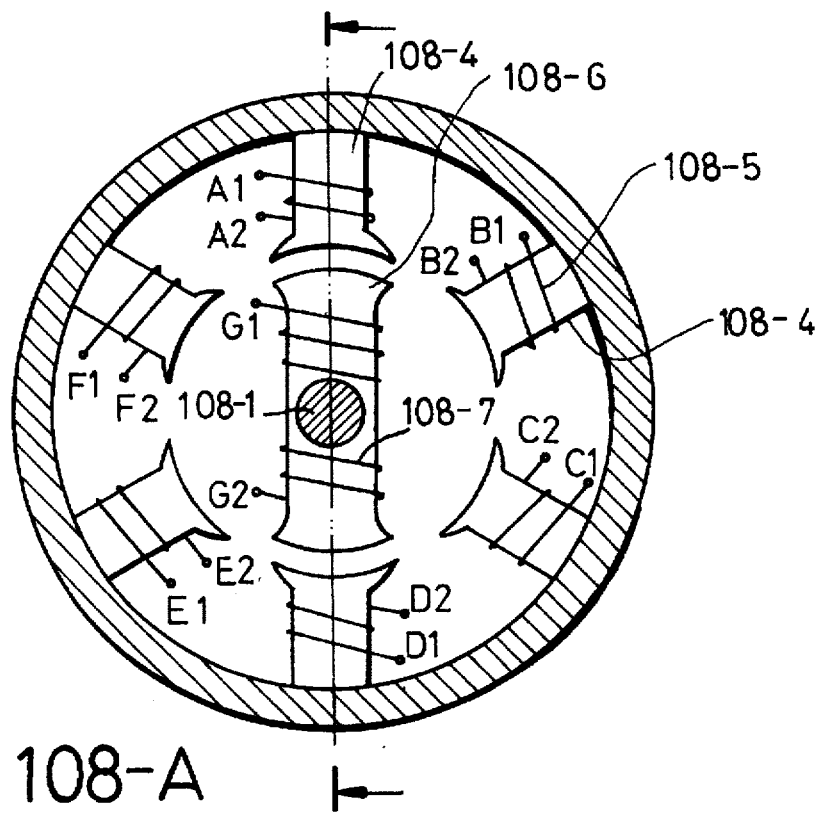
FIG. 108-A
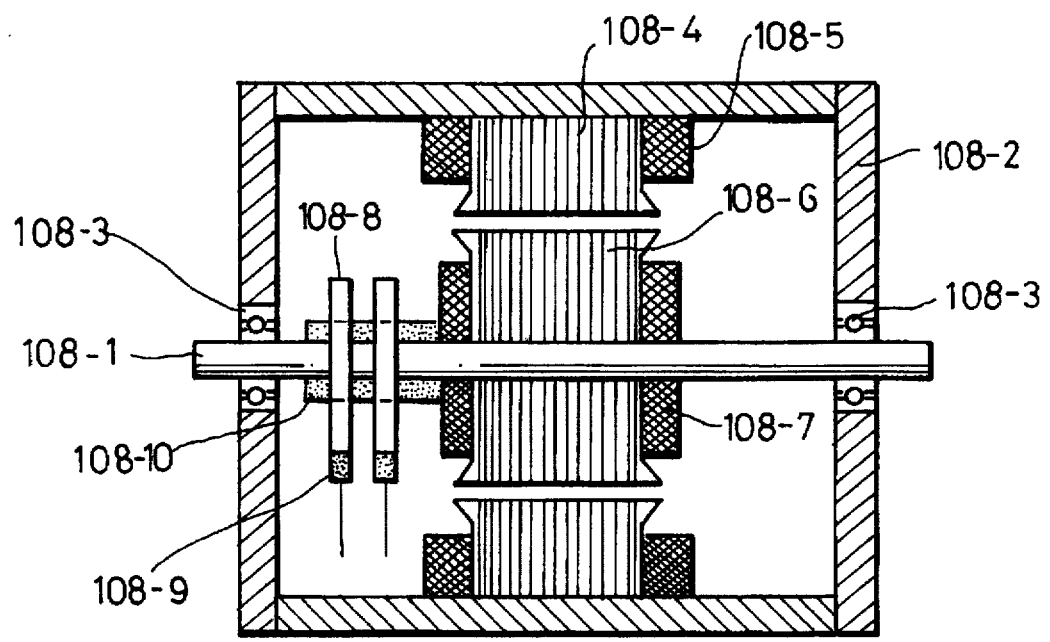
FIG. 108-B

CW

| SD / ST | 0° | 60° | 120° | 180° | 240° | 300° | 0° | 60° | 120° |
|---|---|---|---|---|---|---|---|---|---|
| Q1 | ON |  |  | ON |  |  | ON |  |  |
| Q2 |  | ON |  |  | ON |  |  | ON |  |
| Q3 |  |  | ON |  |  | ON |  |  | ON |
| Q4 |  |  |  | ON | ON | ON |  |  |  |
| Q5 | ON | ON | ON |  |  |  | ON | ON | ON |
| Q6 | ON | ON | ON |  |  |  | ON | ON | ON |
| Q7 |  |  |  | ON | ON | ON |  |  |  |

CCW

| SD / ST | 0° | 60° | 120° | 180° | 240° | 300° | 0° | 60° | 120° |
|---|---|---|---|---|---|---|---|---|---|
| Q1 | ON |  |  | ON |  |  | ON |  |  |
| Q2 |  | ON |  |  | ON |  |  | ON |  |
| Q3 |  |  | ON |  |  | ON |  |  | ON |
| Q4 | ON | ON | ON |  |  |  | ON | ON | ON |
| Q5 |  |  |  | ON | ON | ON |  |  |  |
| Q6 |  |  |  | ON | ON | ON |  |  |  |
| Q7 | ON | ON | ON |  |  |  | ON | ON | ON |

SD: STEP DEGRESS
ST: SWITCH TIME

FIG. 110

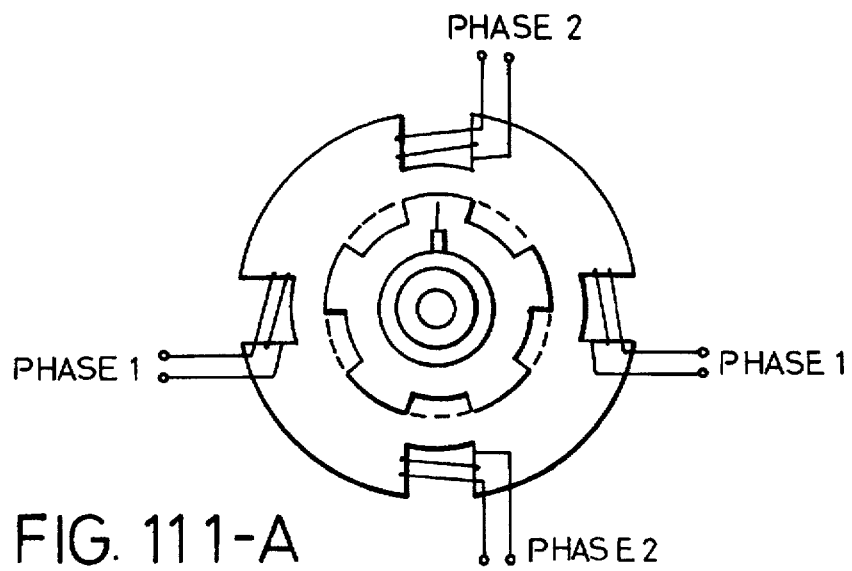
FIG. 111-A
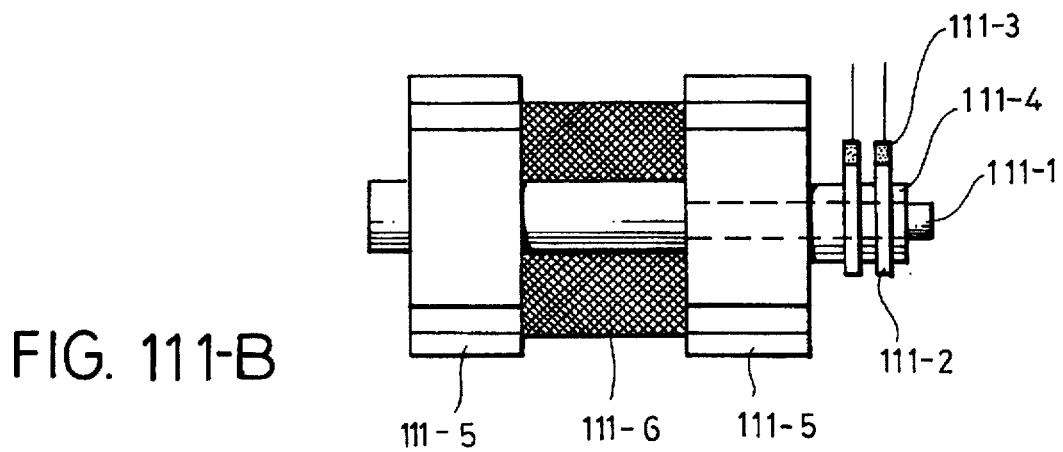
FIG. 111-B
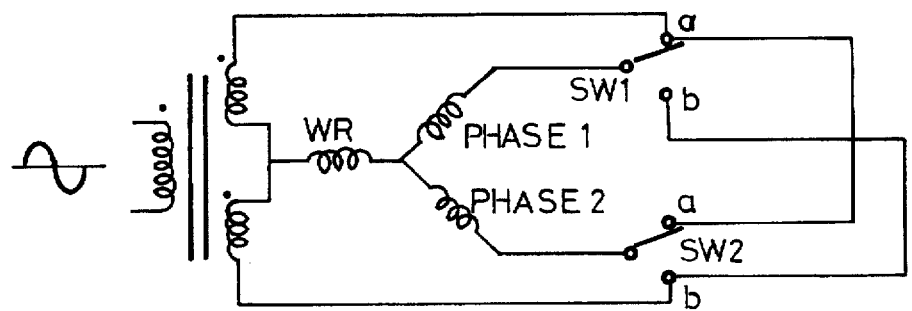
FIG. 112-A

| STEP | CW ROTATION | | CCW ROTATION | |
|---|---|---|---|---|
| | SW1 | SW2 | SW1 | SW2 |
| 1 | a | a | a | a |
| 2 | b | a | a | b |
| 3 | b | b | b | b |
| 4 | a | b | b | a |

FIG. 112-B

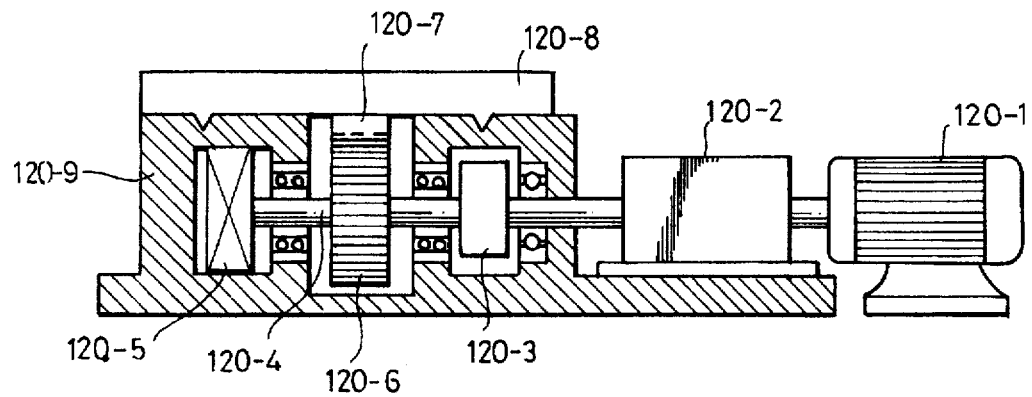
FIG. 120
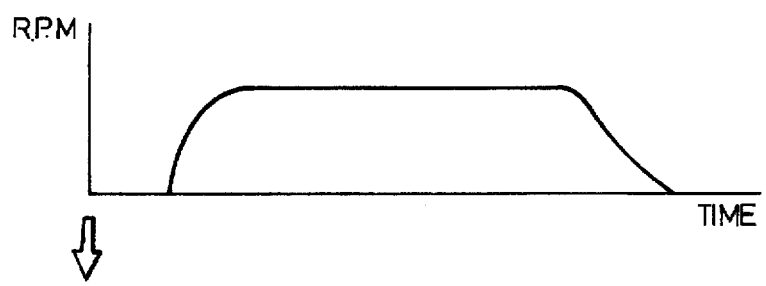
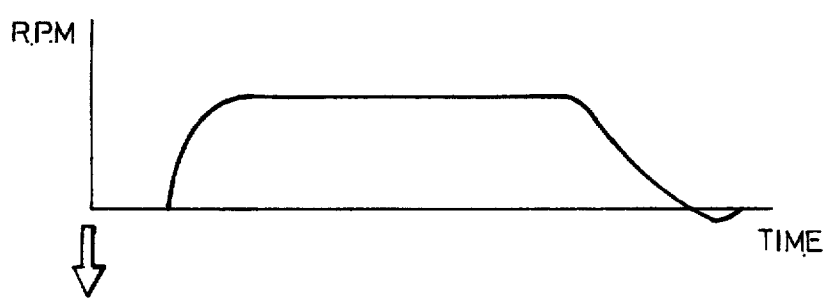
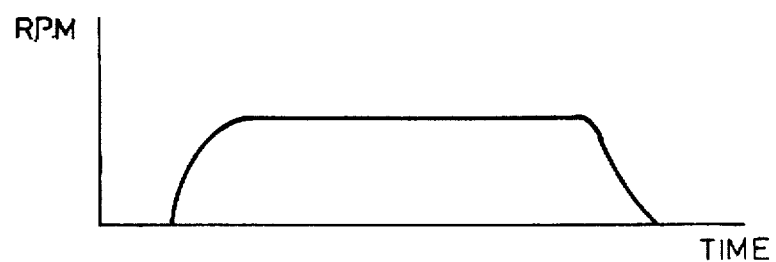
FIG. 121

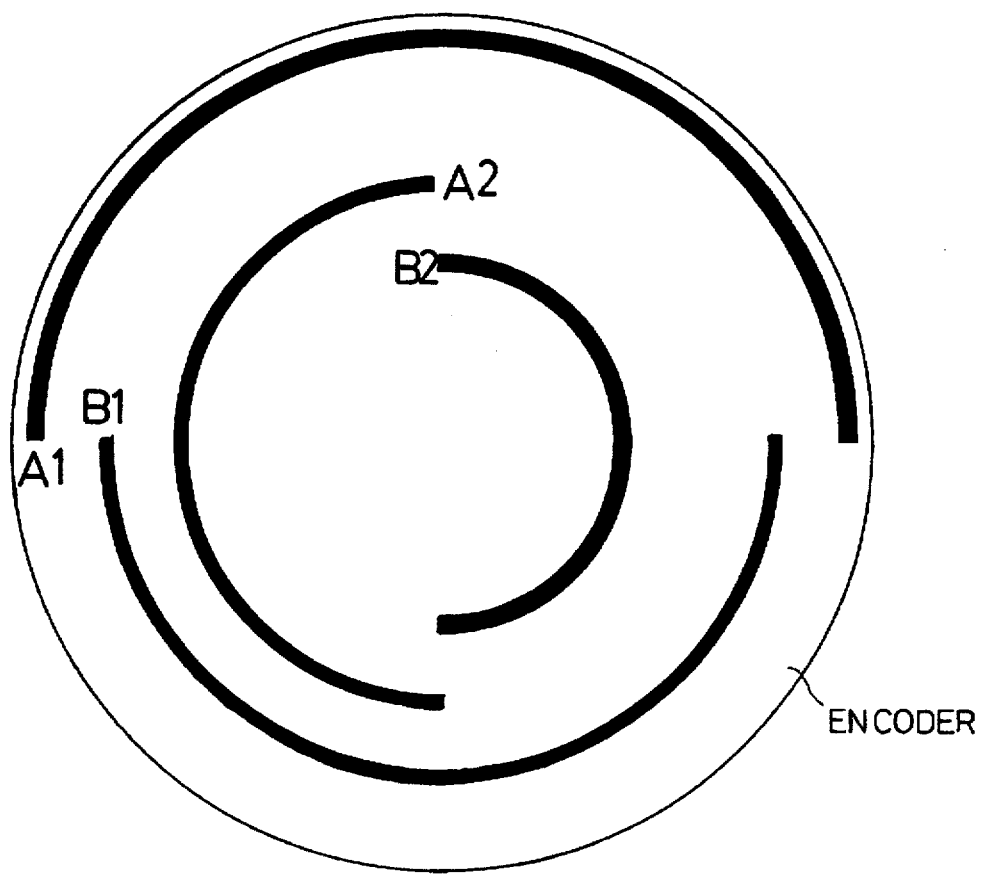
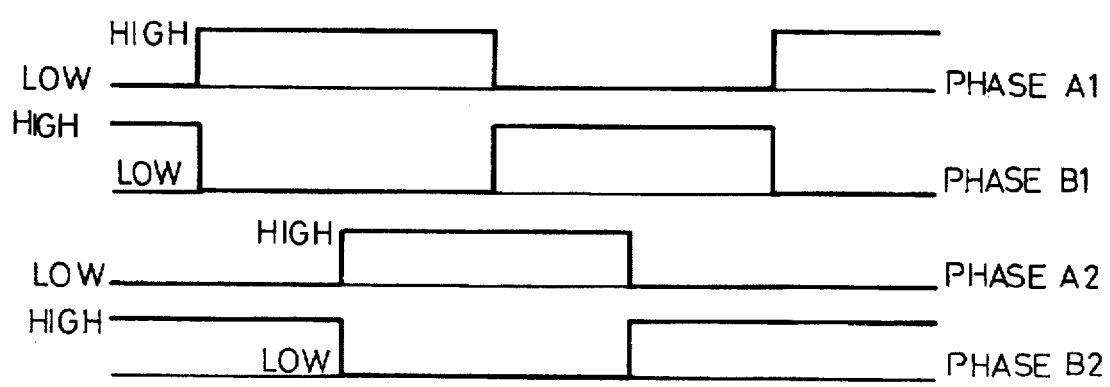
FIG. 126

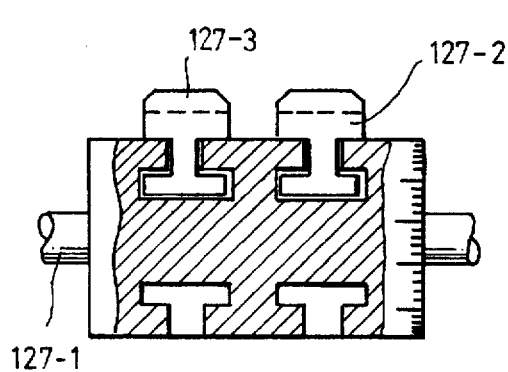
FIG 127-A
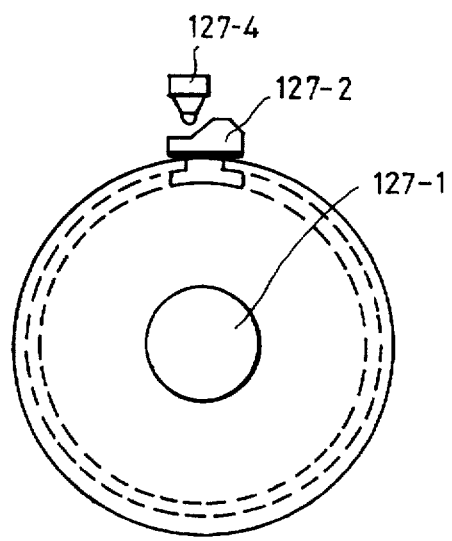
FIG 127-B
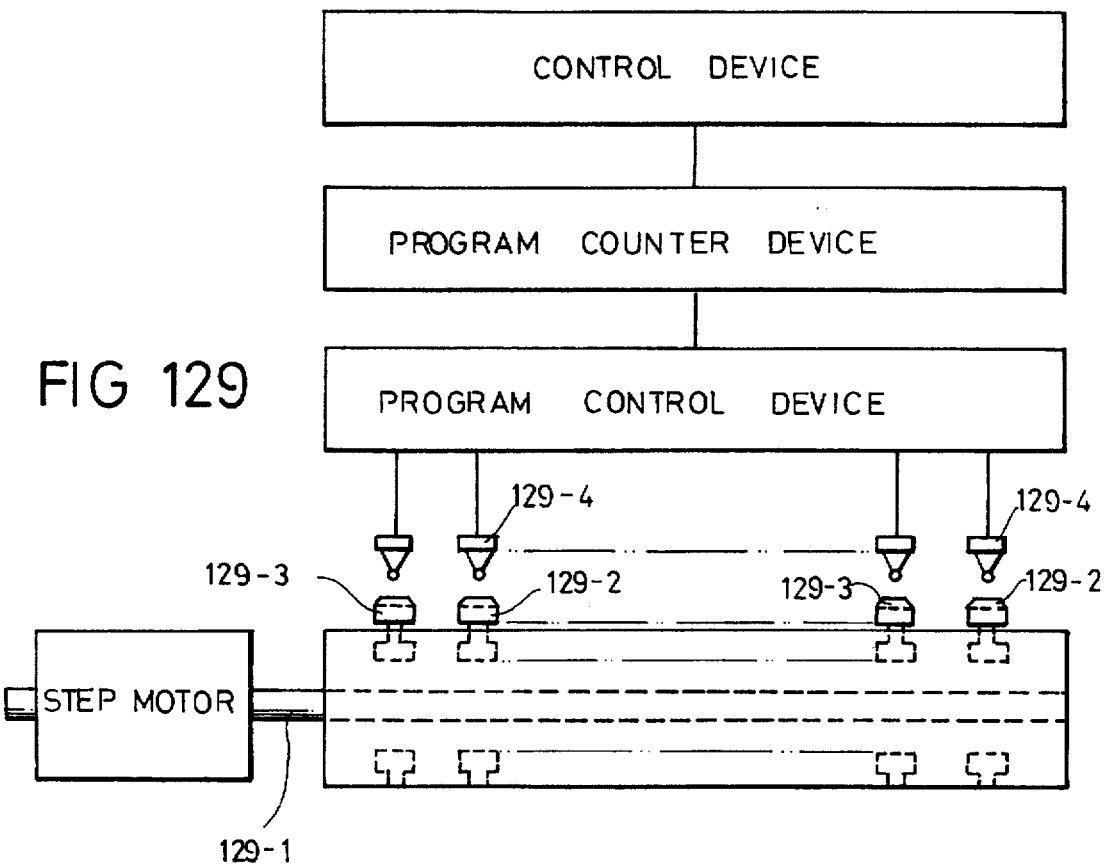
FIG 129

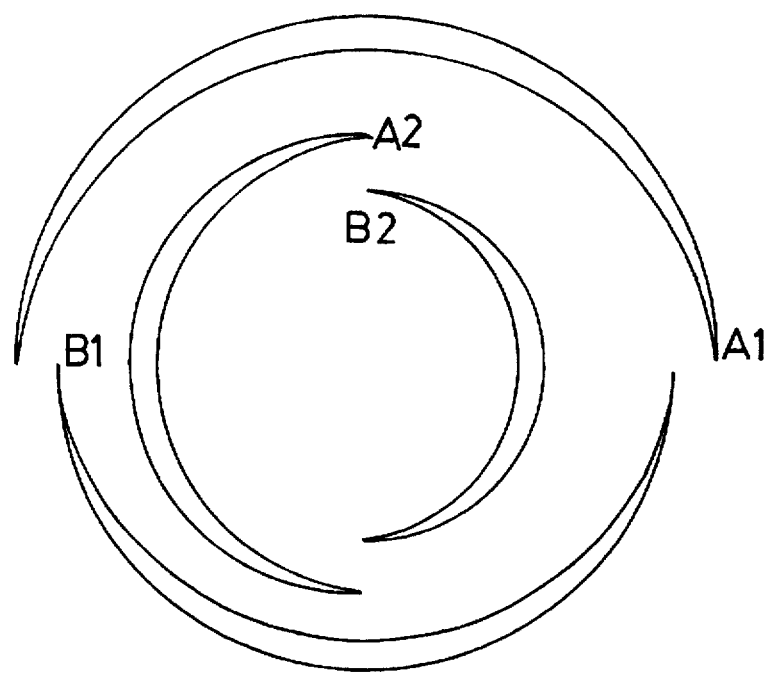
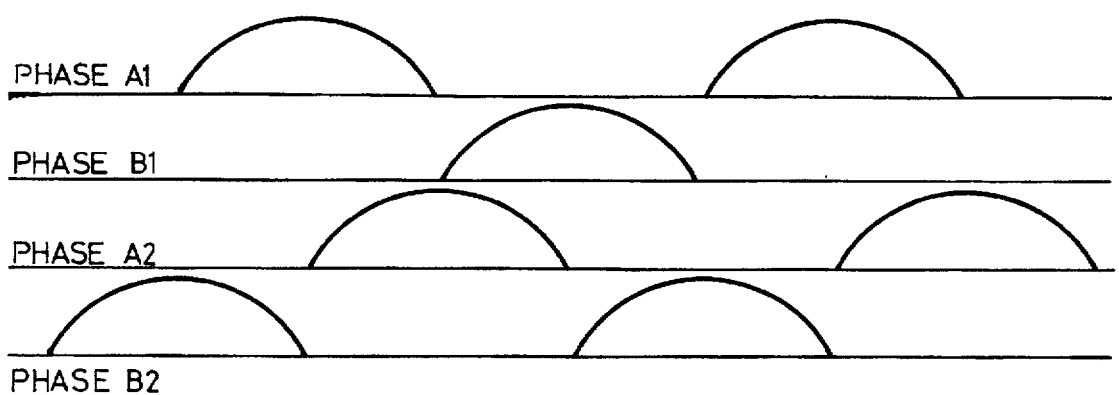
FIG. 128

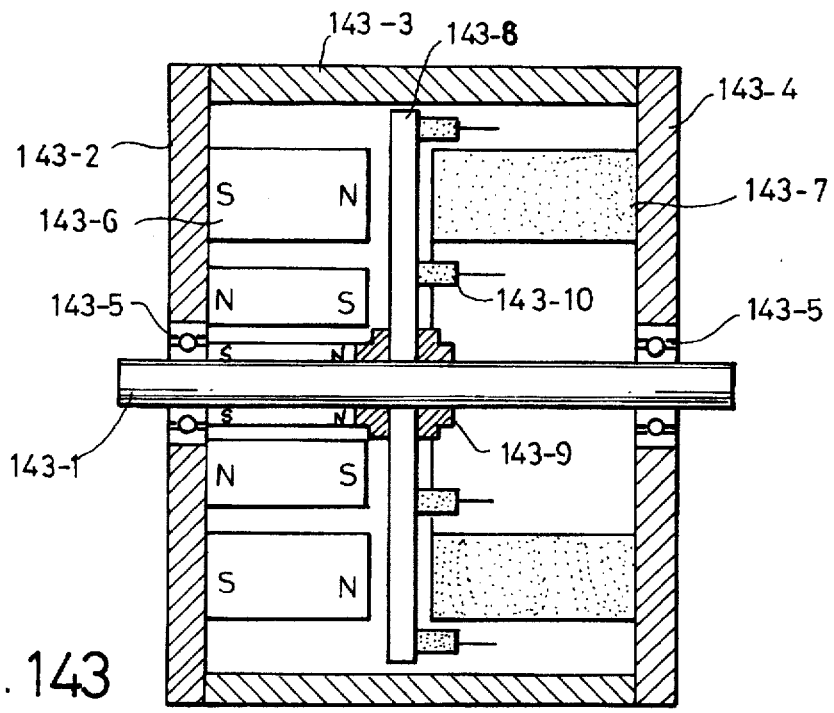
FIG. 143
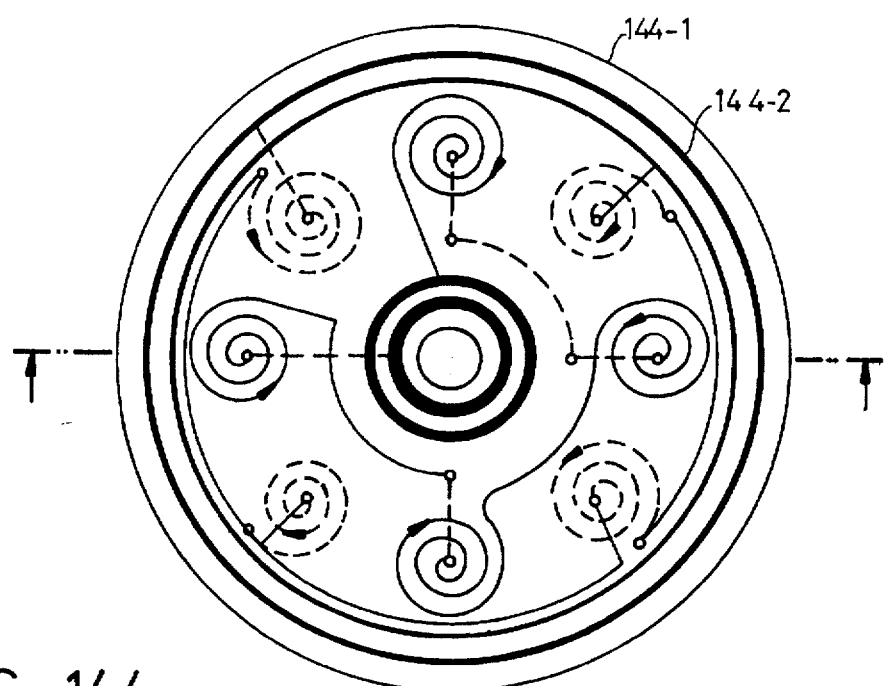
FIG. 144
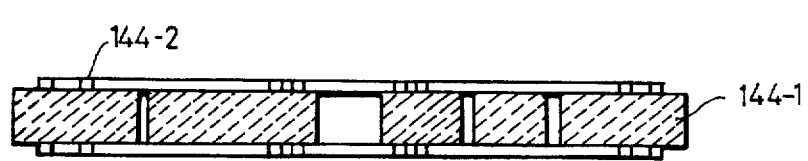

| | WA | WB |
|---|---|---|
| 1 | + | 0 |
| 2 | 0 | + |
| 3 | − | 0 |
| 4 | 0 | − |
| 5 | + | 0 |
| ⋮ | | |

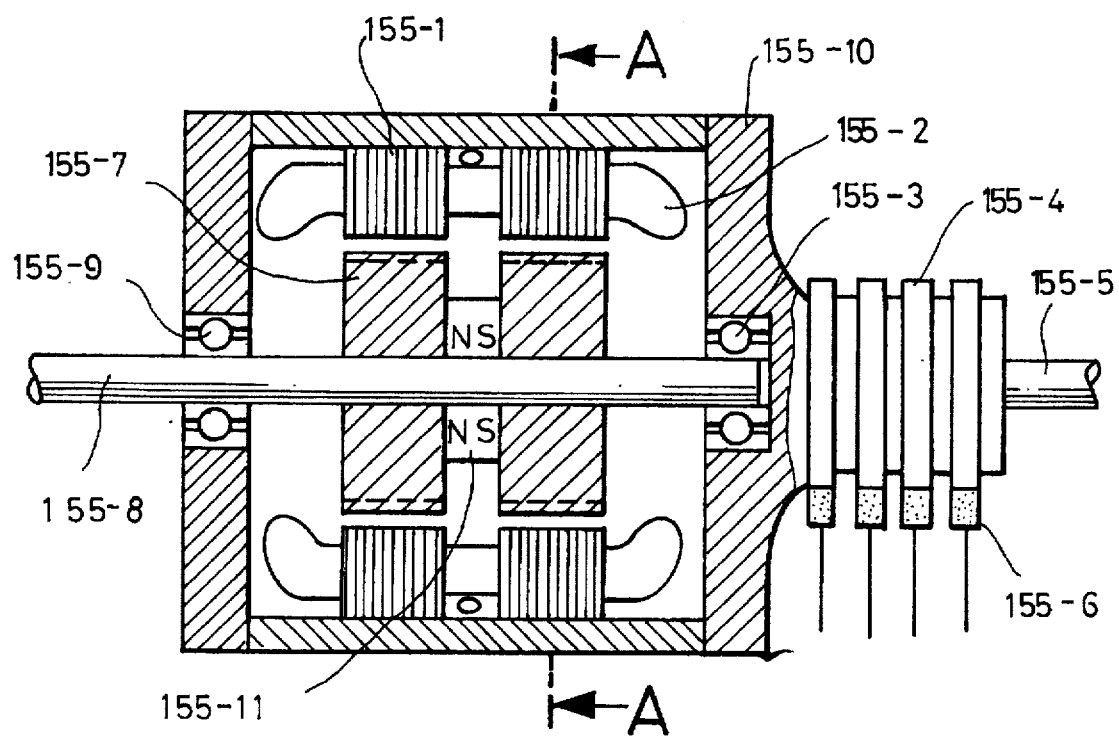
FIG. 155
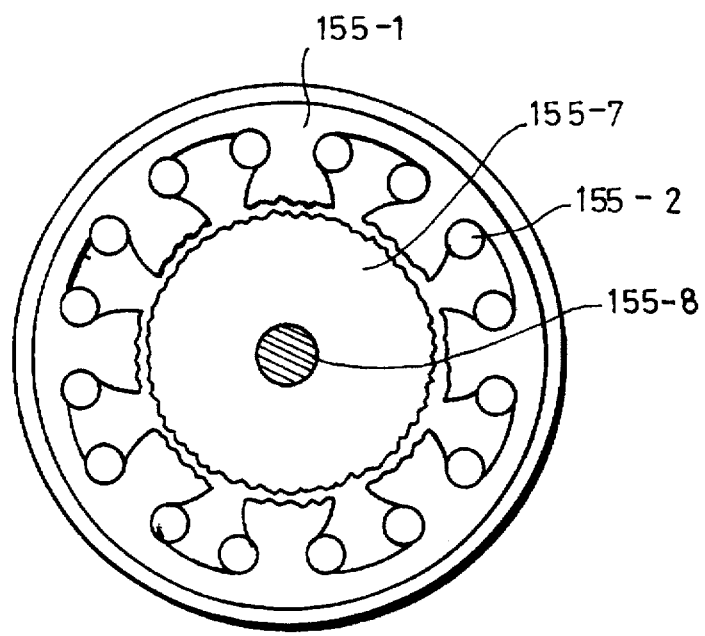
A-A SECTION

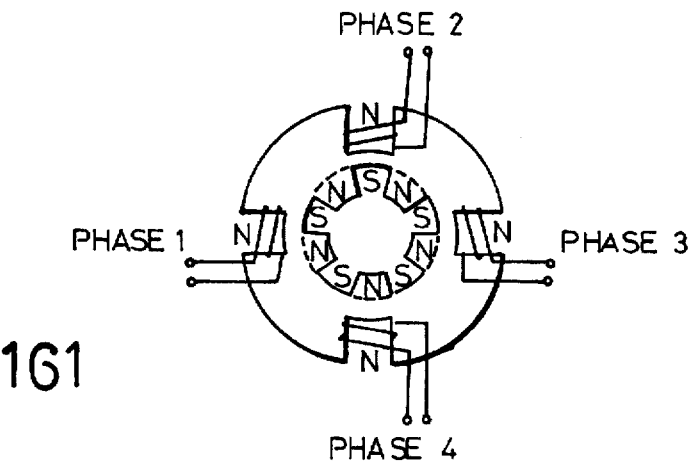
FIG. 161
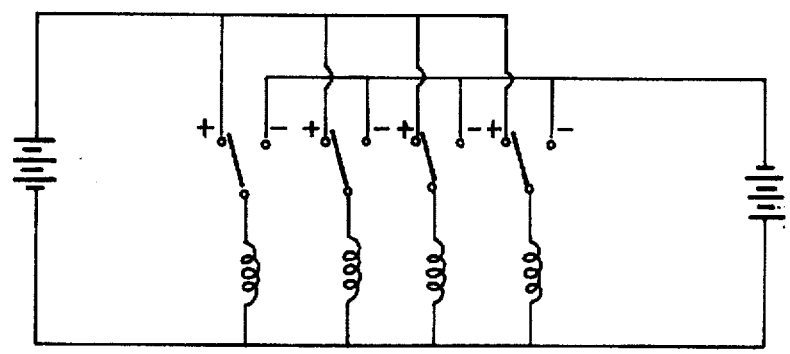
FIG. 162
| STEP | CW ROTATION | | | | CCW ROTATION | | | |
|---|---|---|---|---|---|---|---|---|
| | SW1 | SW2 | SW3 | SW4 | SW1 | SW2 | SW3 | SW4 |
| 1 | + | + | − | − | − | − | + | + |
| 2 | − | + | + | − | − | + | + | − |
| 3 | − | − | + | + | + | + | − | − |
| 4 | + | − | − | + | + | − | − | + |
FIG. 163

| STEP | CW ROTATION | | | | CCW ROTATION | | | |
|---|---|---|---|---|---|---|---|---|
| | SW1 | SW2 | SW3 | SW4 | SW1 | SW2 | SW3 | SW4 |
| 1 | − | + | − | + | + | − | + | − |
| 2 | + | − | + | − | − | + | − | + |
| 3 | − | + | − | + | + | − | + | − |
| 4 | + | − | + | − | − | + | − | + |

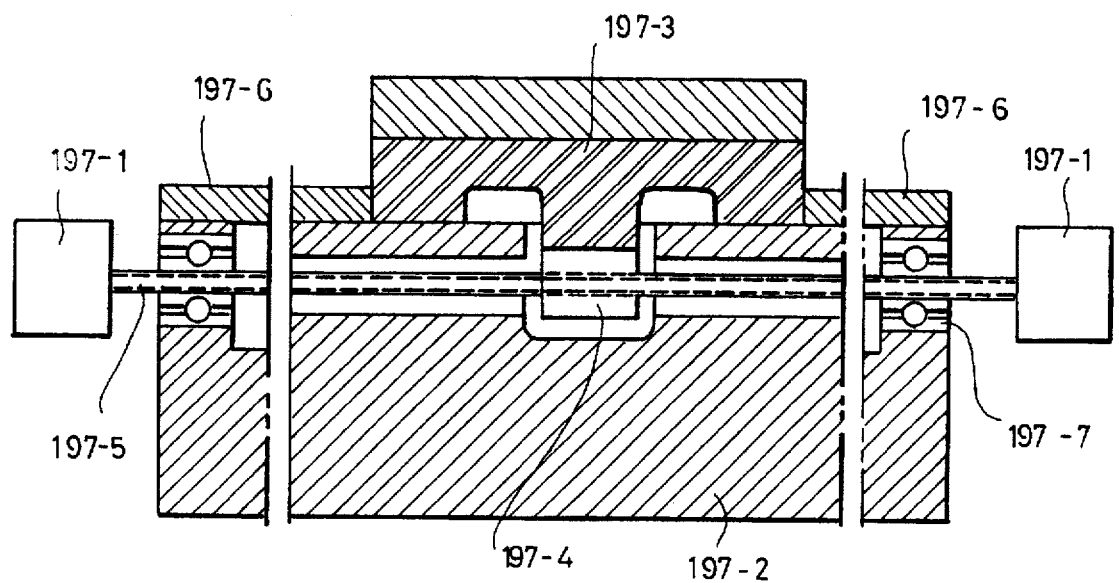
FIG. 197
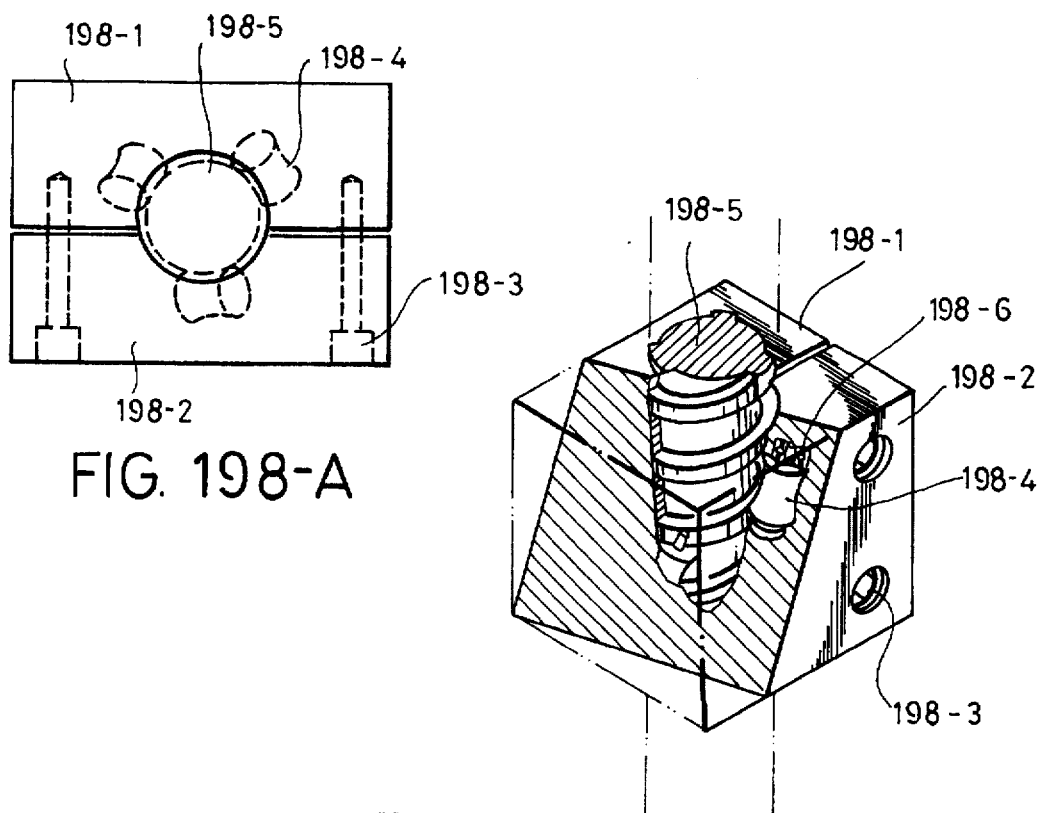
FIG. 198-A
FIG. 198-B

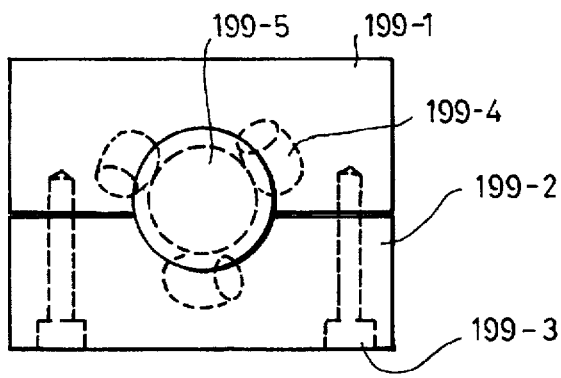
FIG. 199-A
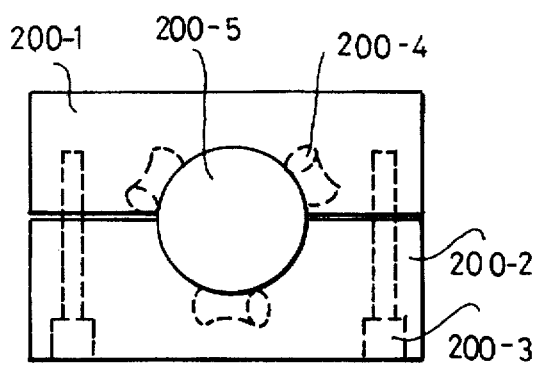
FIG. 200-A
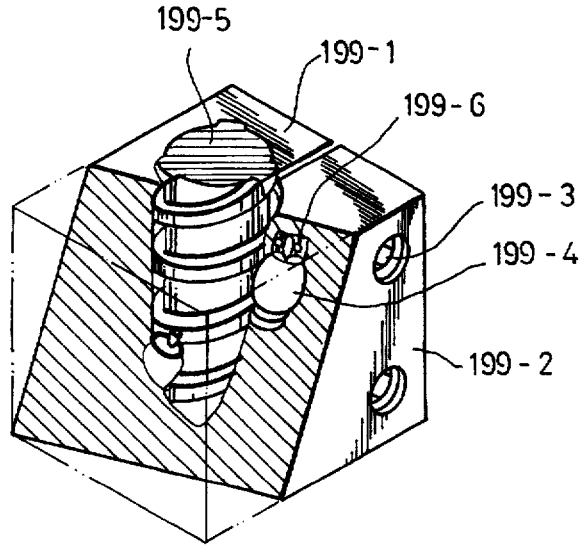
FIG. 199-B
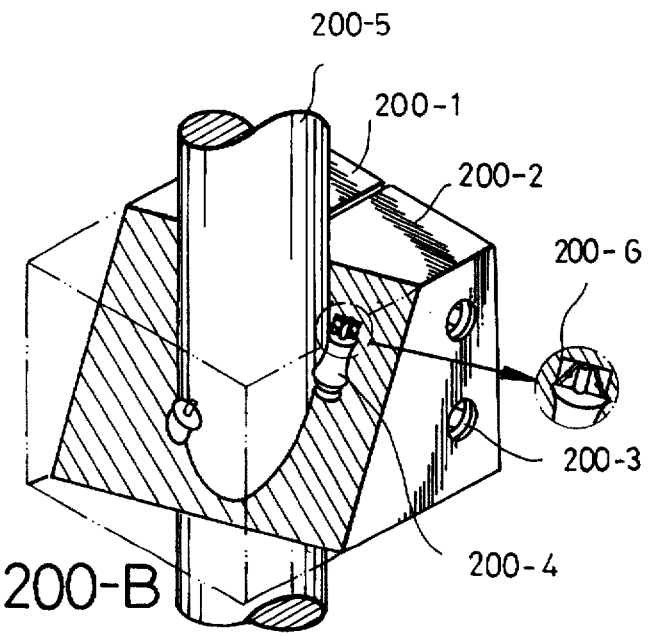
FIG. 200-B

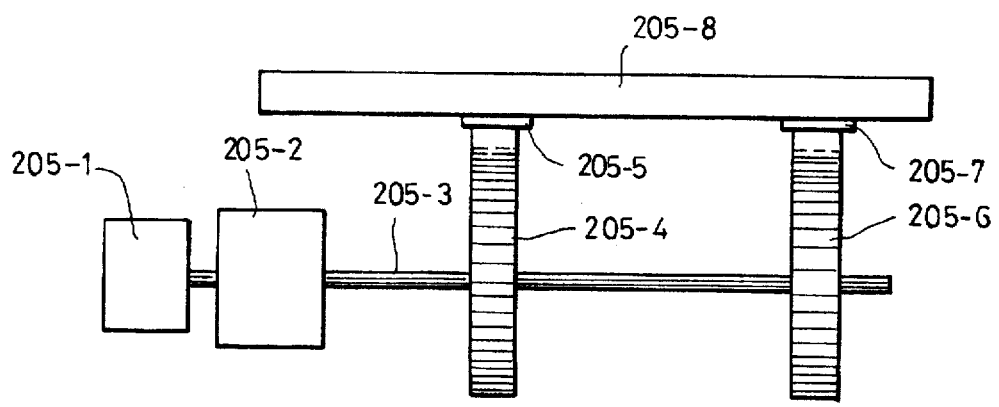
FIG. 205
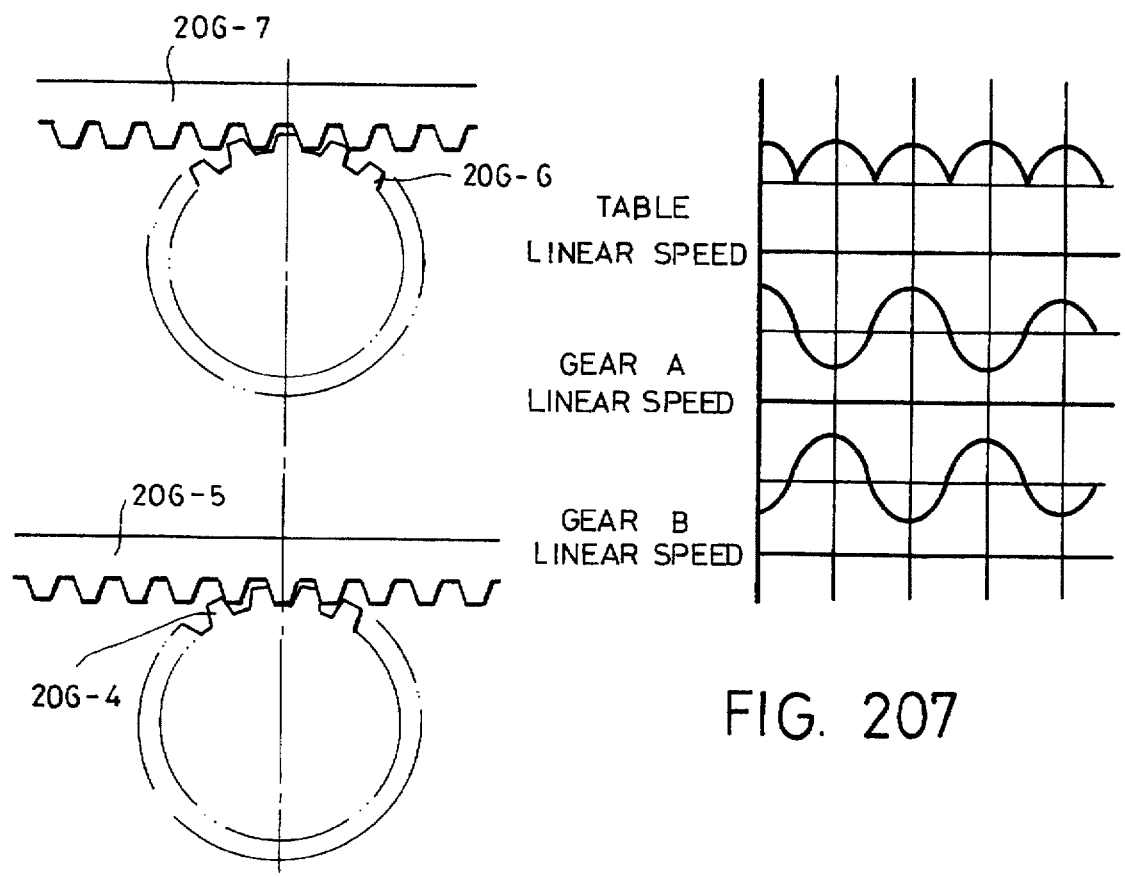
FIG. 206
FIG. 207

5,674,169

TUNNEL TYPE OR DRAGON-GATE TYPE PROCESSING SYSTEM ASSEMBLED WITH SELECTED ELEMENTS AND ITS RELATED INTERFACE MEANS

CROSS-REFERENCE TO RELATED APPLICATION

The instant application is a continuation of U.S. patent application Ser. No. 258,088 filed Oct. 17, 1988 which is a continuation of Ser. No. 426,188 filed Sep. 28, 1982, the contents of which are incorporated herein in their entirety.

BACKGROUND OF THE INVENTION

Simplicity, standardization, and specifications are the basic pre-requisites in mass production of industrial products. However, the main mechanical processing machine in an automatic processing system usually must be individually designed so as to meet the requirements of different workpieces (products) and different processing procedures; therefore, standardization of such machines is rather difficult to achieve. Further, in cases where the workpieces or the processing procedure requires major changes, the flexibility to such machines is a problem, especially, for a processing system for a large workpiece.

SUMMARY OF THE INVENTION

In order to eliminate the aforesaid drawbacks, the inventor has developed a dragon-gate type machine tool, with a completely innovative idea in terms of design, so as to make said machine tool multi-functional. For example, the design allows one machine to be used in a variety of operations such as lathe cutting, drilling, planning, milling, abrading, and boring. Moreover, this invention may be arranged in a "Group" type structure for series and flow-chart sequence processing, or for parallel-type processing or combined processing simultaneously. By means of the newly developed automatic tool-exchange method, the tool chest, the circulating working table and other interface devices are collectively controlled by a small computer and a tunnel-type mechanical processing system is established. In the processing system, the elements to be included upon the "Group" type structure may be selected dependent upon the processing procedures and the requirements of the workpiece.

Since the mechanical hardware and the elements in the "Group" type structure are all assembly and disassembly elements, a person who knows little about the inner mechanical structure in the production flow-chart system can still pick up or select the elements to assemble a given "Group" structure. Owing to the assembly and disassembly features of the elements in the system, the present invention may be manufactured by mass production methods under a given standard and predetermined specifications. In addition, any change in processing power and process sequence may be accomplished by changing the software instructions of the machine, or by minor change in the hardware portion, so as to allow the mechanical processing system of the present invention to be used not only for specialized applications but also for applications of a general nature so that the inability of known machines to conduct economical mass production (for example, where a workpiece is of a small quantity but requires multiple manufacturing steps) may be overcome.

Generally, dragon-gate type machine tools may be classified according to their functions as follows:

(1) Planning machine and milling machine.
(2) Drilling machine.
(3) Grinding machine.
(4) Vertical lathe.
(5) Copying lathe.

In accordance with their structure, they may be classified as follows:

(1) One-sided vertical column type.
(2) Two-sided vertical column type.
(3) Multi-sided vertical column type.

In accordance with the method of driving these machines during processing, the machines may be classified as follows:

(1) Dragon-gate motion type.
(2) Working table reciprocating motion type.
(3) Working table rotary motion type.
(4) A combination working table reciprocating and rotary motion type.
(5) A type in which the workpiece is to be processed is placed on the ground.

In accordance with lathe mandrel apparatus, the machines may be classified as follows:

(1) Single mandrel type.
(2) Multi-mandrel type.

There are other types of machines which can perform several functions in the mechanical processing system, such as assembly and exchange functions, and their functional versatility is also limited by their structure. For instance, the vertical lathe cannot be used for planning or milling processing, and the dragon-gate type milling lathe cannot perform cutting processing. Moreover, the exchangeability between structures is rather low. Therefore, in the conventional dragon-gate mechanical processing system, the adjustment flexibility of the processing procedures and the ability to meet the requirements of various processing workpieces is very limited. The structures of this invention which are specifically designed to eliminate the aforesaid drawbacks are described in detail as follows.

1-1 The ring shaped top of the dragon gate structure.
1-2 A rotary driven lateral girder.
1-3 Lateral girder driving motor.
1-4 Ring-shaped guide channel.
1-5 Lateral driving motor for tool post.
1-6 Lateral driving guide screw for tool post.
1-7 Mandrel driving motor.
1-8 Tool post.
1-9 Working table.
1-10 Lathe bed.

Figure 2:
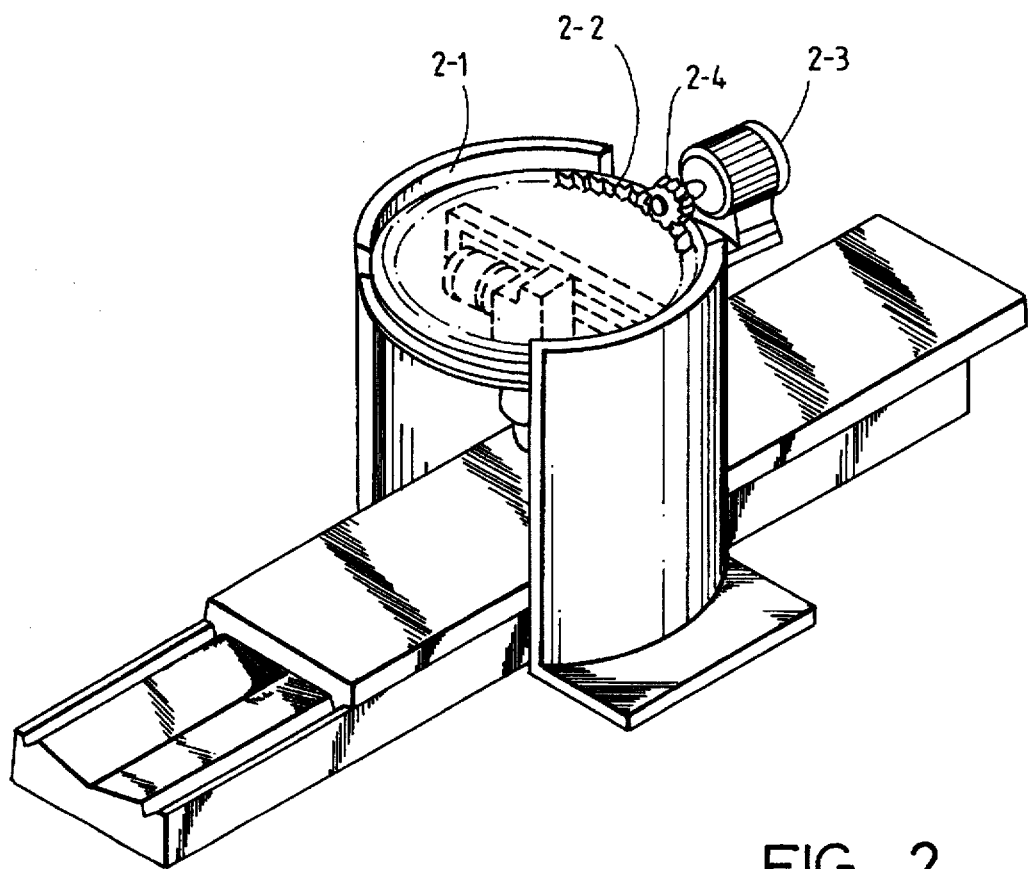

FIG. 2 shows a perspective view of a partial circle sliding surface. Machine parts are indicated as follows:

2-1 A dragon gate structure having a partial circle sliding surface.
2-2 Bevel gear.
2-3 Driving motor.
2-4 The prime driving gear.

FIG. 3-A is a plan view showing the lathe cutting function. Machine parts are indicated as follows:

3-1 Ring-shaped top of a dragon gate structure.
3-2 Rotary driven lateral girder.
3-3 Tool post.
3-4 Working table.

FIG. 3-B is a plan view showing the planning and milling functions. Machines parts are indicated as follows:
3-1 Ring-shaped top of the dragon gate structure.
3-2 Rotary driven lateral girder.
3-3 Tool post.
3-4 Working table.

FIG. 3-C is a plan view showing a multi-station device with multiple ring lateral girders and working tables. Machine parts are indicated as follows:
3-1 Ring-shaped top of the dragon gate structure.
3-2 Rotary driven lateral girder.
3-3 Tool post.
3-4 Working table.
3-5 Working table.
3-6 Conveying belt.

FIG. 4 is a plan view showing a symmetrical and synchronous balance tool post structure. Machine parts are indicated as follows:
4-1 Ring-shaped top of the dragon gate structure.
4-2 Tool post.
4-3 Laterally driving guide screw for the tool post.
4-4 Rotary driven lateral girder.

FIG. 5 is a plan view showing a symmetrical and synchronous balance block structure. Machine parts are indicated as follows:
5-1 Ring-shaped top of the dragon gate structure.
5-2 Tool post.
5-3 The laterally driving guide screw of the tool post or balance block.
5-4 Rotary driven lateral girder.
5-5 Balance block.

Figure 6:
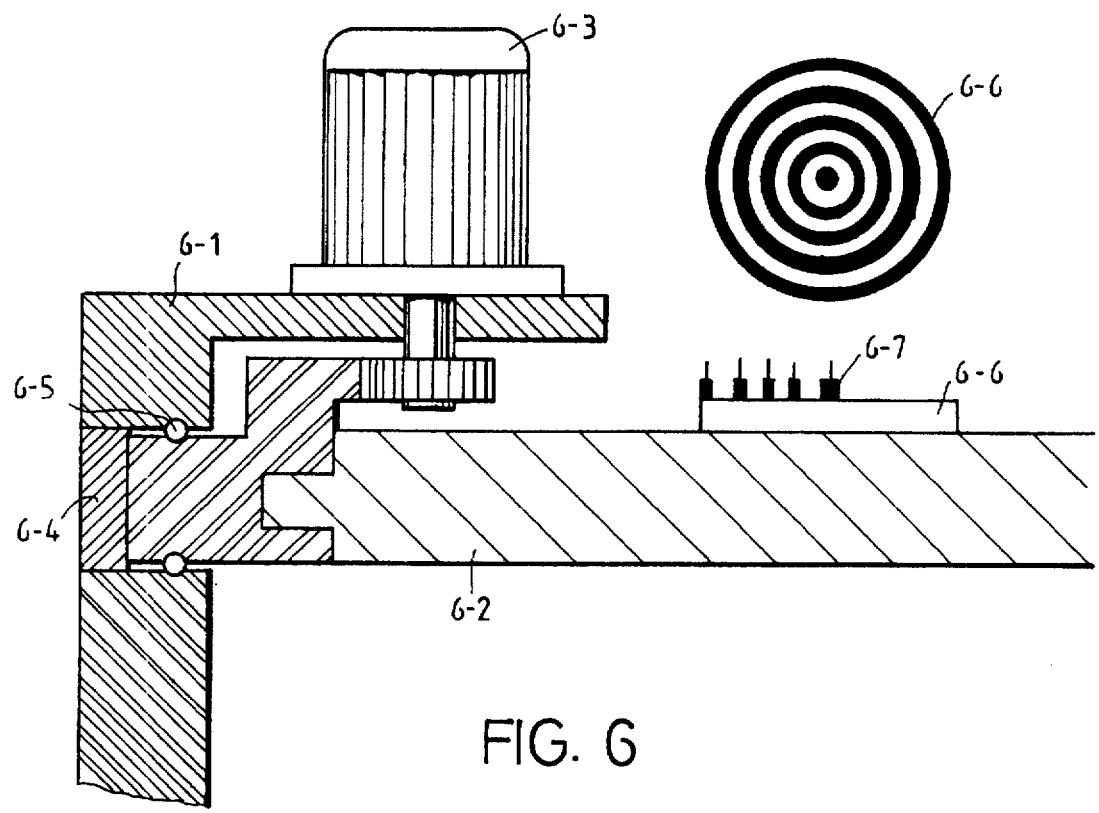

FIG. 6 is a cross-sectional view of a rotary lateral girder driven by a motor and power conveying apparatus.
6-1 The fixed seat of the driving motor.
6-2 Rotary driven lateral girder.
6-3 Rotary driving motor.
6-4 External fixing ring structure.
6-5 Bearing.
6-6 Conductive disk.
6-7 Conductive brush.

Figure 7:
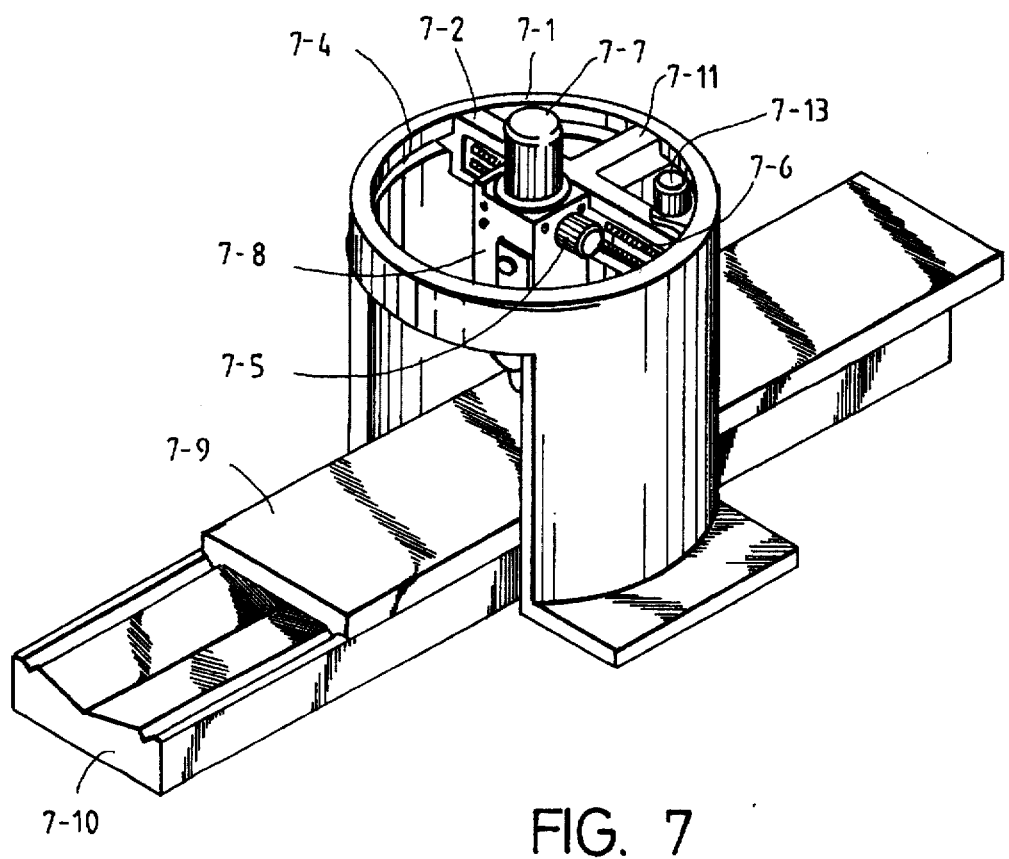

FIG. 7 is a perspective view showing the rotary lateral girder being provided with a supporting arm. Machine parts are indicated as follows:
7-1 The ring-shaped top of the dragon gate structure.
7-2 Rotary driven lateral girder.
7-3 Driving motor of the rotary girder.
7-4 Ring-shaped guide channel.
7-5 The laterally driving motor for the tool post.
7-6 The laterally driving guide screw for the tool post.
7-7 Mandrel driving motor.
7-8 Tool post.
7-9 Working table.
7-10 Lathe bed.
7-11 Auxiliary arm.

Figure 8:
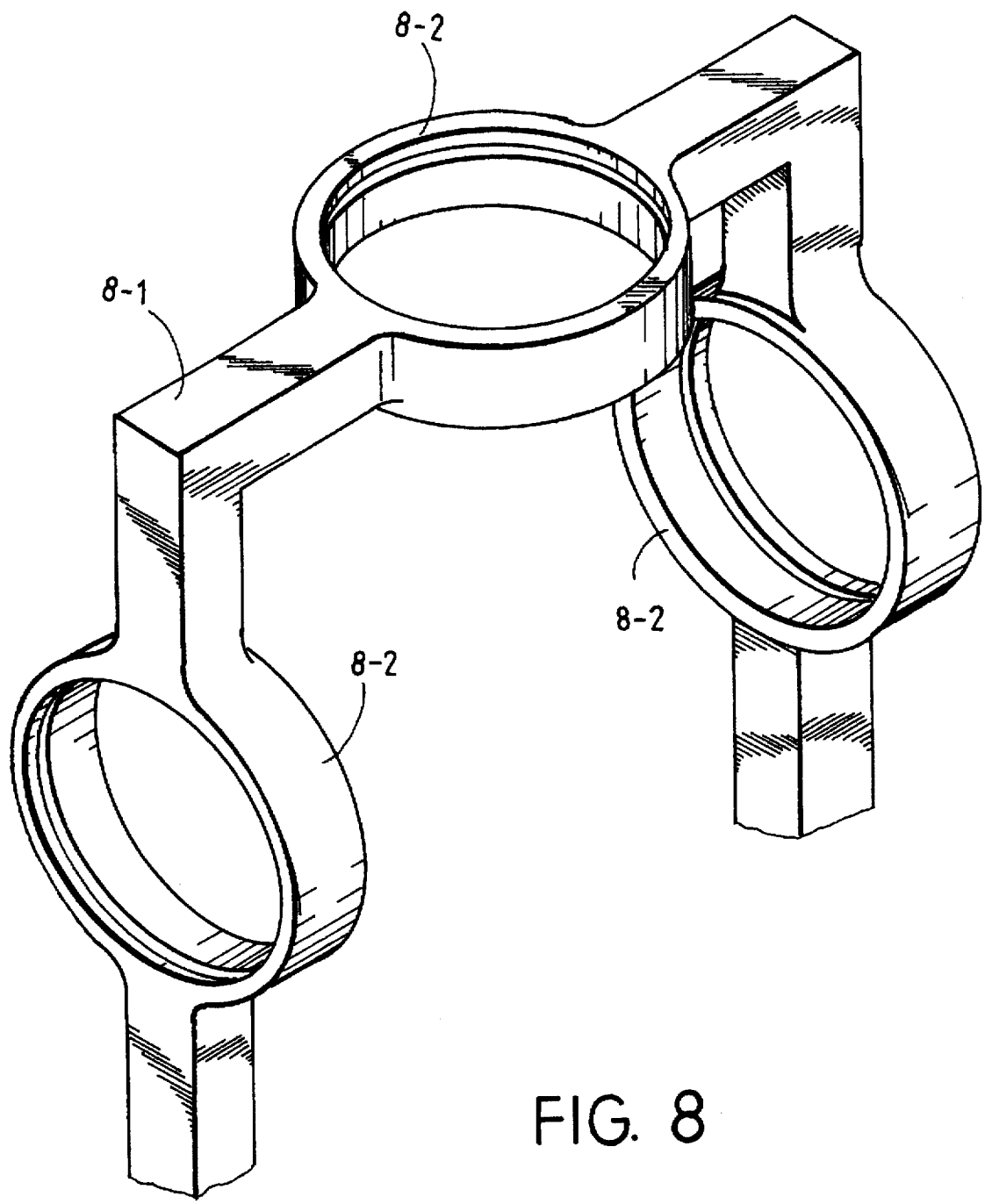

FIG. 8 is a perspective view showing a device for installing the rotary lateral girder.

8-1 The top of the dragon gate.
8-2 A ring-shaped structure for coupling the rotary driven lateral girder.

Figure 9:
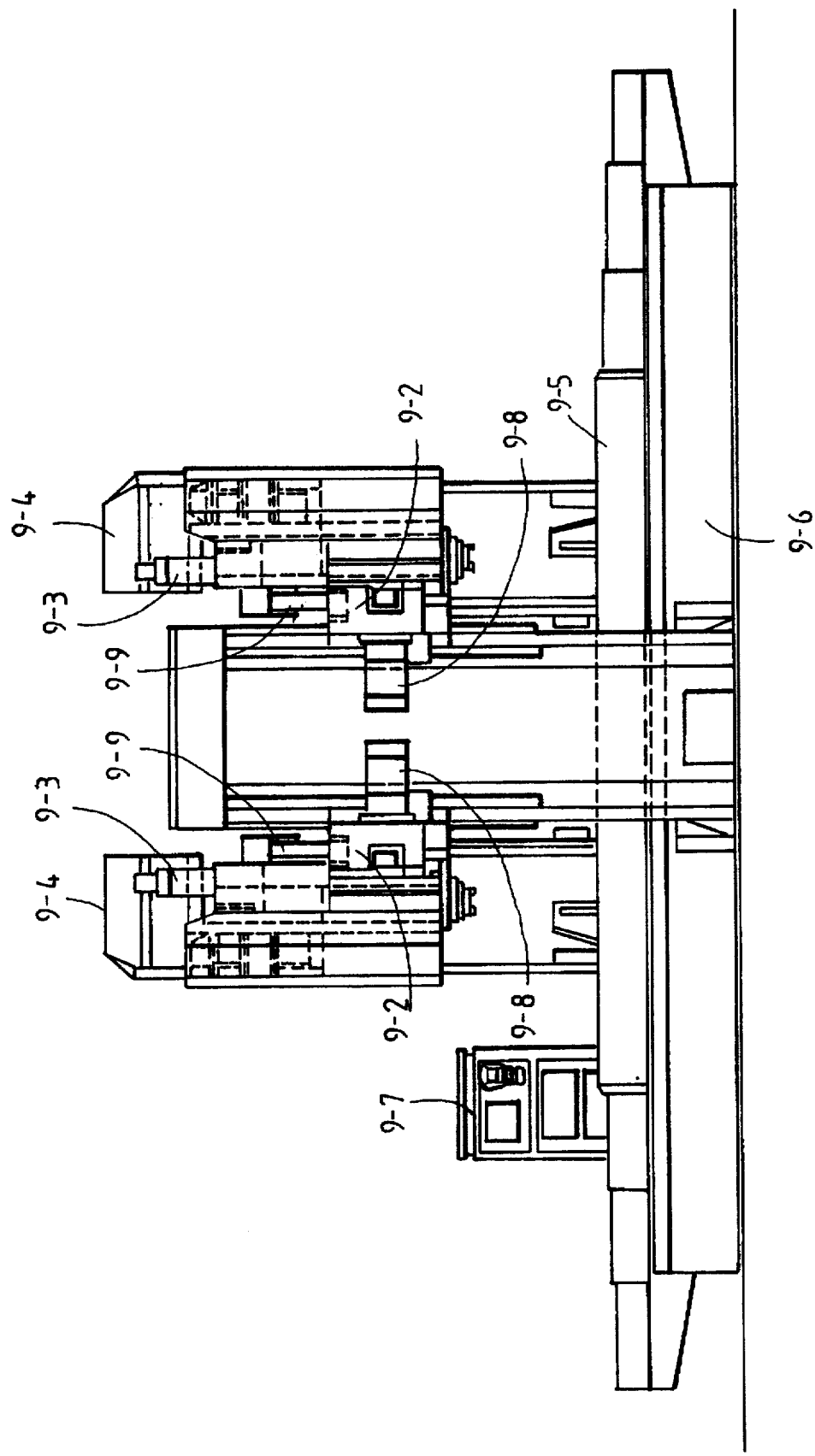

FIG. 9 is a side view showing a dragon gate structure provided with lateral girders and a tool post at both sides.
9-1 The top of the dragon gate.
9-2 Lateral girder.
9-3 Mandrel driving motor.
9-4 Spindle tool post.
9-5 Working table.
9-6 Lathe bed.
9-7 Power control box.
9-8 Driving motor for moving the lateral girder up and down.
9-9 Lateral driving motor for mandrel tool post.

Figure 10:
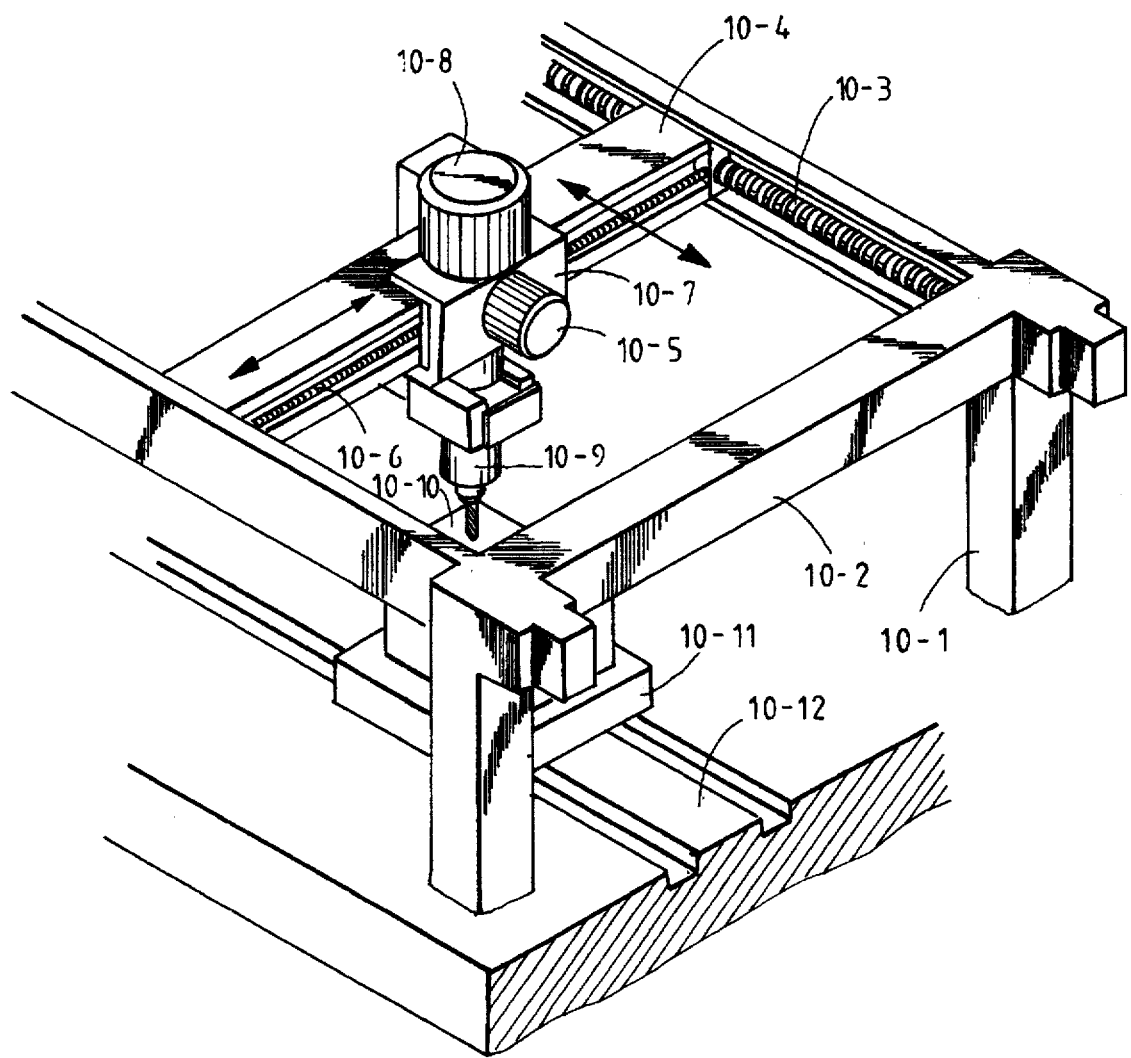

FIG. 10 is a perspective view showing a dragon gate structure furnished with a suspension rail type of lateral girder. Machine parts are indicated as follows:
10-1 The column of the dragon gate.
10-2 Top of the dragon gate.
10-3 The displacement guide screw of the lateral girder.
10-4 Lateral girder.
10-5 The lateral driving motor of the tool post.
10-6 The lateral driving guide screw of the tool post.
10-7 Tool post.
10-8 The mandrel driving motor.
10-9 Tool mandrel.
10-10 Working table.
10-11 Working table.
10-12 Lathe bed.

Figure 11:
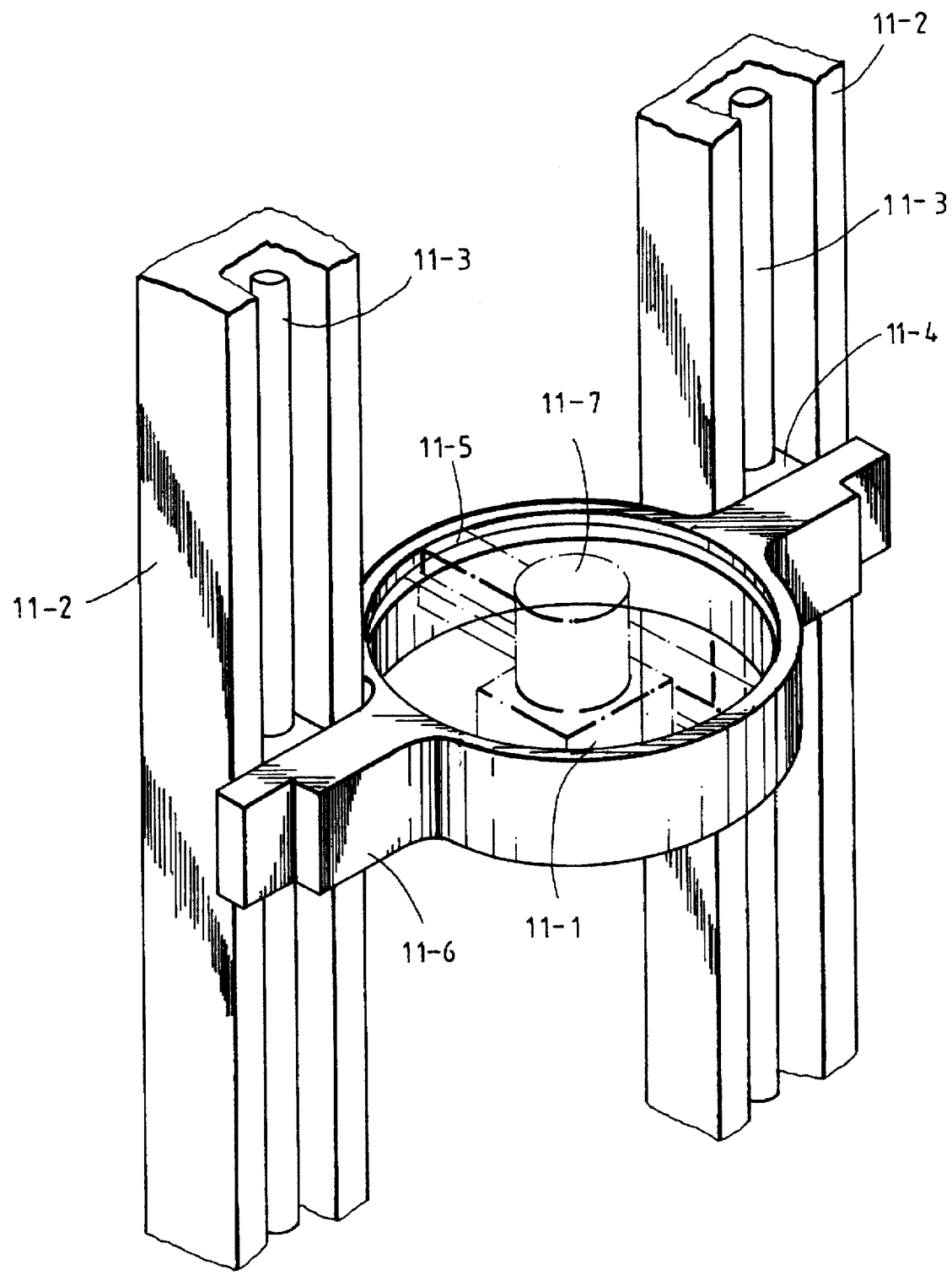

FIG. 11 is a perspective view showing a rotary driven lateral girder in the main lateral girder. Machine parts are indicated as follows:
11-1 Tool post.
11-2 The column of the dragon gate.
11-3 The driving guide screw for moving the ring-shaped lateral girder up and down.
11-4 Joint block.
11-5 The rotary driven lateral girder.
11-6 Ring-shaped lateral girder.
11-7 Mandrel driving motor.

Figure 12:
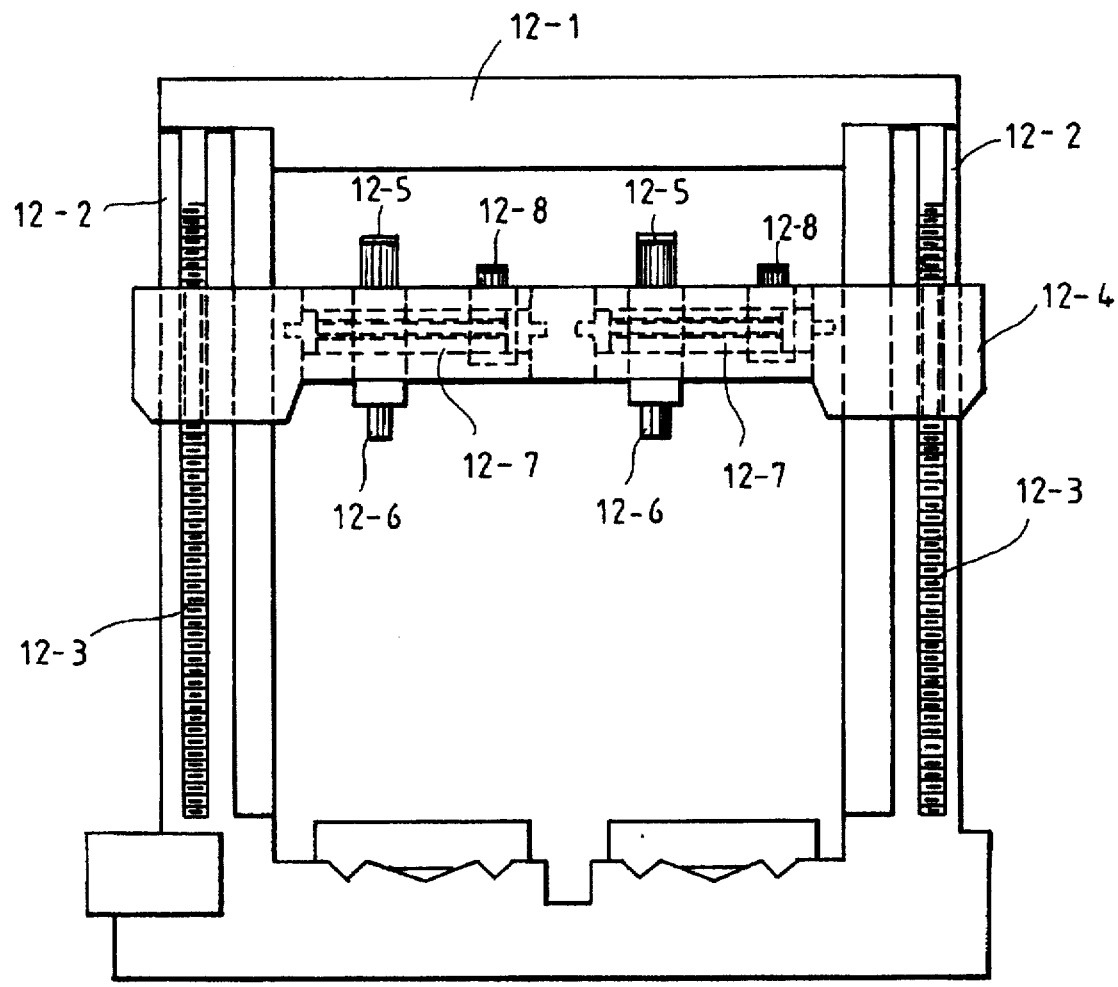

FIG. 12 is a side view showing a rotary driven lateral girder in the main lateral girder. Machine parts are indicated as follows:
12-1 Top of the dragon gate.
12-2 The column of the dragon gate.
12-3 The driving guide screw for moving the ring-shaped lateral girder up and down.
12-4 Ring-shaped lateral girder.
12-5 Mandrel driving motor.
12-6 Tool post.
12-7 The rotary driven lateral girder.
12-8 The driving motor of the rotary driven lateral girder.
12-9 Working table.
12-10 Lathe table.

Figure 13:
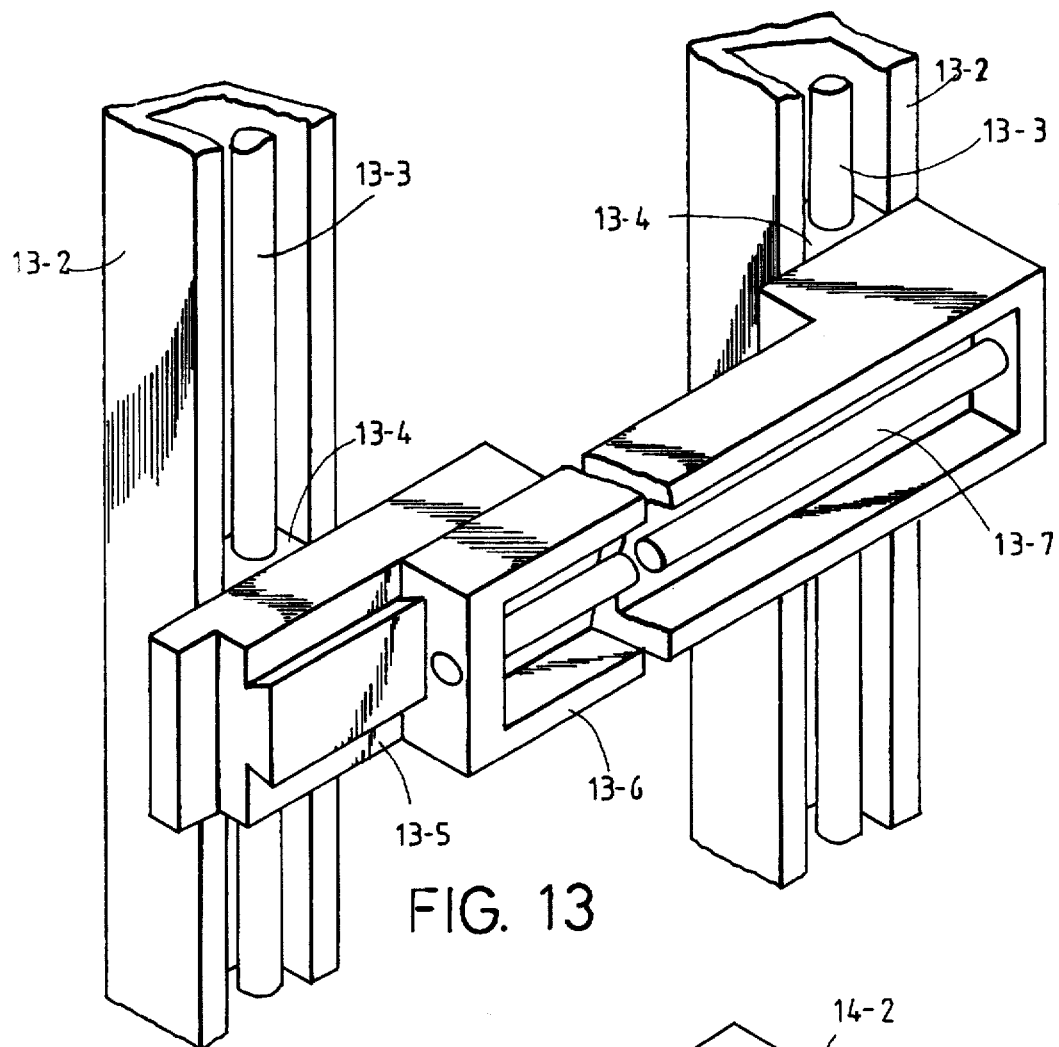

FIG. 13 is a perspective view showing a lateral girder structure having two sections. Machine parts are indicated as follows:
13-1 The column of the dragon gate.

13-2 The driving guide screw for moving the ring-shaped lateral girder up and down.

13-3 Joining block.

13-4 The secondary lateral girder in each of the two-sectional lateral girders.

13-5 The primary lateral girder.

13-6 The lateral driving guide screw of the tool post.

Figure 14:
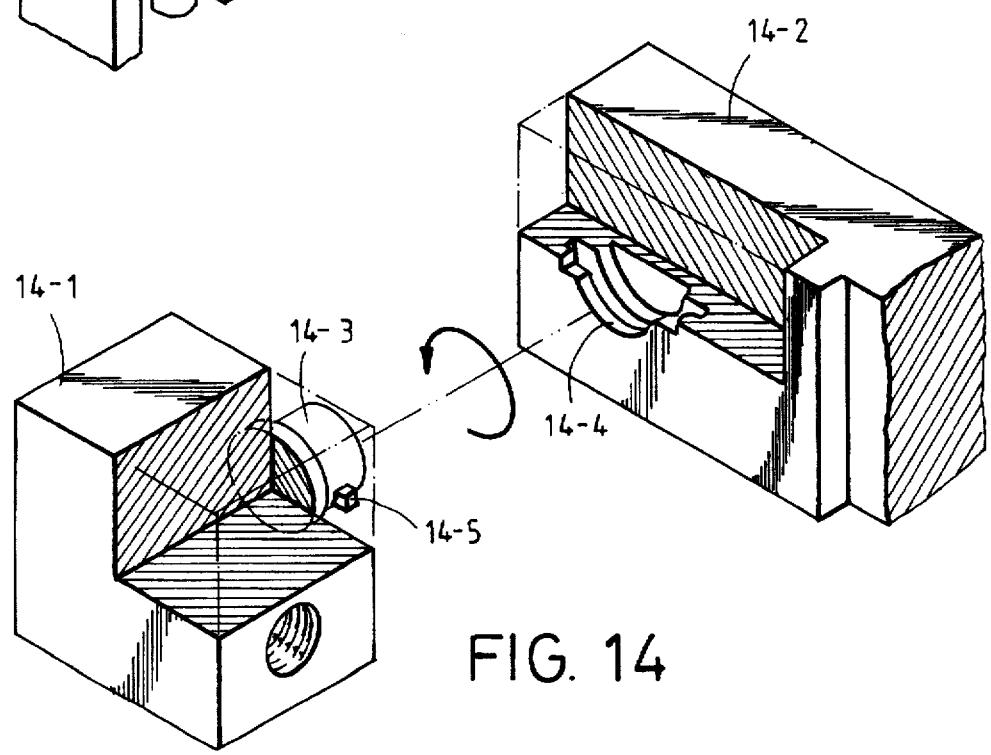

FIG. 14 is a perspective view showing the two-sectional lateral girders being joined together with the column guide screw. Machine parts are indicated as follows:

14-1 Joining block.

14-2 Lateral girder.

14-3 Salient stud.

14-4 Socket.

14-5 Stud.

Figure 15:
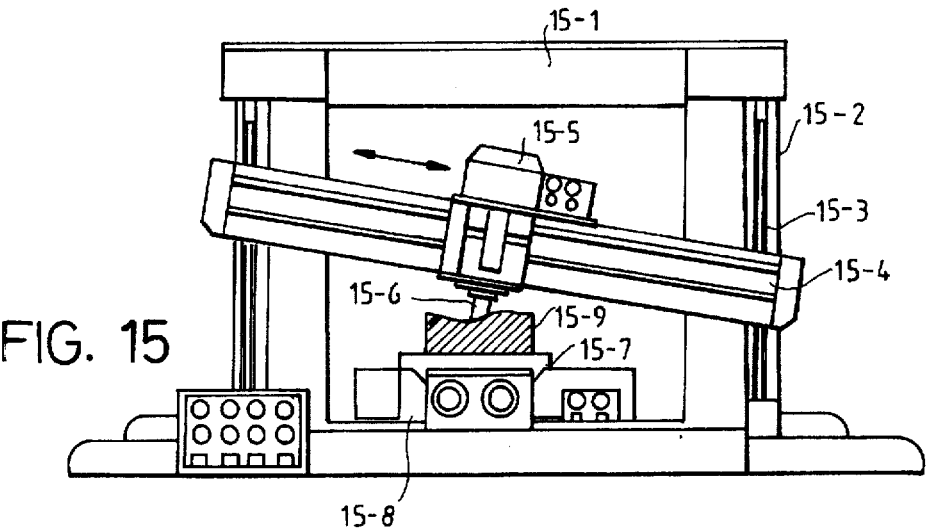

FIG. 15 is a side view showing an oblique planning processing. Machine parts are indicated as follows:

15-1 Top of the dragon gate.

15-2 Dragon gate column.

15-3 The driving guide screw for the lateral girder moving up and down.

15-4 Lateral girder.

15-5 Mandrel driving motor.

15-6 Tool.

15-7 Working table.

15-8 Lathe table.

15-9 Work piece.

Figure 16:
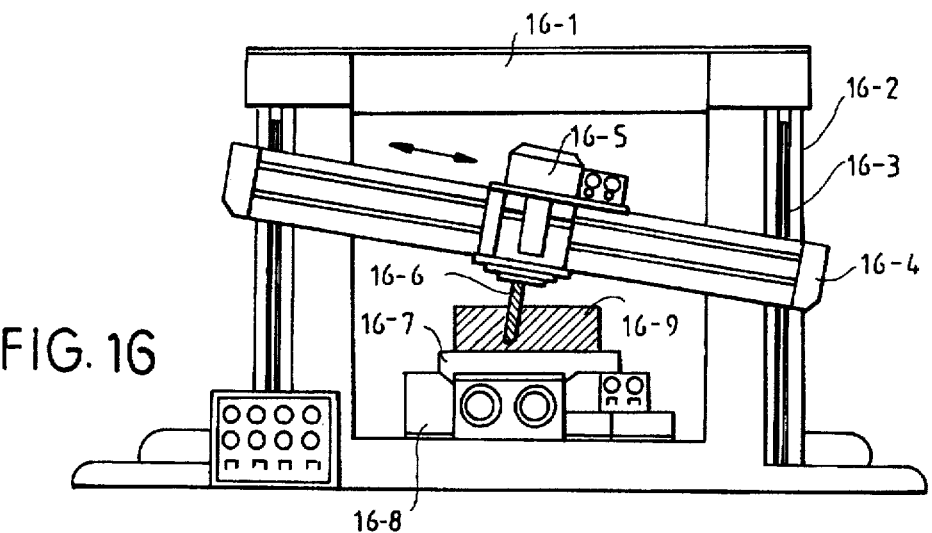

FIG. 16 is a side view showing an oblique lateral girder for oblique drilling processing. Machine parts are indicated as follows:

16-1 Top of the dragon gate.

16-2 Dragon gate column.

16-3 The driving guide screw for moving the lateral girder up and down.

16-4 Lateral girder.

16-5 Mandrel driving motor.

16-6 Tool.

16-7 Working table.

16-8 Lathe table.

16-9 Work piece.

Figure 17:
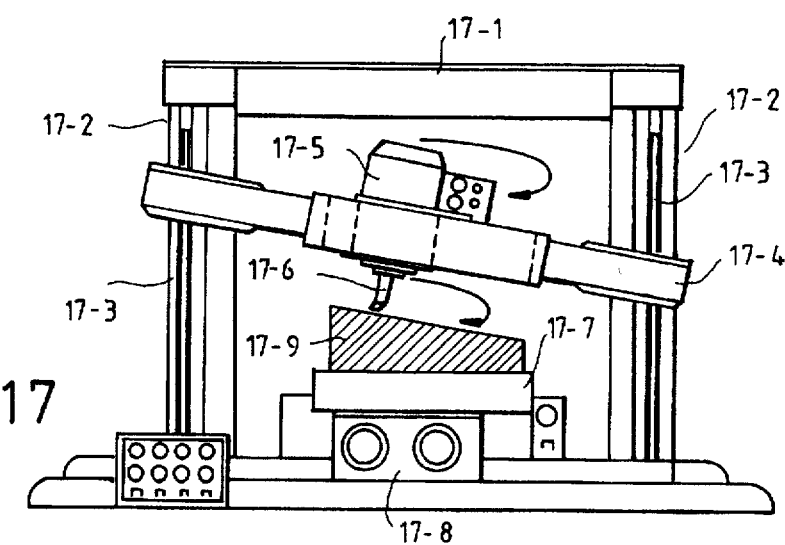

FIG. 17 is a side view showing an oblique lateral girder for lathing processing. Machine parts are indicated as follows:

17-1 Top of the dragon gate.

17-2 Dragon gate column.

17-3 The driving guide screw for moving the lateral girder up and down.

17-4 Lateral girder.

17-5 Mandrel driving motor.

17-6 Tool.

17-7 Working table.

17-8 Lathe table.

17-9 Work piece.

Figure 18:
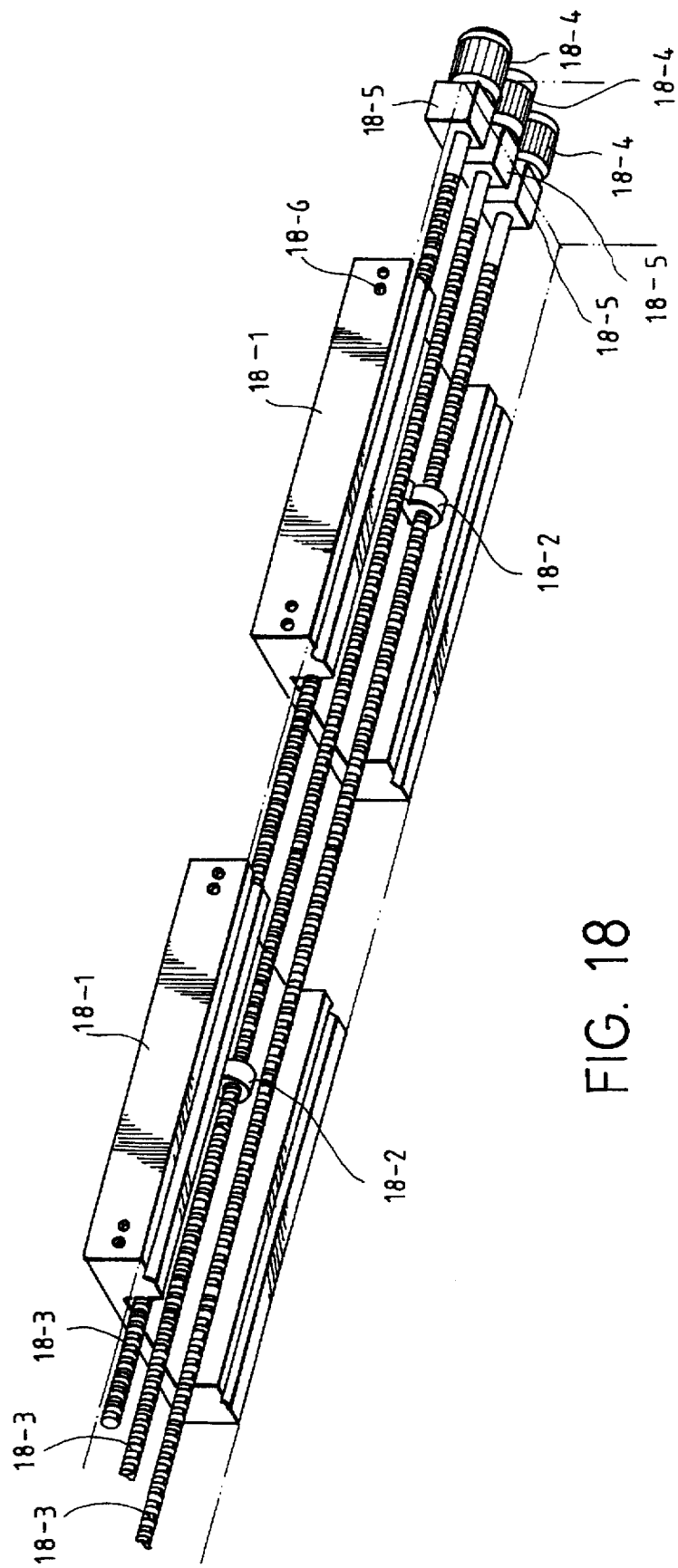

FIG. 18 is a perspective view showing a multi-section working table being driven with a guide screw. Machine parts are indicated as follows:

18-1 Working table.

18-2 The driving nut of the working table.

18-3 Driving guide screw of working table.

18-4 Driving motor.

18-5 Transmission case.

18-6 The fixing hole in interlocked driving operation.

Figure 19:
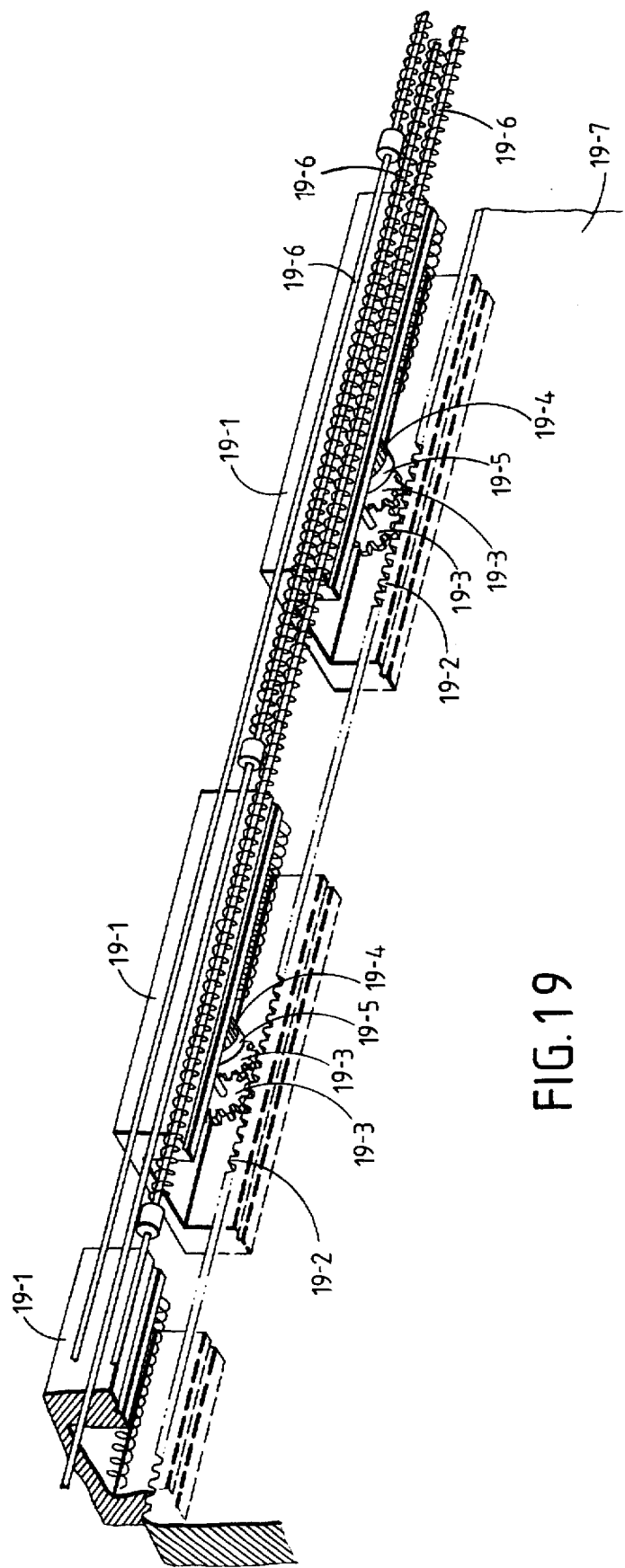

FIG. 19 is a perspective view showing a multi-section working table being driven with a motor installed at the working table base. Machine parts are indicated as follows:

19-1 Working table.

19-2 The rack gear being fixed on the lathe table.

19-3 Transmission gear.

19-4 The driving motor installed inside the working table.

19-5 Transmission case.

19-6 Movable lead.

19-7 Lathe bed.

Figure 20:
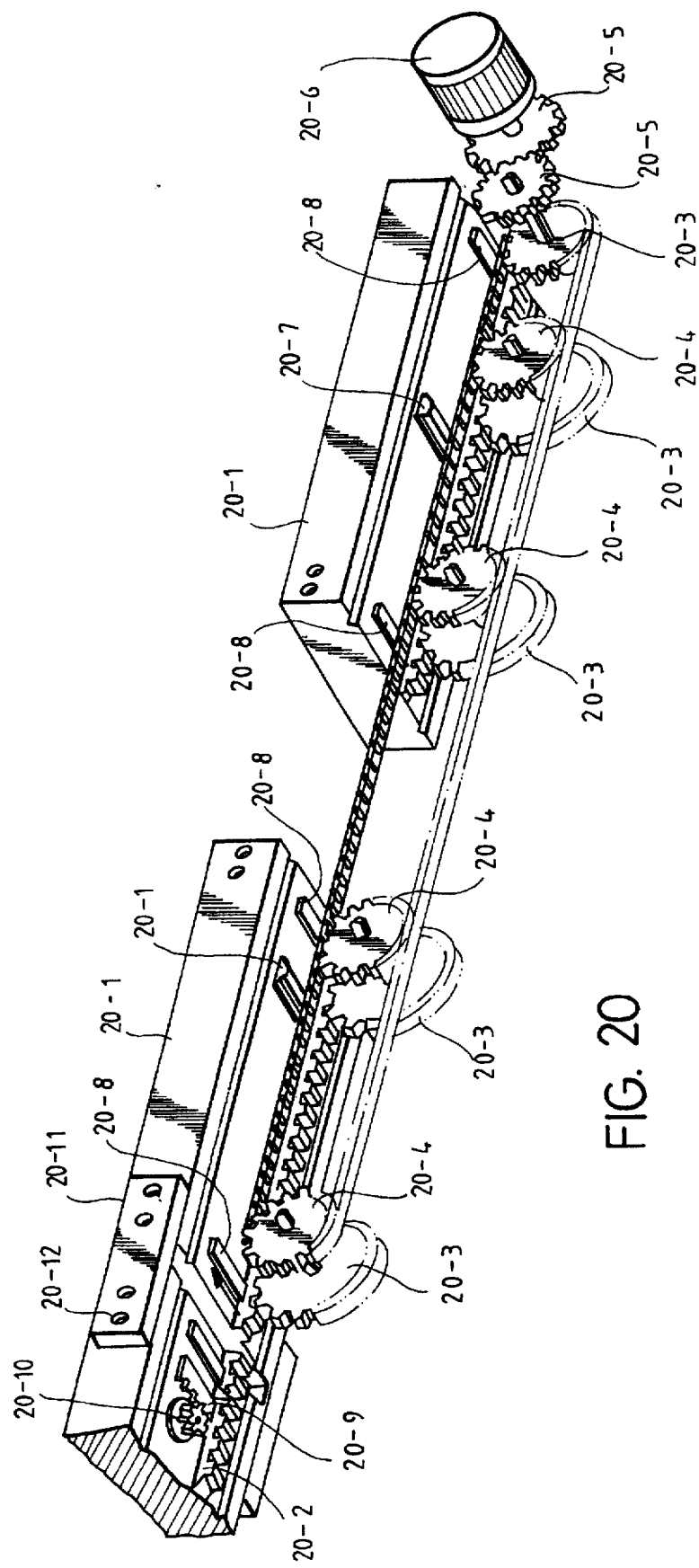

FIG. 20 is a perspective view showing a multi-section working table being driven by row-arranged gears and a lateral displacement clutch gear rack. Machine parts are indicated as follows:

20-1 Working table.

20-2 Working table driving gear rack.

20-3 Working table driving gear.

20-4 The sprockets being driven with one motor.

20-5 Transmission gear.

20-6 Driving motor.

20-7 The working table driving gear rack being driven for lateral displacement by a hydraulic or pneumatic means.

20-8 The lateral sliding channel of the working table driving gear rack.

20-9 The lateral displacement auxiliary gear rack of the working table driving gear rack.

20-10 The lateral displacement auxiliary gear of the working table driving gear.

20-11 The interlocking means of the working table.

20-12 The fixing hole of the interlocking means of the working table.

Figure 21:
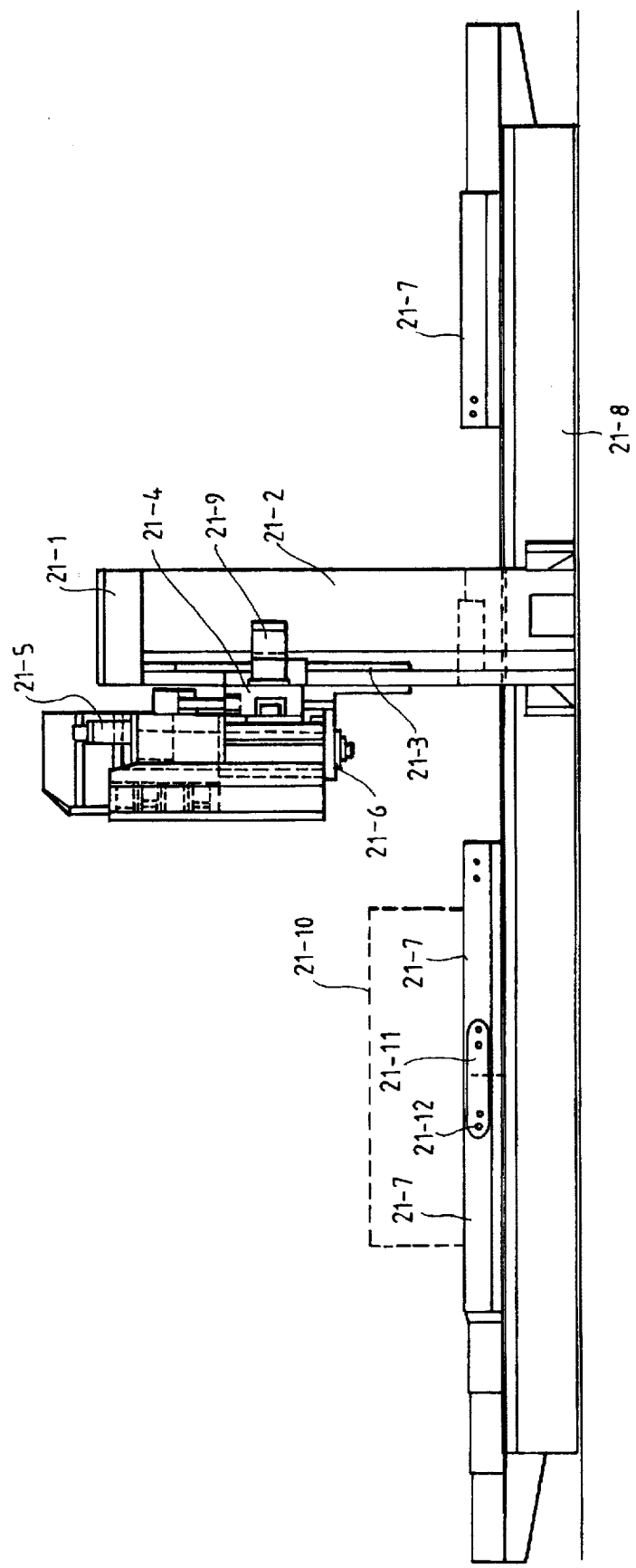

FIG. 21 is a side view showing a multi-section working table being trailed in series by means of interlocking means.

21-1 Top of the dragon gate.

21-2 Column of the dragon gate.

21-3 The guide screw for moving the lateral girder up and down.

21-4 Lateral girder.

21-5 Mandrel driving motor.

21-6 Tool mandrel.

21-7 Working table.

21-8 Lathe bed.

21-9 The lateral displacement driving motor of the mandrel tool post.

21-10 Work piece.

21-11 The interlocking means of the working table.

21-12 The locking nut of the interlocking means of the working table.

Figure 22:
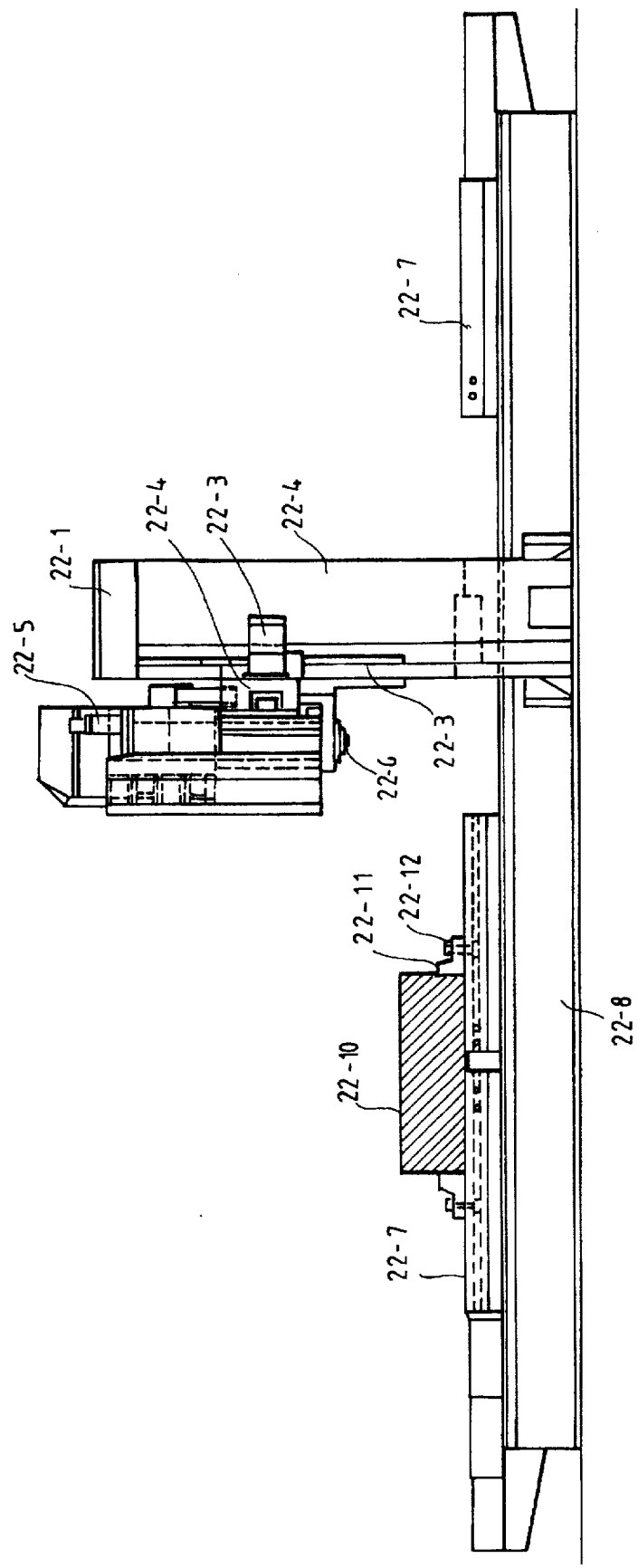

FIG. 22 is a side view showing a multi-section working table being trailed in series by means of a workpiece.

22-1 Top of the dragon gate.

22-2 Column of the dragon gate.

22-3 The guide screw for moving the lateral girder up and down.

22-4 Lateral girder.

22-5 Mandrel driving motor.

22-6 Tool mandrel.

22-7 Working table.
22-8 Lathe bed.
22-9 The lateral displacement driving motor of the mandrel tool post.
22-10 Work piece.
22-11 Work piece locking means.
22-12 The locking nut assembly of the workpiece locking means.

Figure 23:
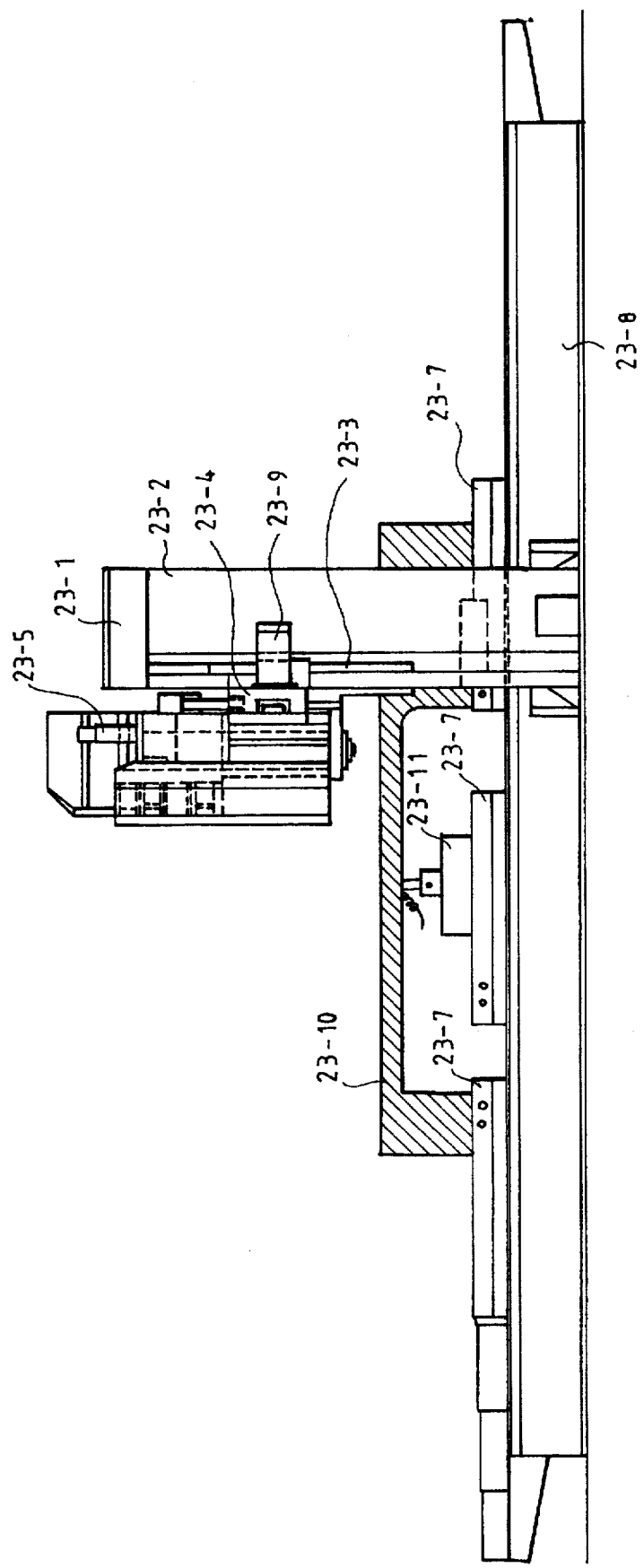

FIG. 23 is a side view showing a multi-section workpiece arranged in series in the gravity point support method to trail the working tables so that processing may be done at the base. Machine parts are indicated as follows:

23-1 Top of the dragon gate.
23-2 Column of the dragon gate.
23-3 The guide screw for moving the lateral girder up and down.
23-4 Lateral girder.
23-5 Mandrel driving motor.
23-6 Tool mandrel.
23-7 Lathe bed.
23-9 The lateral displacement driving motor of the mandrel tool post.
23-10 Tool post to be installed on the lathe table.

Figure 24:
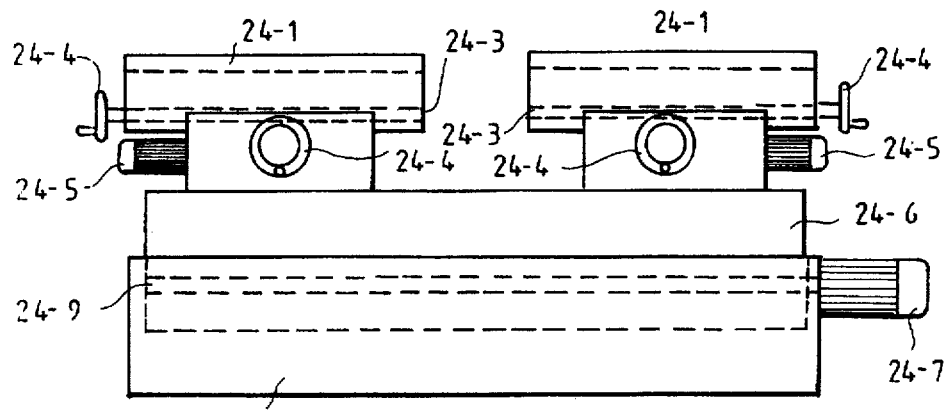

FIG. 24 is a side view showing an over-lapping type of working table. Machine parts are indicated as follows:

24-1 The upper layer working table.
24-2 The lathe bed of the upper working table.
24-3 The driving guide screw of the upper layer working table.
24-4 Manual operation wheel.
24-5 The driving motor of the upper working table.
24-6 The lower layer working table.
24-7 The driving motor of the lower layer working table.
24-8 Lathe bed.
24-9 The driving guide screw of the lower layer working table.

Figure 25:
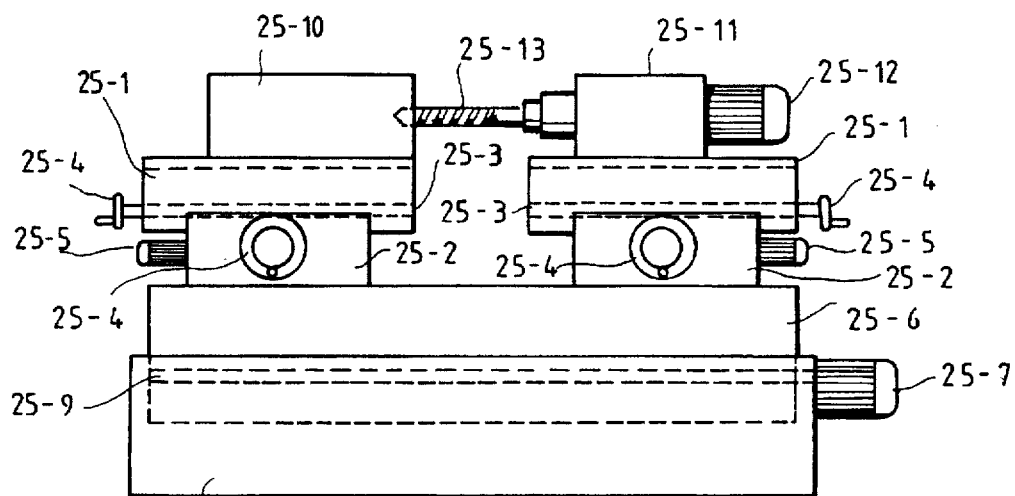

FIG. 25 is a side view showing an over-lapping type of working table. Machine parts are indicated as follows:

25-1 Small working table.
25-2 The fixed base of the small working table.
25-3 The guide screw of the small working table.
25-4 Hand wheel.
25-5 The driving motor of the small working table.
25-6 The main working table.
25-7 The driving motor of the main working table.
25-8 Lathe bed.
25-9 The driving guide screw of the main working table.
25-10 Work piece.
25-11 Tool post.
25-12 The driving motor of the tool.
25-13 Tool.

Figure 26:
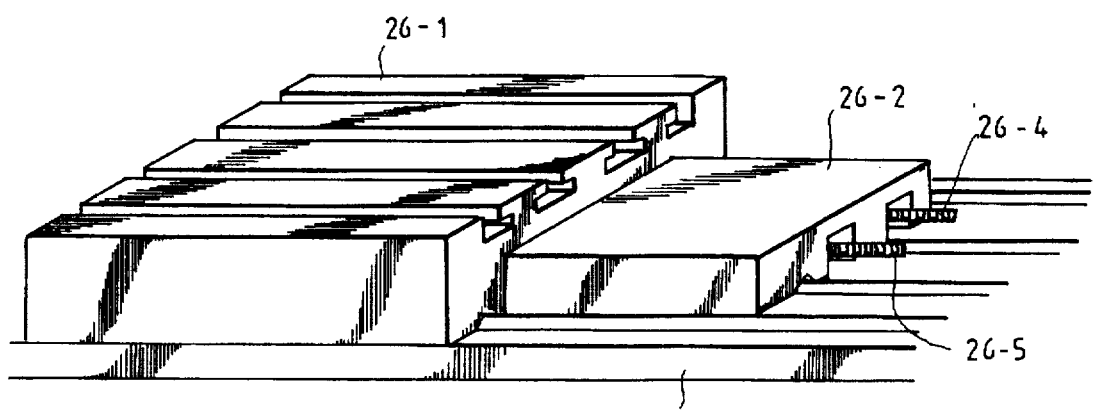

FIG. 26 shows the linear type of shrapnel (or nest) working table. Machine parts are indicated as follows:

26-1 The main working table.
26-2 Small working table.
26-3 Lathe bed.
26-4 The driving guide screw of the small working table.
26-5 The driving guide screw of the main working table.

Figure 27:
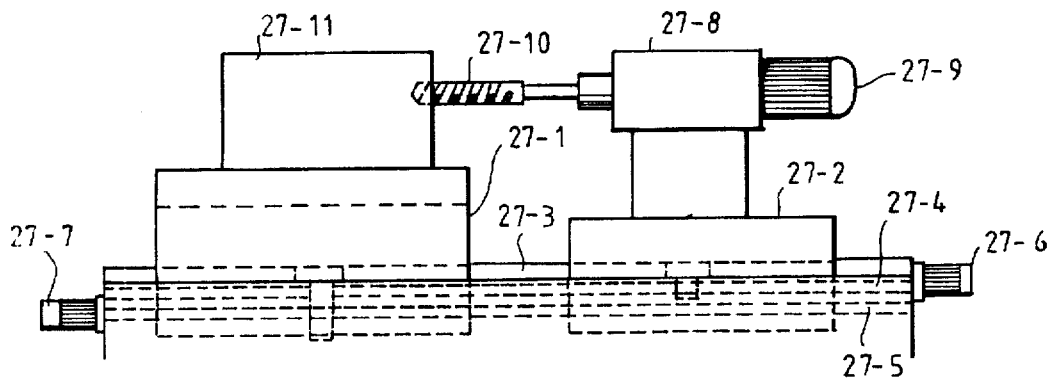

FIG. 27 shows the side view of the linear type of shrapnel (or nest) working table. Machine parts are indicated as follows:

27-1 Main working table.
27-2 Small working table.
27-3 Lathe bed.
27-4 The driving guide screw of the small working table.
27-5 The driving guide screw of the main working table.
27-6 The driving motor of the small working table.
27-7 The driving motor of the main working table.
27-8 Tool post.
27-9 Tool driving motor.
27-10 Tool.
27-11 Work piece.

Figure 28:
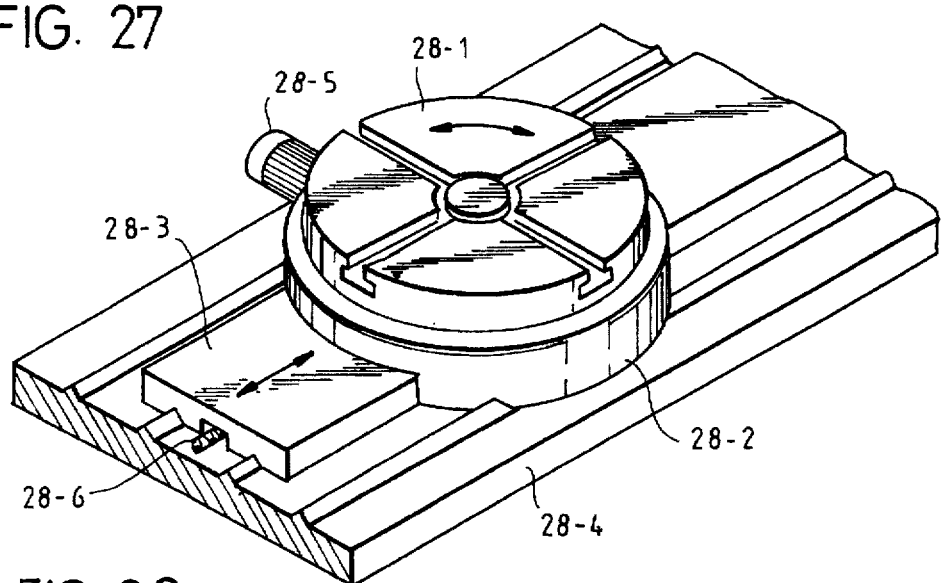

FIG. 28 shows the rotary type of shrapnel working table. Machine parts are indicated as follows:

28-1 Main working table.
28-2 The base of the main working table.
28-3 Small working table.
28-4 Lathe bed.
28-5 The rotary driving motor of the main working table.
28-6 The driving guide screw of the small working table.

Figure 29:
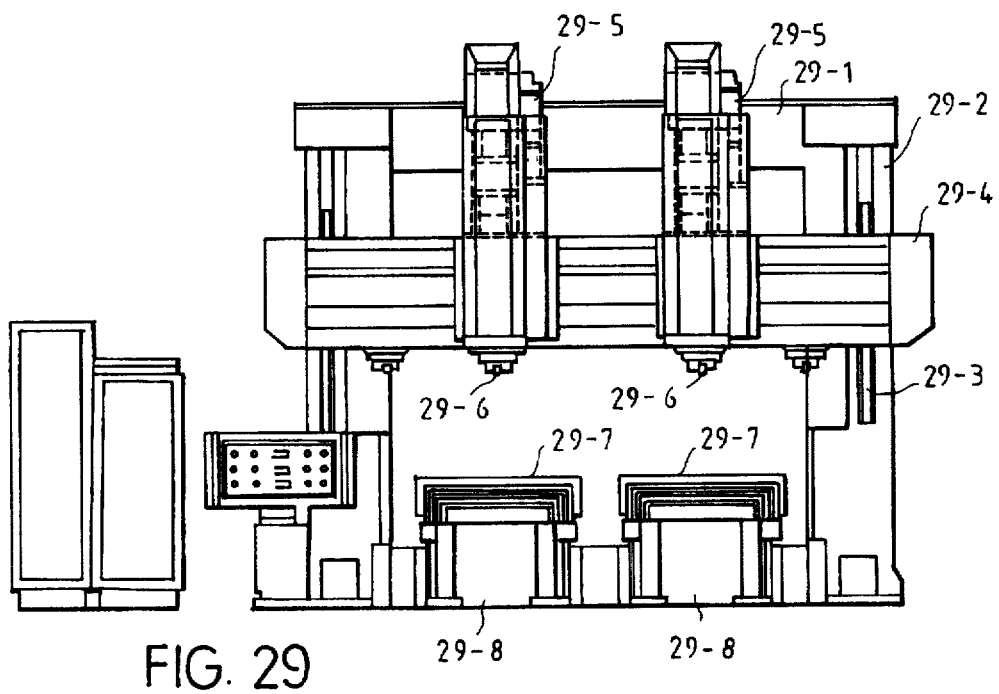

FIG. 29 shows a multi-set parallel working table. Machine parts are indicated as follows:

29-1 Top of the dragon gate.
29-2 The dragon gate column.
29-3 The driving guide screw for moving the lateral girder up and down.
29-4 Lateral girder.
29-5 The driving motor of the mandrel.
29-6 Tool mandrel.
29-7 Working table.
29-8 Lathe bed.

Figure 30:
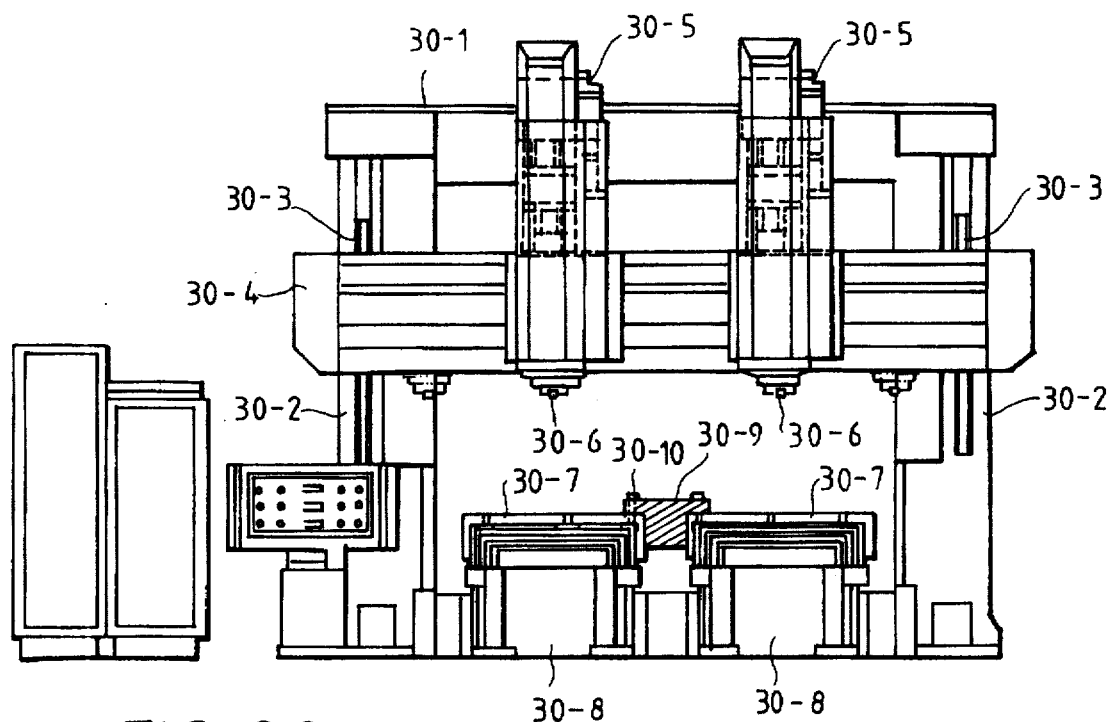

FIG. 30 shows a multi-set parallel working table being trailed by interlocking means. Machine parts are indicated as follows:

30-1 Top of the dragon gate.
30-2 The dragon gate column.
30-3 The driving guide screw for moving the lateral girder up and down.
30-4 Lateral girder.
30-5 The driving motor of the mandrel.
30-6 Tool mandrel.
30-7 Working table.
30-8 Lathe bed.
30-9 The interlocking means of the working table.
30-10 The locking screw of the interlocking means of the working table.

Figure 31:
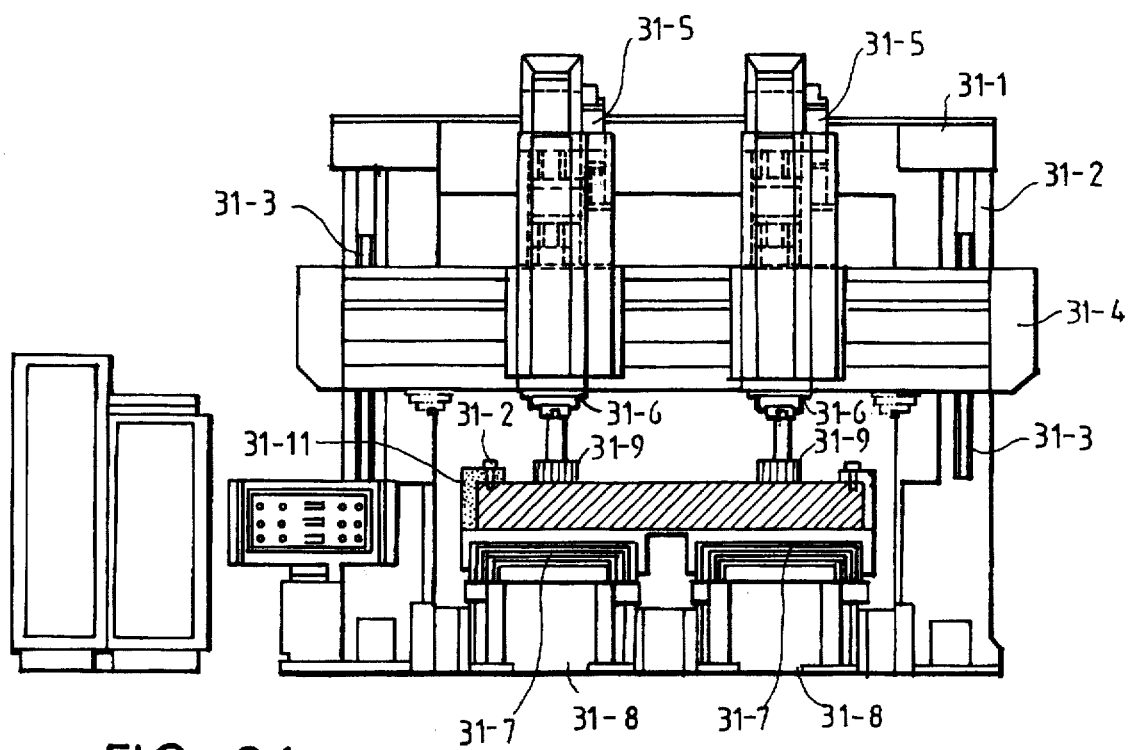

FIG. 31 shows the multi-set parallel working table being fastened to move by means of the workpiece. Machine parts are indicated as follows:

31-1 Top of the dragon gate.
31-2 The dragon gate column.
31-3 The driving guide screw for moving the lateral girder up and down.
31-4 Lateral girder.
31-5 The driving motor of the mandrel.
31-6 Tool mandrel.
31-7 Working table.
31-8 Lathe bed.
31-9 Tool.
31-10 Work piece.

31-11 The locking means of the workpiece.

31-12 The fixed screw of the locking means of the working table.

Figure 32:
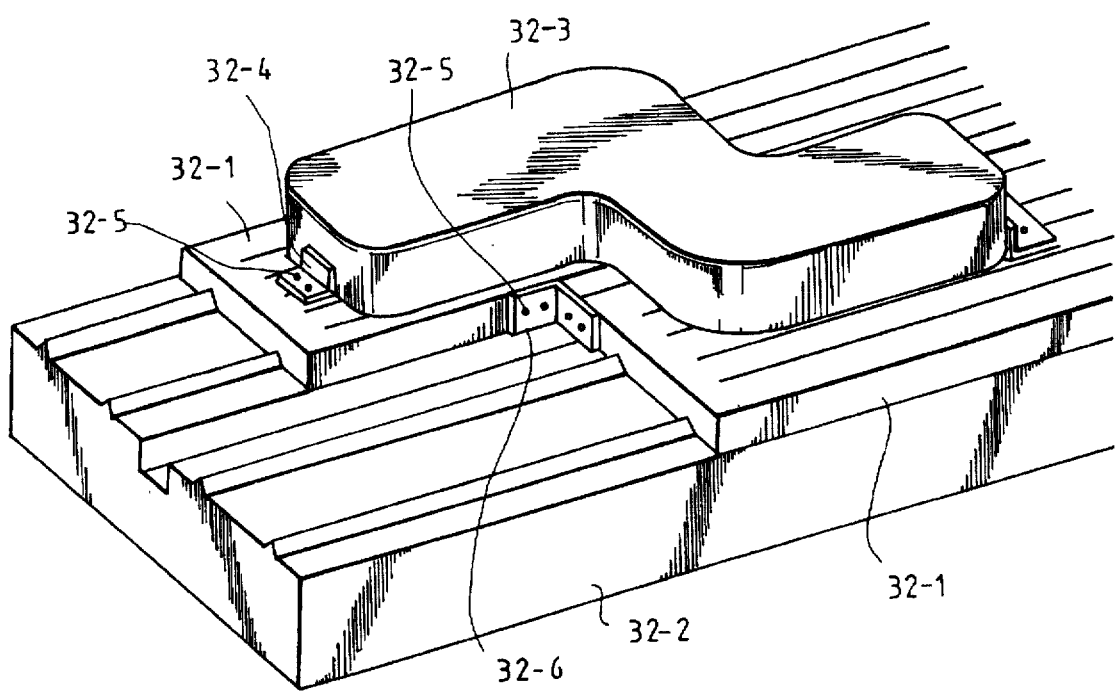

FIG. 32 shows the arrangement of workpieces on the multi-set parallel working table. Machine parts are indicated as follows:

32-1 Working table.

32-2 Lathe bed.

32-3 Work piece.

32-4 Locking means of the workpiece.

32-5 The locking screw of the workpiece.

32-6 Locking means of the working table.

32-7 The locking screw of the working table.

Figure 33:
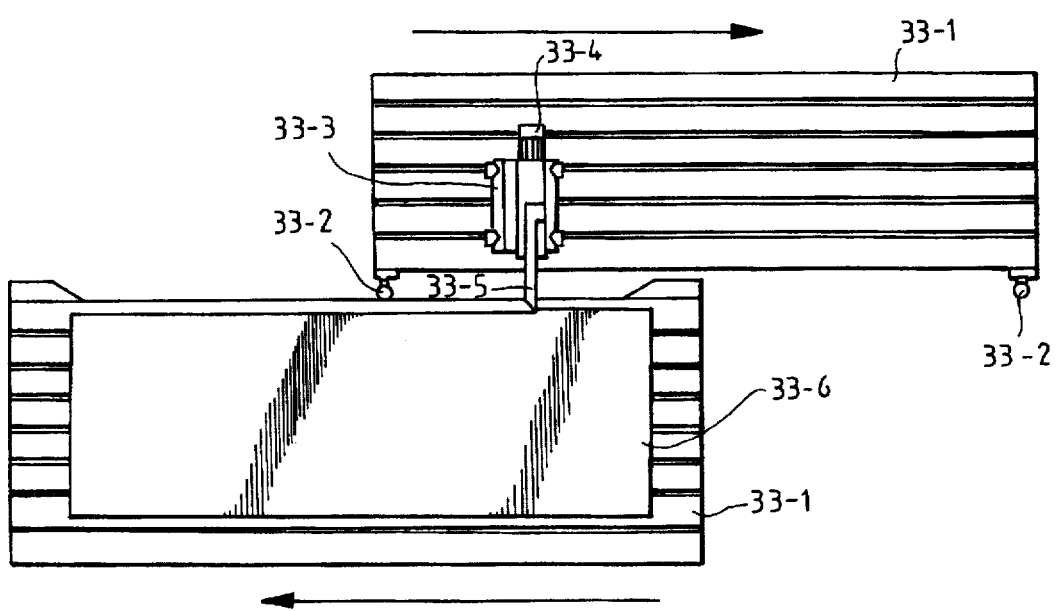

FIG. 33 shows the reverse driving of the multi-set parallel working table. Machine parts are indicated as follows:

33-1 Working table.

33-2 Reverse rotation sensing switch.

33-3 Tool post.

33-4 The driving motor for tool feeding.

33-5 Tool.

33-6 Work piece.

Figure 34:
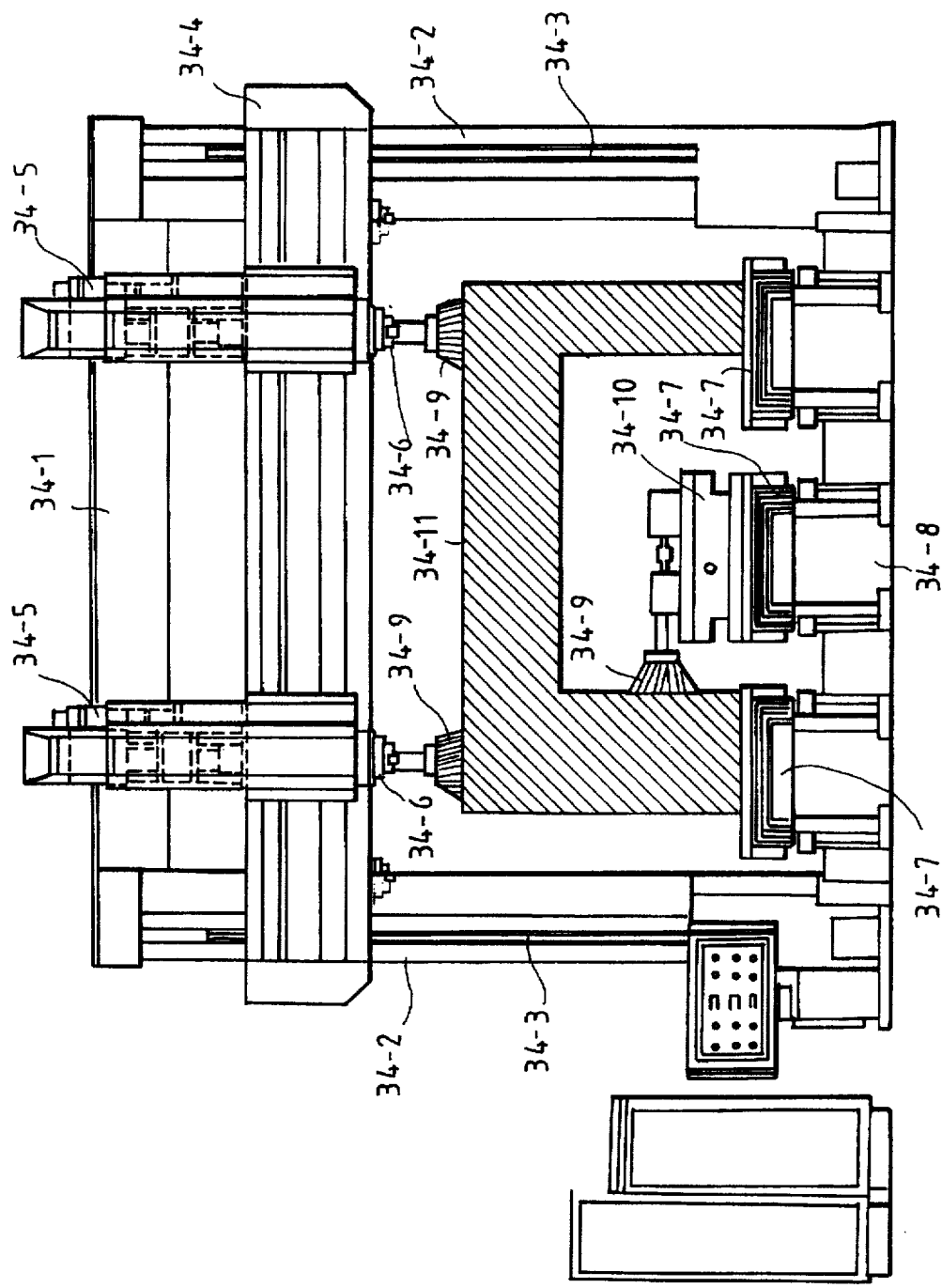

FIG. 34 shows the processing which may be done between two adjacent working tables and at the base in said multi-set parallel working tables. Machine parts are indicated as follows:

34-1 Top of the dragon gate.

34-2 The dragon gate column.

34-3 The driving guide screw for moving the lateral girder up and down.

34-4 Lateral girder.

34-5 The driving motor of the mandrel.

34-6 Tool mandrel.

34-7 Working table.

34-8 Lathe bed.

34-9 Tool.

34-10 Tool post being installed on the lathe bed.

34-11 Work piece.

Figure 35:
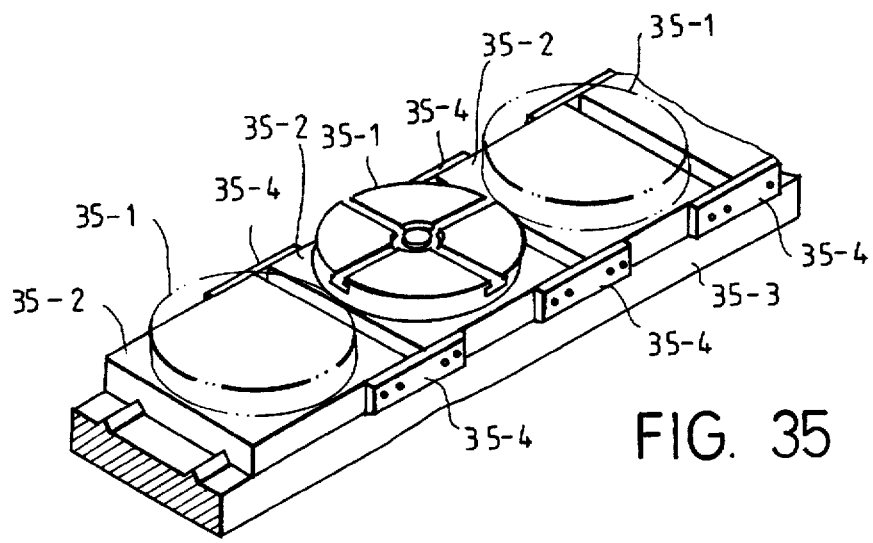

FIG. 35 shows the base of the rotary working table set able to be interlocked and to be put on one lathe bed for driving together. Machine parts are indicated as follows:

35-1 Rotary working table.

35-2 The base of the rotary working table.

35-3 Lathe bed.

35-4 Base locking means.

Figure 36:
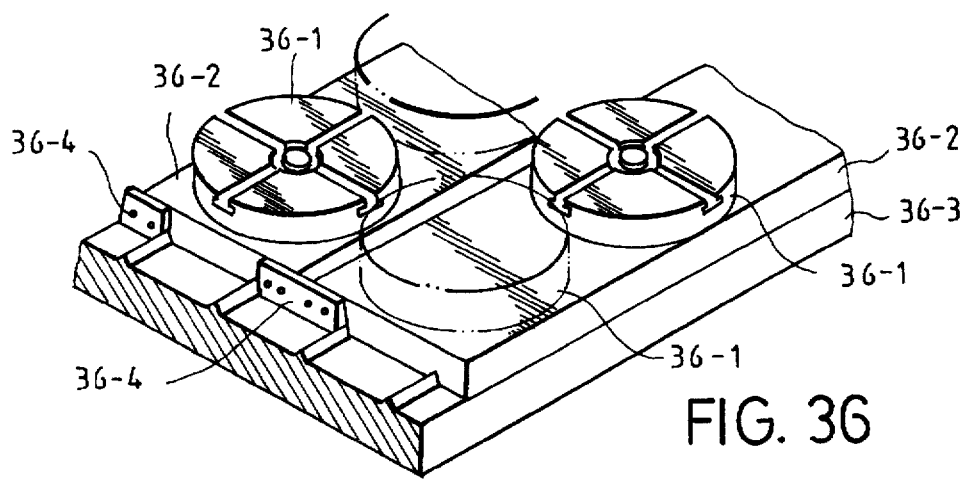

FIG. 36 shows the bases of the multi-column rotary working table set able to be interlocked and to be put on one lathe bed for driving together. Machine parts are indicated as follows:

36-1 Rotary working table.

36-2 The base of the rotary working table.

36-3 Lathe bed.

36-4 Base locking means.

Figure 37:
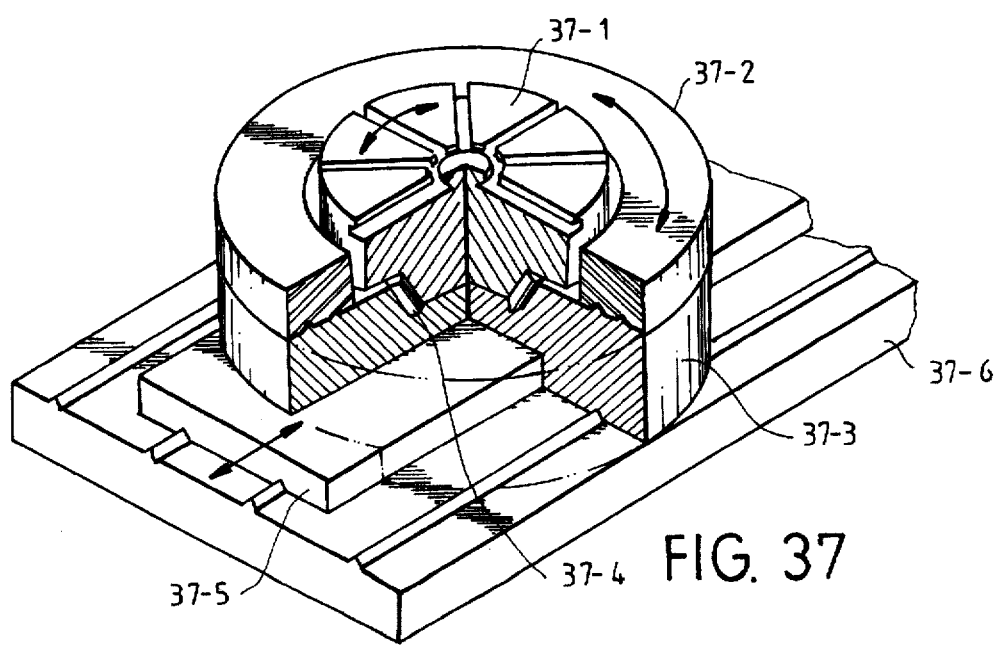

FIG. 37 shows a co-axial ring-shaped working table.

37-1 Small rotary working table.

37-2 The co-axial outer ring structure.

37-3 The base of the small rotary working table and the co-axial outer ring structure.

37-4 Roller.

37-5 Main working table.

37-6 Lathe bed.

FIG. 38a–38e shows the working table of the co-axial ring-shaped structure being driven synchronously, asynchronously, and in forward or reverse direction. Machine parts are indicated as follows:

38-1 Small rotary working table.

38-2 The co-axial outer ring structure.

38-3 The base of the small rotary working table and the co-axial outer ring structure.

38-4 Roller.

38-5 Main working table.

38-6 Lathe bed.

Figure 40:
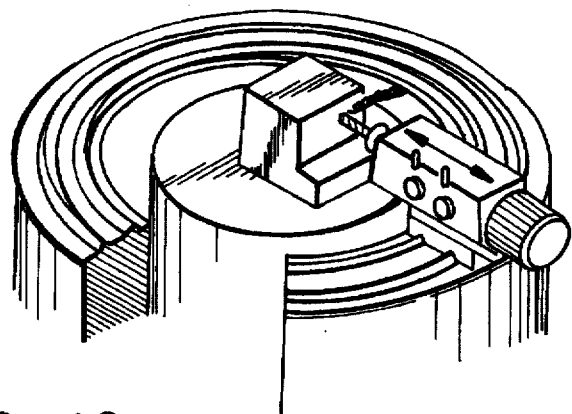

FIGS. 39, 40 show two adjacent working tables being used to process different workpieces by means of the same co-axial ring-shaped structure. Machine parts are indicated as follows:

39-1 Co-axial outer ring structure.

39-2 Rotary working table.

39-3 Work piece.

39-4 Tool post.

39-5 Tool driving motor.

39-6 Tool.

Figure 41:
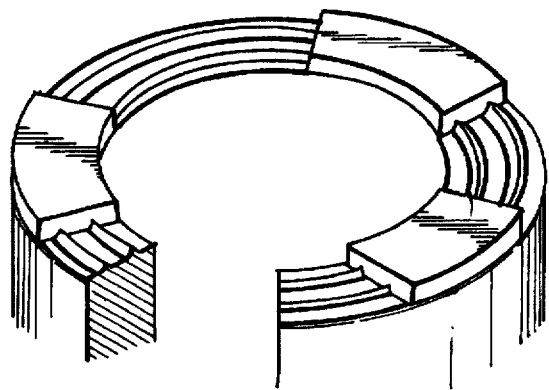

FIG. 41 shows a working table set being set up with a partial circle structure.

Figure 42:
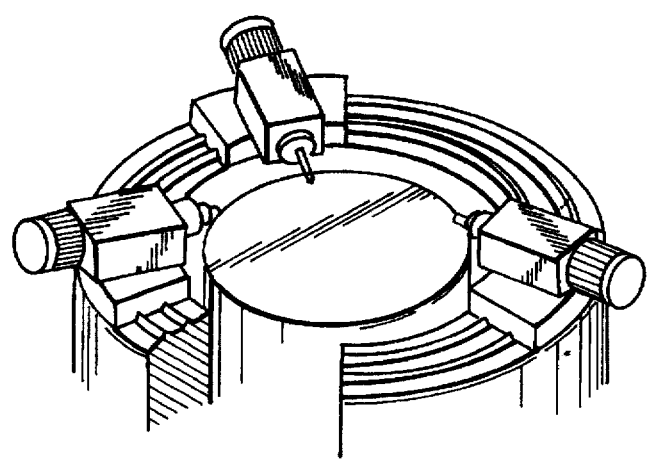

FIG. 42 shows a hybrid operation among the co-axial ring-shaped, the partial circle structure, and co-axial rotary working tables.

Figure 43:
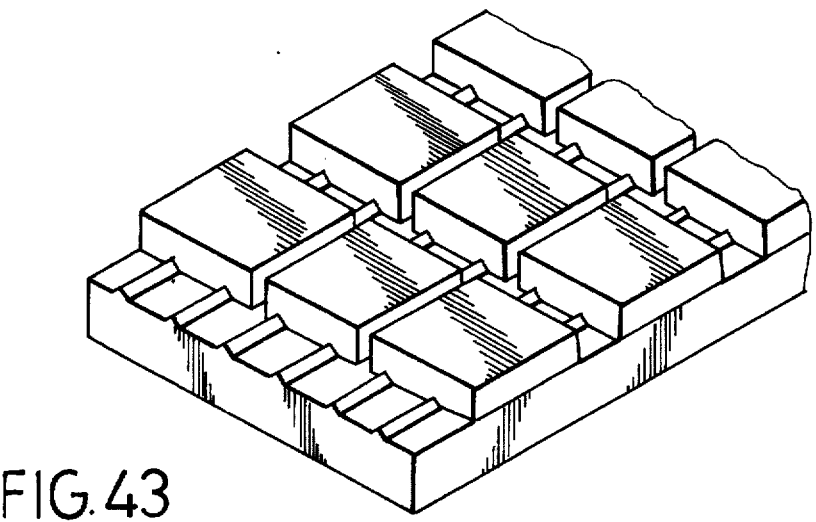

FIG. 43 shows a multi-column and multi-section working table set system.

Figure 44:
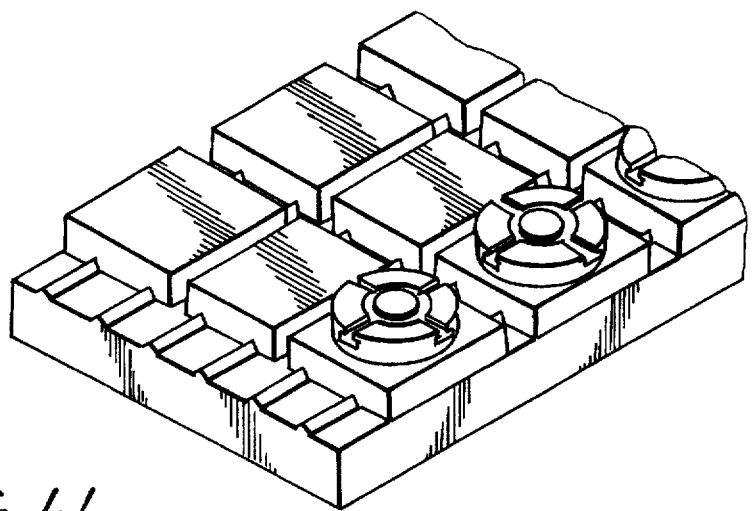

FIG. 44 shows the embodiment-A of a hybrid operation of the multi-column and multi-section working table sets and the ring-shaped or rotary working tables.

Figure 45:
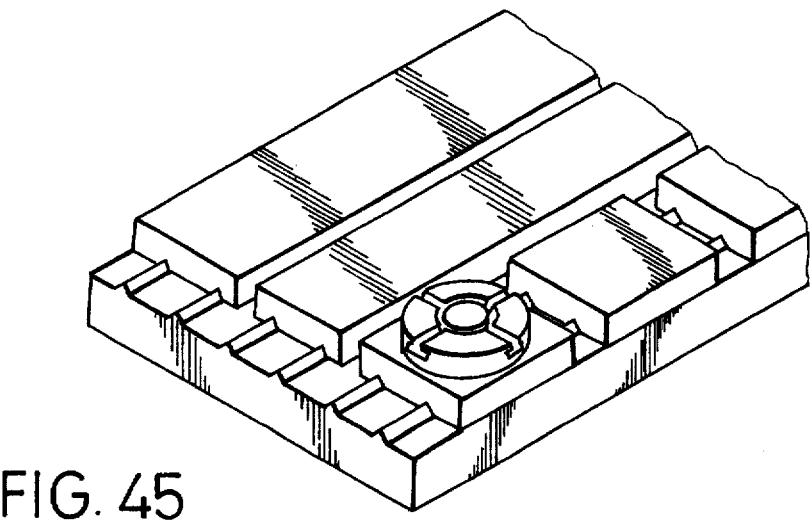

FIG. 45 shows the embodiment-B of a hybrid operation of the multi-column and multi-section working table sets and the ring-shaped or rotary working tables.

Figure 46:
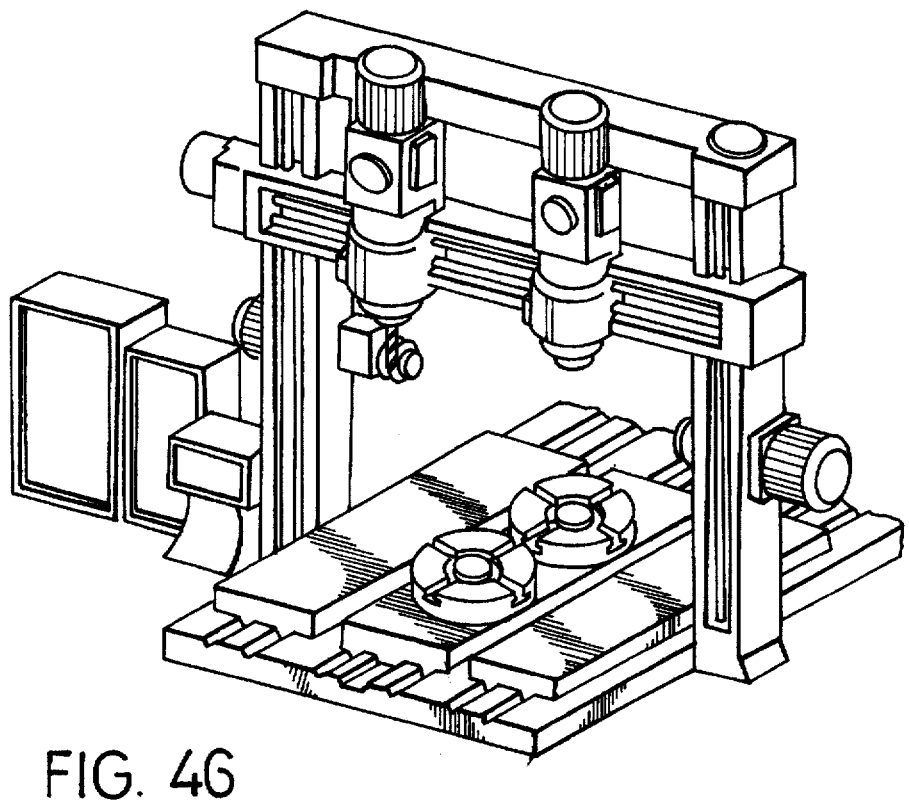

FIG. 46 shows the embodiment-C of a hybrid operation of the multi-column and multi-section working table sets and the ring-shaped or rotary working tables.

Figure 47:
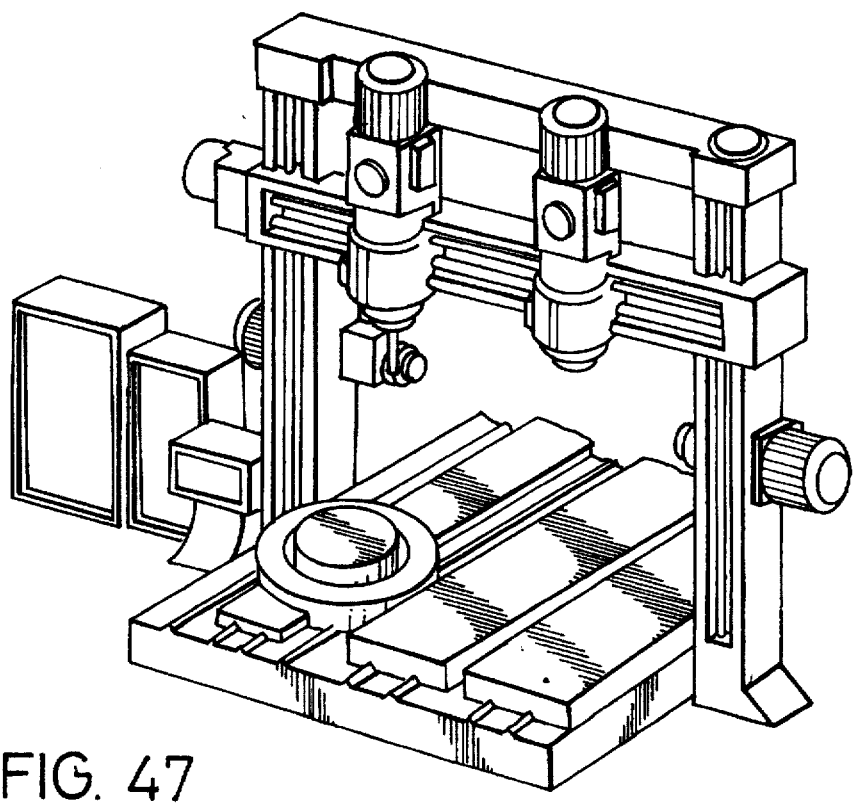

FIG. 47 shows the embodiment-D of a hybrid operation of the multi-column and multi-section working table sets and the ring-shaped or rotary working tables.

Figure 48:
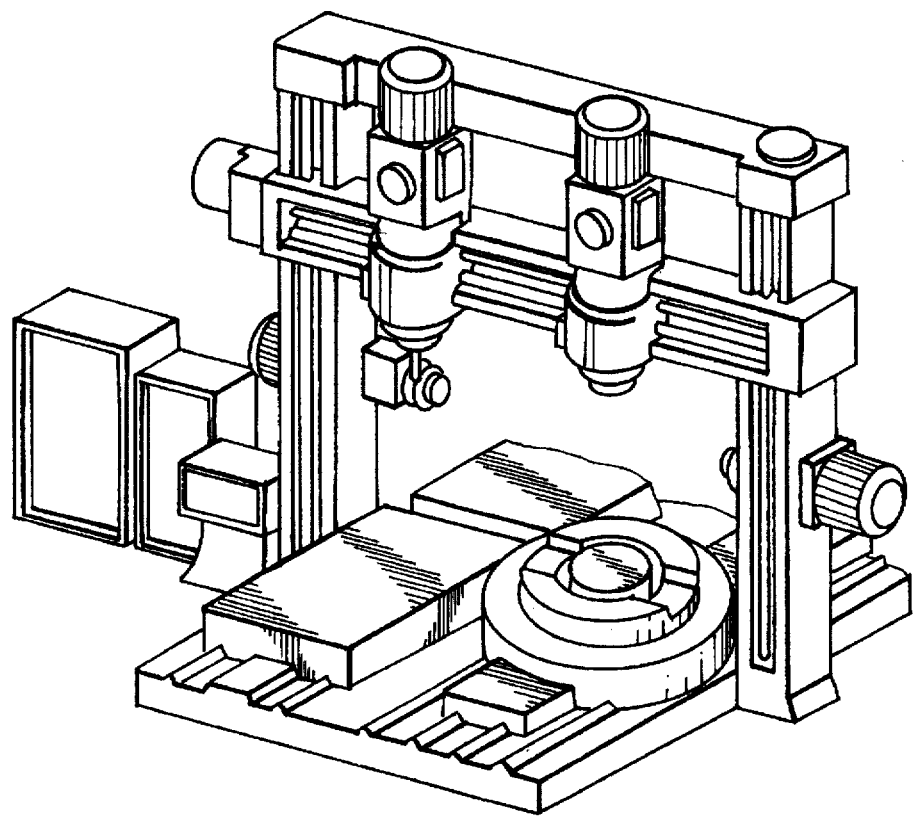

FIG. 48 shows the embodiment-E of a hybrid operation of the multi-column and multi-section working table sets and the ring-shaped or rotary working tables.

Figure 49:
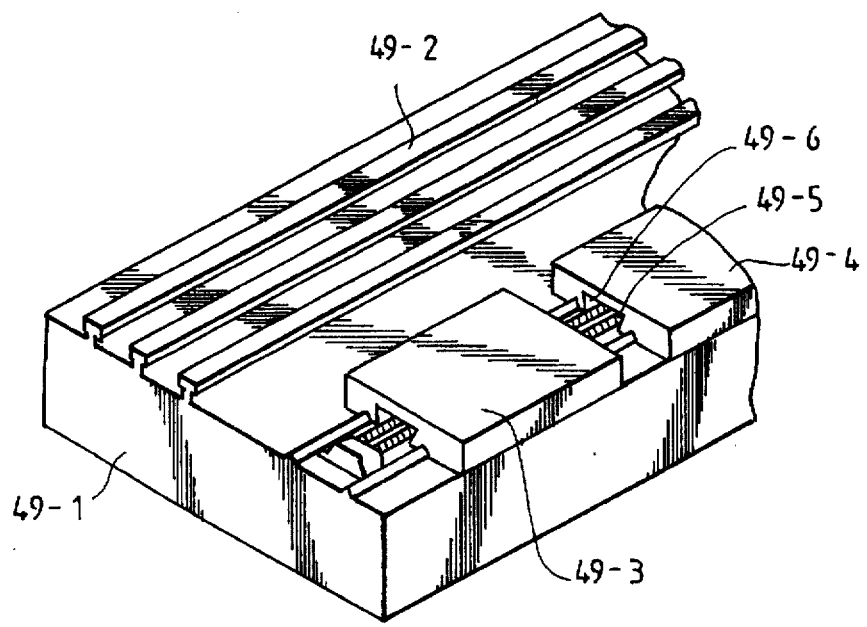

FIG. 49 shows the hybrid operation of the driving working tables and the fixed working tables. Machine parts are indicated as follows:

49-1 Lathe bed.

49-2 Fixed type of working table.

49-3 The driving working table.

49-4 The driving working table.

49-5 The driving guide screw of the working table.

49-6 The driving guide screw of the working table.

Figure 50:
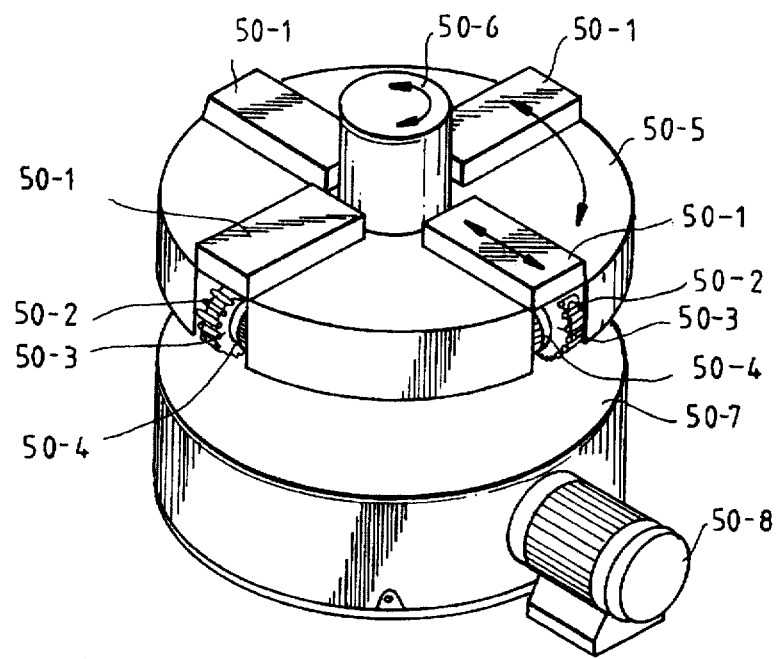

FIG. 50 shows the structure of the working table exchanging station. Machine parts are indicated as follows:

50-1 Working table.

50-2 Conveyer belt.

50-3 Driving wheel.

50-4 Driving motor.

50-5 Rotary table.

50-6 Center rod.

50-7 The base of the rotary table.

50-8 The driving motor of the rotary table.

Figure 51:
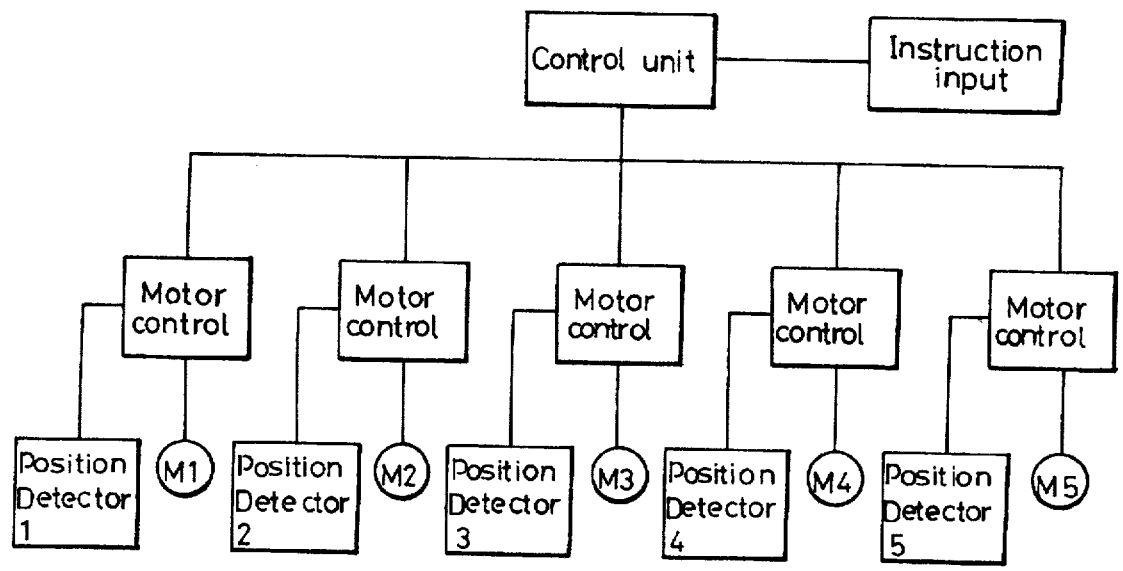

FIG. 51 shows a control system diagram of FIG. 50.

Figure 52:
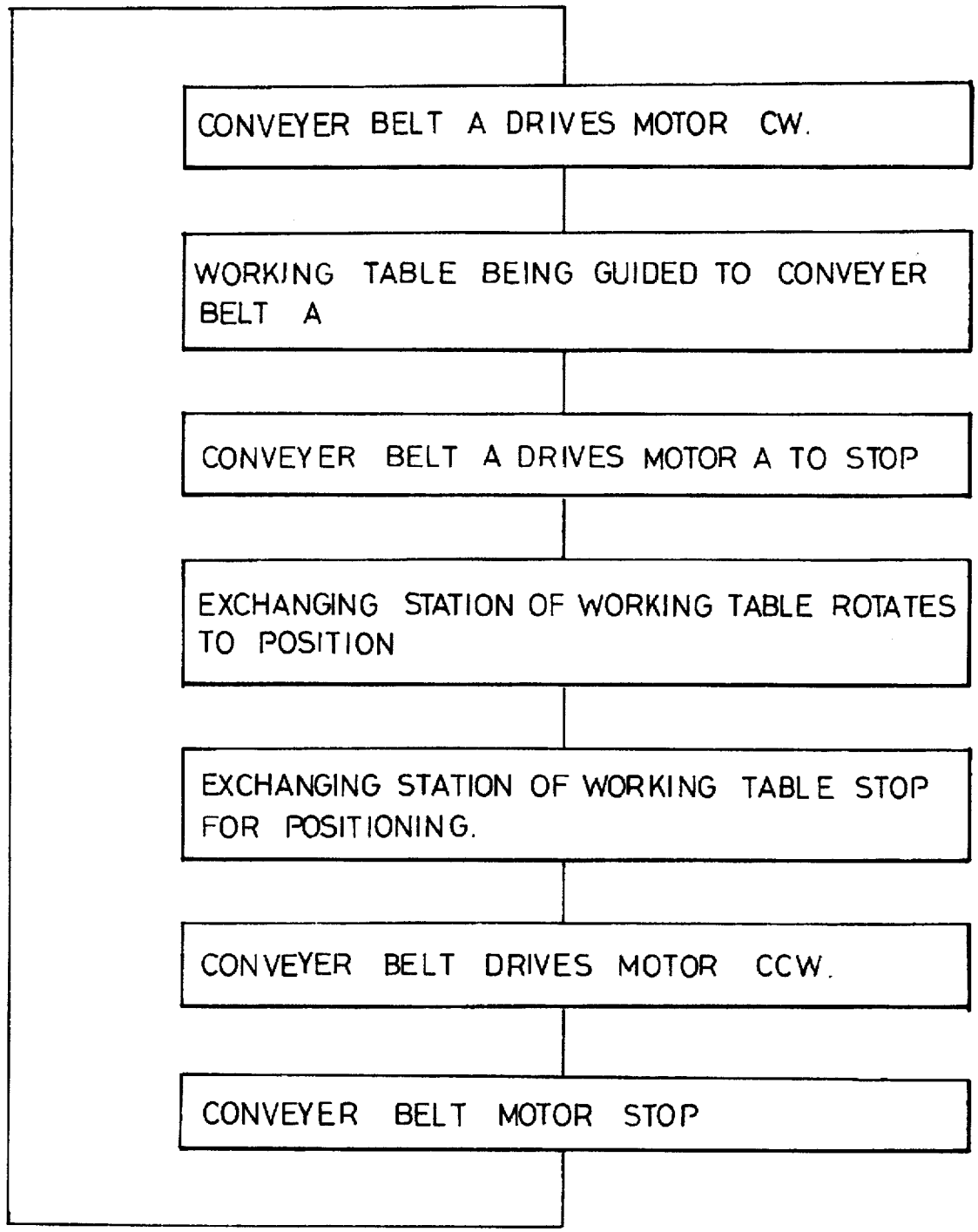

FIG. 52 shows the flow chart of the exchanging station of the working table.

Figure 53:
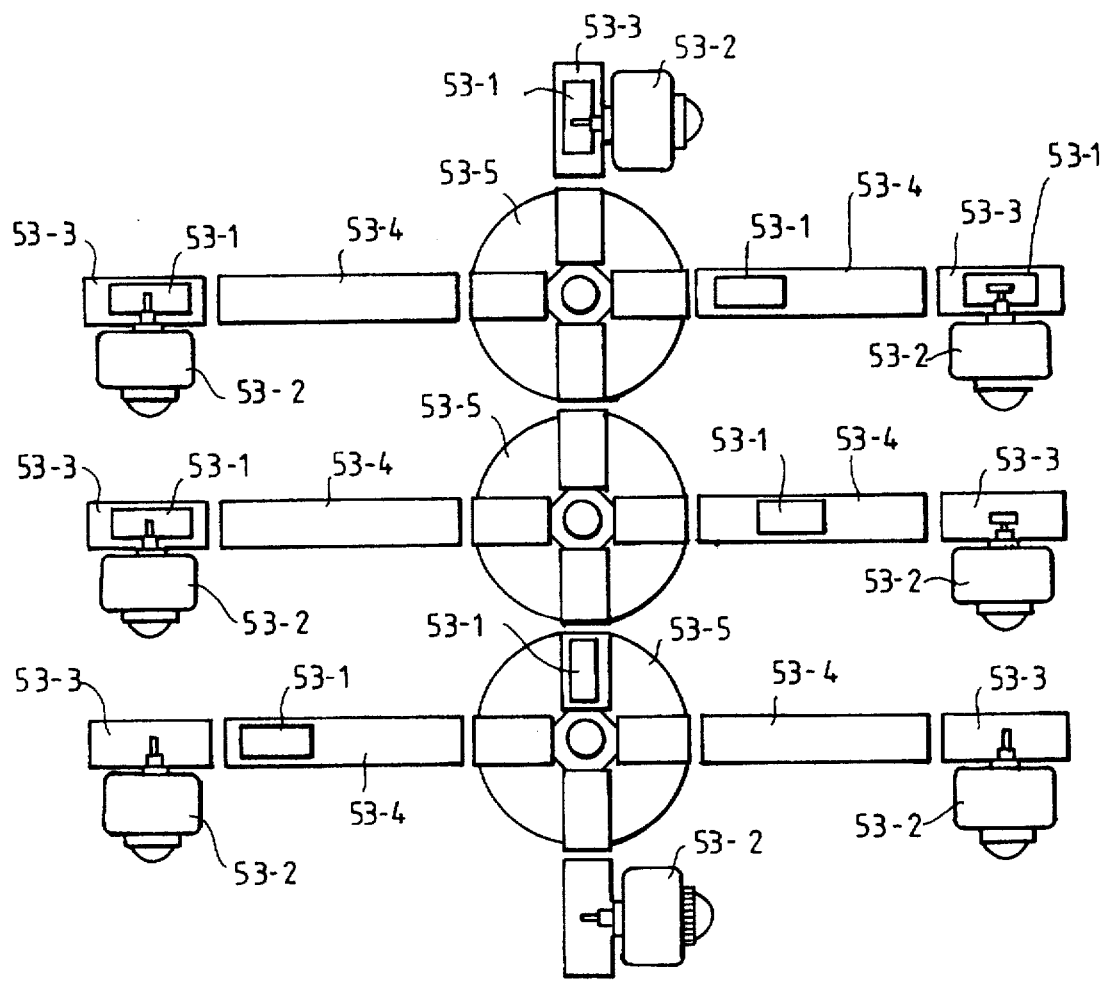

FIG. 53 shows the matrix type of embodiment of the multi-set working table exchanging station. Machine parts are indicated as follows:

53-1 Working table.

53-2 The lathe bed type of processing machine body and the tool mandrel.

53-3 The lathe bed of the lathe bed type of processing machine.

53-4 The conveyor belt of the working table.

53-5 The exchanging station of the working table.

Figure 54:
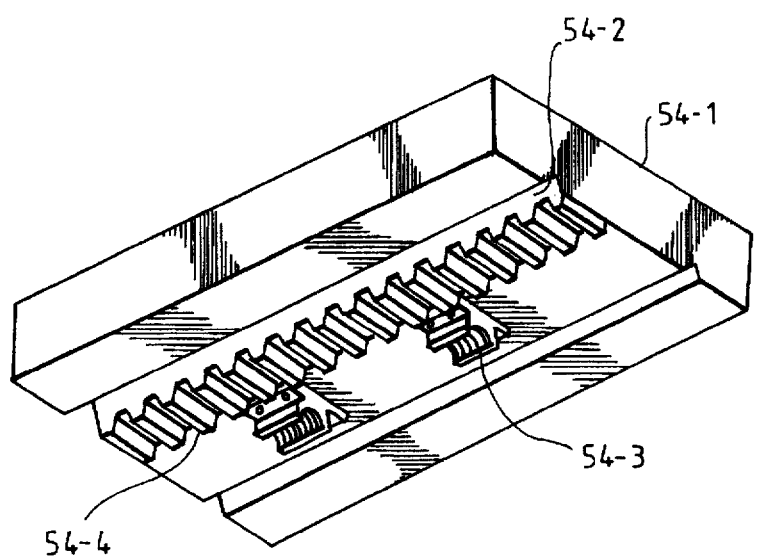

FIG. 54 shows the working table being conveyed with the auxiliary conveyor belt. Machine parts are indicated as follows:

54-1 Working table.

54-2 Coupling gear rack.

54-3 Curved nut.

54-4 The fastening means of the curved nut.

FIG. 55 shows an involute flare type of guide channel of the working table. Machine parts are indicated as follows:

55-1 Working table.

55-2 Coupled gear rack.

55-3 Curved nut.

55-4 Curved nut.

55-5 Guide channel.

FIG. 56 shows a salient-tooth-shaped driving structure for driving the conveyor belt of the working table. Machine parts are indicated as follows:

56-1 Salient-tooth-shaped metal caterpillar tread.

56-2 Cylinder-shaped linking means.

56-3 Linking pin.

FIG. 57 shows the driving gear of the working table conveyer belt. Machine parts are indicated as follows:

57-1 Coupling gear rack.

57-2 The driving axle of the coupling gear.

FIG. 58 shows the auxiliary conveyer belt. Machine parts are indicated as follows:

58-1 The lathe bed having a guide rail.

58-2 Salient-tooth-shaped metal caterpillar tread.

58-3 Driving gear.

58-4 Driving motor.

Figure 59:
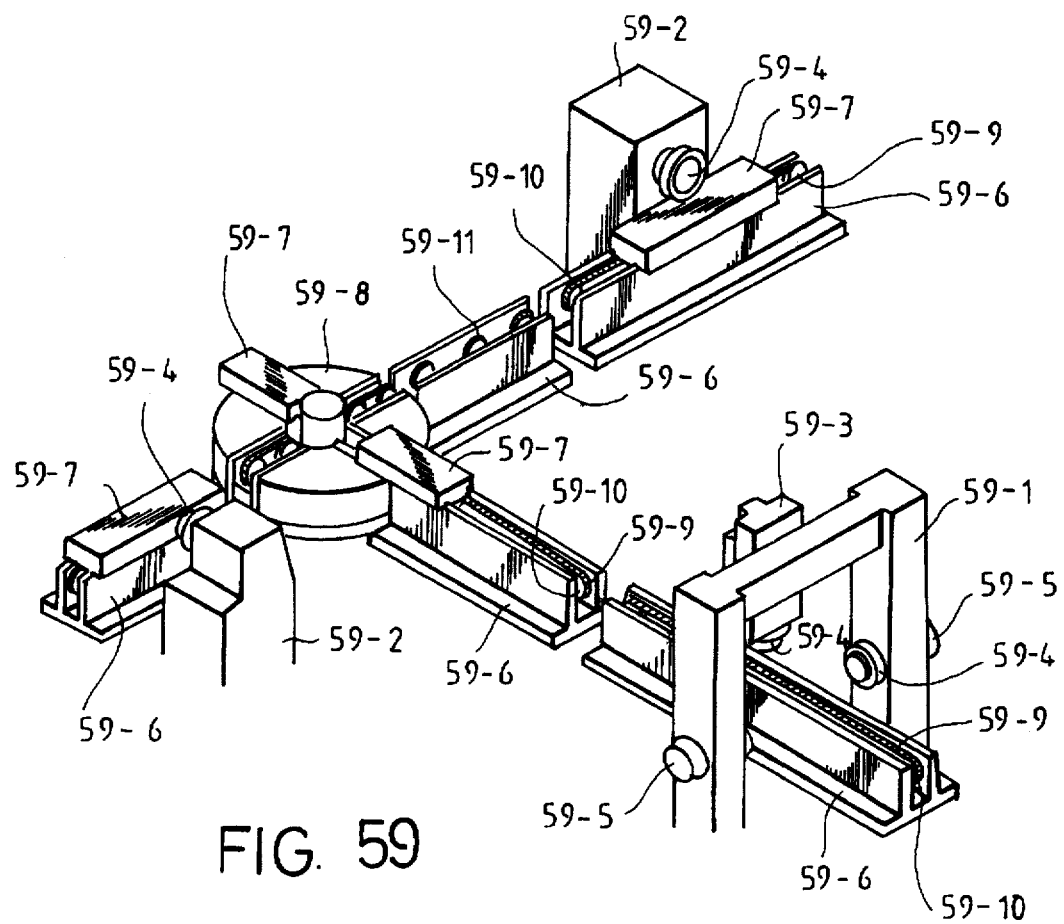

FIG. 59 shows a structure having the working table exchanging station and the working table group. Machine parts are indicated as follows:

59-1 The dragon gate column.

59-2 The lathe bed type of processing machine body and the tool mandrel.

59-3 Mandrel tool post set.

59-4 Tool.

59-5 The driving motor of the tool.

59-6 Lathe bed.

59-7 Working table.

59-8 The exchanging station of the working table.

59-9 Salient-tooth-shaped metal caterpillar tread.

59-10 The driving motor working table conveyer belt.

Figure 60:
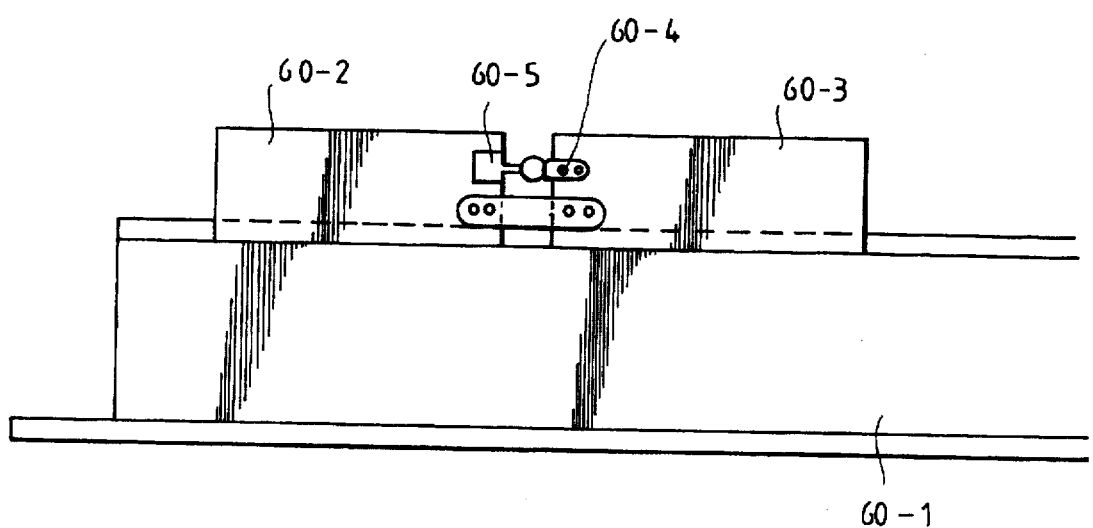

FIG. 60 shows the installation of the sensing switch means of the working table set. Machine parts are indicated as follows:

60-1 Lathe bed.

60-2 Working table.

60-3 Working table.

60-4 Contact stop.

60-5 Sensing means.

Figure 61:
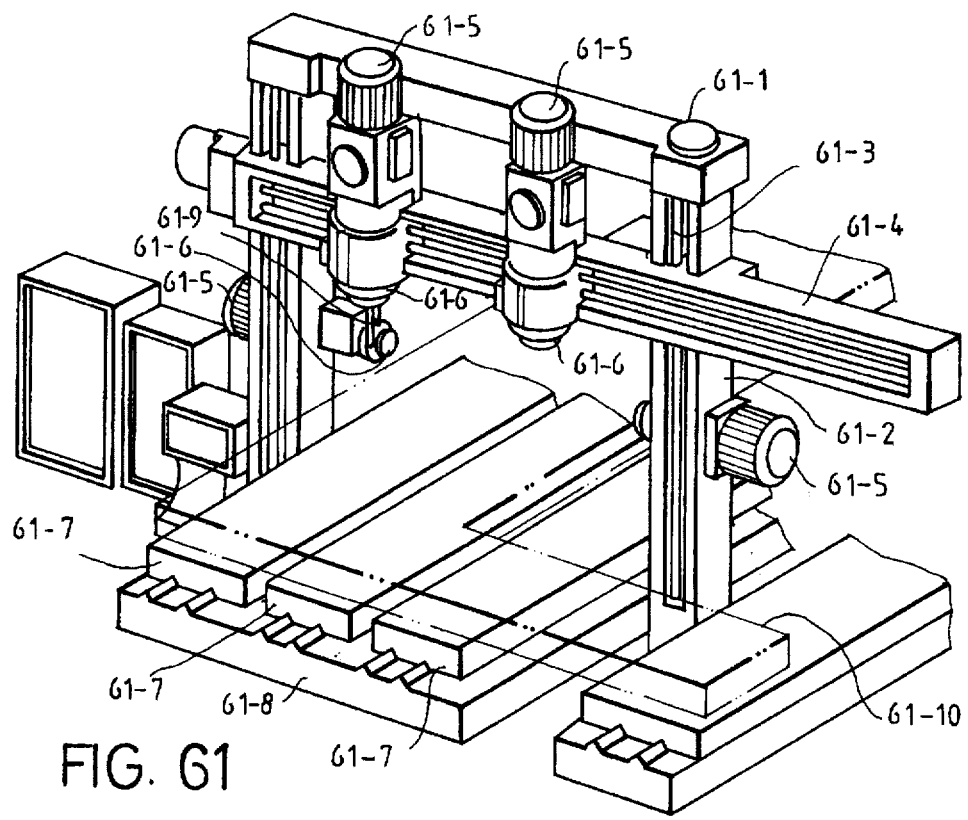

FIG. 61 shows part of the working table set being installed outside the dragon gate. Machine parts are indicated as follows:

61-1 Top of the dragon gate.

61-2 The dragon gate column.

61-3 The guide screw for moving the lateral girder up and down.

61-4 Lateral girder.

61-5 Mandrel driving motor.

61-6 Tool mandrel.

61-7 Working table.

61-8 Lathe bed.

61-9 Tool.

61-10 Work piece.

Figure 62:
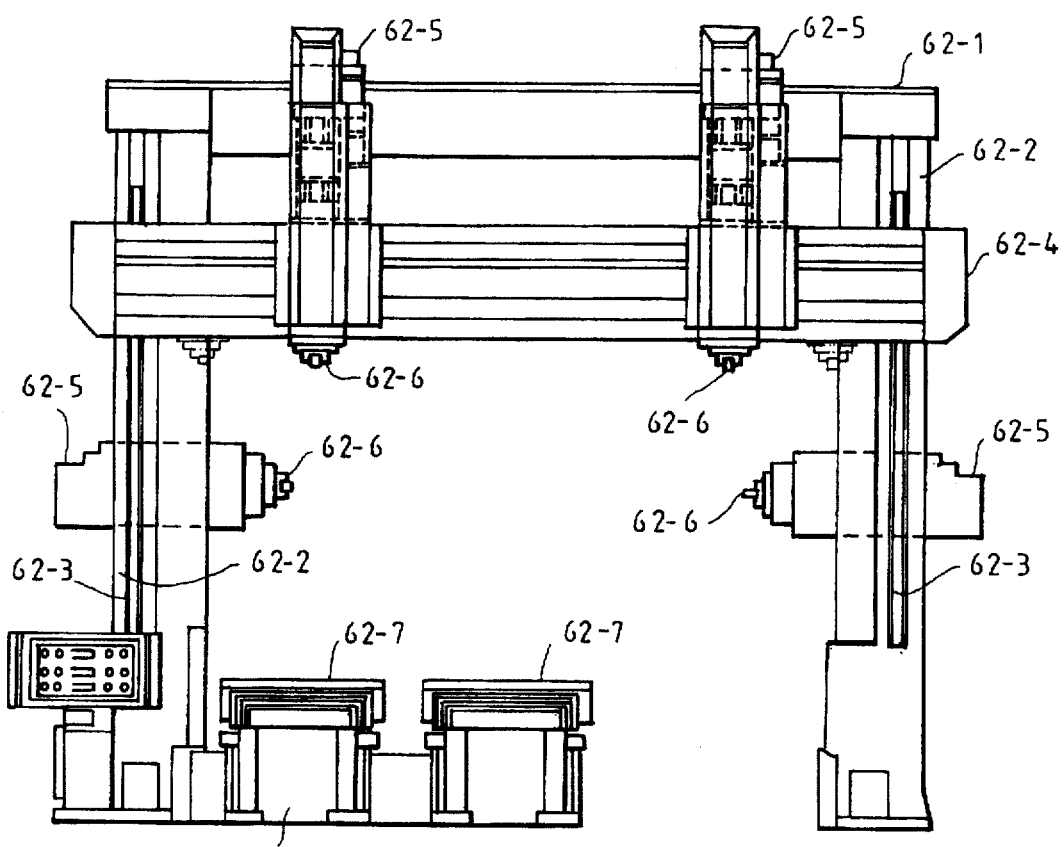

FIG. 62 shows the dragon gate type of machine reserving some ground space. Machine parts are indicated as follows:

62-1 Top of the dragon gate.

62-2 The dragon gate column.

62-3 The driving guide screw for moving the lateral girder up and down.

62-4 Lateral girder.

62-5 The driving motor of the mandrel.

62-6 Tool mandrel.

62-7 Working table.

62-8 Lathe bed.

Figure 63:
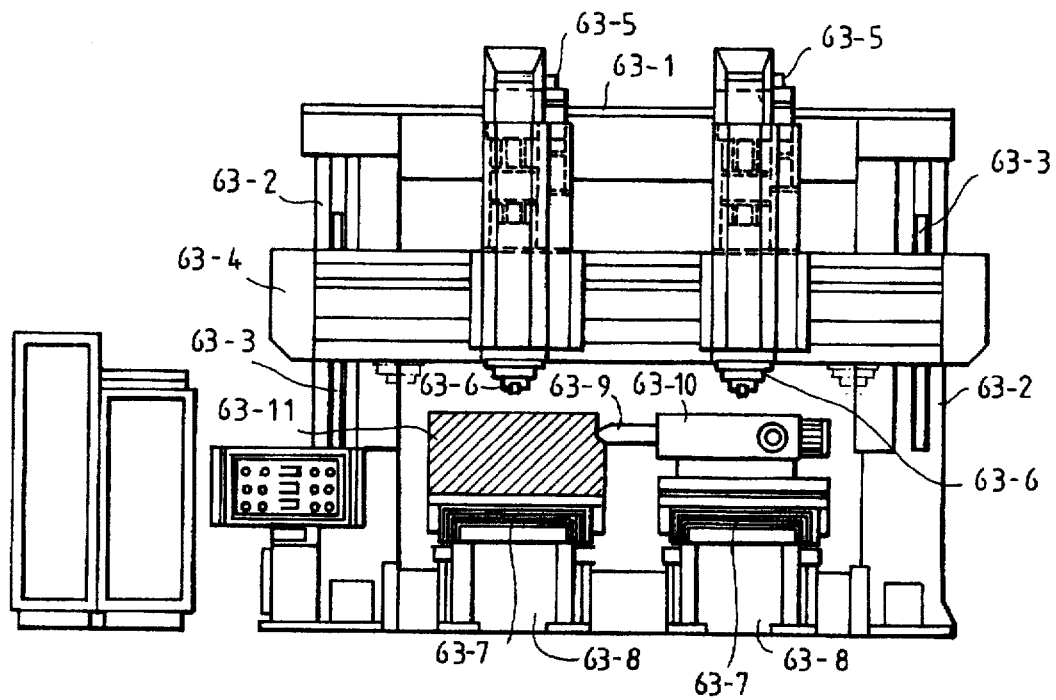

FIG. 63 shows some tool posts being installed on the working tables of the working table groups for mutual processing operation. Machine parts are indicated as follows:

63-1 Top of the dragon gate.

63-2 The dragon gate column.

63-3 The driving guide screw for moving the lateral girder up and down.

63-4 Lateral girder.

63-5 The driving motor of the mandrel.

63-6 Tool mandrel.

63-7 Working table.

63-8 Lathe bed.

63-9 Tool.

63-10 Tool post being installed on the lathe bed.

63-11 Work piece.

Figure 64:
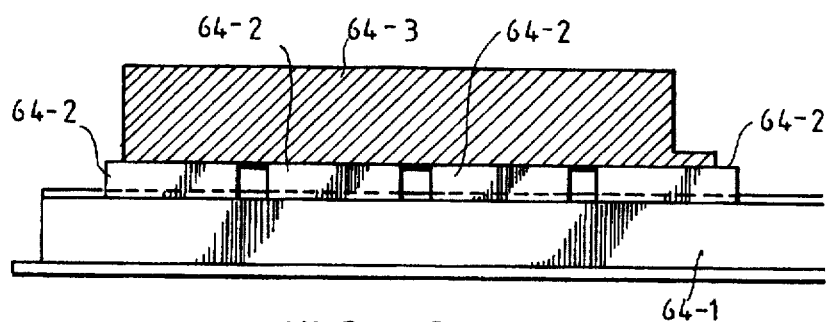

FIG. 64 shows a big workpiece being carried with more than one set of working tables to be driven synchronously. Machine parts are indicated as follows:

64-1 Lathe bed.

64-2 Working table.

64-3 Work piece.

Figure 65:
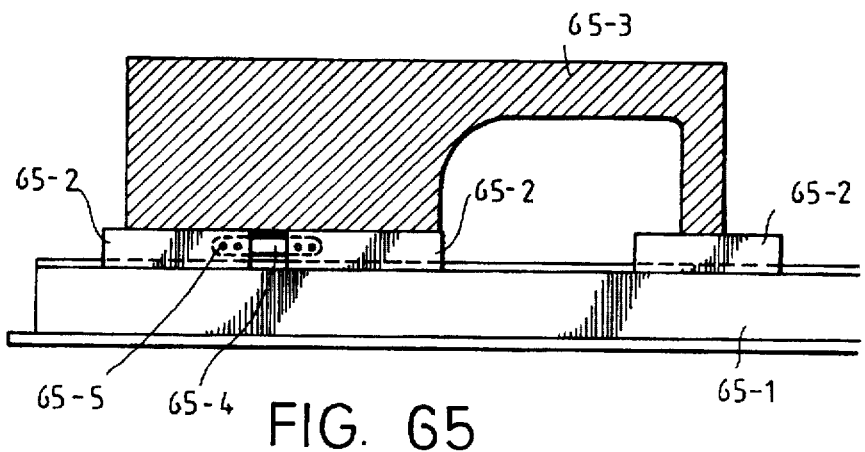

FIG. 65 shows an embodiment of the big workpiece being carried by using the gravity point support method. Machine parts are indicated as follows:

65-1 Lathe bed.

65-2 Working table.

65-3 Work piece.

65-4 Interlocking means of working tables.

65-5 The lock screw of the working table interlocking means.

Figure 66:
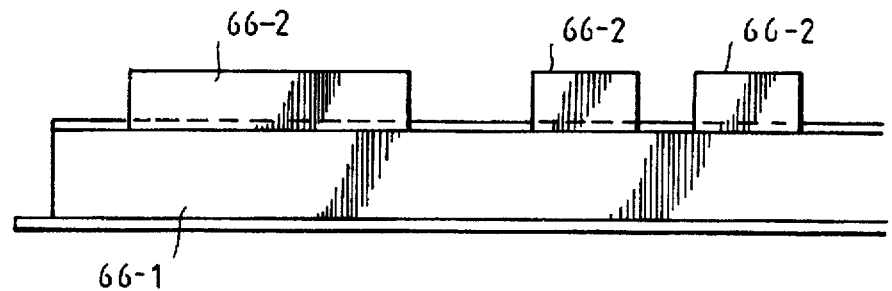

FIG. 66 shows an embodiment using working tables having un-equal size. Machine parts are indicated as follows:

66-1 Lathe bed 66-2 Working table.

Figure 67:
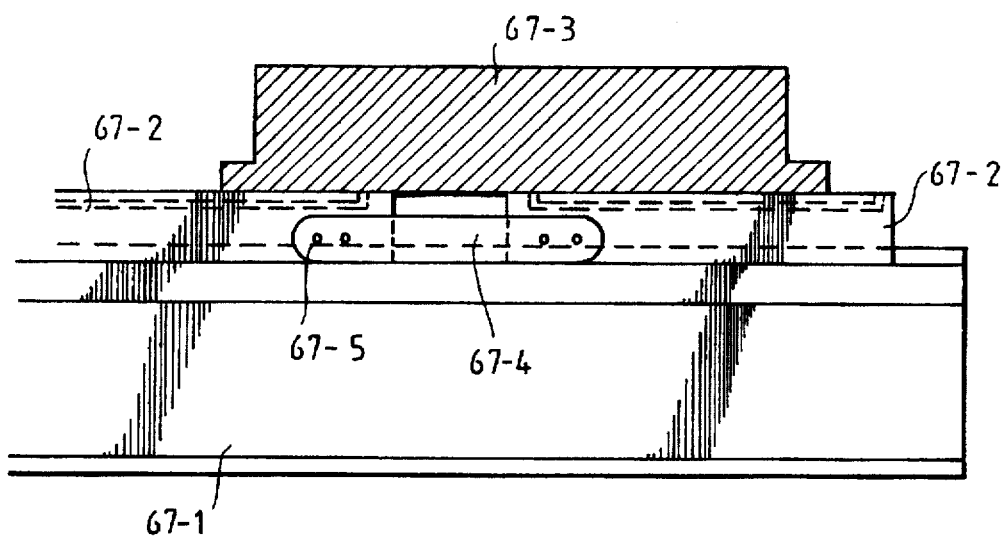

FIG. 67 shows the mechanical interlocking means of the working table. Machine parts are indicated as follows:

67-1 Lathe bed.

67-2 Working table.

67-3 Work piece.

67-4 The interlocking means of the working table.

67-5 The lock screw of the working table interlocking means.

Figure 68:
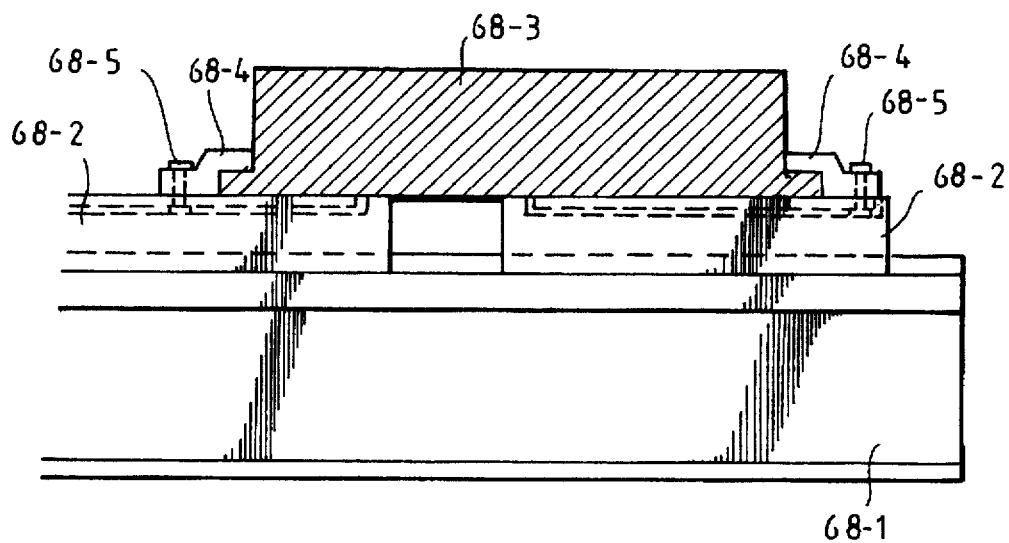

FIG. 68 shows the interlocking and driving method used with the workpiece. Machine parts are indicated as follows:

68-1 Lathe bed.

68-2 Working table.

68-3 Work piece.

68-4 The interlocking means of the working table.

68-5 The lock screw of the working table interlocking means.

Figure 69:
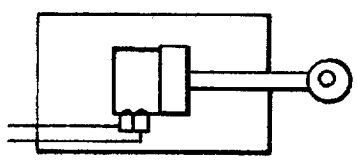

FIG. 69 shows the monitoring switch means (relay type) of the working tables in synchronously trailing drive.

Figure 70:
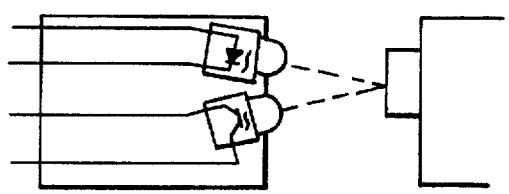

FIG. 70 shows the monitoring switch means (Photocell solid state type) of the working tables in synchronously trailing drive.

Figure 71:
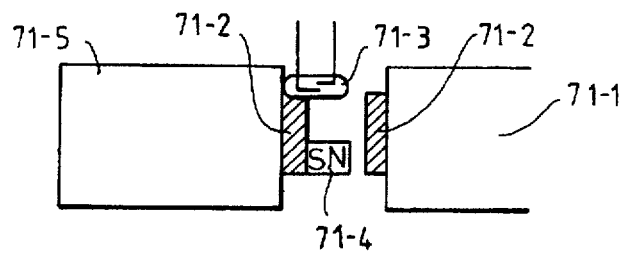

FIG. 71 shows the monitoring switch means (reed relay) of the working tables in synchronously trailing drive. Machine parts are indicated as follows:

71-1 Working table.

71-2 Movable magnetized block.

71-3 Reed relay.

71-4 Fixed magnetized block.

71-5 The fixing base of the sensing means.

Figure 72:
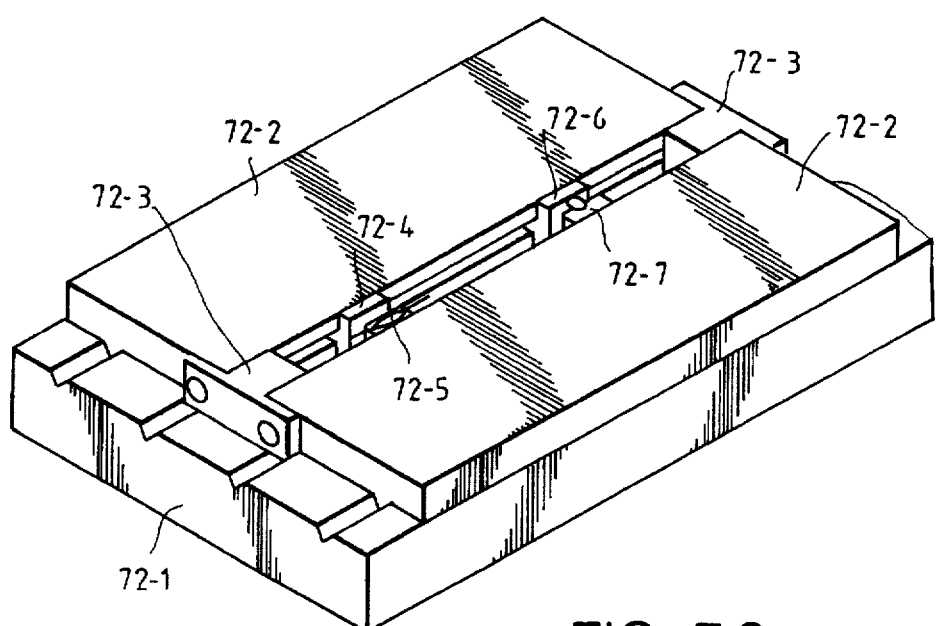

FIG. 72 shows an embodiment of the monitoring switch of the juxtaposed working table. Machine parts are indicated as follows:

72-1 Lathe bed.

72-2 Working table.

72-3 The locking means of the working table.

72-4 Magnetized block.

72-5 Reed relay.

72-6 Contact stop.

72-7 Limit switch.

Figure 73:
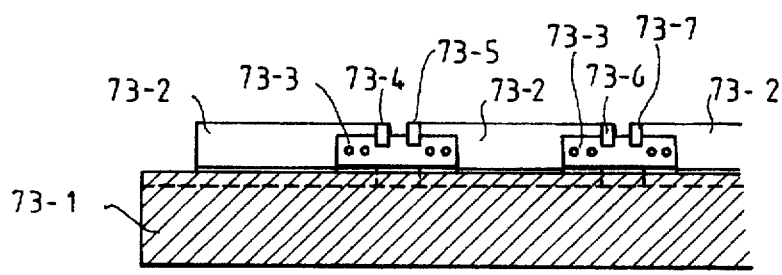

FIG. 73 shows an embodiment of the monitoring switch for the multi-section working tables.

73-1 Lathe bed.

73-2 Working table.

73-3 The locking means of the working table.

73-4 The reed relay and the preset magnet sets.

73-5 Magnetized block.

73-6 The reed relay and the preset magnet sets.

73-7 Magnetized block.

Figure 74:
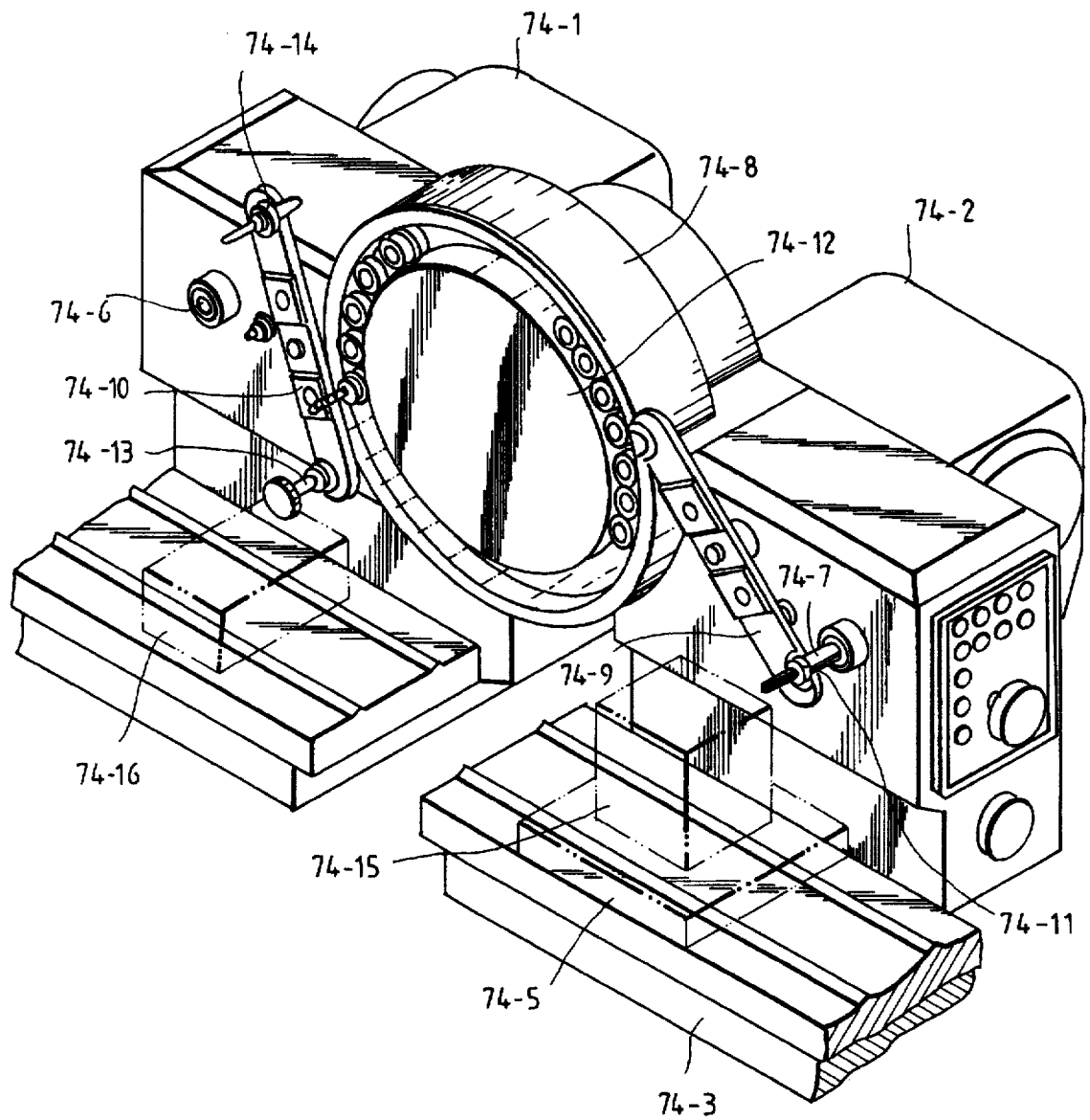

FIG. 74 shows the common tool chest for two or more tool exchanging and output positions. Machine parts are indicated as follows:

74-1 Machine body.

74-2 Machine body.

74-3 Base.

74-4 Lathe bed.

74-5 Working table.

74-6 Tool mandrel.

74-7 Tool mandrel.

74-8 Tool post.

74-9 Exchanging arm.

74-10 Exchanging arm.

74-11 Standardized tool.

74-12 Stand-by tool post.

74-13 Standardized tool.

74-14 Standardized tool.

74-15 Work piece.

74-16 Working table.

Figure 75:
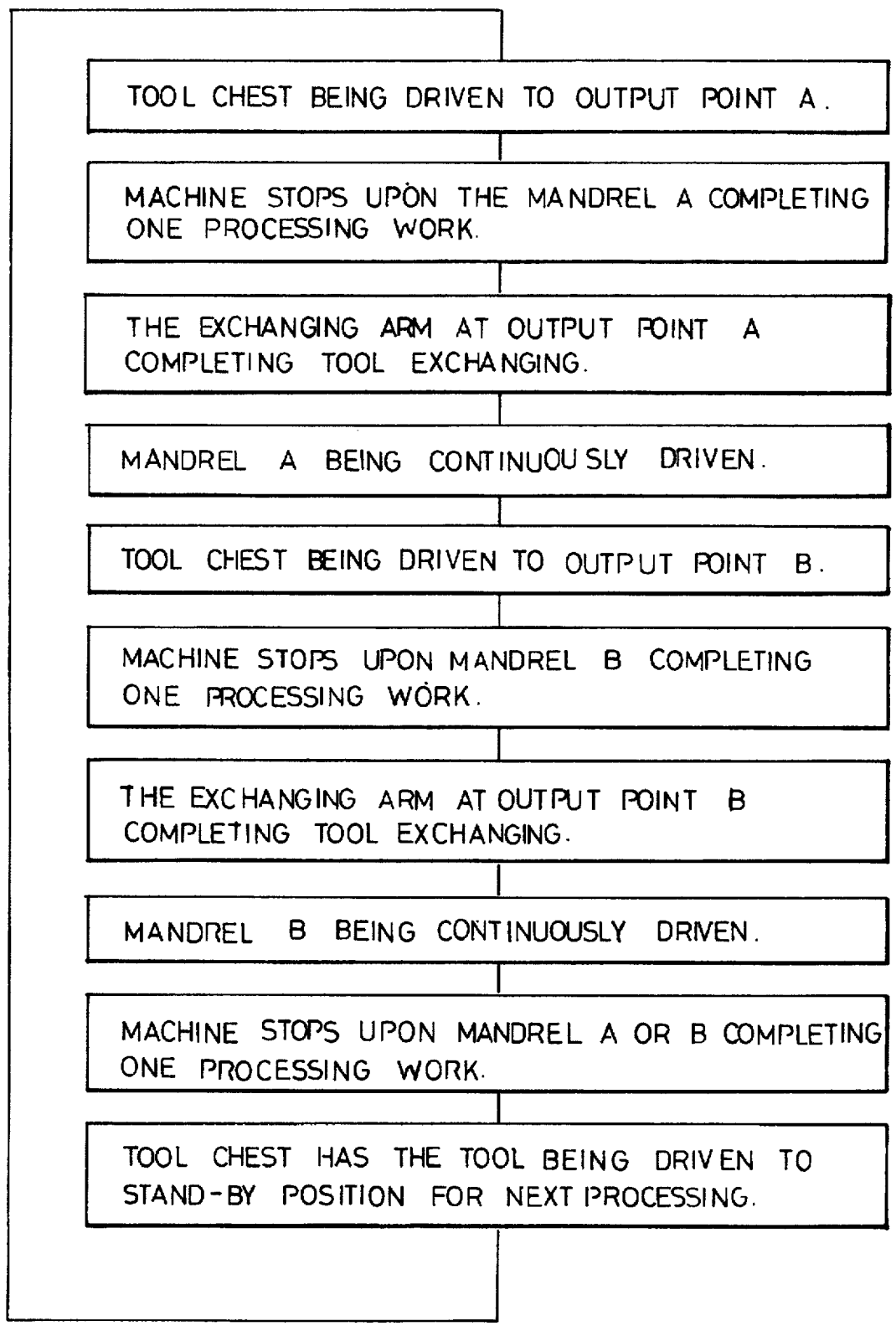

FIG. 75 shows the operation flow chart of two or more tool exchanging stations.

Figure 76:
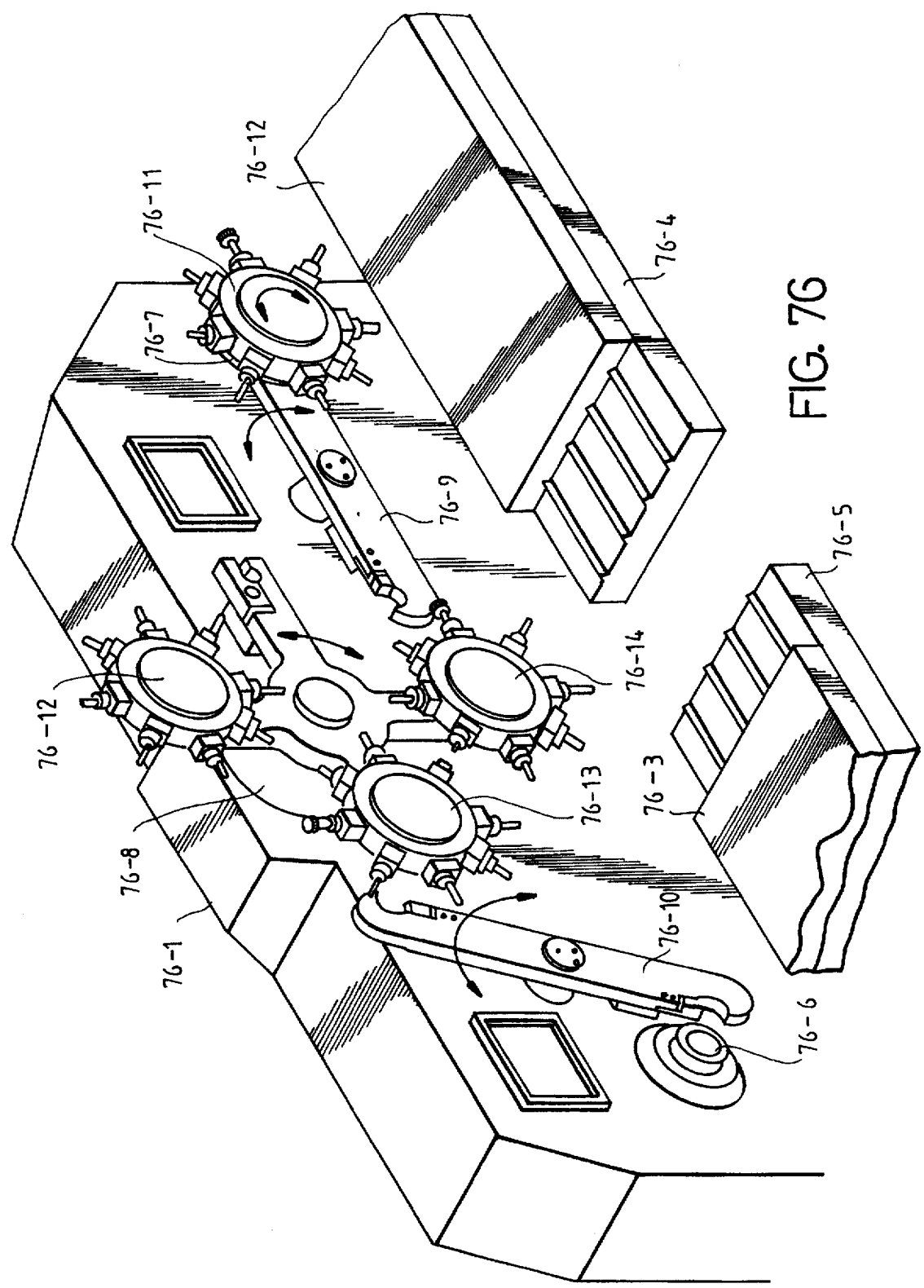

FIG. 76 shows the tool exchanging means including a tool turret as an element. Machine parts are indicated as follows:

76-1 Machine body.

76-2 Working table.

76-3 Working table.

76-4 Lathe bed.

76-5 Lathe bed.

76-6 Mandrel.

76-7 Mandrel.

76-8 Mandrel.

76-9 Exchanging arm.

76-10 Exchanging arm.

76-11 Tool turret.

76-12 Tool turret.

76-13 Tool turret.

76-14 Tool turret.

Figure 77:
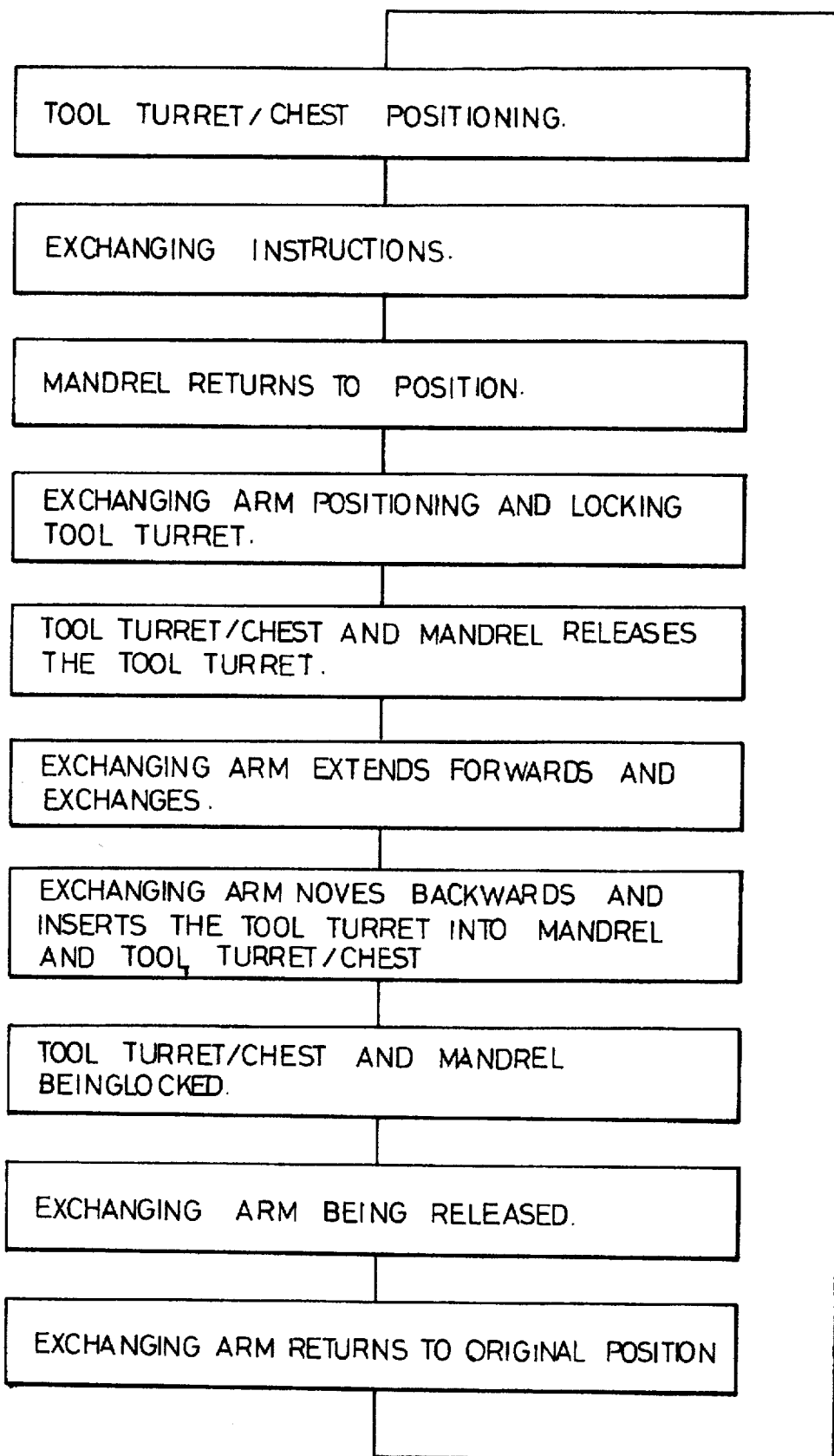

FIG. 77 shows the tool operation flow chart of the tool turret element.

Figure 78:
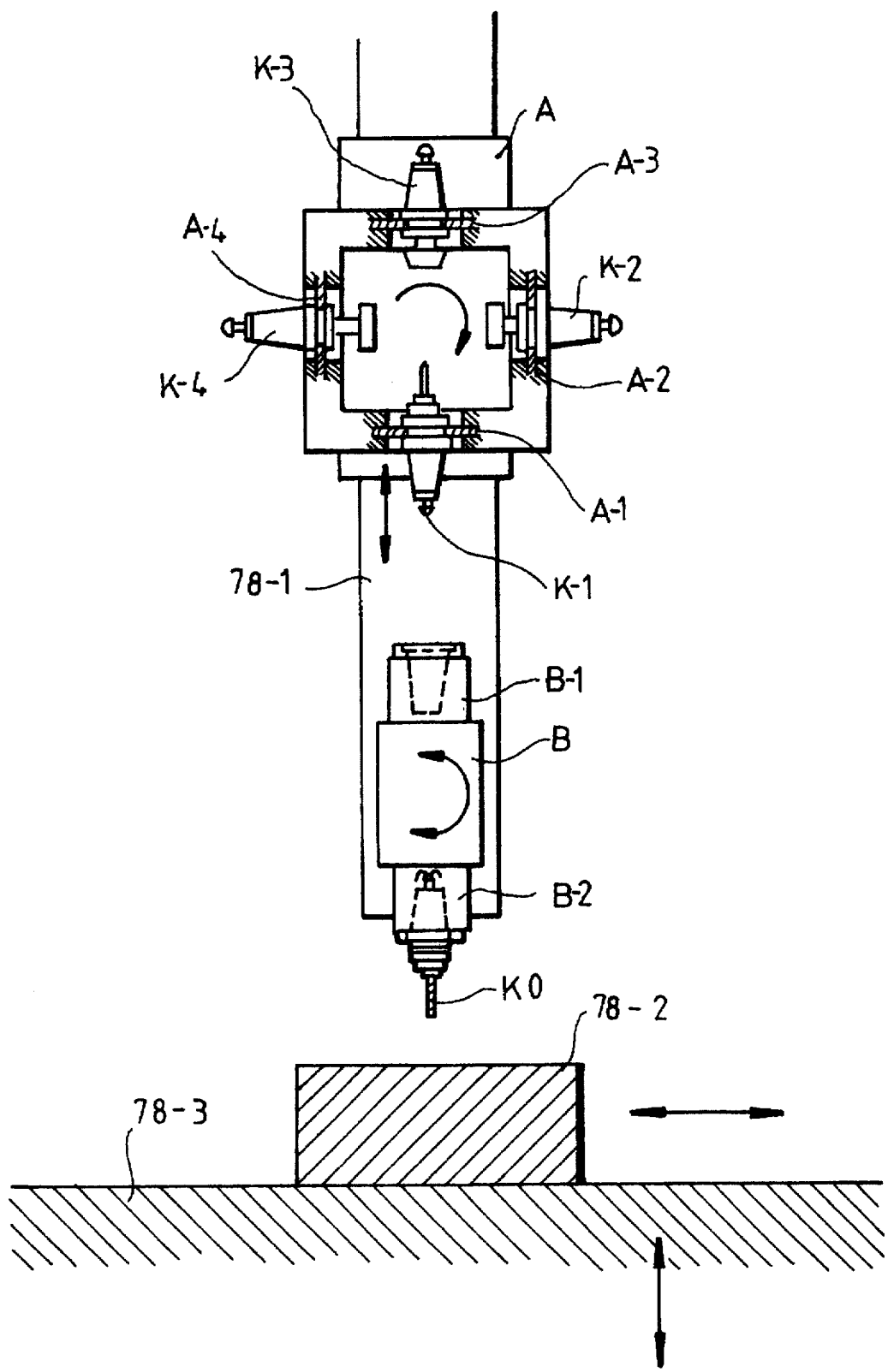

FIG. 78 shows an embodiment of an automatic tool exchanging system of the movable tool chest type. Machine parts are indicated as follows:

78-1 The common base of the tool chest and mandrel.

78-2 Work piece.

78-3 Working table.

Figure 79:
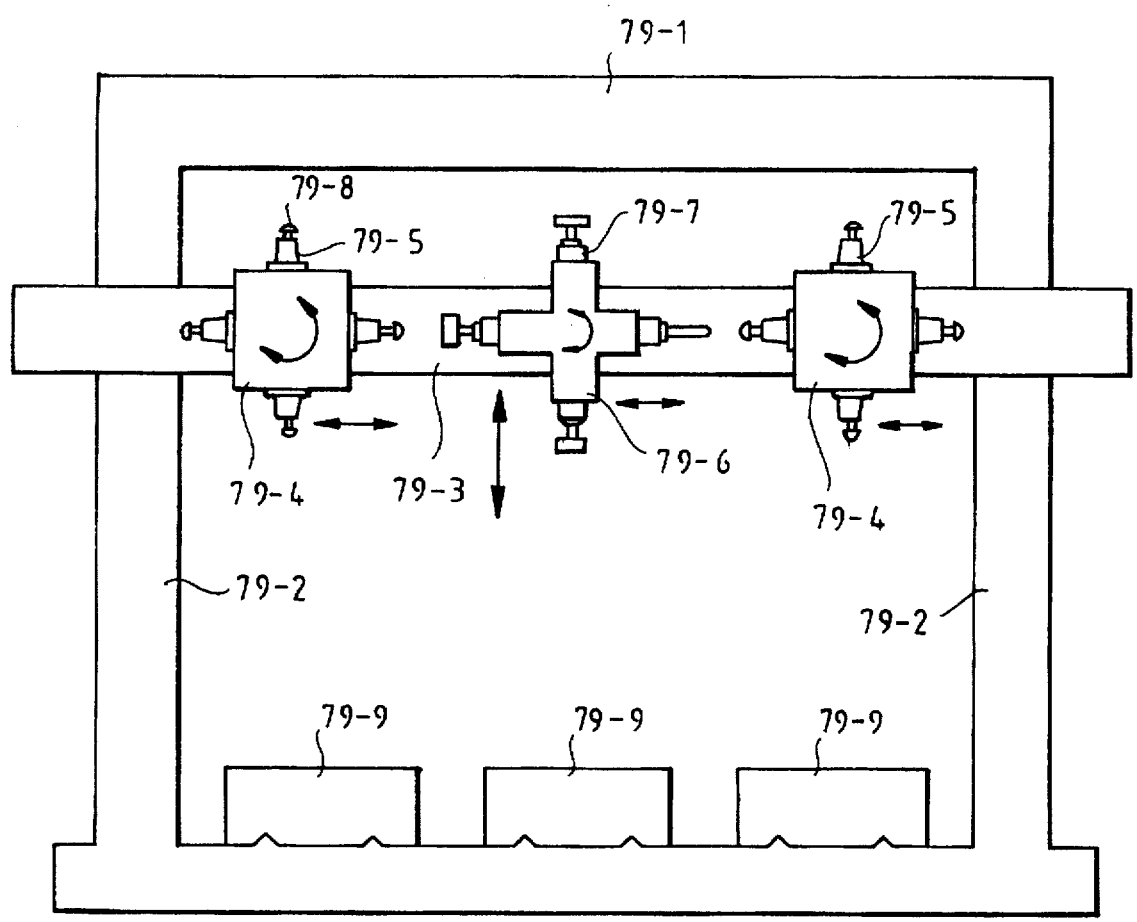

FIG. 79 shows an embodiment of an automatic tool exchanging system of the movable tool chest type. Machine parts are indicated as follows:

79-1 Top of the dragon gate.

79-2 Dragon gate column.

79-3 Lateral girder.

79-4 Tool chest.

79-5 Tool storage axle.

79-6 Tool post.

79-7 Tool mandrel.

79-8 Tool.

Figure 80:
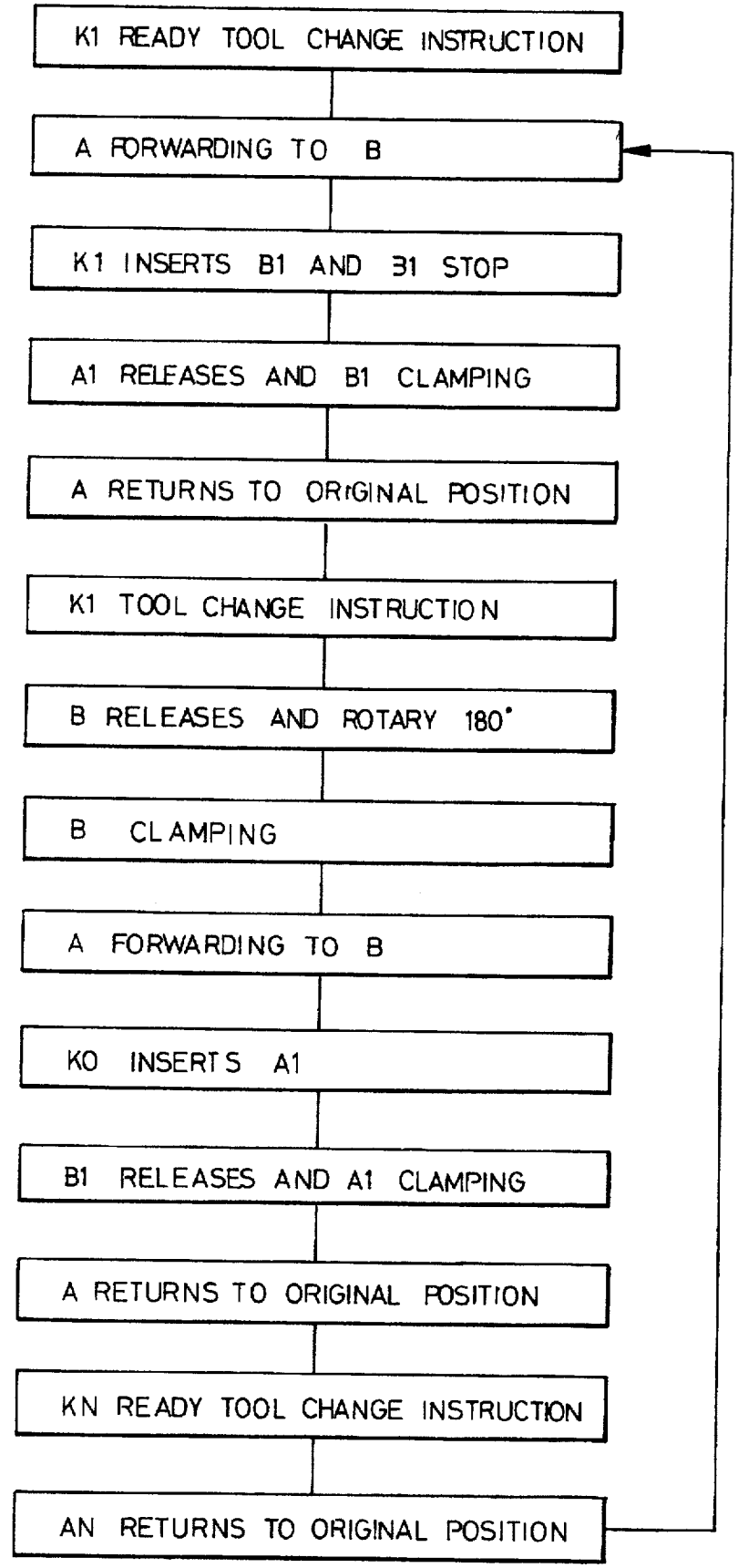

FIG. 80 shows the flow chart of automatic tool exchanging operation of the tool moving type.

Figure 81:
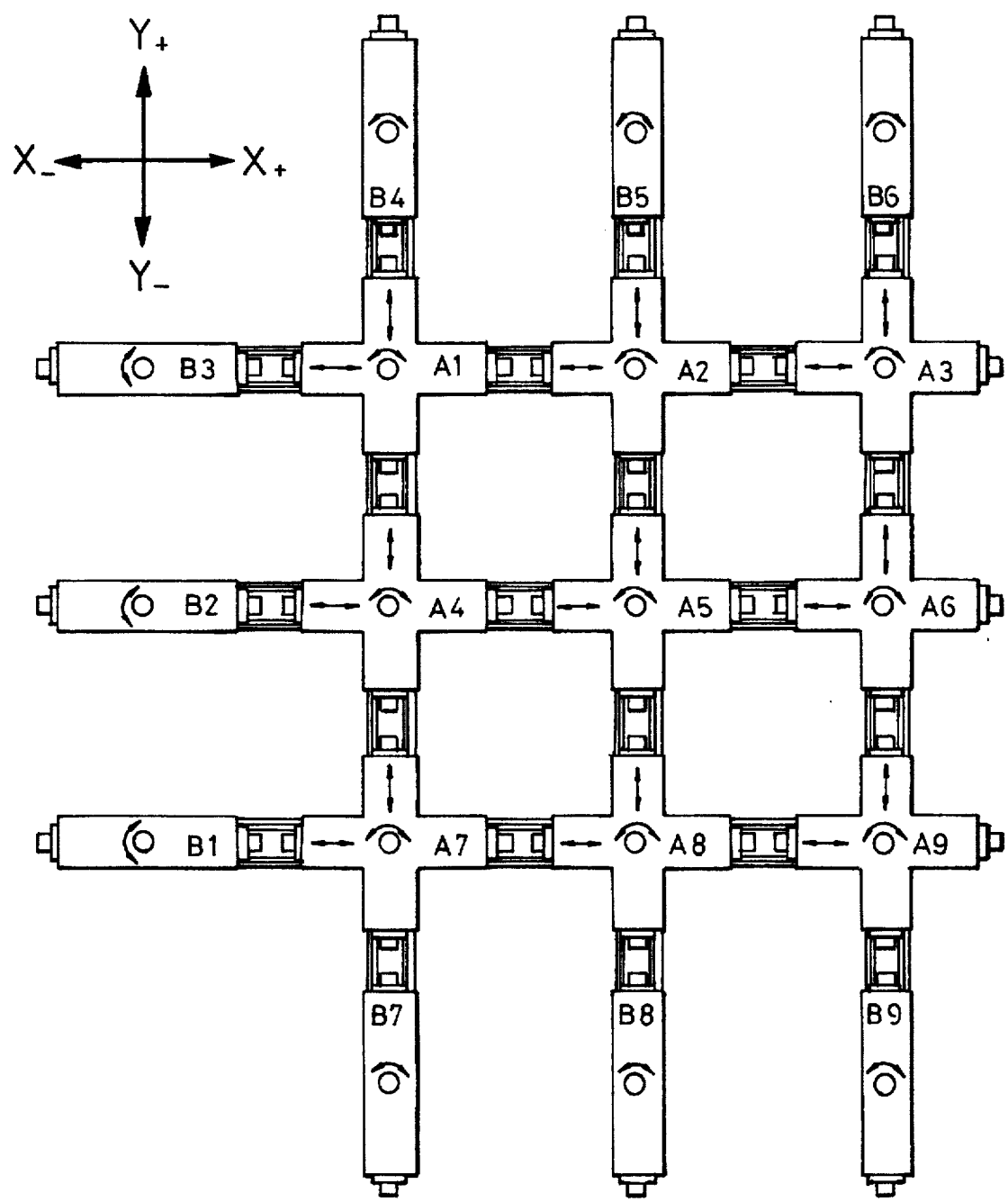

FIG. 81 shows an embodiment of an automatic tool exchanging system of a multi-set of the movable tool chest type.

$A_1$–$A_9$ indicate the tool chests which may be rotated and may be driven for coordinate axle positioning.

$B_1$–$B_9$ show a tool mandrel, of which the dual end axles can rotate at 180°.

FIG. 82 shows the operation flow chart of the multi-set tool chest system.

Figure 83:
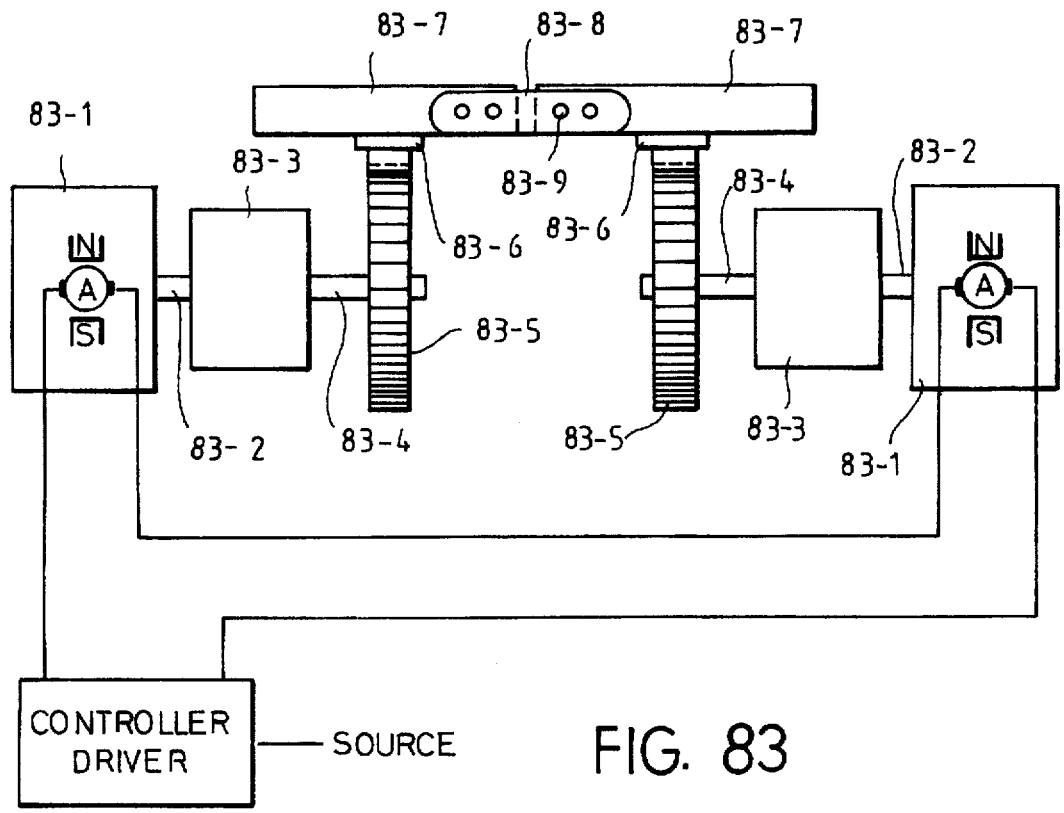

FIG. 83 shows the series driving operation of the working tables operated by means of D.C. motor armature. Machine parts are indicated as follows:

83-1 Driving motor.
83-2 The output axle of the driving motor.
83-3 Gear box.
83-4 The output axle of the gear box.
83-5 Driving gear.
83-6 Gear rack.
83-7 Working table.
83-8 The locking means of the working table.
83-9 The lock screw of the locking means of the working table.

Figure 84:
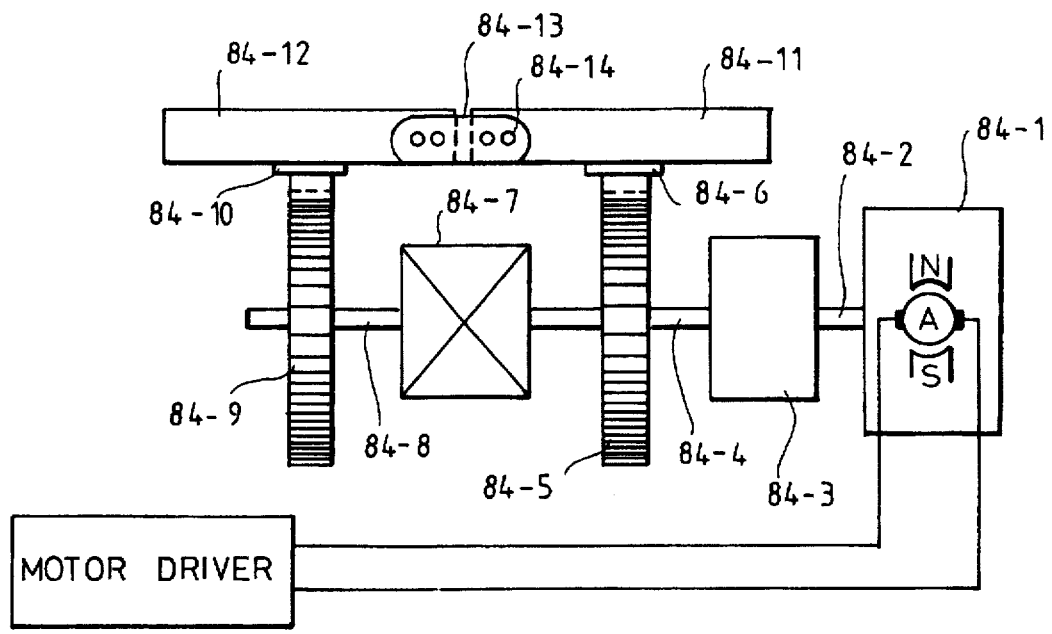

FIG. 84 shows a dual working table set being driven by means of a single-set driving motor and a clutch assembly. Machine parts are indicated as follows:

84-1 Driving motor.
84-2 Output axle of the driving motor.
84-3 Gear box.
84-4 Output axle of the gear box.
84-5 Driving gear.
84-6 Gear rack.
84-7 Electro-magnetic clutch.
84-8 Driving gear.
84-9 Driving gear.
84-10 Gear rack.
84-11 Working table.
84-12 Working table.
84-13 Locking means of the working table.
84-14 The lick screw of the locking means of the working table.

Figure 85:
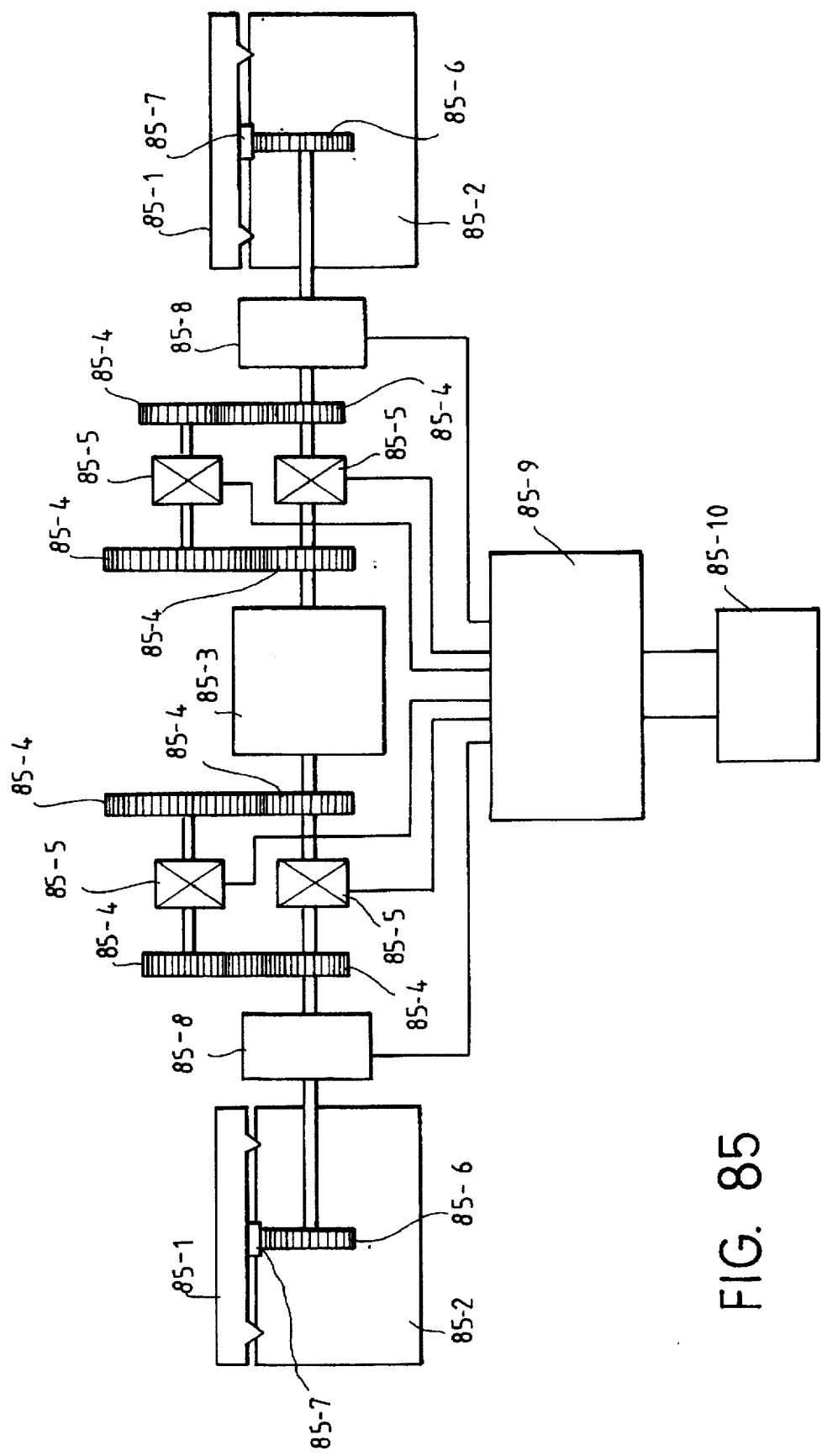

FIG. 85 shows the working table set being driven by means of a single-set driving motor and clutch assembly. Machine parts are indicated as follows:

85-1 Working table.
85-2 Lathe bed.
85-3 Driving motor.
85-4 Drive gear.
85-5 Clutch.
85-6 Driving gear.
85-7 Gear rack
85-8 Transmission case.
85-9 Control means.
85-10 Operating means.

Figure 86:
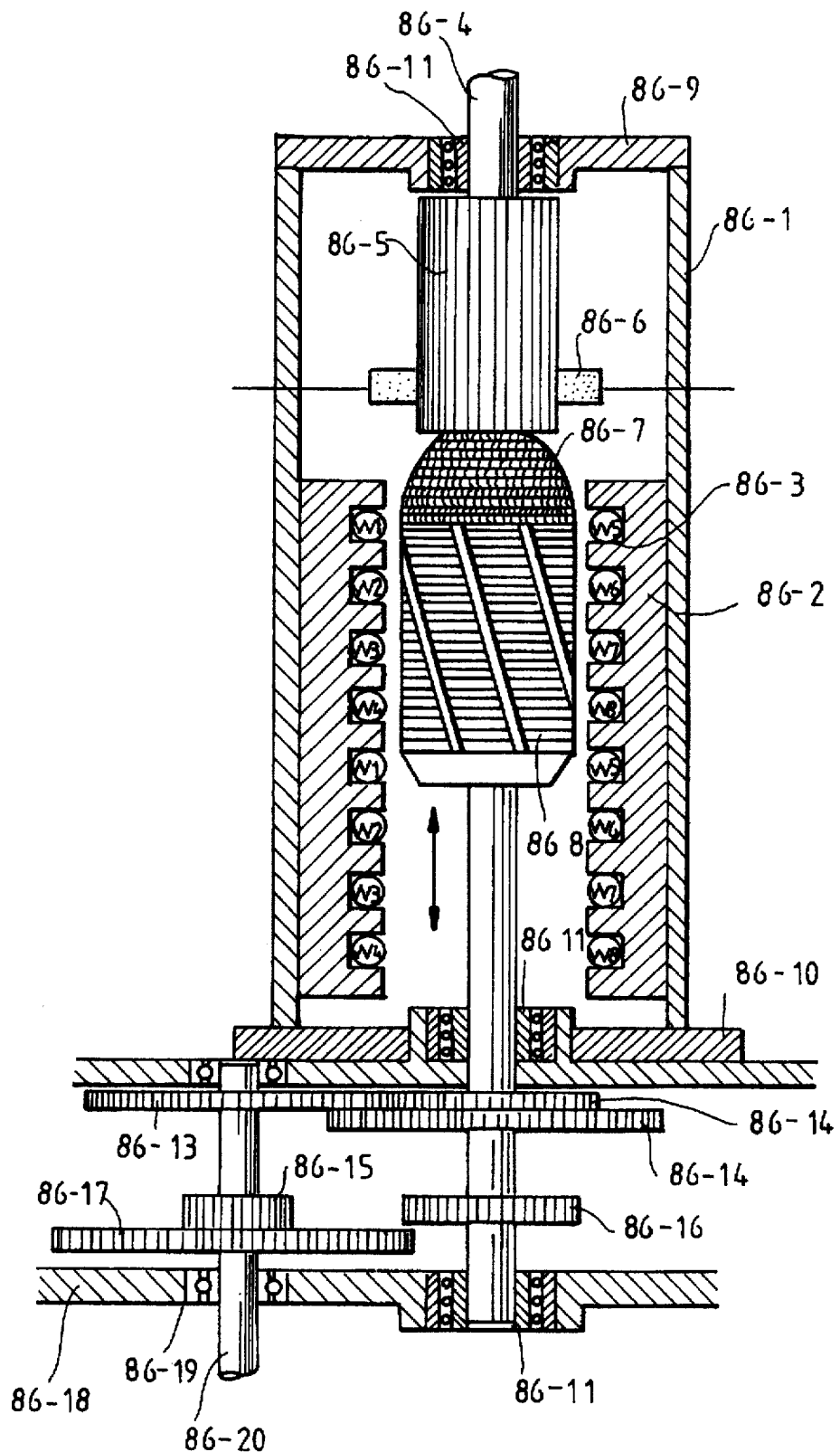

FIG. 86 shows a gear transmission means driven by an axial displacement D.C. motor. Machine parts are indicated as follows:

86-1 Outer case.
86-2 The core of the magnetic field.
86-3 Field winding.
86-4 Armature axle.
86-5 Commutators.
86-6 Brush.
86-7 Armature winding.
86-8 Armature iron core.
86-9 The rear cover of the motor.
86-10 The front cover of the motor.
86-11 Radial bearing.
86-12 Mid-speed driving gear.
86-13 Mid-speed output gear.
86-14 High-speed driving gear.
86-15 High-speed output gear.
86-16 Low-speed driving gear.
86-17 Low-speed output gear.
86-18 The lid of the output end.
86-19 Output bearing.
86-20 Output axle.

Figure 87:
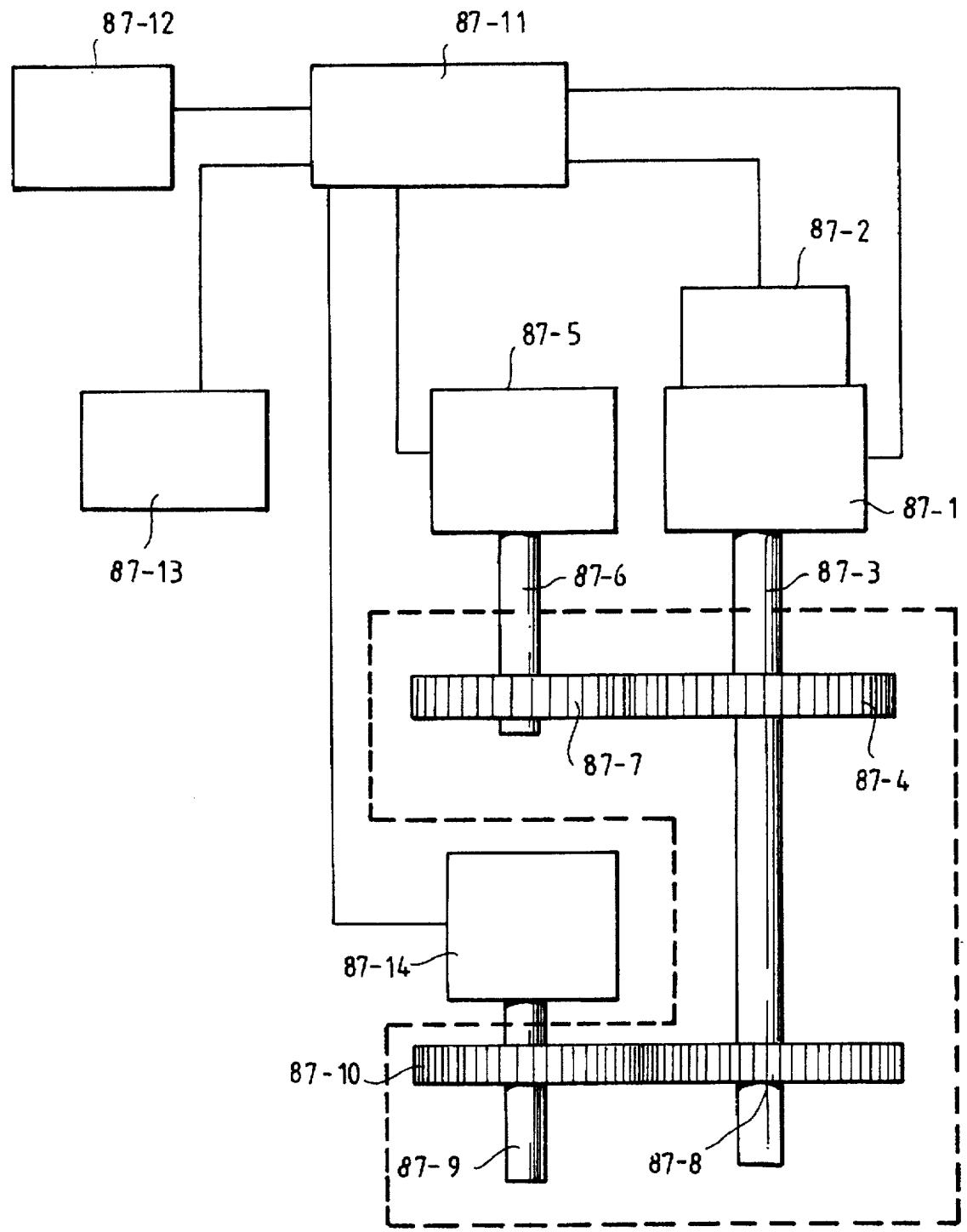

FIG. 87 shows a brake operation block diagram using a multi-pole A.C. auxiliary motor. Machine parts are indicated as follows:

87-1 Primary driving motor.
87-2 External brake means.
87-3 The output axle of the primary driving motor.
87-4 Driving gear.
87-5 A.C. multi-pole induction auxiliary motor.
87-6 Output axle of the auxiliary motor.
87-7 Driving gear.
87-8 Driving gear.
87-9 Driving gear.
87-10 Output axle.
87-11 Random control device.
87-12 Control instruction input means.
87-13 Speed gauge.
87-14 Speed sensing means.

Figure 88:
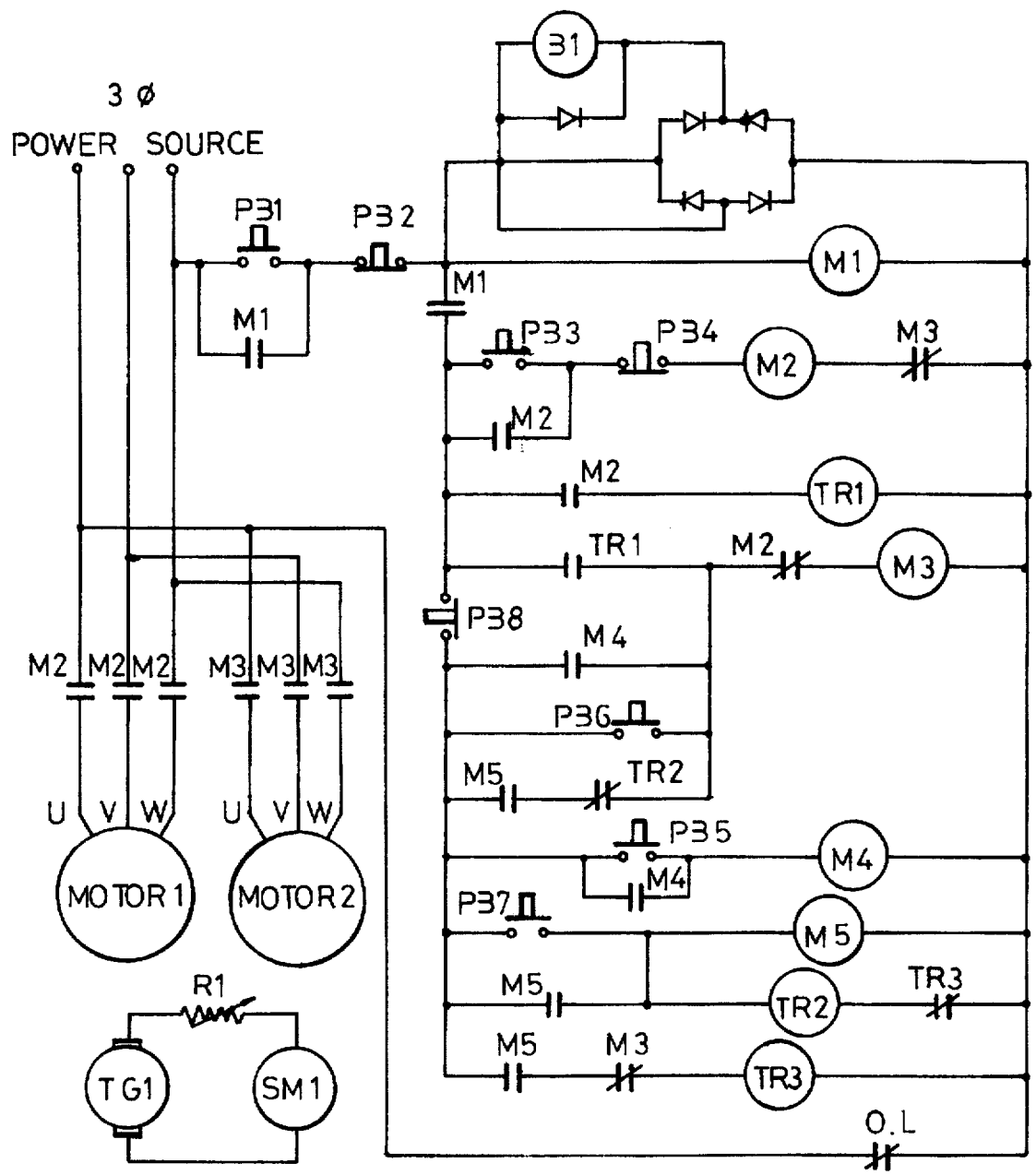

FIG. 88 shows a brake operation circuit using a multi-pole A.C. auxiliary motor.

Figure 89:
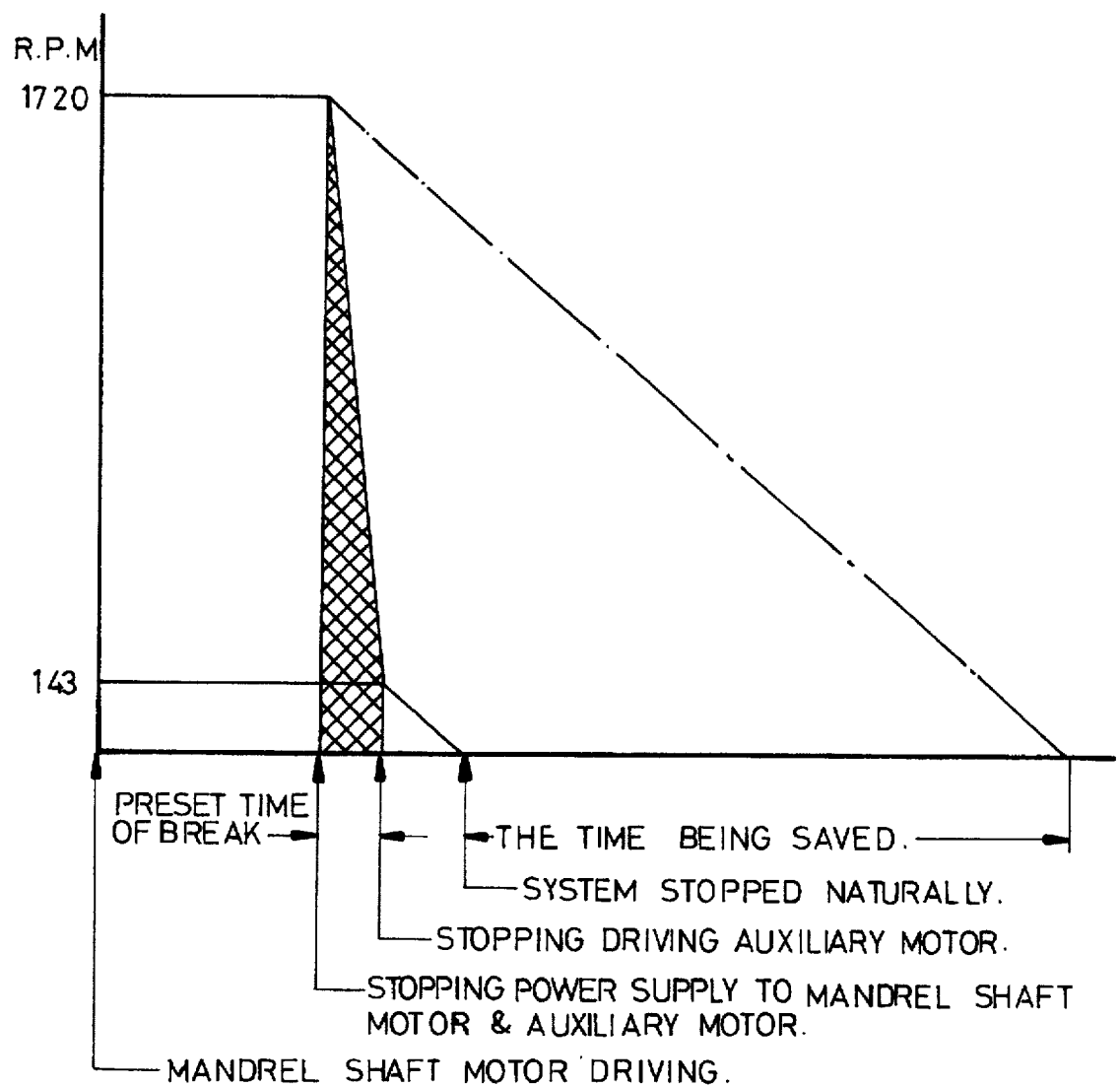

FIG. 89 shows a diagram of the brake function.

Figure 90:
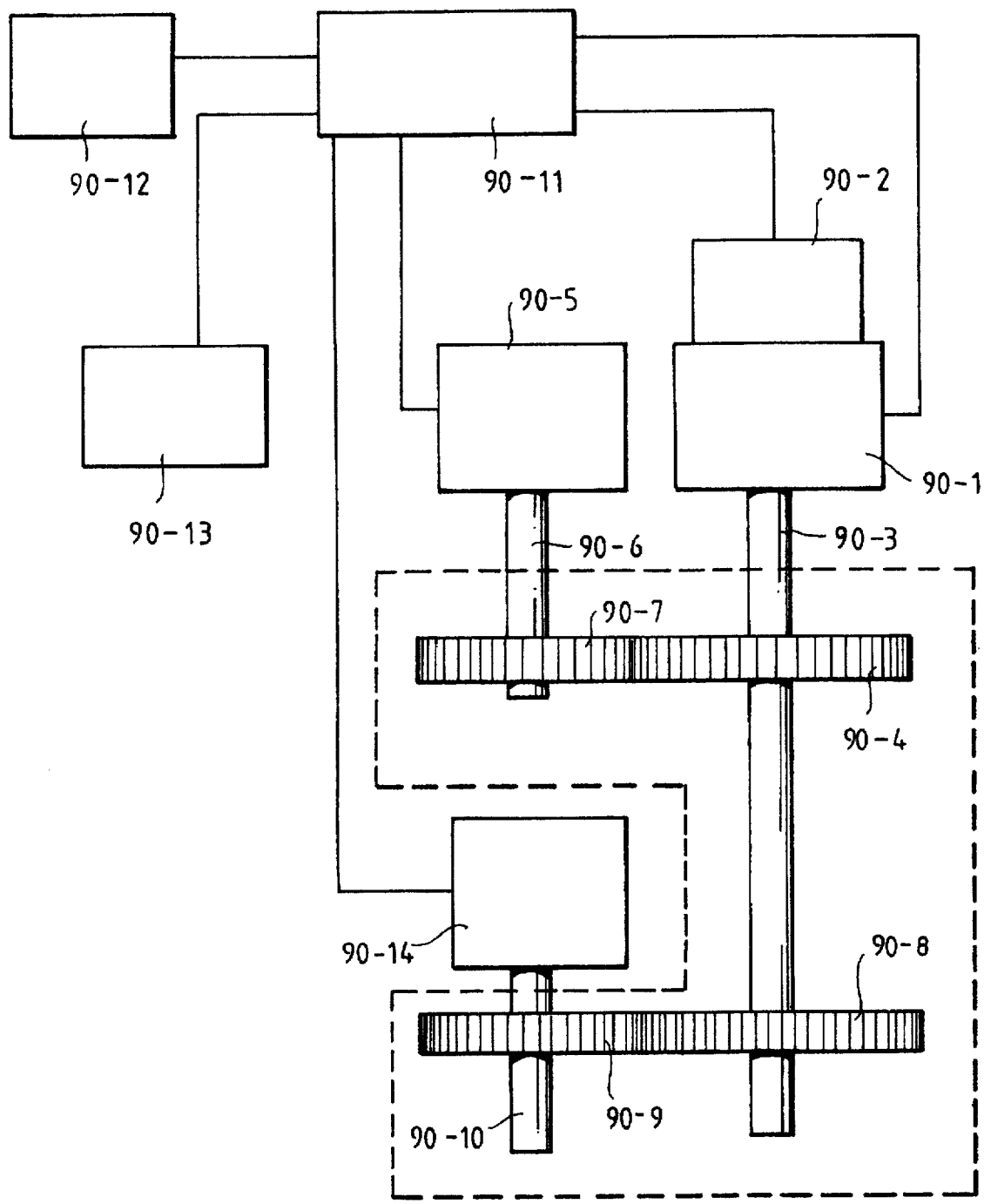

FIG. 90 shows a block diagram using a D.C. auxiliary motor for brake operation. Machine parts are indicated as follows:

90-1 Primary driving motor.
90-2 External brake means.
90-3 The output axle of the primary driving motor.
90-4 Driving gear.
90-5 D.C. auxiliary motor.
90-6 The output axle of the D.C. auxiliary motor.
90-7 Driving gear.
90-8 Driving gear.
90-9 Driving gear.
90-10 Output axle.
90-11 Random control device.
90-12 Control instruction input means.
90-13 Speed gauge.
90-14 Speed sensing means.

FIG. 91 shows a circuit diagram using D.C. auxiliary motor for brake operation.

Figure 92:
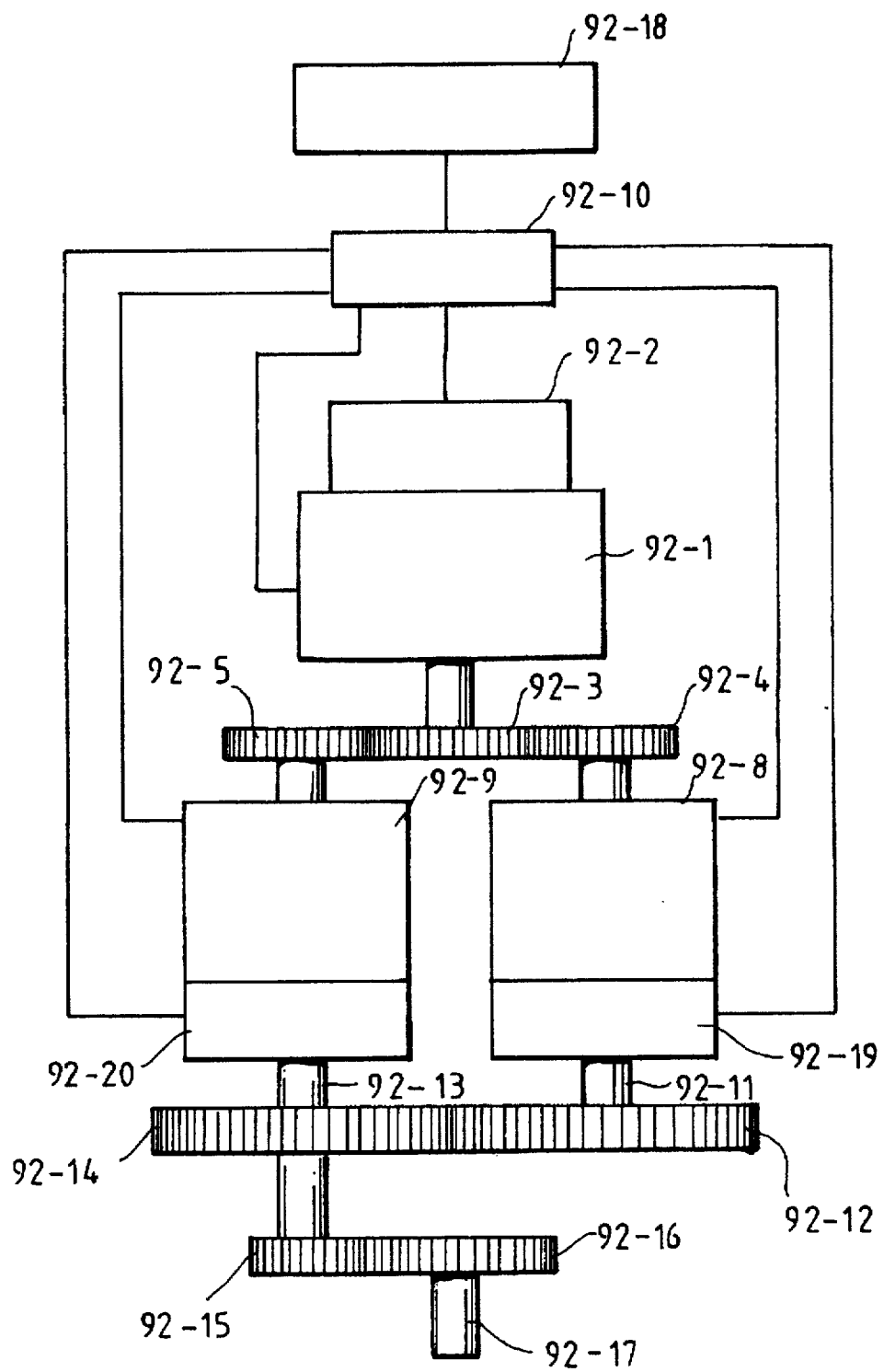

FIG. 92 shows an eddy-current coupled means which can rotate forward and reversely and has a brake function, and which may be used for driving the mandrel and the working table. Machine parts are indicated as follows:

92-1 Driving motor.
92-2 External control means.
92-3 Driving gear.
92-4 Driving gear.
92-5 Driving gear.
92-6 Input axle of coupling means.
92-7 Input axle of coupling means.
92-8 Eddy-current coupled ring-shaped driving means.

92-9 Eddy-current coupled ring-shaped driving means.
92-10 RAM control means.
92-11 Output axle of the coupling means.
92-12 Driving gear.
92-13 Output axle of the coupling means.
92-14 Driving gear.
92-15 Driving gear.
92-16 Driving gear.
92-17 Output axle.
92-18 Input means of control instructions.
92-19 Speed sensing means.
92-20 Speed sensing means.

Figure 93:
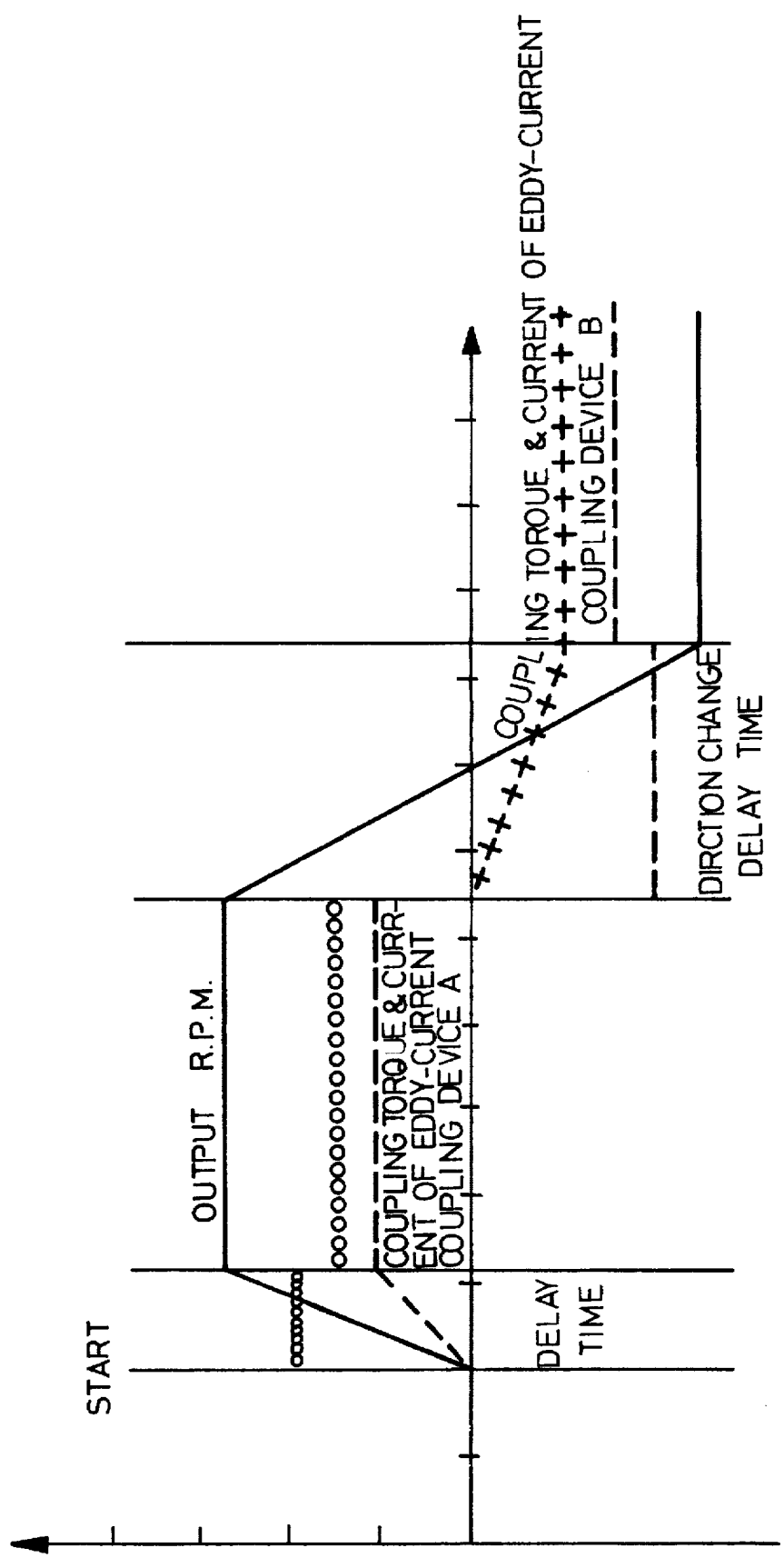

FIG. 93 shows the forward/reverse rotation switching characteristic diagram of the eddy-current coupled means which has the forward/reverse rotation and brake functions.

Figure 94:
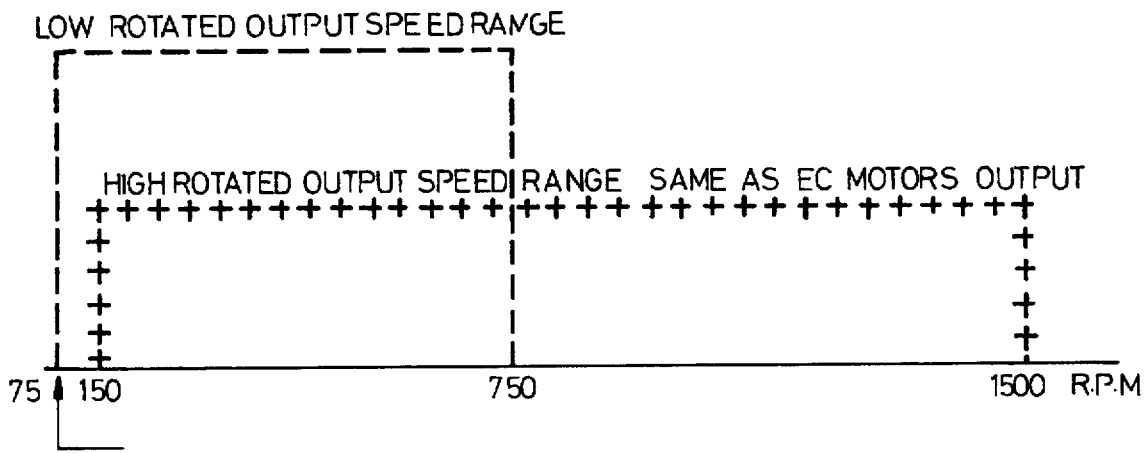

FIG. 94 shows the characteristic diagram of torque expanding.

Figure 95:
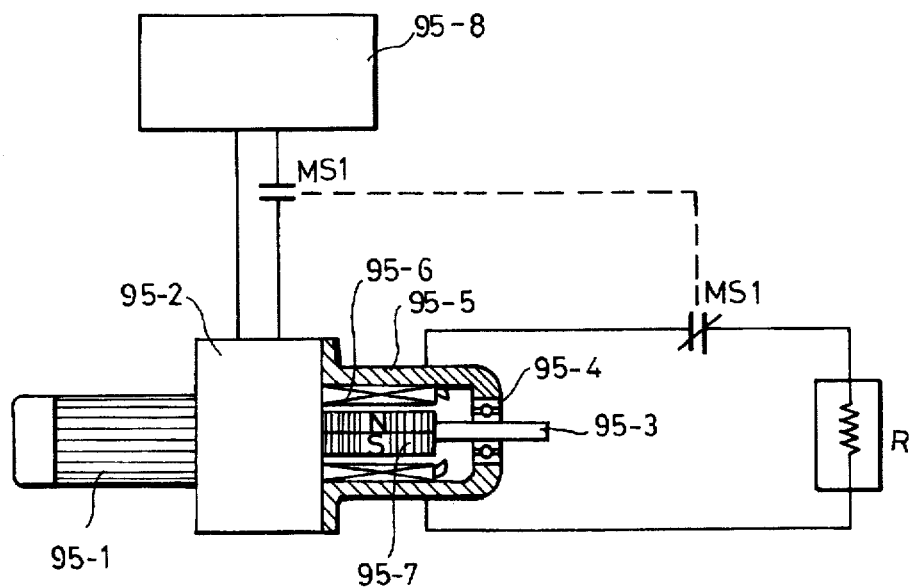

FIG. 95 shows the powered "TG" brake means. Machine parts are indicated as follows:
95-1 A.C. induction motor.
95-2 Eddy-current coupling driving means.
95-3 Output axle.
95-4 Bearing.
95-5 Outer case.
95-6 Generator winding.
95-7 Permanent magnet rotor.
95-8 D.C. excited control device.

Figure 96:
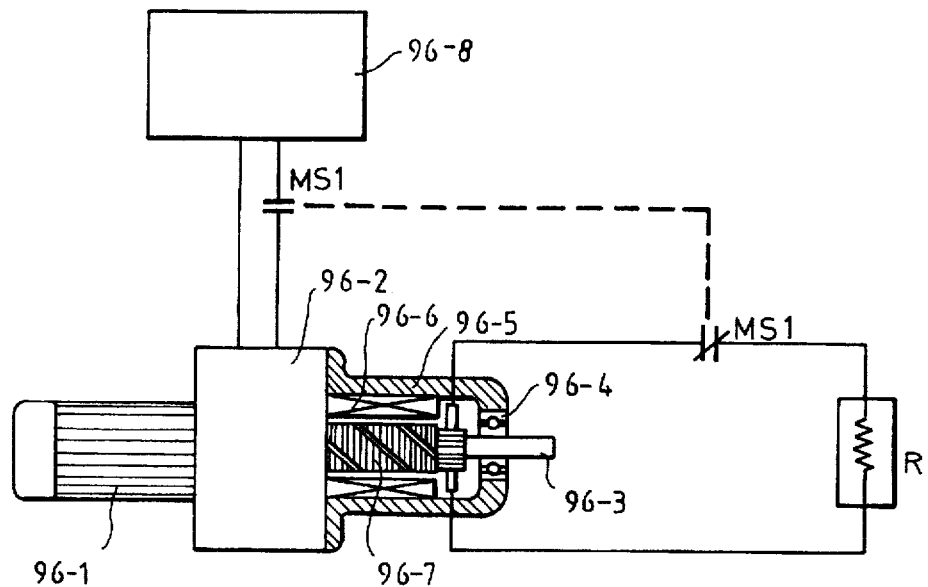

FIG. 96 shows the D.C. generator brake means. Machine parts are indicated as follows:
96-1 A.C. induction motor.
96-2 Eddy-current coupling driving means.
96-3 Output axle.
96-4 Bearing.
96-5 Outer case.
96-6 Excited field.
96-7 Armature winding.
96-8 D.C. excited control device.

Figure 97:
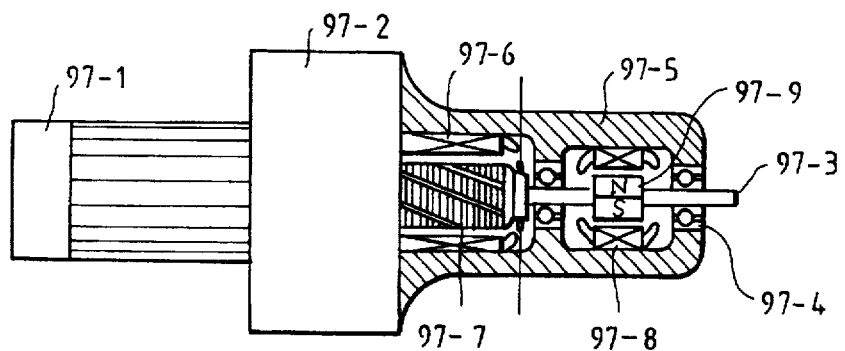

FIG. 97 shows a brake means using an A.C./D.C. generator. Machine parts are indicated as follows:
97-1 A.C. induction motor.
97-2 Eddy-current coupling driving means.
97-3 Output axle.
97-4 Bearing.
97-5 Outer case.
97-6 D.C. field winding.
97-7 The armature winding of the generator.
97-8 The field winding of A.C. stator.
97-9 Permanent magnet.

Figure 98:
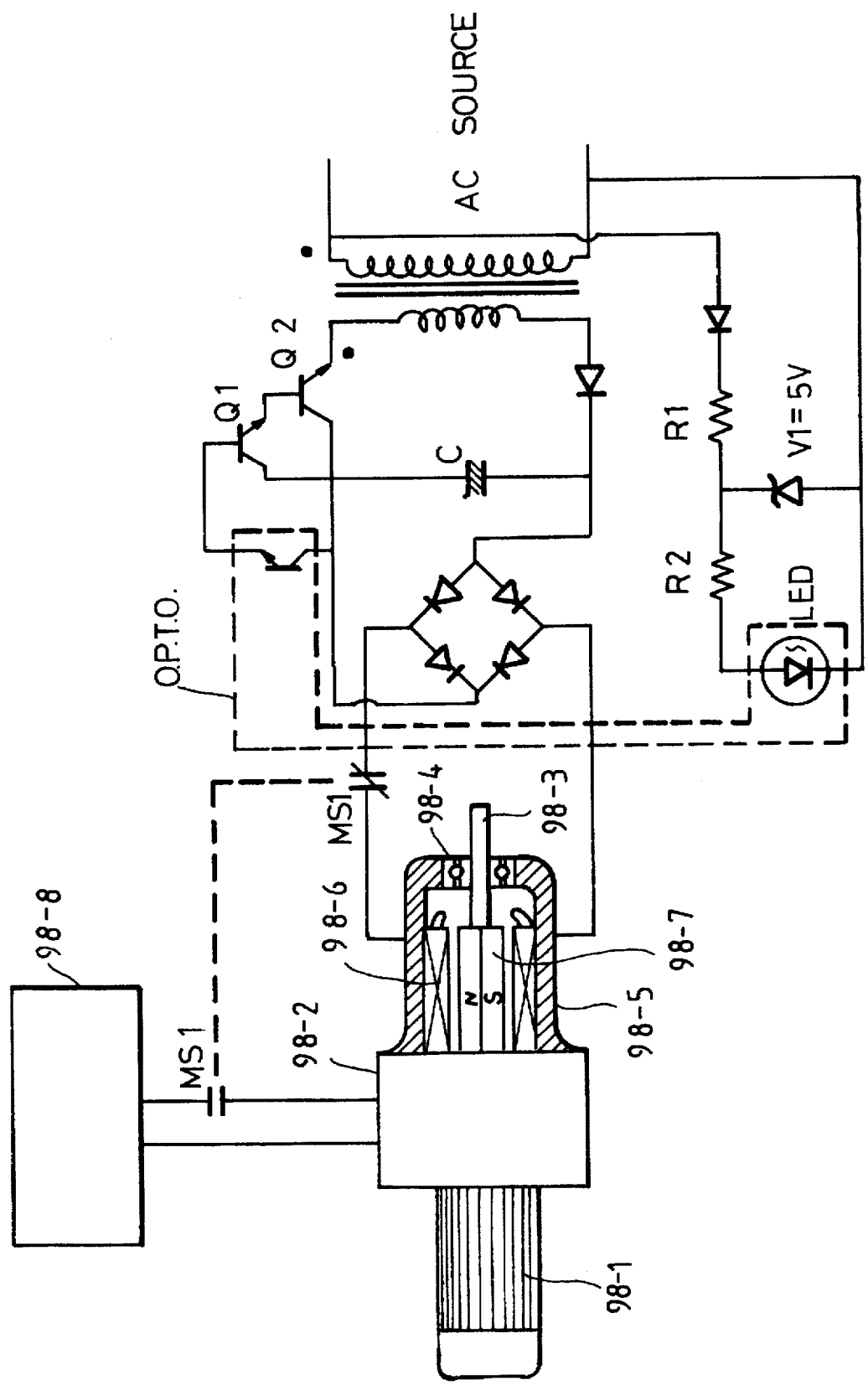

FIG. 98 shows an A.C. regenerated power brake means. Machine parts are indicated as follows:
98-1 A.C. induction motor.
98-2 Eddy-current coupling driving means.
98-3 Output axle.
98-4 Bearing.
98-5 Outer case.
98-6 Stator field winding.
98-7 Permanent magnet rotor.
98-8 D.C. excited control device.

Figure 99:
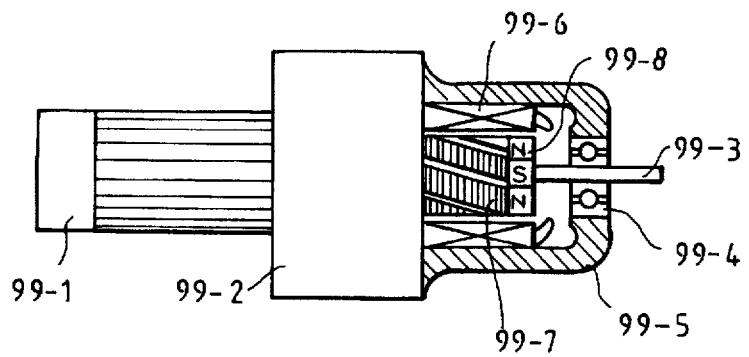

FIG. 99 shows an A.C. generator brake means of the permanent magnet type of squirrel cage. Machine parts are indicated as follows:

99-1 A.C. induction motor.
99-2 Eddy-current coupling driving means.
99-3 Output axle.
99-4 Bearing.
99-5 Outer case.
99-6 Stator winding.
99-7 Squirrel cage and permanent magnet rotor.
99-8 Permanent magnet pole.

FIG. 100 shows an embodiment of synchronous pursuit operation by using a stepper motor to control the brush set of a conventional D.C. motor. Machine parts are indicated as follows:
100-1 Stator.
100-2 Stepper motor rotor.
100-3 The field winding of the D.C. motor.
100-4 D.C. motor armature.
100-5 The input brush of armature power.
100-6 The slip ring of armature input power.
100-7 The input power brush of the stepper motor stator.
100-8 The disk-shaped slip ring of the input power of the stepper motor stator.
100-9 The commutator of the armature.
100-10 The armature brush.
100-11 The brush lid of the armature.
100-12 Output axle.

FIG. 101 shows the mutual attraction state between the motor armature and the field poles shown in FIG. 100 when the polarity of said poles is different.

FIG. 102 shows the motor brushes in FIG. 100 being driven by the driving motor.

FIG. 103 shows the armature and brushes of motor shown in FIG. 100 being pulled back.

Figure 104:
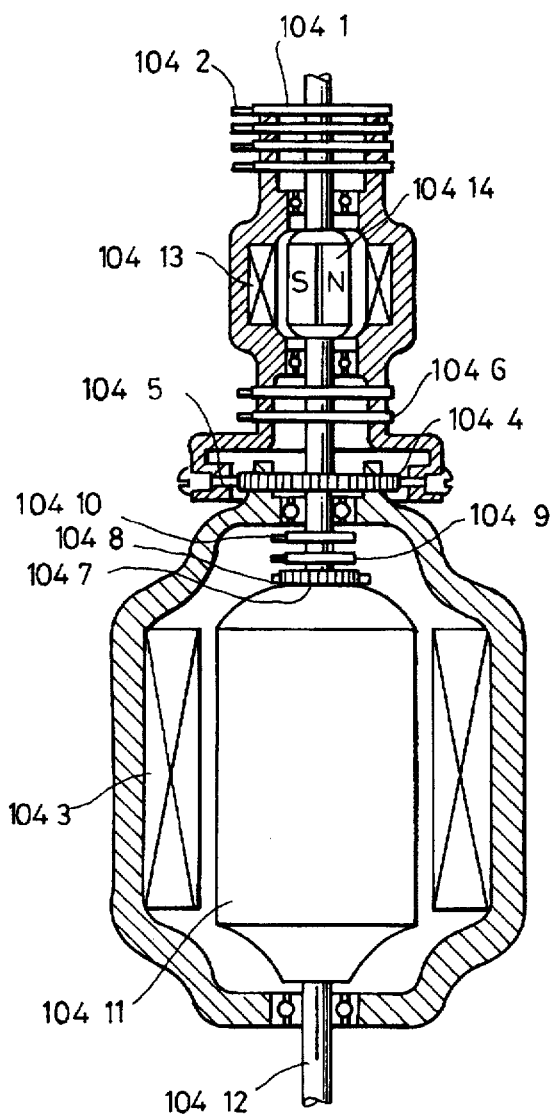

FIG. 104 shows an embodiment of synchronous pursuit operation of the conventional D.C. motor field being controlled by a stepper motor. Machine parts are indicated as follows:
104-1 The slip ring of the input power of the stepper motor.
104-2 The brush of the input power of the stepper motor.
104-3 Field stator.
104-4 Commutator segment.
104-5 Brush.
104-6 Slip ring.
104-7 The commutator segment of the rotor.
104-8 Brush.
104-9 Rotor input slip ring.
104-10 The input brush of the rotor.
104-11 Armature.
104-12 Output axle.
104-13 The stator of the stepper motor.
104-14 The rotor of the stepper motor.

Figure 105:
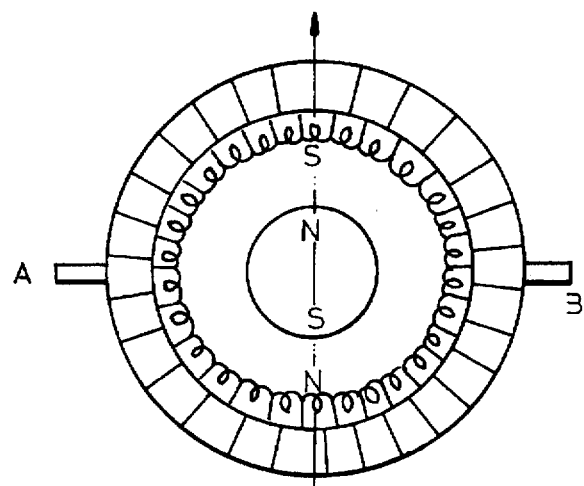

FIG. 105 shows the mutual attraction state between the armature and the field of the motor shown in FIG. 104.

Figure 106:
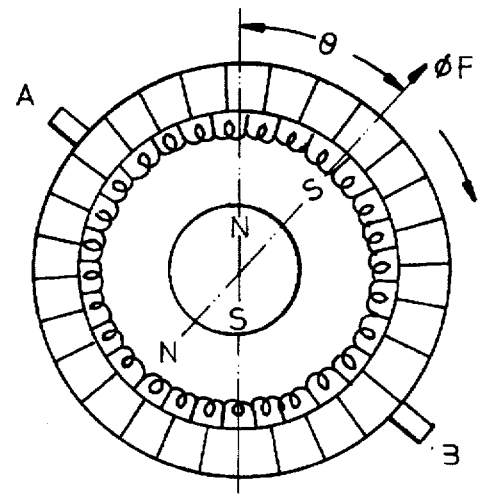

FIG. 106 shows the motor magnetic poles in FIG. 104 being changed by the driving motor.

Figure 107:
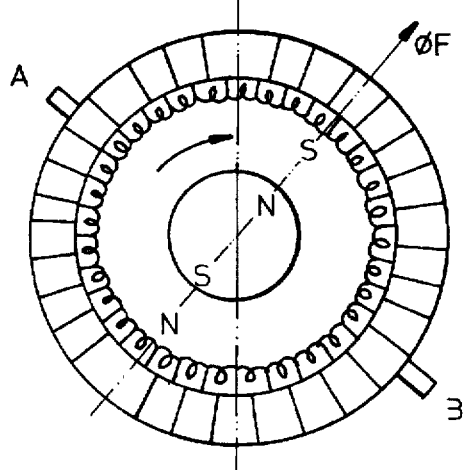

FIG. 107 shows the pursuit state between the rotor and the field of the motor shown in FIG. 104.

FIG. 108 shows an embodiment of the stepper motor driven by A.C. Machine parts are indicated as follows:
108-1 Output axle.
108-2 Outer case.

108-3 Bearing.
108-4 Stator iron core.
108-5 Stator winding.
108-6 Rotor iron core.
108-7 Rotor winding.
108-8 Rotor slip ring.
108-9 Rotor brushes.
109-10 The insulating holder of the rotor slip ring.

Figure 109:
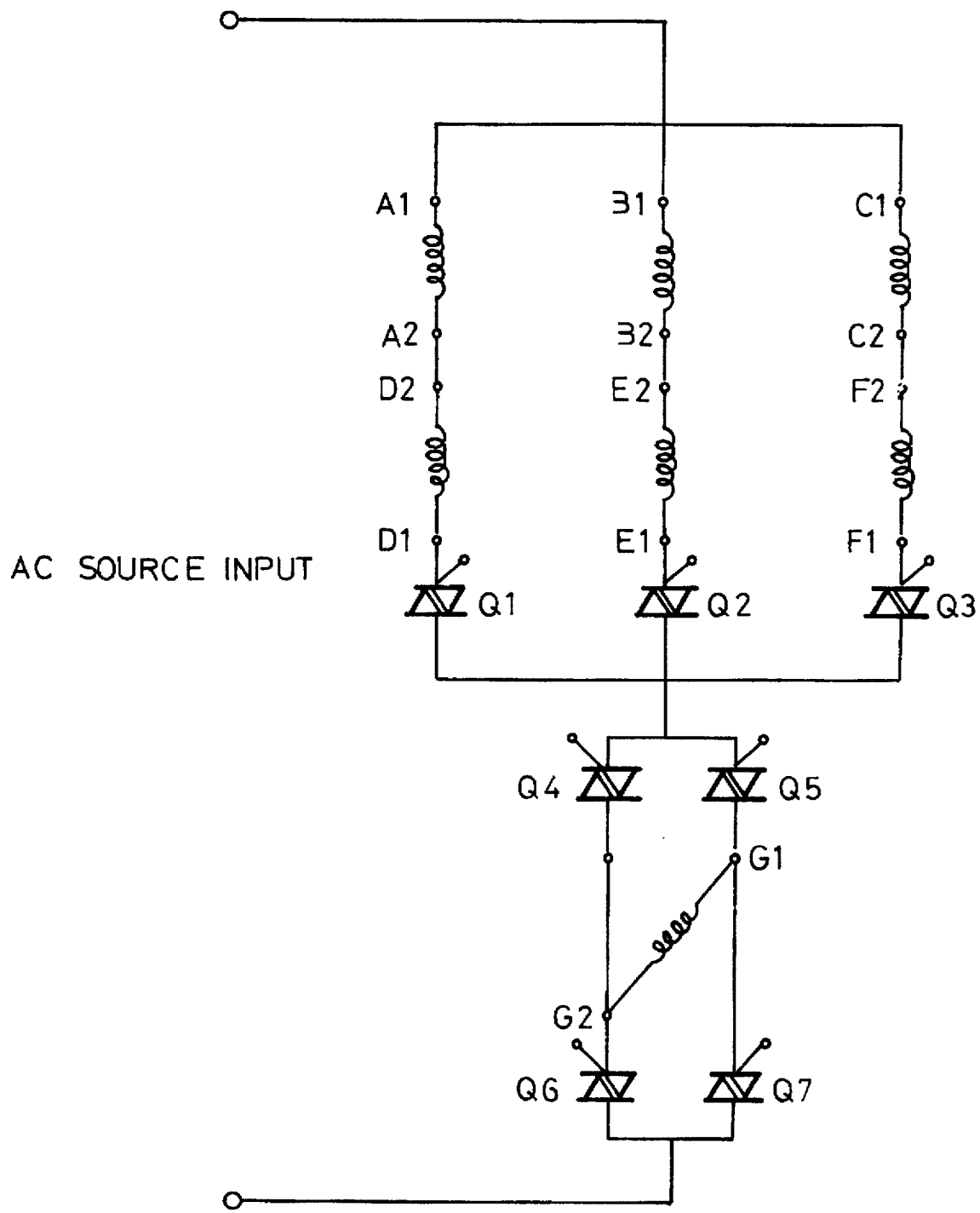

FIG. 109 shows the series connection diagram between the stator and rotor windings of the motor in FIG. 108 and the control switch.

FIGS. 111A, 111B show an embodiment of a two-section type of motor. Machine parts are indicated as follows:

111-1 Output axle.
111-2 Input slip ring of the rotor.
111-3 Input brush of the rotor.
111-4 Brush holder.
111-5 The tooth-shaped iron core of the rotor.
111-6 Rotor winding.

FIGS. 112A, 112B show an embodiment-1 of the motor driving circuit.

Figures 113, 114:
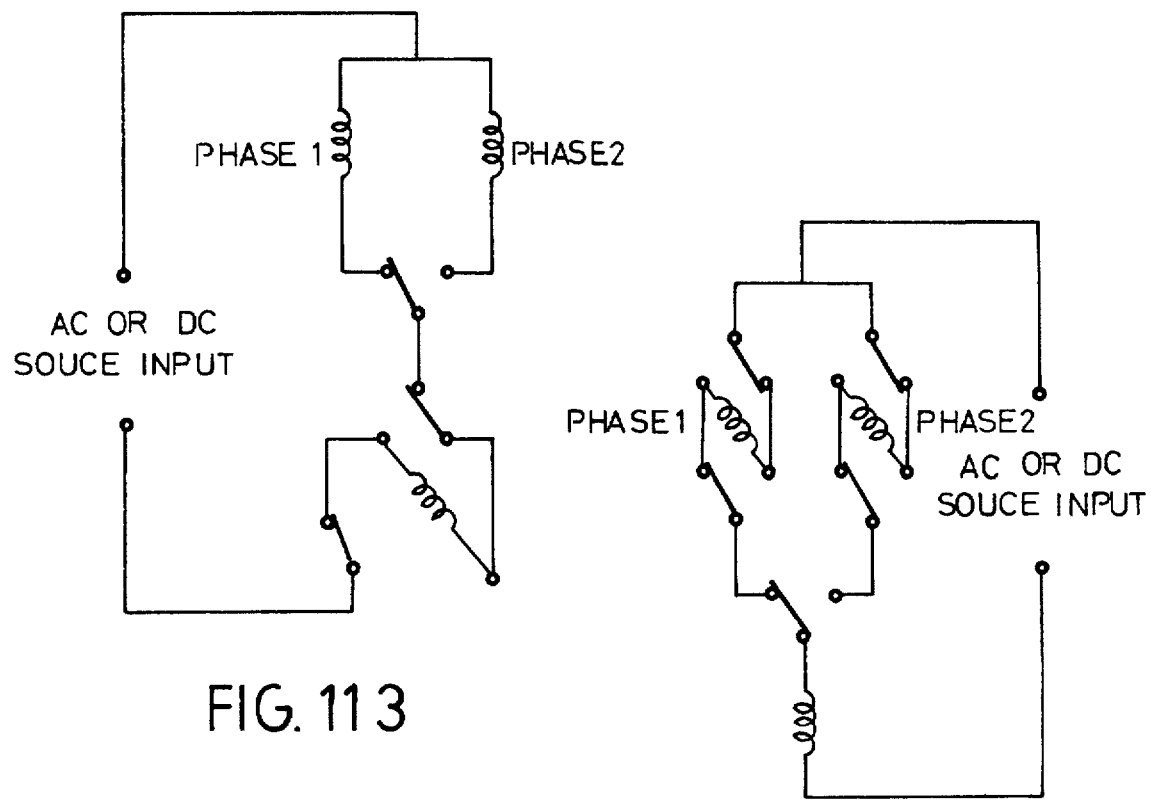

FIG. 113 shows an embodiment-2 of the motor driving motor.

FIG. 114 shows an embodiment-3 of the motor driving motor.

Figure 115:
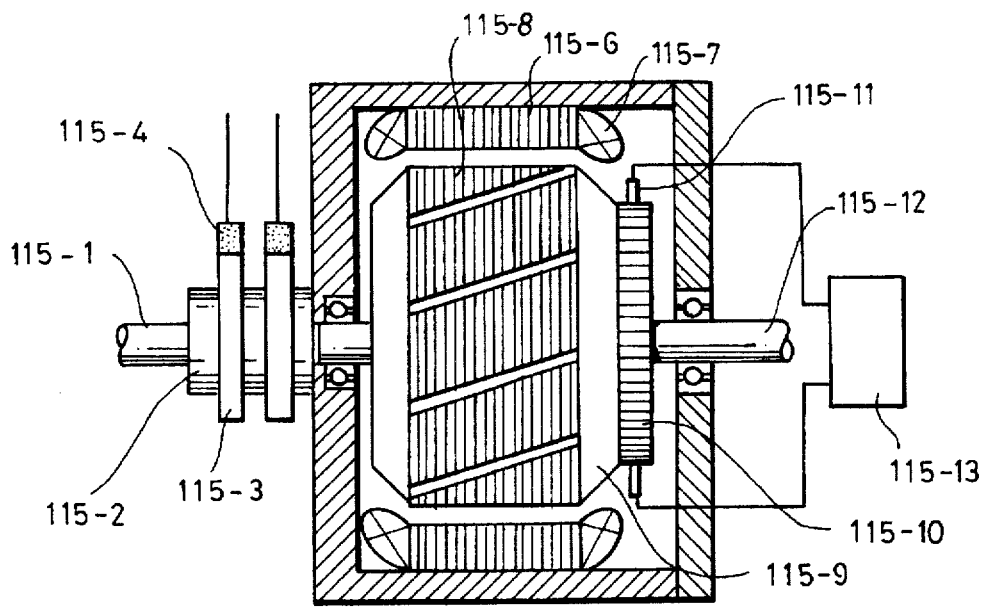

FIG. 115 shows the structure of a generated power self-excitation and transmission, electro-magnetic coupling, and driving means. Machine parts are indicated as follows:

115-1 Input axle.
115-2 Insulating base.
115-3 Slip ring.
115-4 Brush.
115-5 Outer case.
115-6 Iron core of the field.
115-7 Field winding.
115-8 Armature iron core.
115-9 Armature winding.
115-10 Commutator.
115-11 Brush.
115-12 Output axle.
115-13 The resistance load or a regenerated feedback load.

Figure 116:
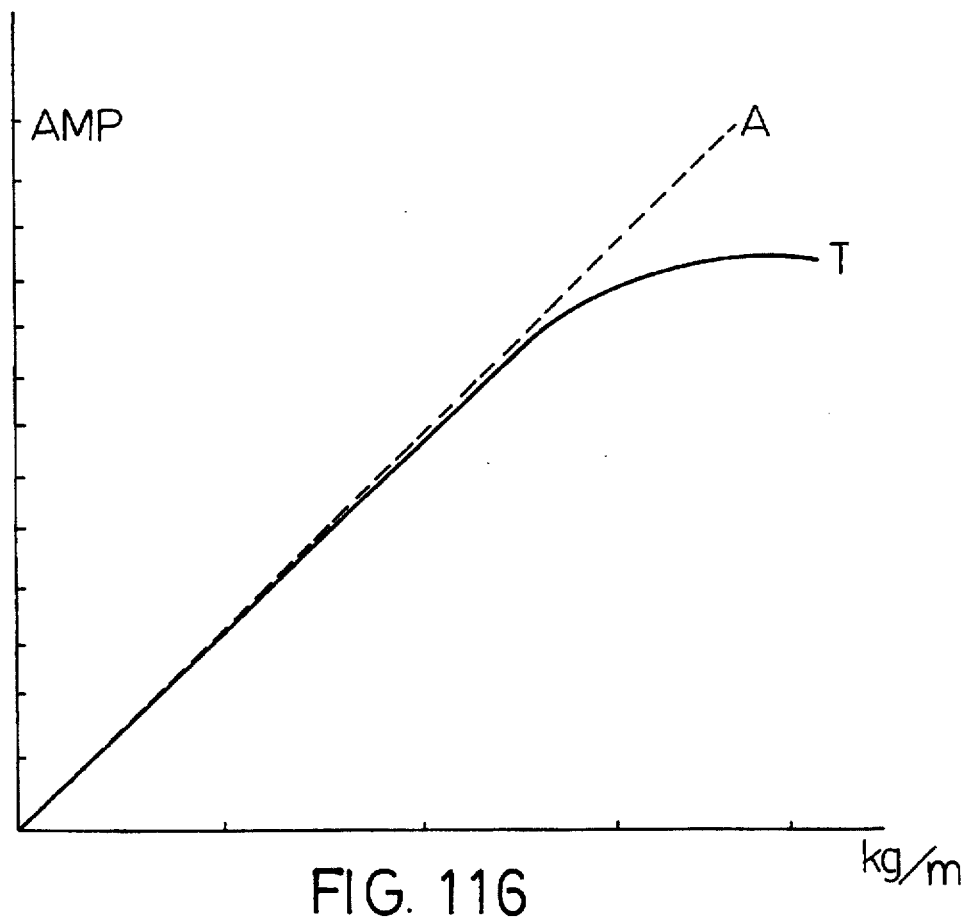

FIG. 116 shows the circuit and the characteristic diagram of the generated power self-excitation and transmission, electro-magnetic coupling, and driving means.

Figure 117:
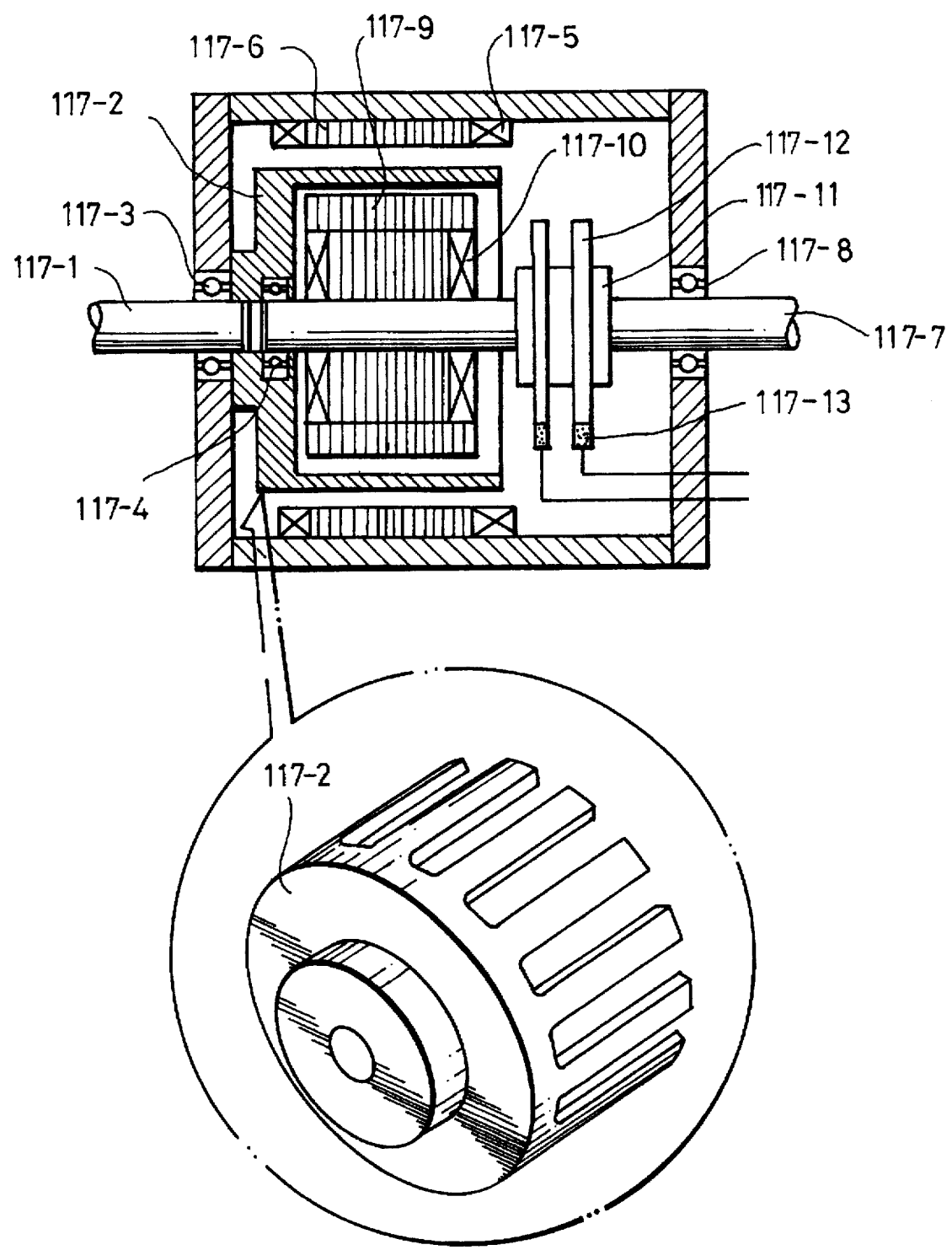

FIG. 117 shows an A.C. winding rotor type of generated power self-excitation and transmission, electro-magnetic coupling, and driving means. Machine parts are indicated as follows:

117-1 Input axle.
117-2 The salient tooth-shaped magnetic conductance ring coupled to the input axle.
117-3 Bearing.
117-4 Bearing.
117-5 Field winding.
117-6 Field iron core.
117-7 Output axle.
117-8 Bearing.
117-9 Rotor iron core.
117-10 Rotor winding.
117-11 Rotor.
117-12 Rotor slip ring.
117-13 Rotor brush.

Figure 118:
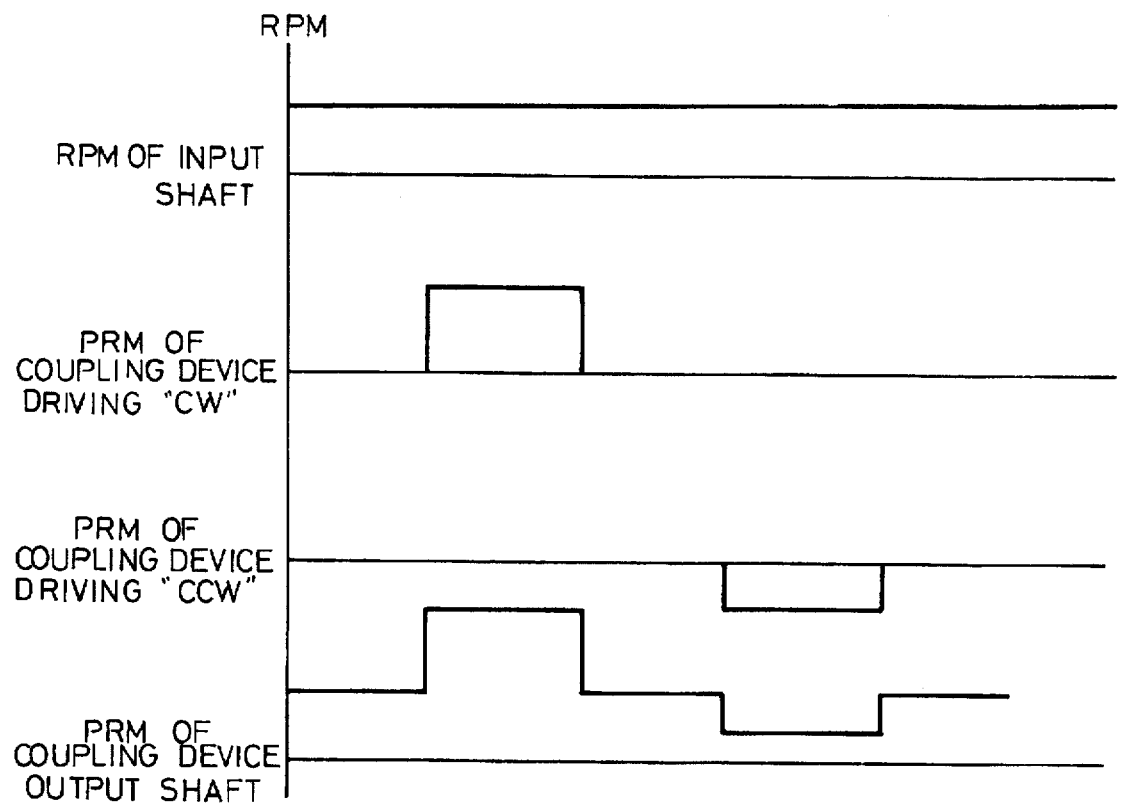

FIG. 118 shows a characteristic diagram of the generated power self-excitation and transmission, electric-magnetic coupling, and driving means.

Figure 119:
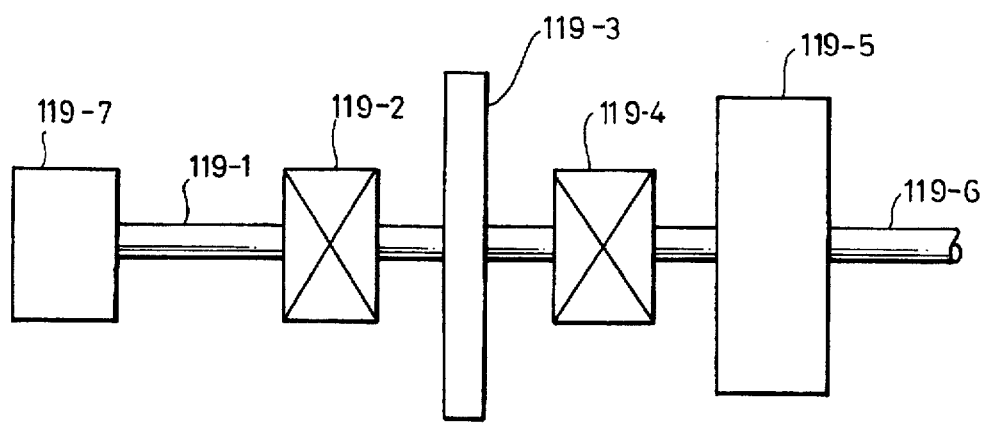

FIG. 119 shows an inertia motion energy ratio transmission type of speed variation means. Machine parts are indicated as follows:

119-1 Driving input axle.
119-2 Clutch means.
119-3 Inertial flywheel.
119-4 Clutch means.
119-5 Flywheel.
119-6 Clutch means.
119-7 Driving power source.

FIG. 120 shows a high frequency response brake means having flexible transmission means. Machine parts are indicated as follows:

120-1 Driving motor.
120-2 Transmission system.
120-3 Flexible transmission means.
120-4 The output axle of a flexible transmission means.
120-5 Brake means.
120-6 Driving gear.
120-7 Gear rack.
120-8 Working table.
120-9 Lathe bed.

FIG. 121 shows the operational characteristics of a high frequency response brake means having flexible transmission means.

Figure 122:
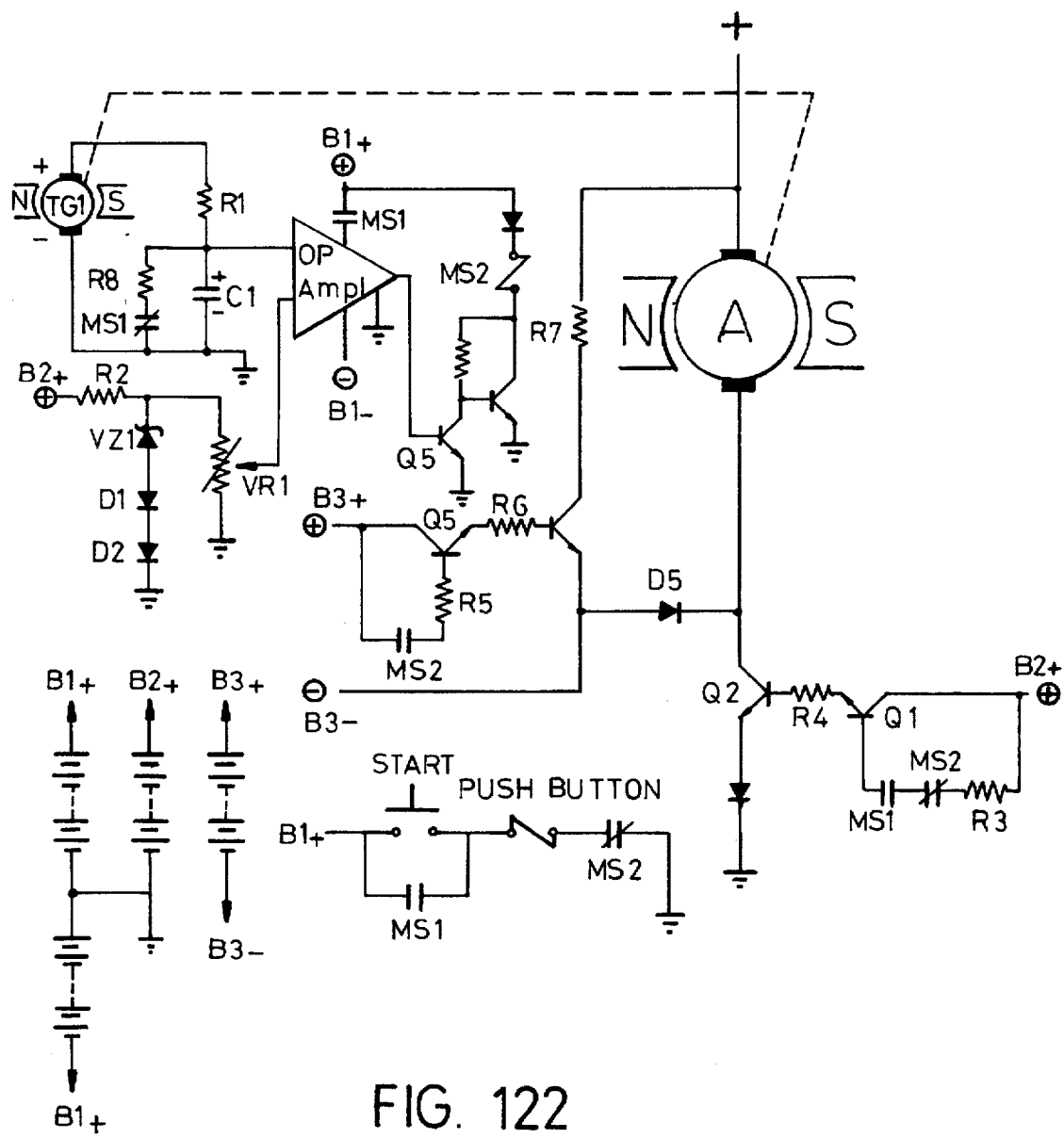

FIG. 122 shows a positioning circuit to be set with an analog feedback signal accumulative quantity.

Figure 123:
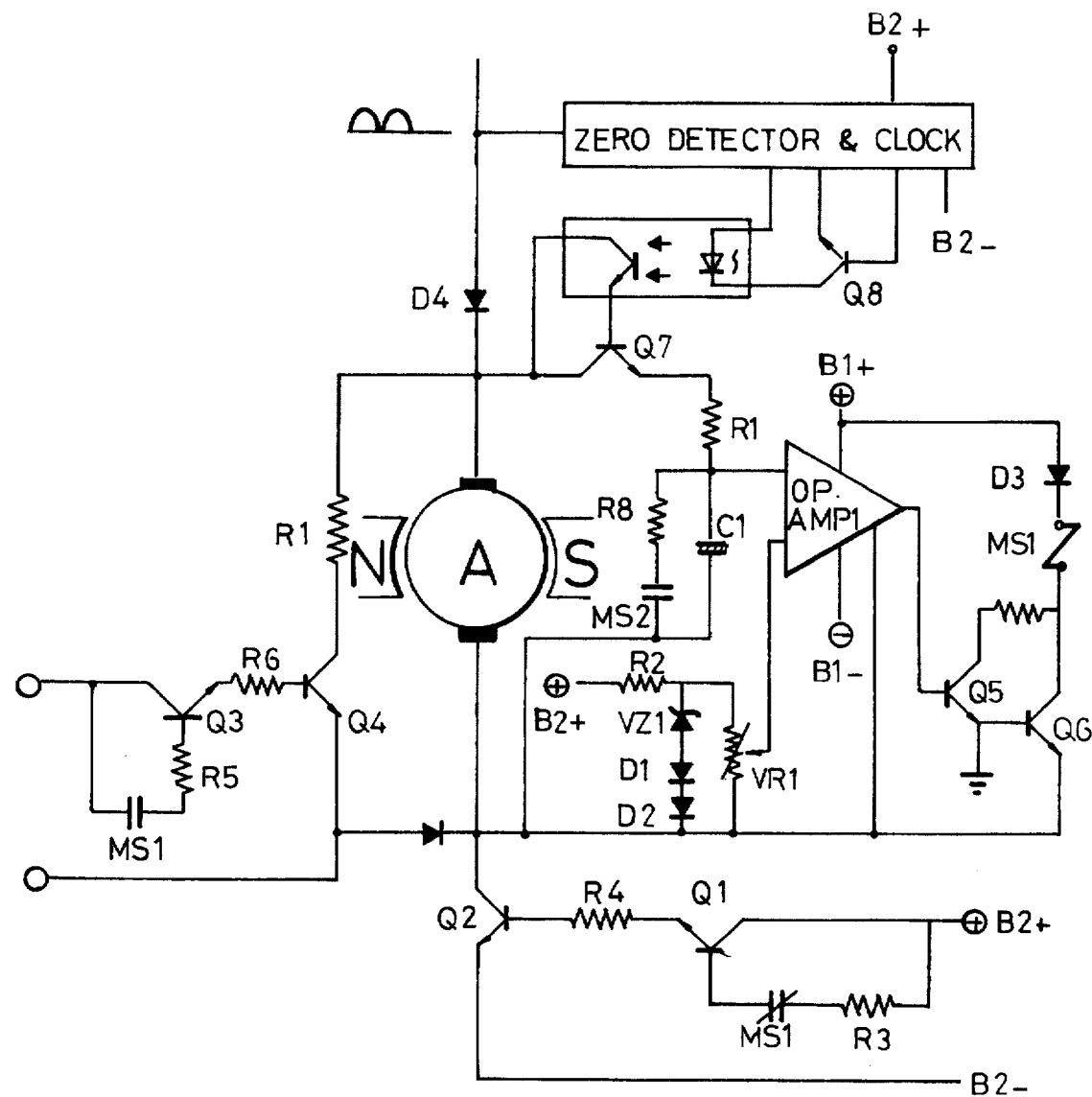

FIG. 123 shows the positioning circuit to be set with an analog signal accumulative quantity of the armature counter-E.M.F.

Figure 124:
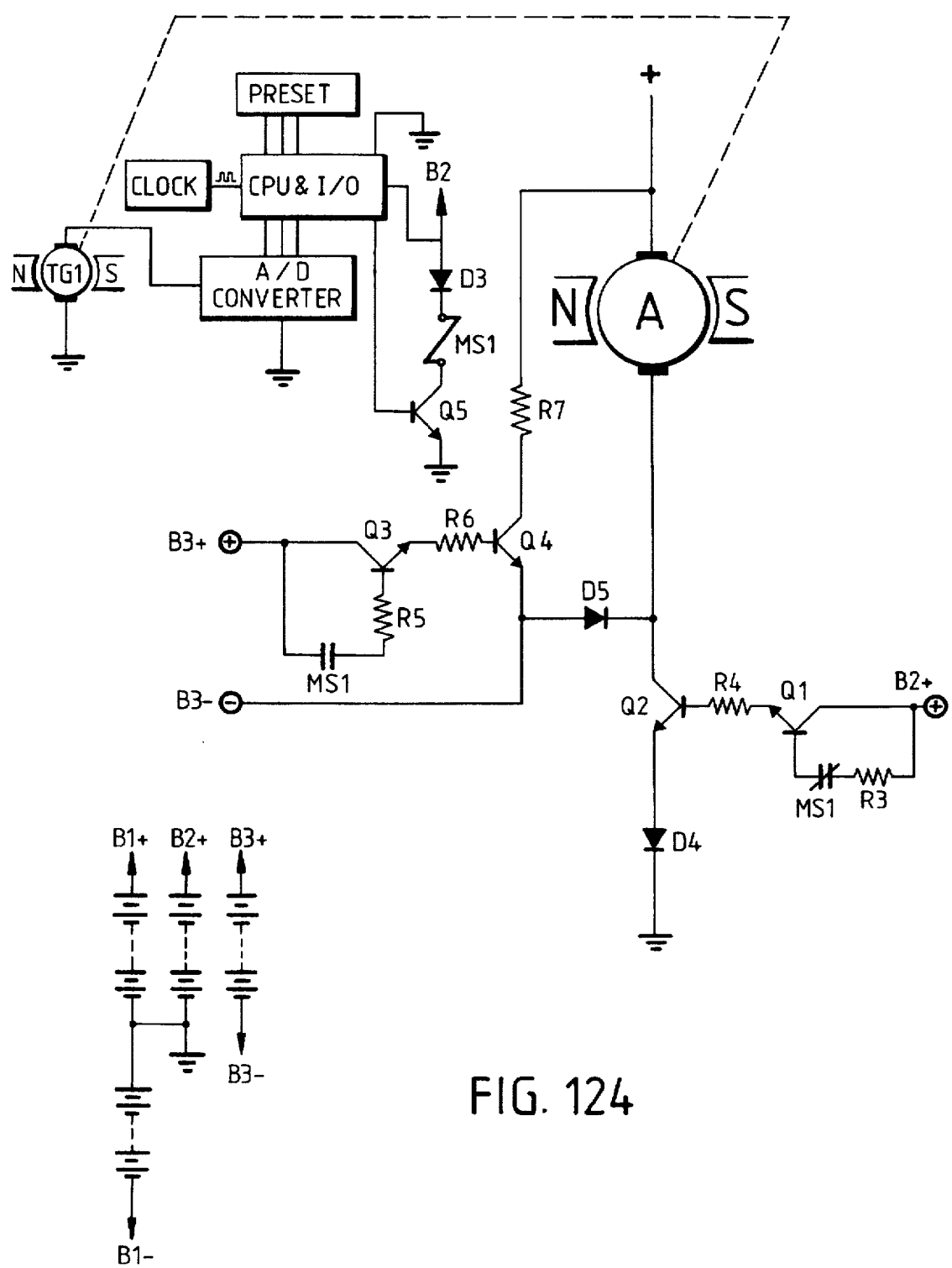

FIG. 124 shows a positioning control circuit of a digital type of analog accumulative quantity.

Figure 125:
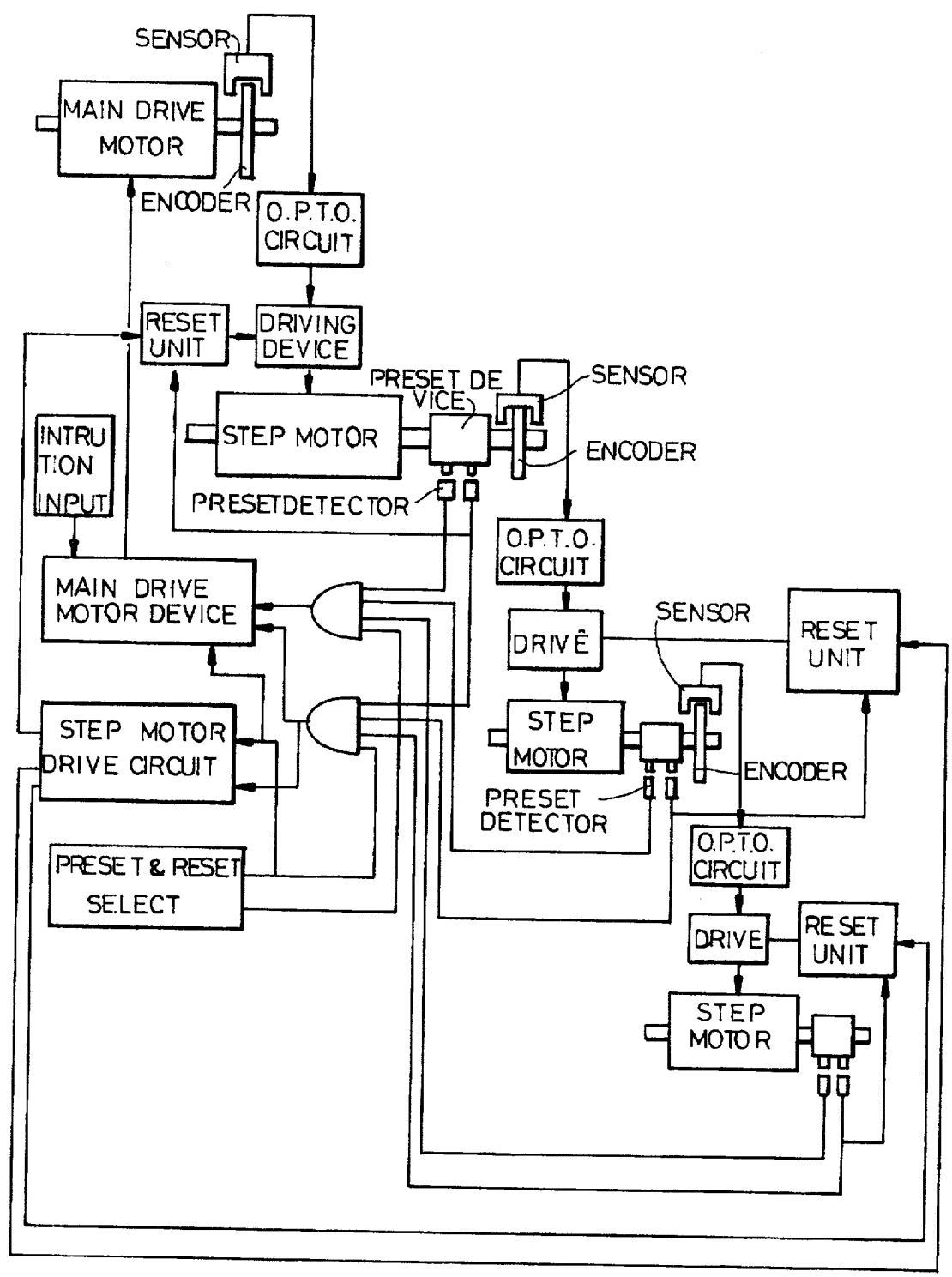

FIG. 125 shows a non-contact type of synchronous driving stepper type of setting control means.

FIG. 126 shows an encoder having a setting stepper encoder.

FIGS. 127A, 127B show a setting means. Machine parts are indicated as follows:

127-1 Axle.
127-2 Contact stop.
127-3 Contact stop.
127-4 Sensing switch.

FIG. 128 shows a digital encoder having an analog variation quantity.

FIG. 129 shows a multi-set view of the setting means and the corresponding sensing means. Machine parts are indicated as follows:

129-1 Axle.
129-2 Contact stop.
129-3 Contact stop.
129-4 Sensing switch.

Figure 130:
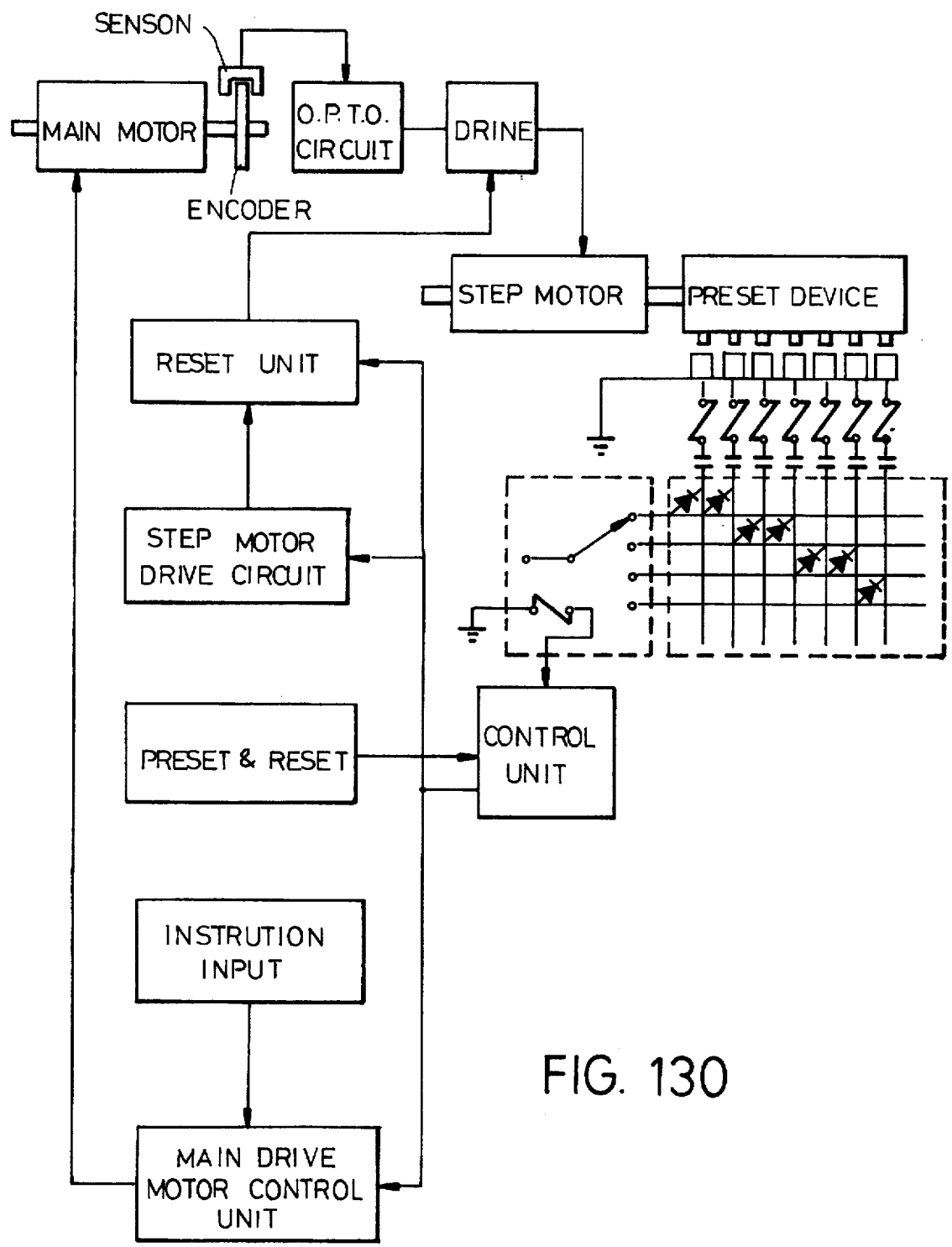

FIG. 130 shows the circuit block diagram of a multi-set setting means.

Figure 131:
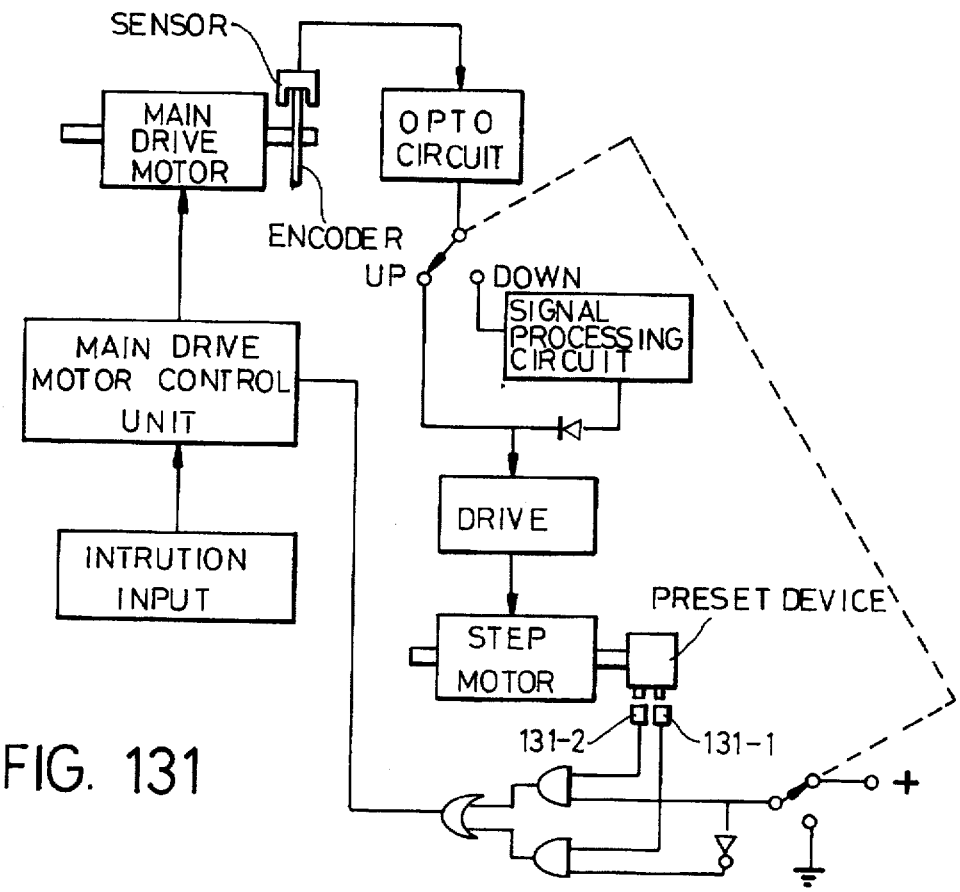

FIG. 131 shows the circuit for the up and down reciprocating setting. Machine parts are indicated as follows:

131-1 Sensing means for setting.

131-2 Sensing means for setting.

Figure 132:
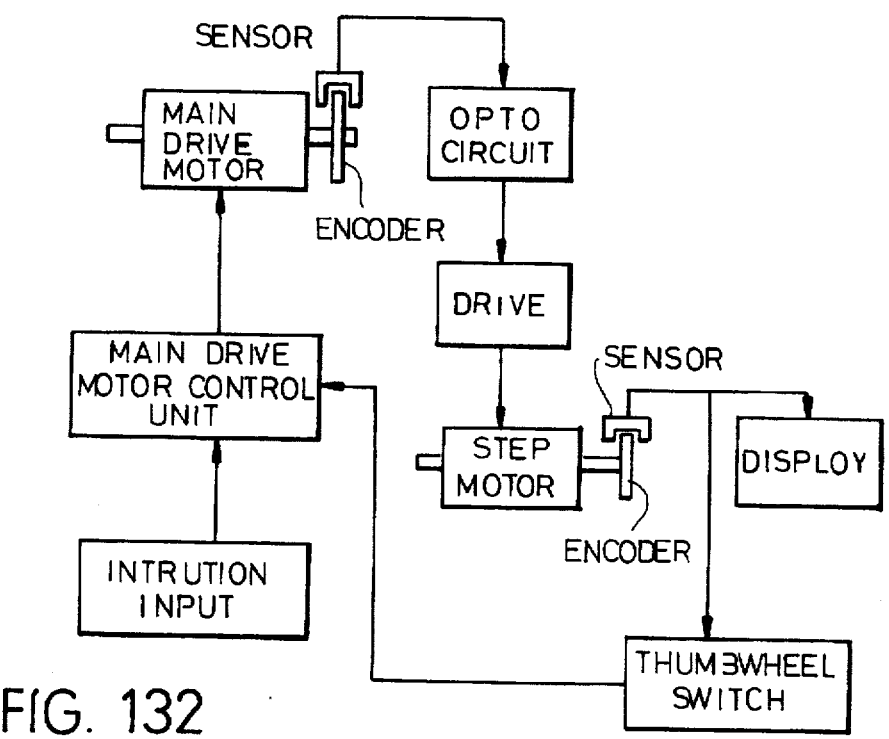

FIG. 132 shows a block diagram using a digital switch setting method.

Figure 133:
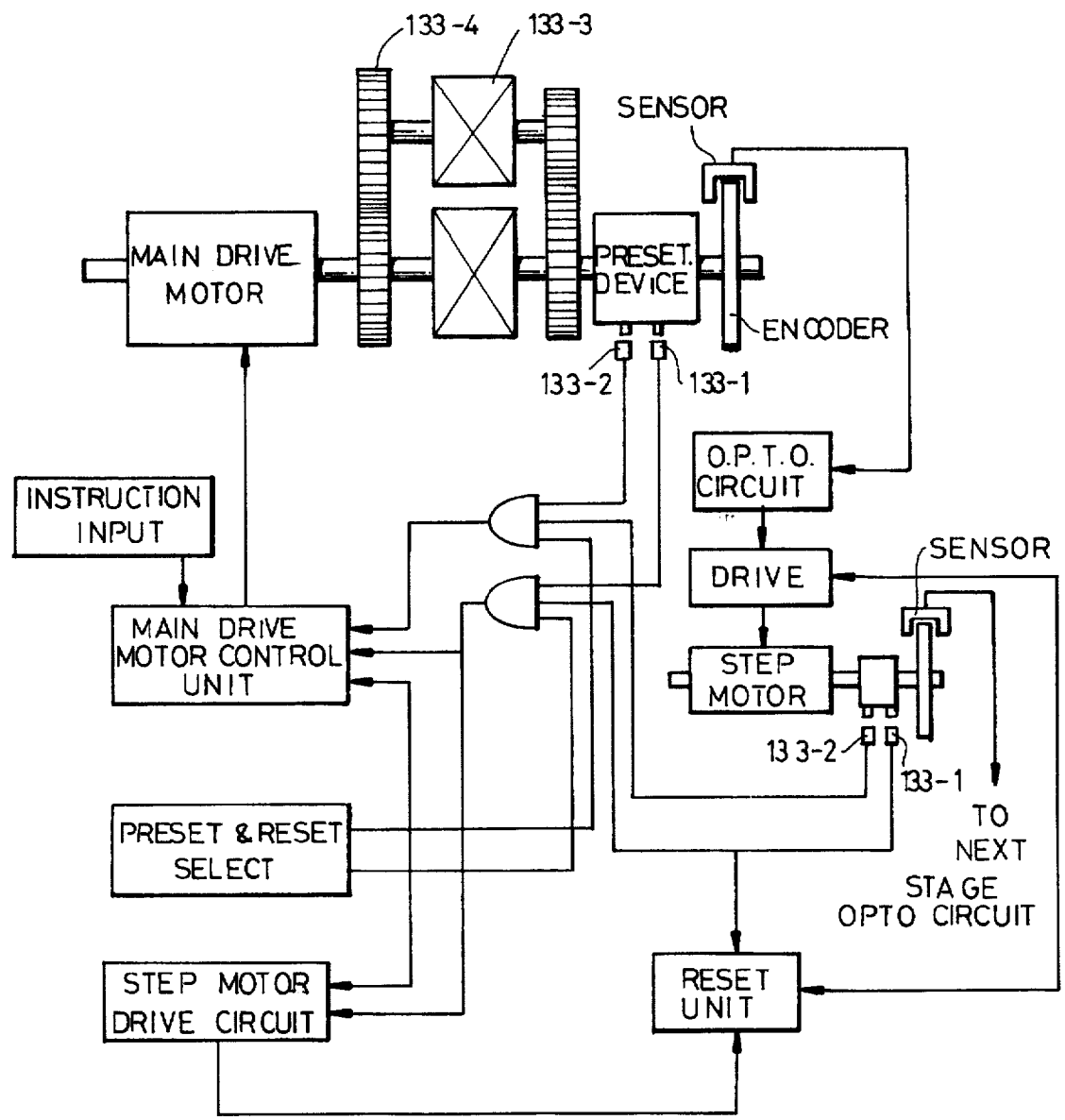

FIG. 133 shows a block diagram of the forward/reverse setting drive of the clutch. Machine parts are indicated as follows:

133-1 Sensing means for setting.
133-2 Sensing means for setting.
133-3 Clutch means.
133-4 Driving gear.

Figure 134:
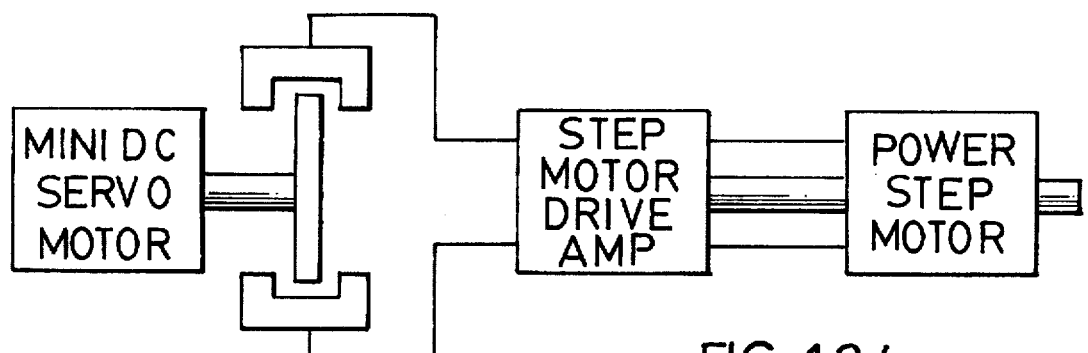

FIG. 134 shows a synchronous type of servo-driving means.

Figure 135:
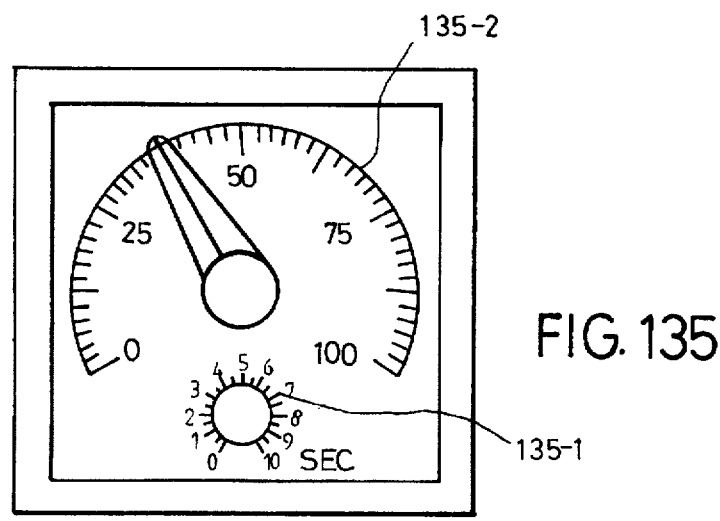

FIG. 135 shows a stepper type of timing switch control board. Machine parts are indicated as follows:

135-1 Multiplier scale.
135-2 Setting time scale.

Figure 136:
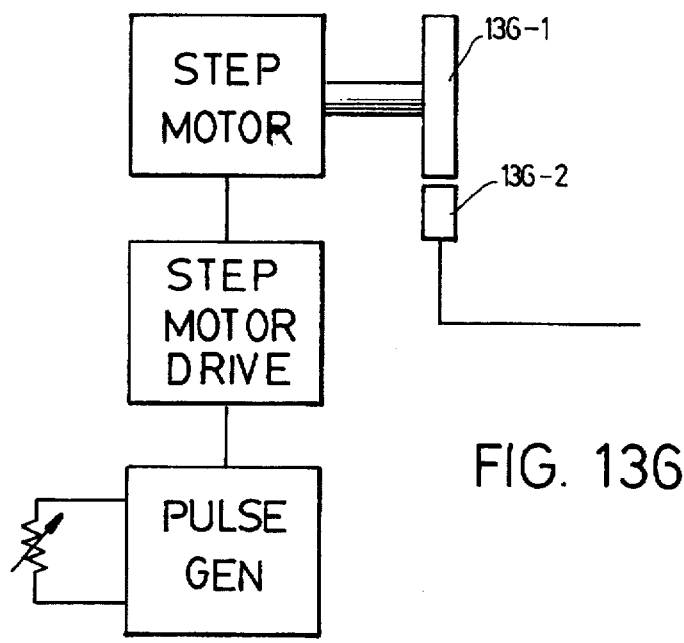

FIG. 136 shows the circuit diagram of the stepper type of timing switch. Machine parts are indicated as follows:

136-1 Cam.
136-2 Sensing means for setting.

Figure 137:
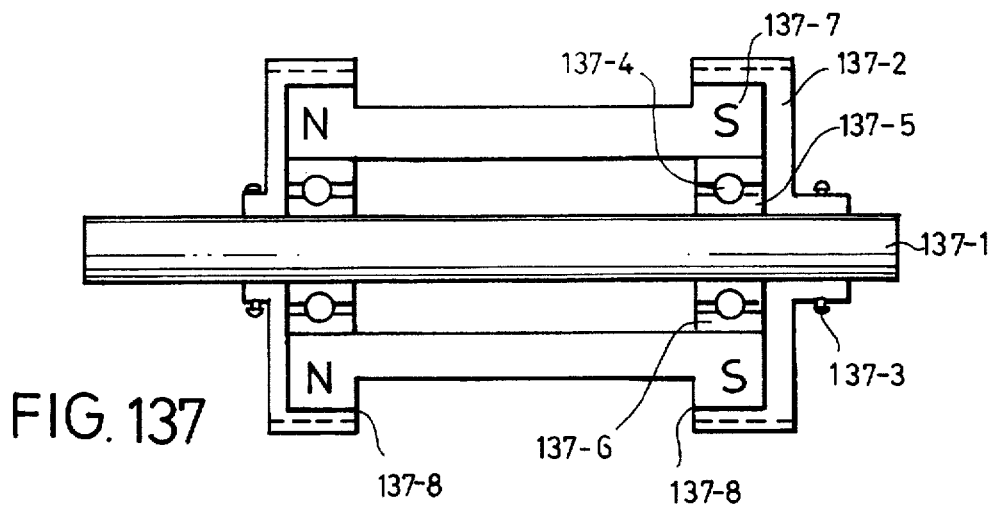

FIG. 137 shows the structure of a cup-shaped stepper rotor having low inertia. Machine parts are indicated as follows:

137-1 Axle.
137-2 Cup-shaped rotor.
137-3 Lock screw.
137-4 Bearing ball.
137-5 Inner collar of the bearing.
137-6 Outer collar of the bearing.
137-7 Ring-shaped permanent magnet.
137-8 Air gap.

Figure 138:
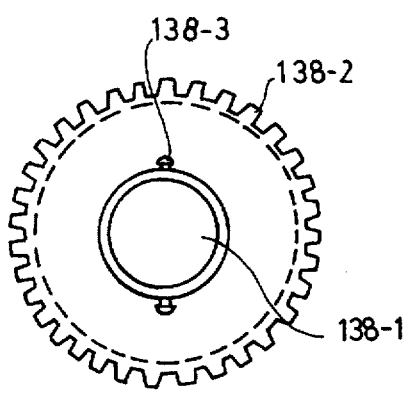

FIG. 138 shows the front view of a cup-shaped stepper rotor having low inertia. Machine parts are indicated as follows:

138-1 Axle.
138-2 Cup-shaped rotor.
138-3 Lock screw.

Figure 139:
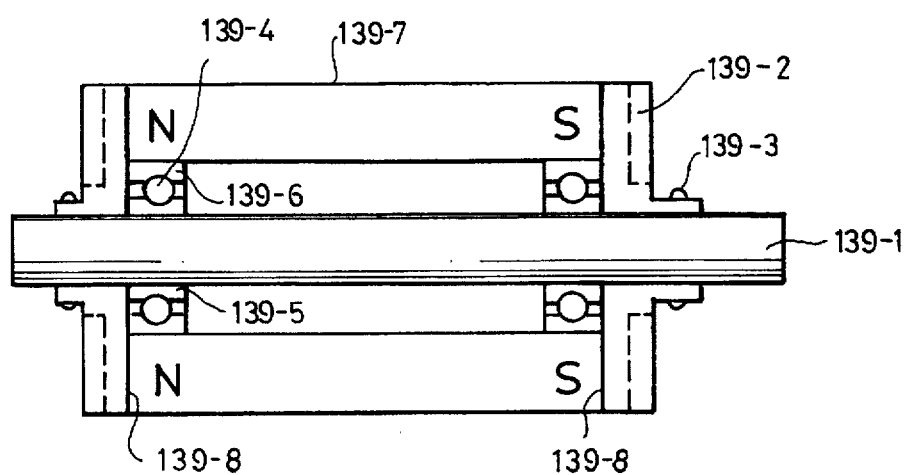

FIG. 139 shows the structure of a flat plate-shaped stepper rotor. Machine parts are indicated as follows:

139-1 Axle.
139-2 Flat plate-shaped rotor.
139-3 Lock screw.
139-4 Bearing ball.
139-5 Inner collar of bearing.
139-6 Outer collar of bearing.
139-7 Ring-shaped permanent magnet.
139-8 Air gap.

Figure 140:
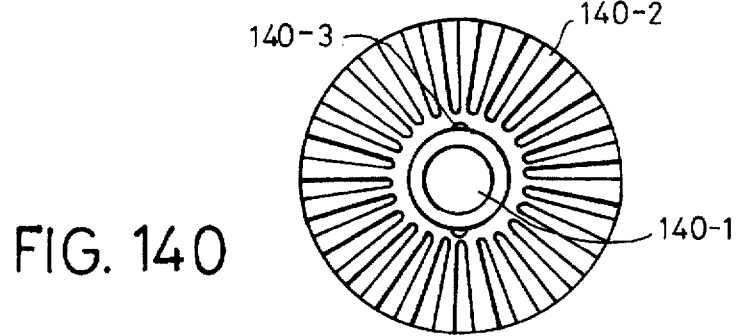

FIG. 140 shows a side view of the flat plate-shaped stepper rotor. Machine parts are indicated as follows:

140-1 Axle.
140-2 Flat plate-shaped rotor.
140-3 Lock screw.

Figure 141:
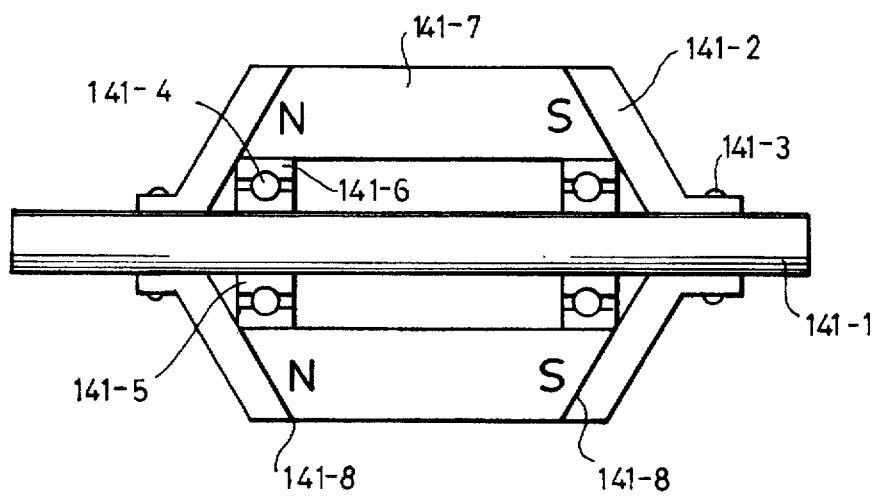

FIG. 141 shows the structure of a cone-shaped stepper rotor. Machine parts are indicated as follows:

141-1 Axle.
141-2 Cone-shaped rotor.
141-3 Lock screw.
141-4 Bearing ball.
141-5 Inner collar of the bearing.
141-6 Outer collar of the bearing.
141-7 Ring-shaped permanent magnet.
141-8 Air gap.

Figure 142:
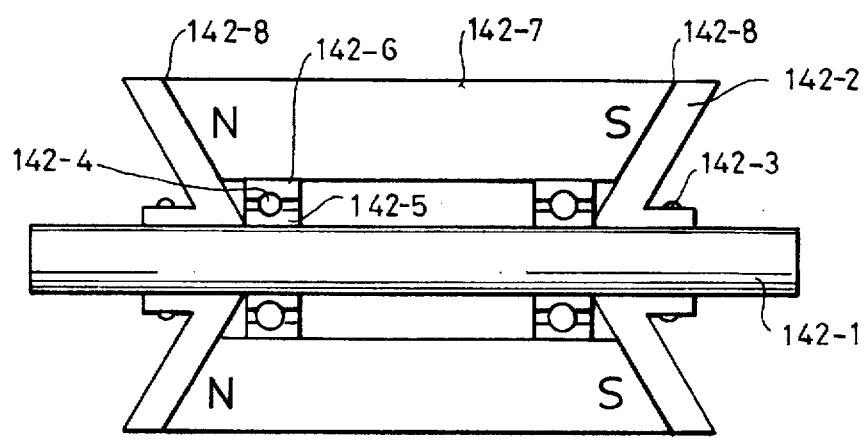

FIG. 142 shows a concave type of cone-shaped stepper rotor. Machine parts are indicated as follows:

142-1 Axle.
142-2 Concave and cone-shaped rotor.
142-3 Lock screw.
142-4 Bearing ball.
142-5 Inner collar of the bearing.
142-6 Outer collar of the bearing.
142-7 Ring-shaped permanent magnet.
142-8 Air gap.

FIG. 143 shows the structure of a printing type of stepper motor. Machine parts are indicated as follows:

143-1 Axle.
143-2 End lid.
143-3 Outer case.
143-4 End lid.
143-5 Bearing.
143-6 Permanent magnet.
143-7 Ring-shaped magnet core.
143-8 Printing winding type rotor.
143-9 Fixed ring.
143-10 Brush.

FIG. 144 shows a printing type of stepper motor with the conductor being disposed in an eddy-current shape. Machine parts are indicated as follows:

144-1 The insulating portion of the printing winding type rotor.
144-2 The conducting portion of the printing winding type rotor.

Figures 145, 146:
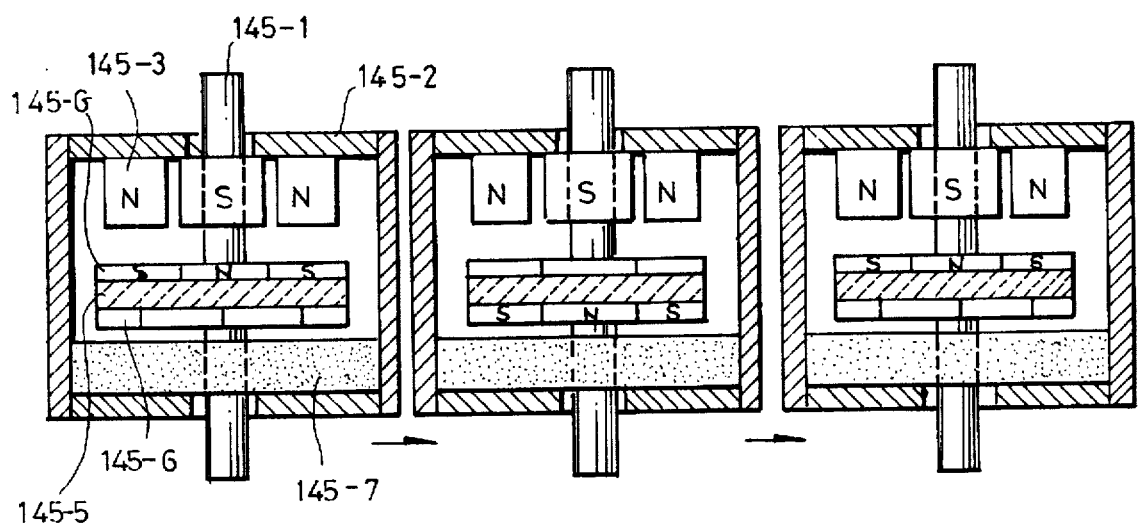

FIG. 145 shows the operational flow chart of the printing type of stepper motor.

FIG. 146 shows the motor operation corresponding to the flow chart in FIG. 145 Machine parts are indicated as follows:

146-1 Axle.
146-2 Outer case.
146-3 Permanent magnet.
146-4 Bearing.
146-5 The insulating portion of the printing winding type rotor.
146-6 The inducting portion of the printing winding type rotor.

Figure 147:
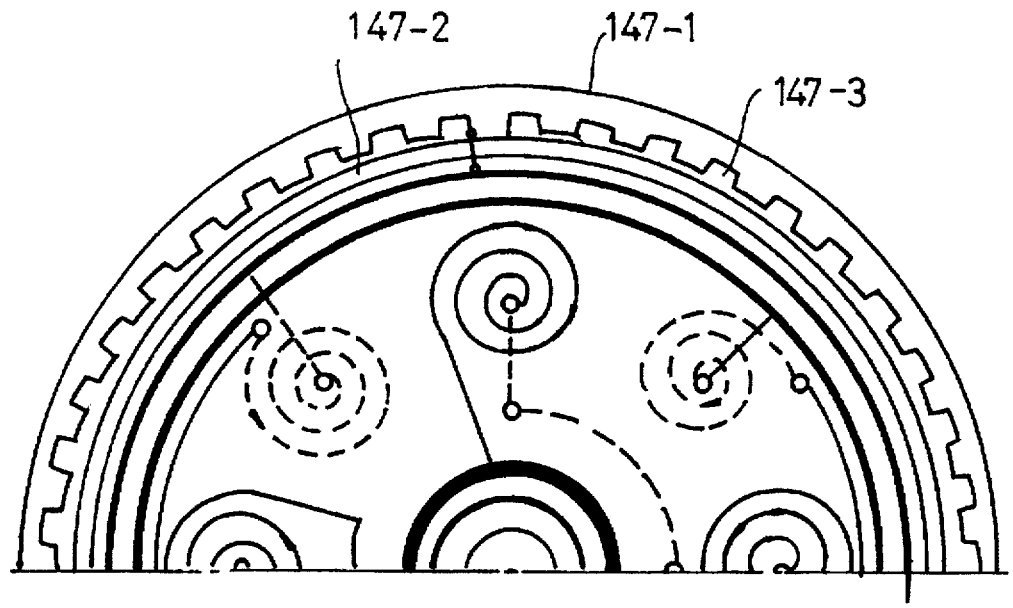

FIG. 147 shows the printing type rotor having a pulse induction winding structure. Machine parts are indicated as follows:

147-1 The insulating portion of the printing winding type of rotor.
147-2 The conducting portion of the printing winding type of rotor.
147-3 The sensing winding of angular displacement.

Figure 148:
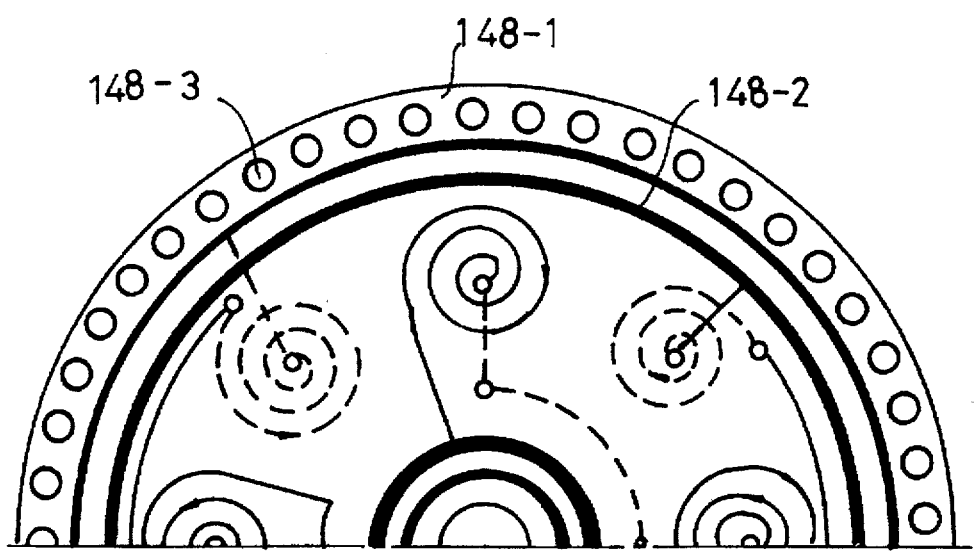

FIG. 148 shows a light passing hole for photocell sensing on the printing type rotor. Machine parts are indicated as follows:

148-1 The insulating portion of the printing winding type of rotor.
148-2 The conducting portion of the printing winding type of rotor.
148-3 The light passing hole for angular displacement sensing.

Figure 149:
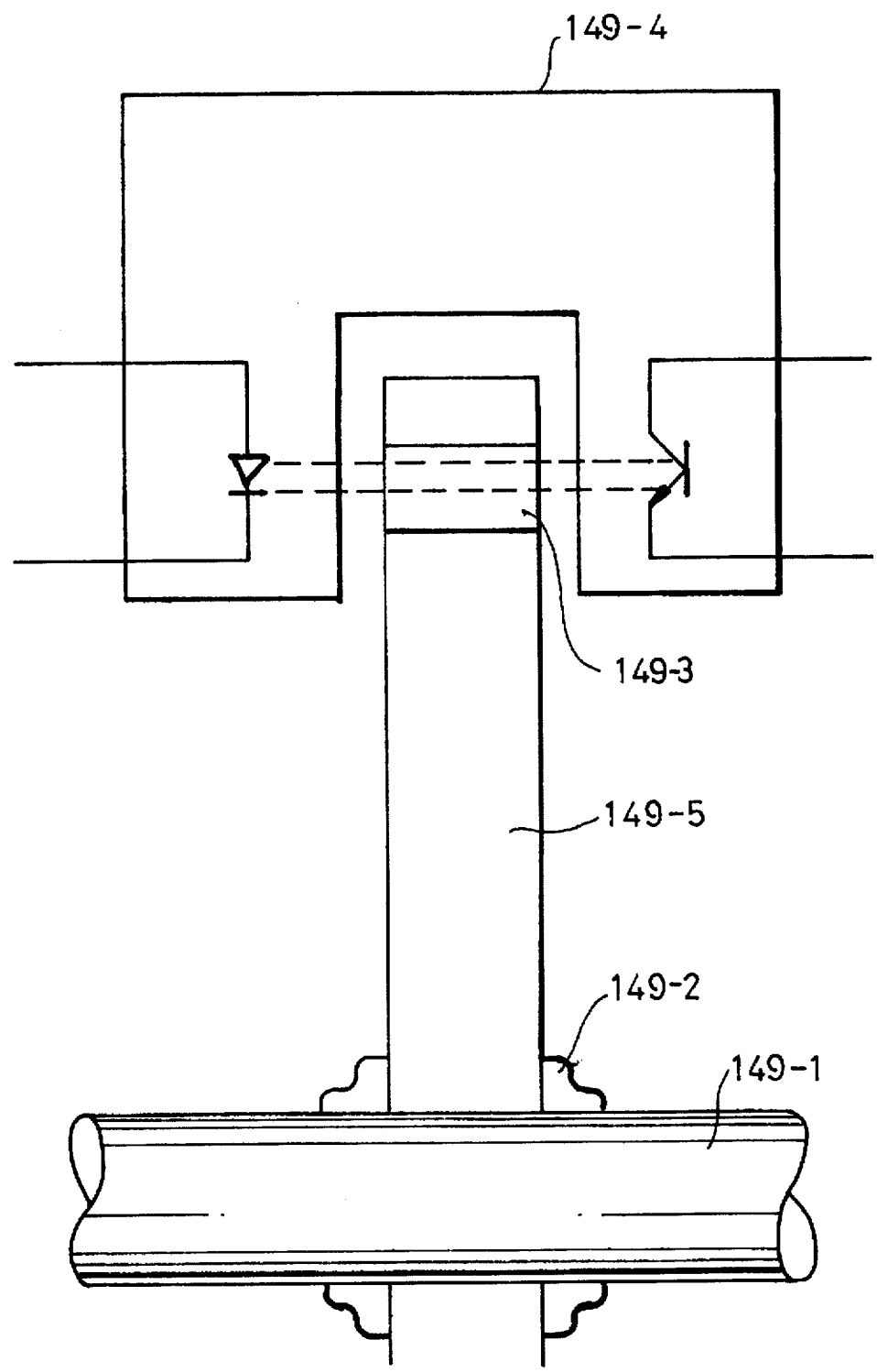

FIG. 149 shows an embodiment of the photocell sensing means. Machine parts are indicated as follows:

149-1 Axle.
149-2 Fixed ring.
149-3 Light passing hole.
149-4 Photocell sensing means.
149-5 The insulating portion of the printing winding type of rotor.

Figure 150:
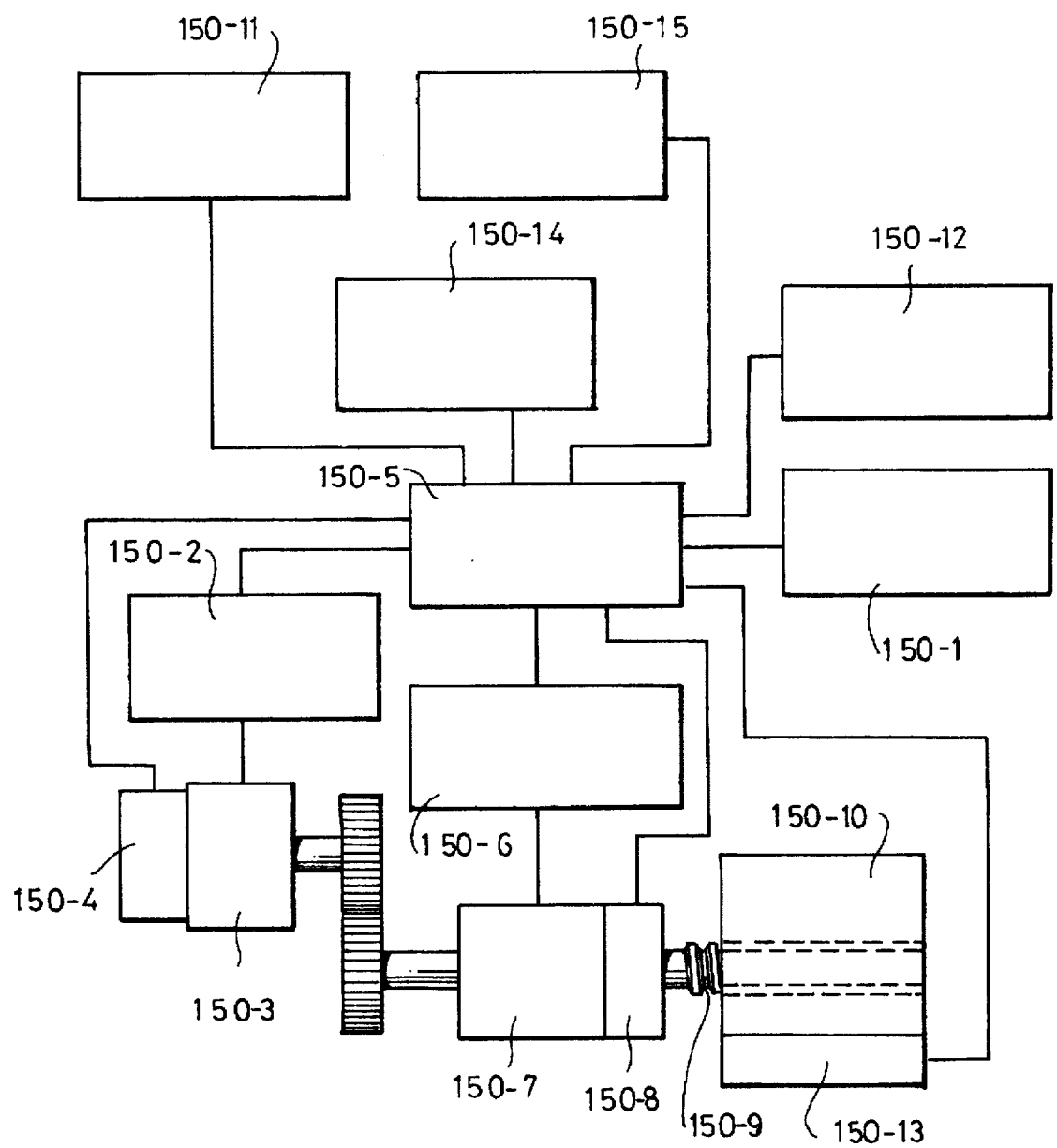

FIG. 150 shows the block diagram of a differential type of dynamic error compensation system. Machine parts are indicated as follows:

150-1 Control data and logic input device.
150-2 Driving device controller.
150-3 Driving device.
150-4 Rotary angular sensing means.
150-5 CPU
150-6 Controllable coupling means driver.
150-7 Controllable coupling means.
150-8 Rotary angular sensing means.
150-9 Working table drive screw.
150-10 Working table.
150-11 Displacement distance indicator.
150-12 Temperature sensing and input transformation device.
150-13 Lock device.
150-14 Error value memory means.
150-15 Error value input device.

Figure 151:
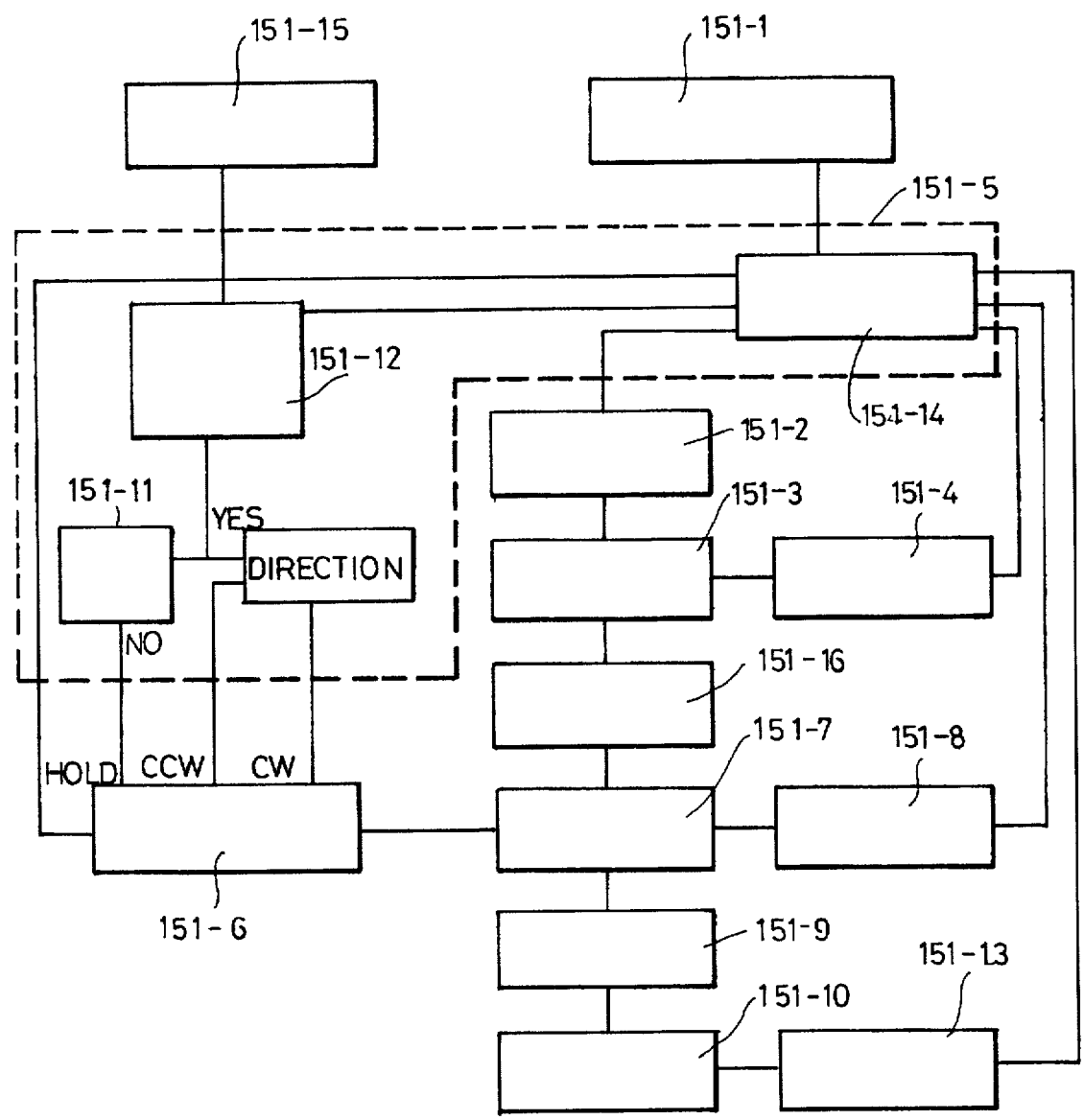

FIG. 151 shows the control block diagram of the system in FIG. 150. Machine parts are indicated as follows:

151-1 Control data and logic input device.
151-2 Driving device controller.
151-3 Driving means.
151-4 Rotary angular sensing means.
151-5 CPU
151-6 Controllable coupling means driver.
151-7 Controllable coupling means.
151-8 Rotary angular sensing means.
151-9 Guide screw.
151-10 Working Table.
151-11 CW
151-12 Error value.
151-13 Working table clamping device.
151-14 Compare and instruction output.
151-15 Error value input device.
151-16 Transmission gear train.

Figure 152:
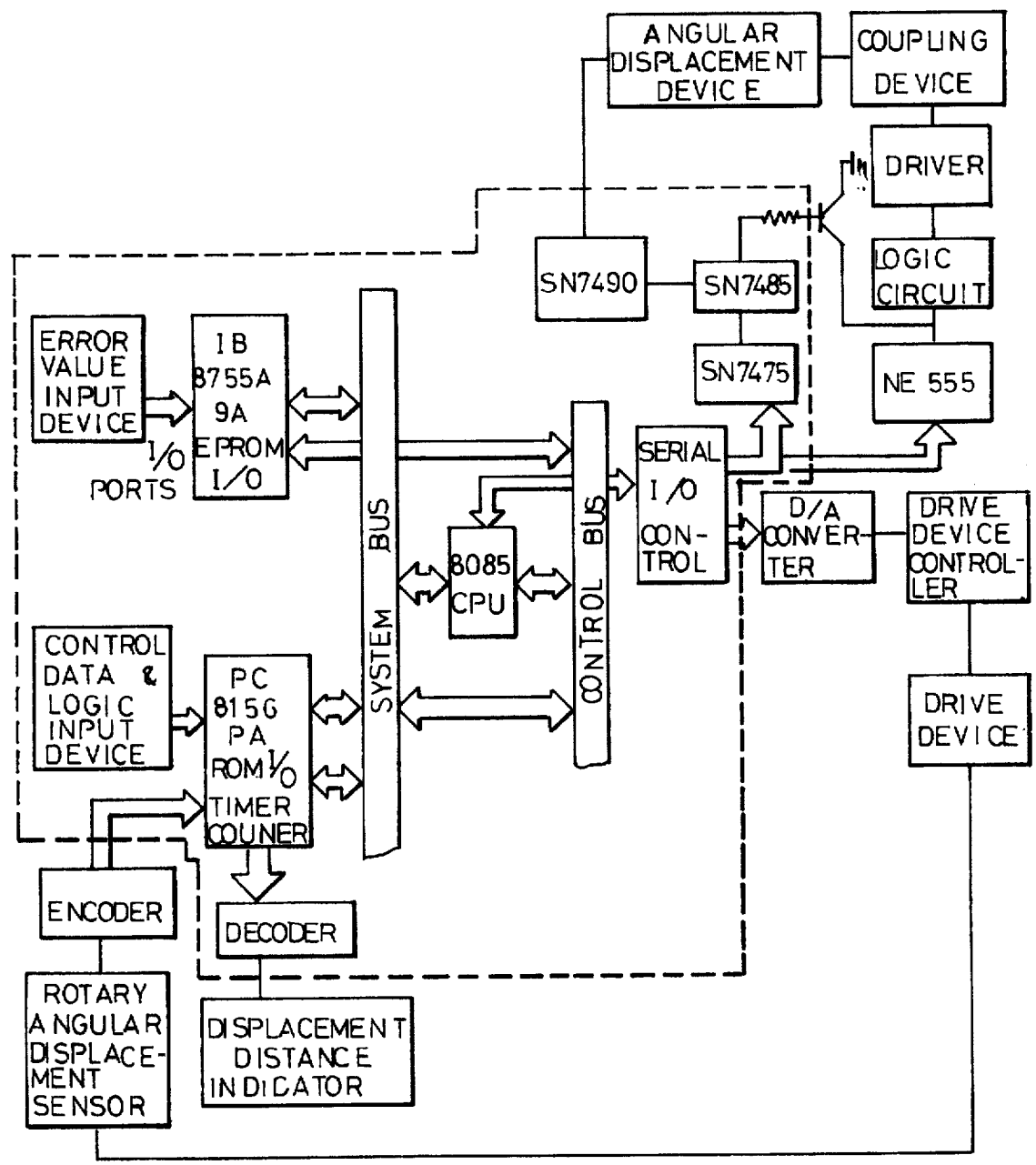

FIG. 152 shows the CPU element structure block diagram of the system shown in FIG. 150.

Figure 153:
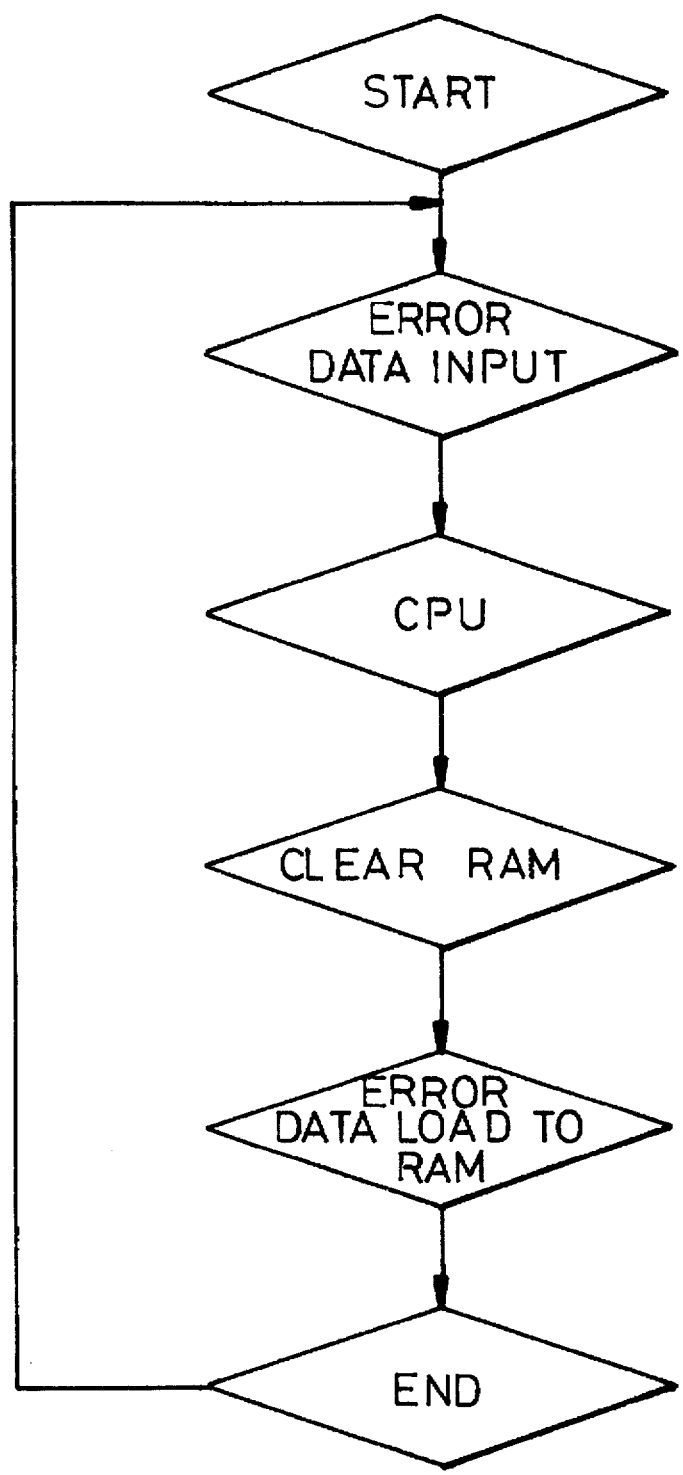

FIG. 153 shows the input flow chart of the error value.

Figure 154:
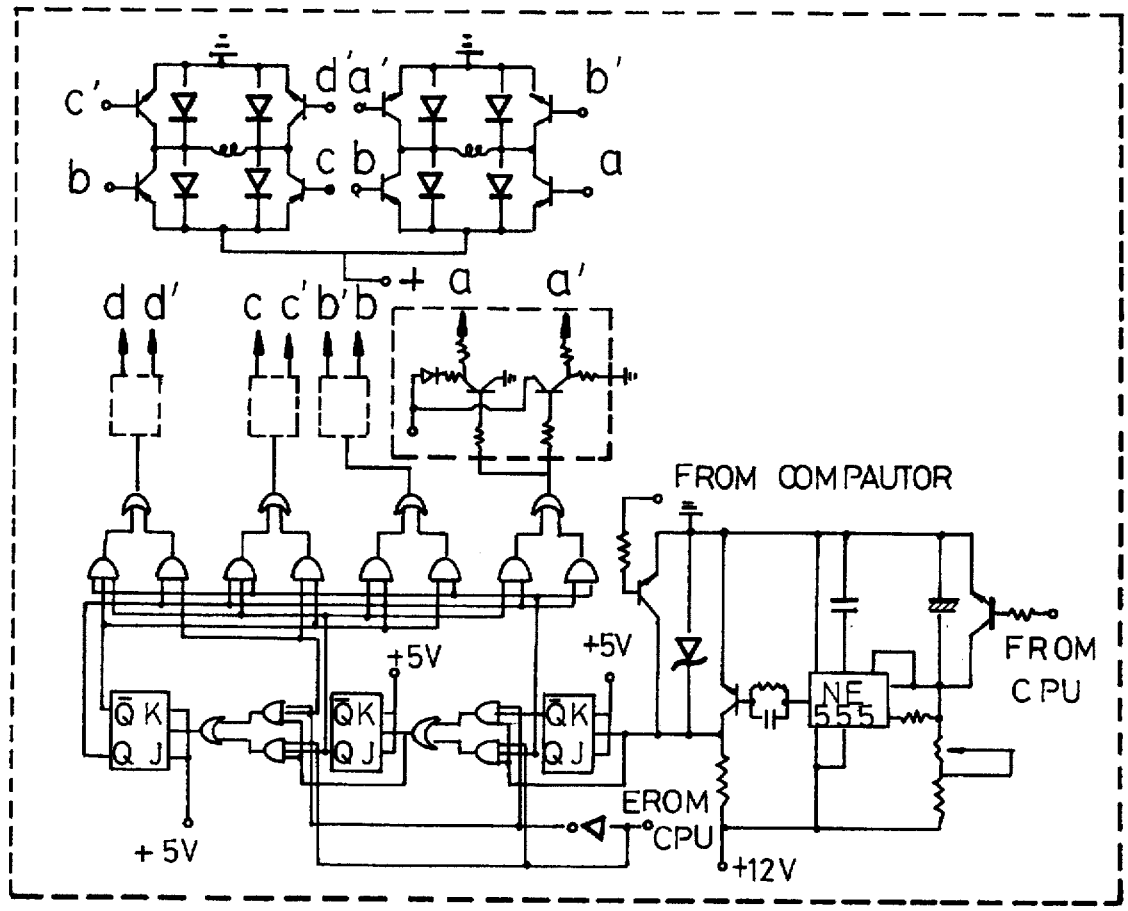

FIG. 154 shows the driving circuit of the controllable coupling means.

FIG. 155 shows the controllable coupling means. Machine parts are indicated as follows:

155-1 Rotary field core.
151-2 Rotary field winding.
151-3 Bearing.
151-4 The slip ring of the rotary field.
151-5 Output axle.
155-6 Brush.
155-7 The rotor iron core of the input axle.
155-8 Input axle.
155-9 Bearing.
155-10 Outer case of the rotary field.
155-11 The ring-shaped permanent magnet of the input axle rotor.

Figure 156:
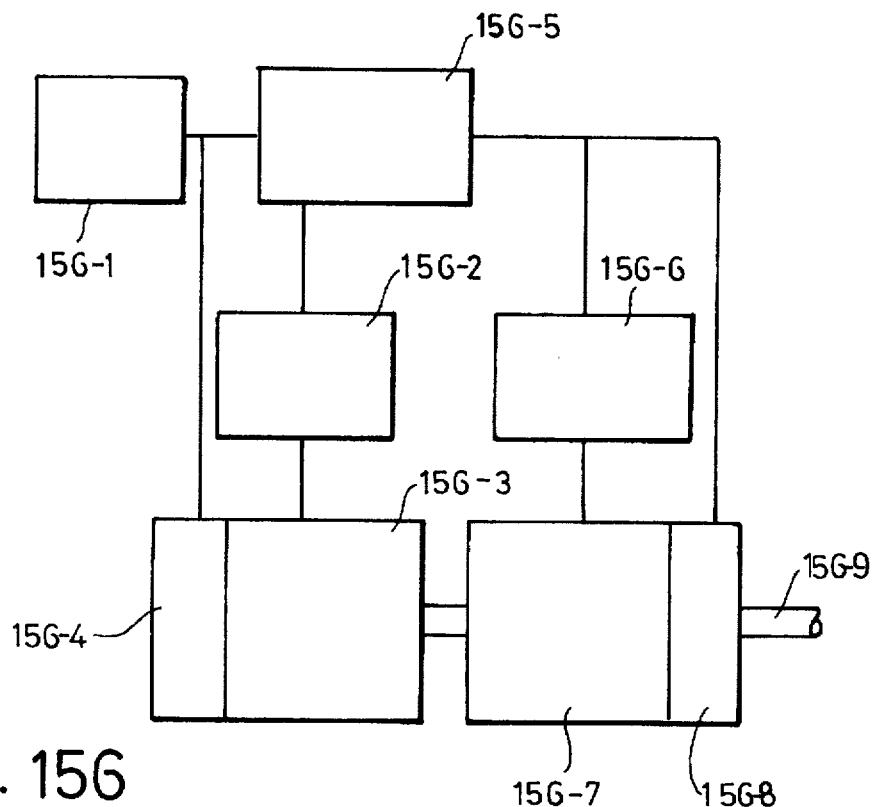

FIG. 156 shows the single combination and output between the motor and the controllable coupling means. Machine parts are indicated as follows:

156-1 Control data and logic input means.
156-2 The control unit of the driving motor.
156-3 Driving motor.
156-4 Rotary type of angle sensing means.
156-5 CPU.
156-6 The driver of the controllable coupling means.
156-7 Controllable coupling means.
156-8 Rotary type of angle sensing means.
156-9 Output axle.

Figure 157:
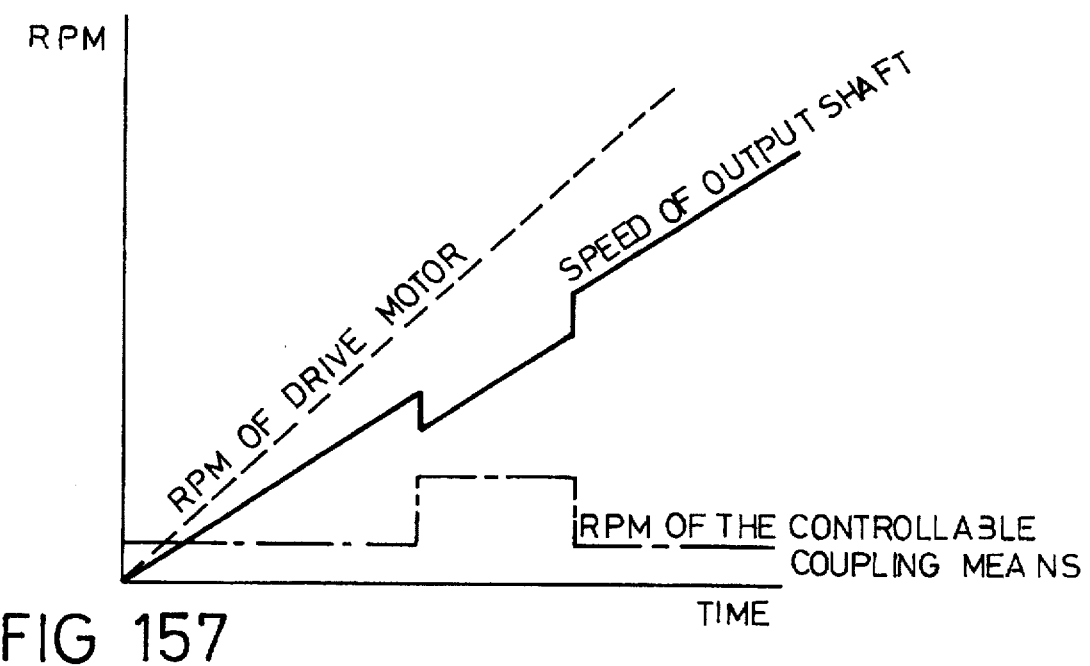

FIG. 157 shows a RPM versus time diagram of FIG. 156 embodiment.

Figure 158:
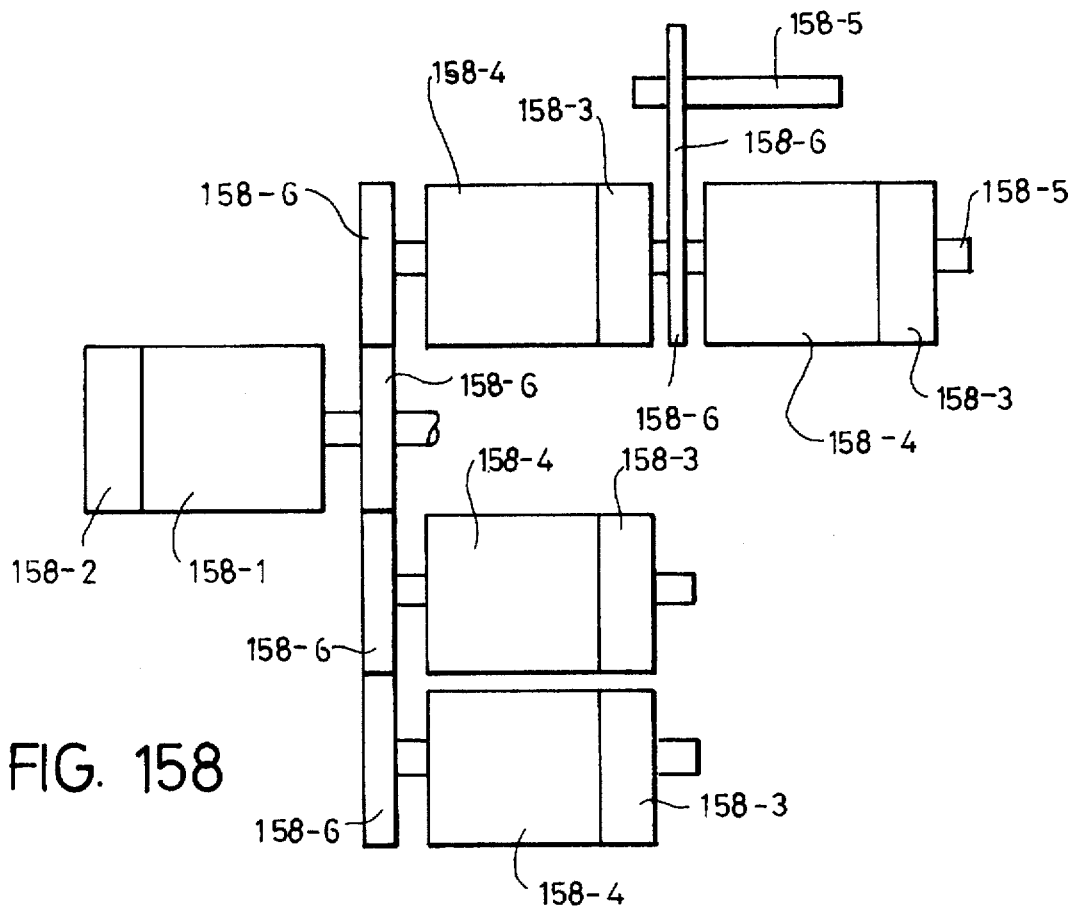

FIG. 158 shows the series and parallel output of the multi-set controllable coupling means. Machine parts are indicate as follows:

158-1 Driving motor.
158-2 Rotary type of angle sensing means.
158-3 Rotary type of angle sensing means.
158-4 Controllable coupling means.
158-5 Output axle.
158-6 Driving gear train.

Figure 159:
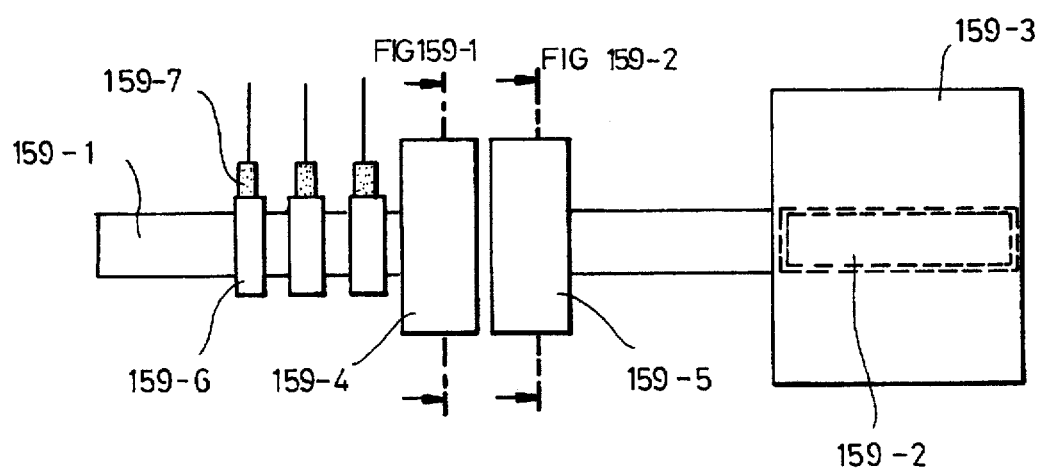
Figures 1, 159:
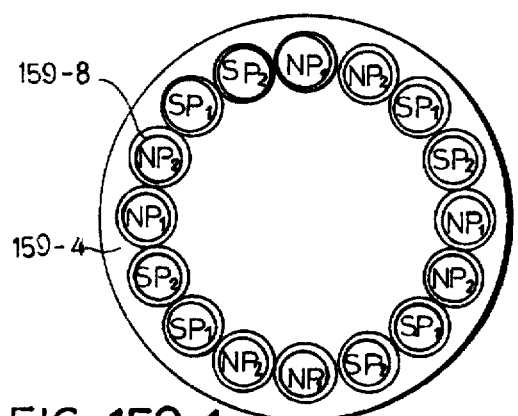
Figures 2, 159:
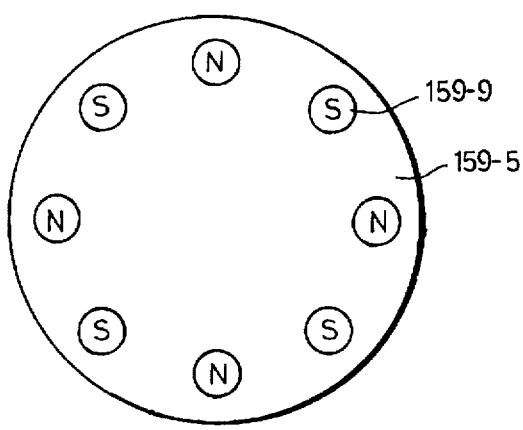

FIG. 159 shows a disk type of controllable coupling means. Machine parts are indicated as follows:

159-1 Input axle.
159-2 Output guide screw.
159-3 Working table.
159-4 Input end of controllable coupling means.
159-5 Output end of controllable coupling means.
159-6 Slip ring.
159-7 Brush.
159-8 Current exciting type of magnetic pole.
159-9 Permanent magnet.

Figure 160:
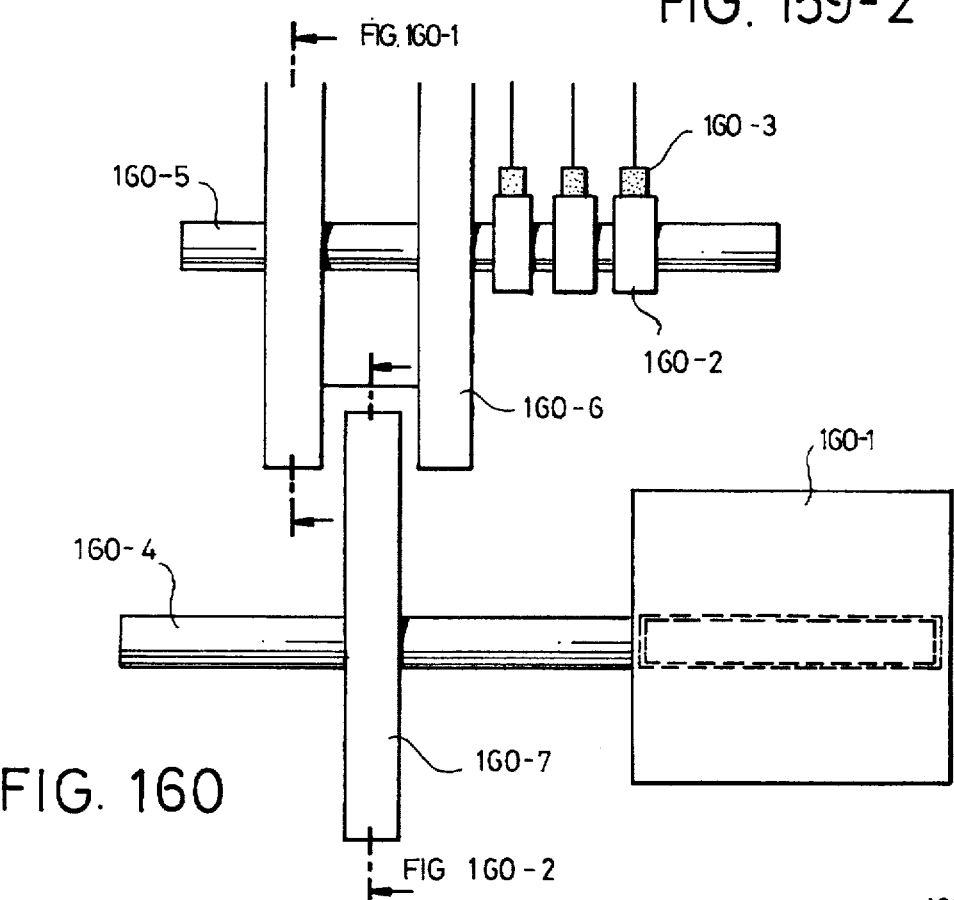
Figures 1, 160:
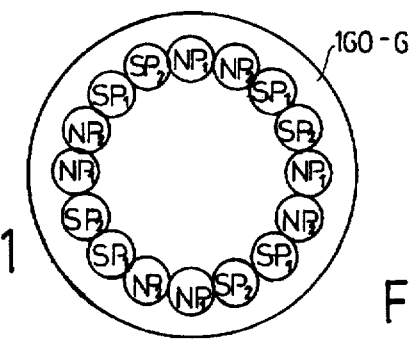
Figures 2, 160:
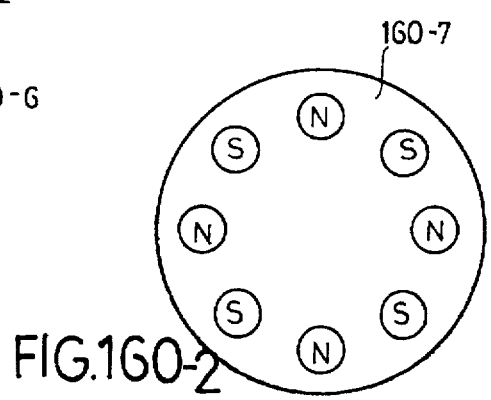

FIG. 160 shows the controllable coupling means between the axles. Machine parts are indicated as follows:

160-1 Working table.
160-2 Slip ring.
160-3 Brush.
160-4 Output guide screw.
160-5 Input axle.
160-6 The input end rotor of the controllable coupling means.
160-7 The output end rotor of the controllable coupling means.

FIG. 161 shows the static holding type of controllable coupling means structure.

FIG. 162 shows the driving circuit of the static holding type of controllable coupling means.

FIG. 163 shows the driving operation table of the static holding type of controllable coupling means.

Figure 164:
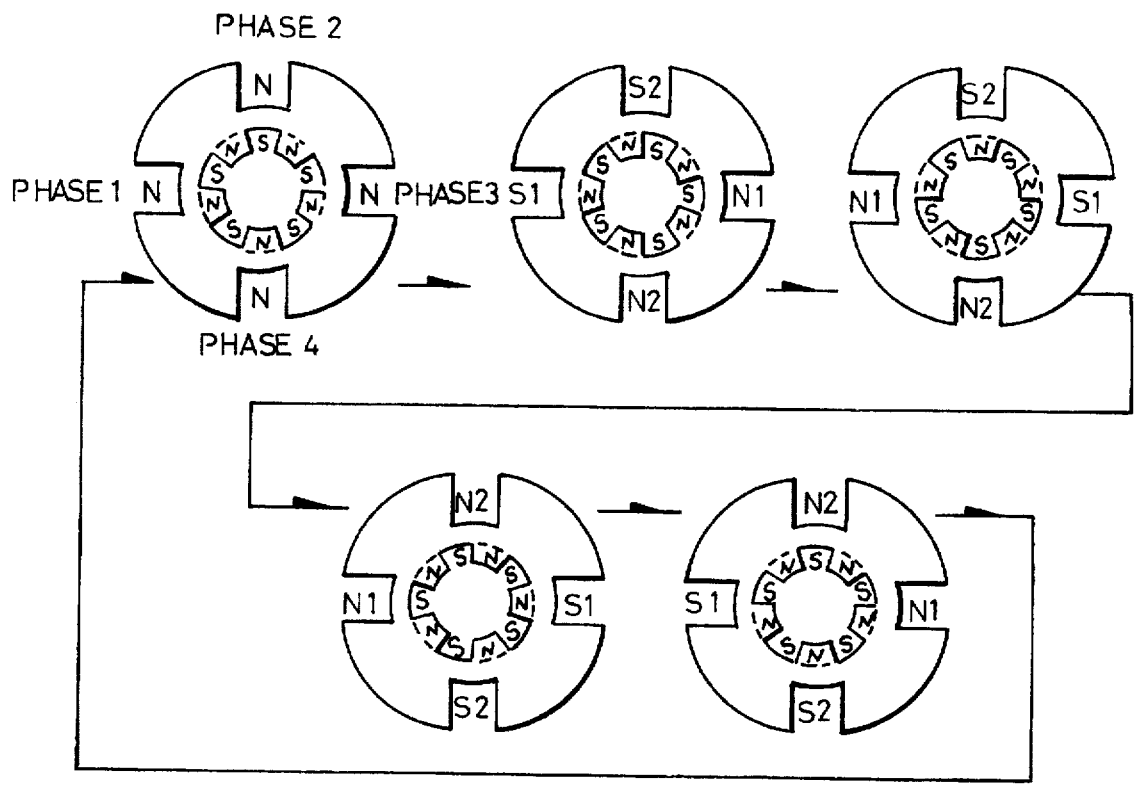

FIG. 164 shows the driving steps of the static holding type of controllable coupling means.

Figures 165, 166:
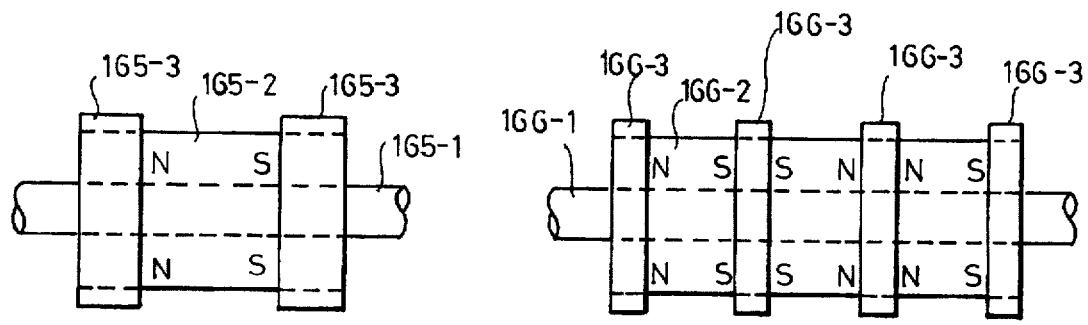

FIG. 165 shows the two-section type of the static holding type of controllable coupling means. Machine parts are indicated as follows:

165-1 Axle.

165-2 Ring-shaped permanent magnet.

166-3 Rotor iron core.

FIG. 166 shows a four-section type of the static holding type of controllable coupling means. Machine parts are indicated as follows:

166-1 Axle.

166-2 Ring-shaped permanent magnet.

166-3 Rotor iron core.

Figure 167:
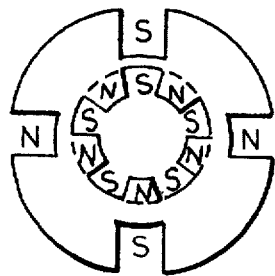

FIG. 167 shows a big driving angle structure of the static holding type of controllable coupling means.

Figures 168, 169:
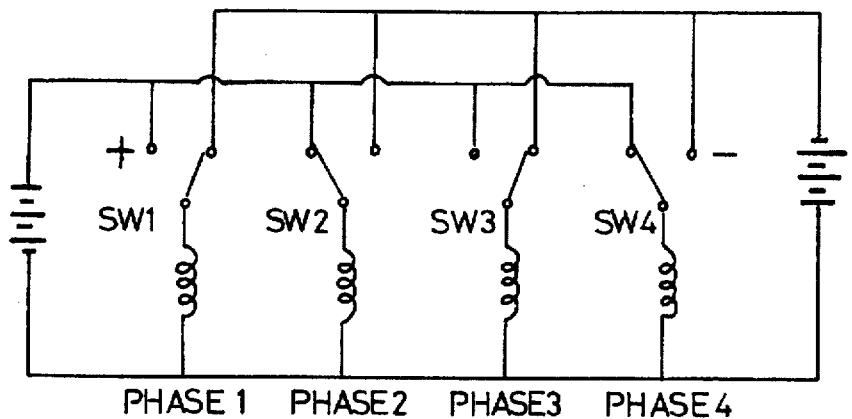

FIG. 168 shows a driving circuit of the big driving angle method of the static holding type of controllable coupling means.

FIG. 169 shows the operation table of the driving circuit in the big driving angle method of the static holding type of controllable coupling means.

Figure 170:
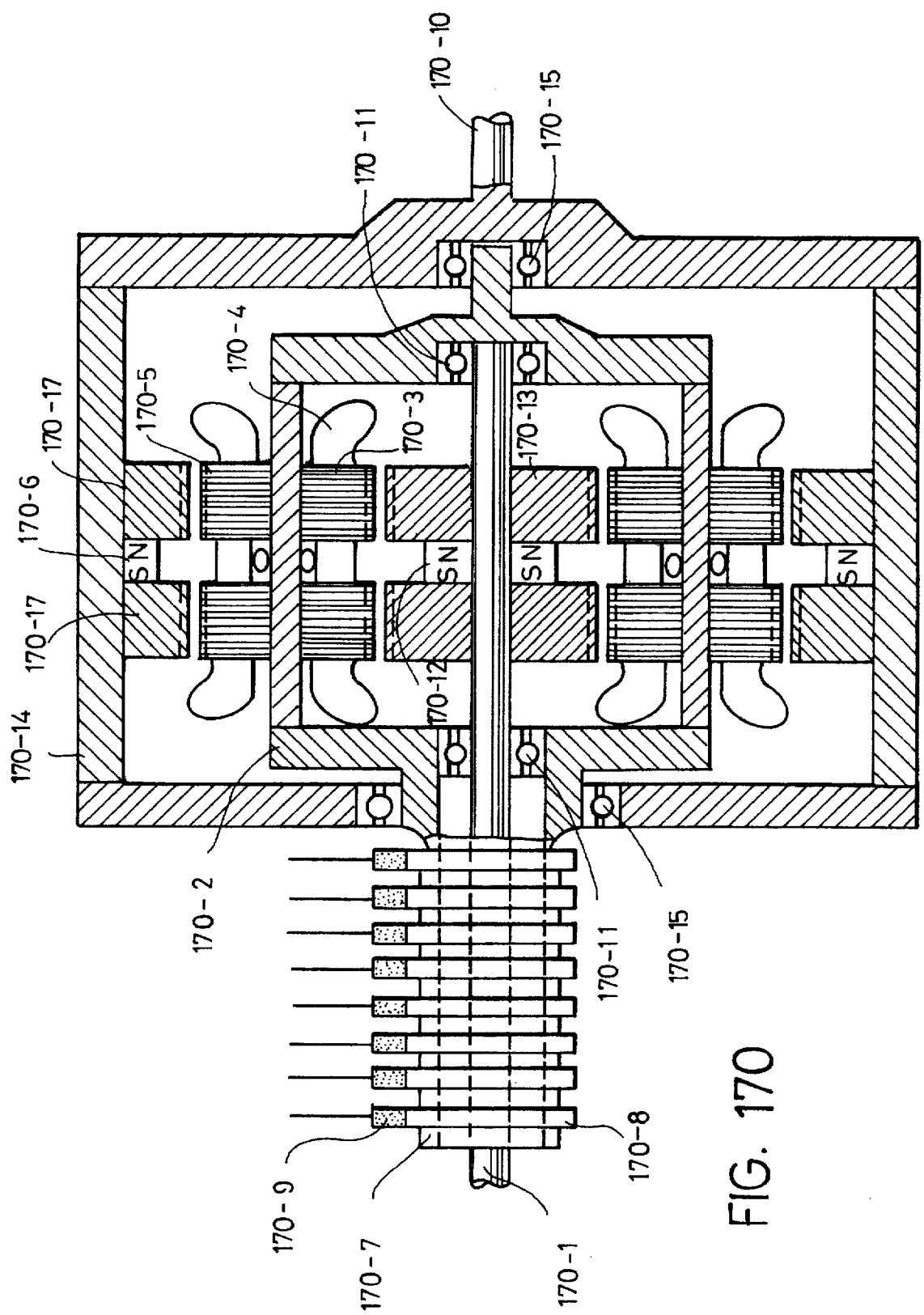

FIG. 170 shows the structure of a three-laminate (or layer) type of the controllable coupling means. Machine parts are indicated as follows:

170-1 Input axle.

170-2 Mid-laminate (or layer) ring-shaped structure.

170-3 Inner field iron core.

170-4 Inner field winding.

170-5 Outer field iron core.

170-6 Outer field winding.

170-7 Insulator.

170-8 Slip ring.

170-9 Brush.

170-10 Output axle.

170-11 Bearing.

170-12 Permanent magnet.

170-13 The rotor iron core of the input axle.

170-14 Outer case.

170-15 Bearing.

170-16 Permanent magnet.

170-17 Outside rotor iron core.

Figure 171:
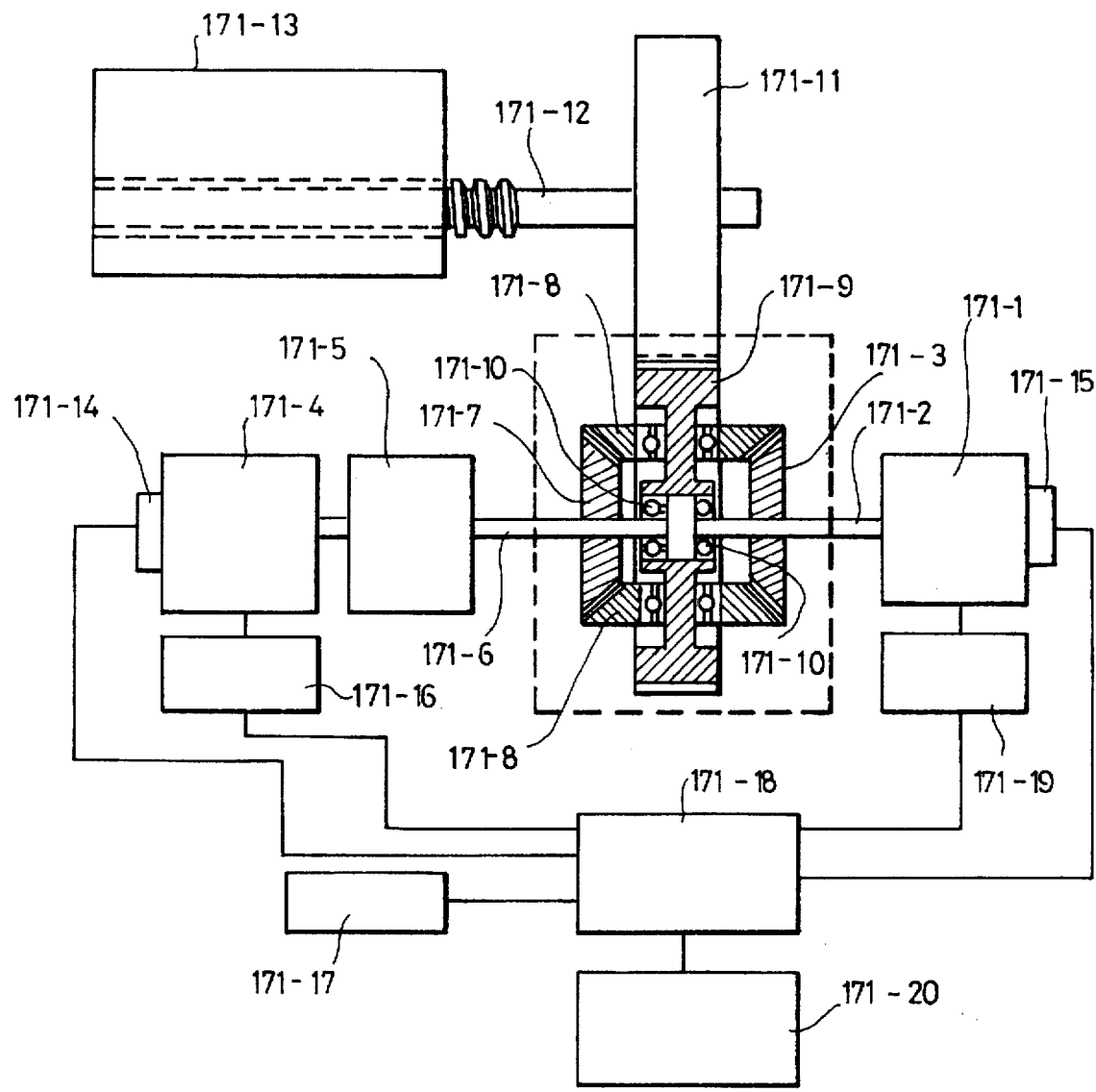

FIG. 171 shows the structure of a cyclic gear train type for the dynamic error-compensation method. Machine parts are indicated as follows:

171-1 Driving motor.

171-2 Output axle of the driving motor.

171-3 Driving gear.

171-4 Auxiliary motor.

171-5 Speed reduce device of auxiliary motor.

171-6 Output axle of auxiliary motor.

171-7 Driving gear.

171-8 Driving gear.

171-9 Transmission gear.

171-10 Bearing.

171-11 Output gear.

171-12 Transmission axle.

171-13 Working table.

171-14 Rotary angular sensing means.

171-15 Rotary angular sensing means.

171-16 Auxiliary motor driver.

171-17 Error value memory means.

171-18 CPU.

171-19 Driving motor controller.

171-20 Control data and logic device.

Figure 172:
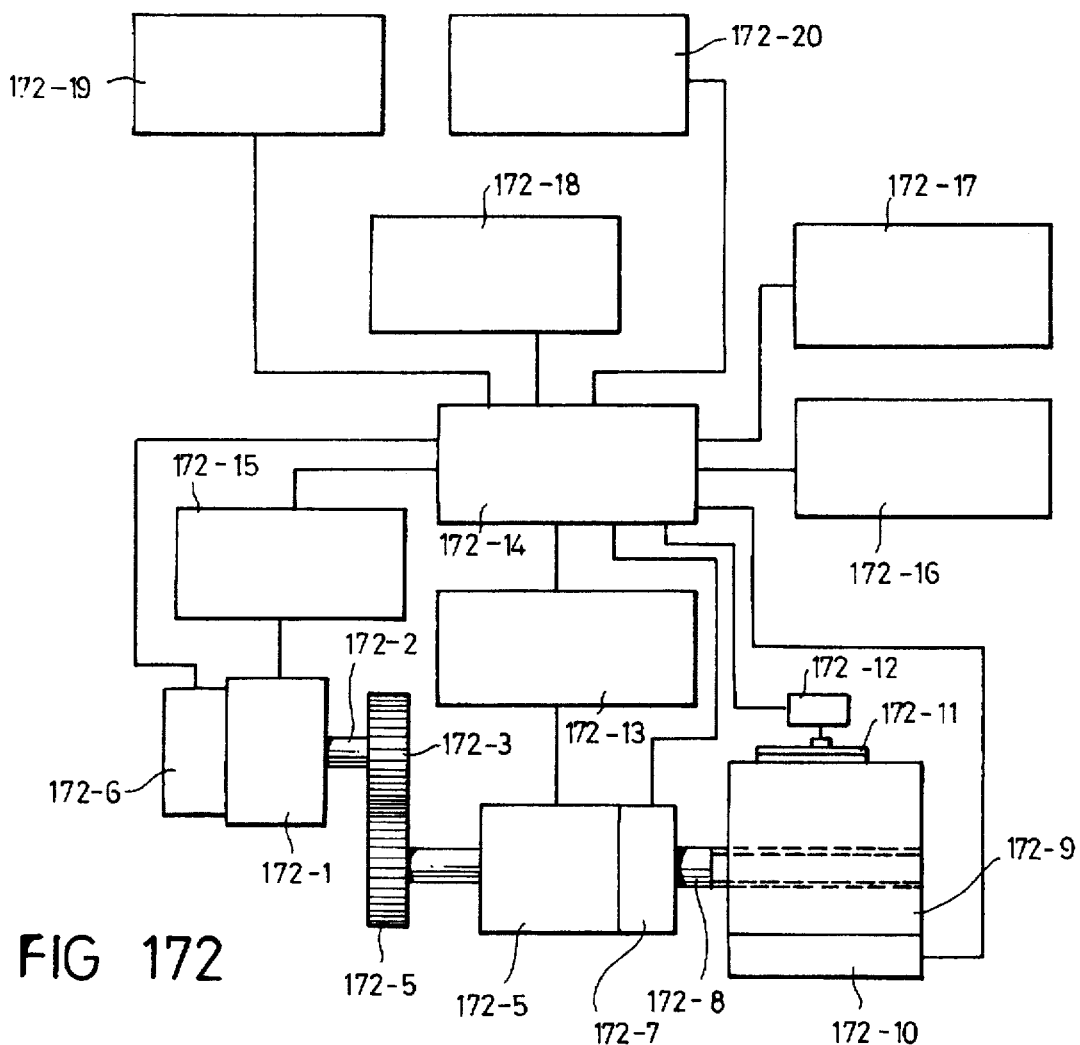

FIG. 172 shows the block diagram of an error-compensation system by means of magnetic reference point. Machine parts are indicated as follows:

172-1 Driving device.

172-2 Output axle of the driving device.

172-3 Transmission gear.

172-4 Transmission gear.

172-5 Controllable coupling device.

172-6 Rotary angular sensing means.

172-7 Rotary angular sensing means.

172-8 Guide screw.

172-9 Working table.

172-10 Lock means.

172-11 Magnetic tape.

172-12 Magnetic head.

172-13 CPU.

172-14 Controller of the controllable coupling device.

172-15 Controller of the driving device.

172-16 Control data and logic input device.

172-17 Temperature sensing and input transformation device.

172-18 Error value memory device.

172-19 Error value input device.

172-20 Displacement distance indicator.

Figure 173:
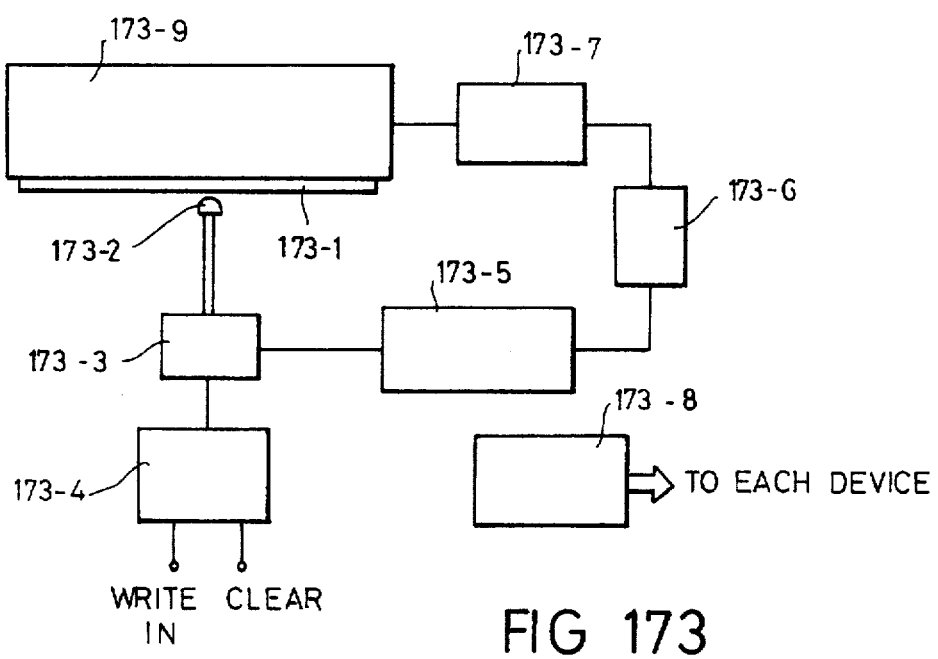

FIG. 173 shows a positioning control system including means for the magnetizing and de-magnetizing, and magnetic sensing means and magnetic tape. Machine parts are indicated as follows:

173-1 Magnetic tape.

173-2 Magnetic head.

173-3 Amplifier.

173-4 Main control unit.

173-5 Program control means.

173-6 Driving means.

173-7 Driving motor.

173-8 Dynamics supply means.

173-9 Working table.

Figure 174:
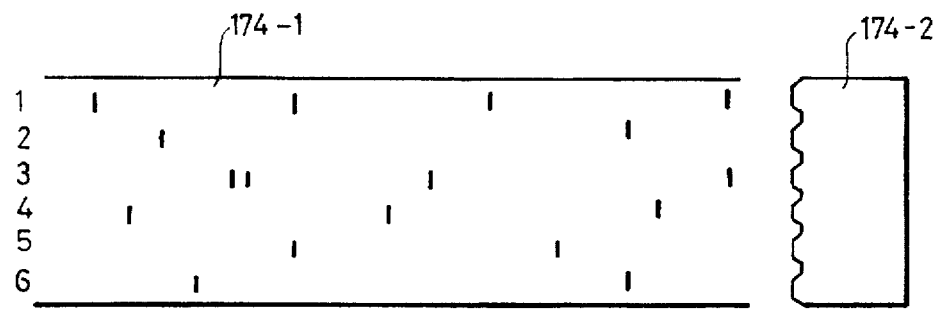

FIG. 174 shows the magnetic point distribution view on the magnetic tape. Machine parts are indicated as follows:

174-1 Magnetic tape.

174-2 Magnetic head group.

Figure 175:
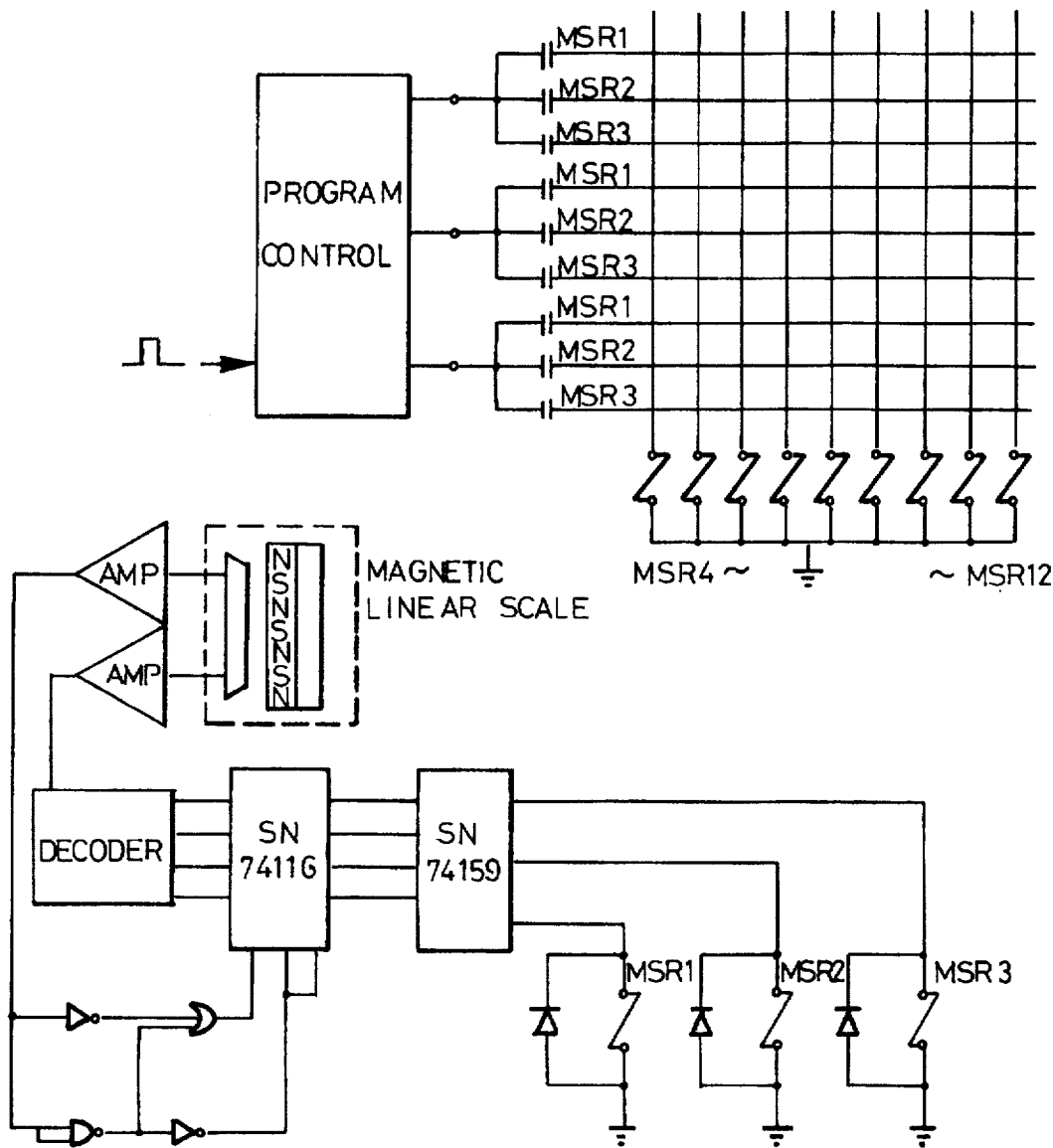

FIG. 175 shows the processing circuit of the magnetic point sensing program.

Figures 176, 177:
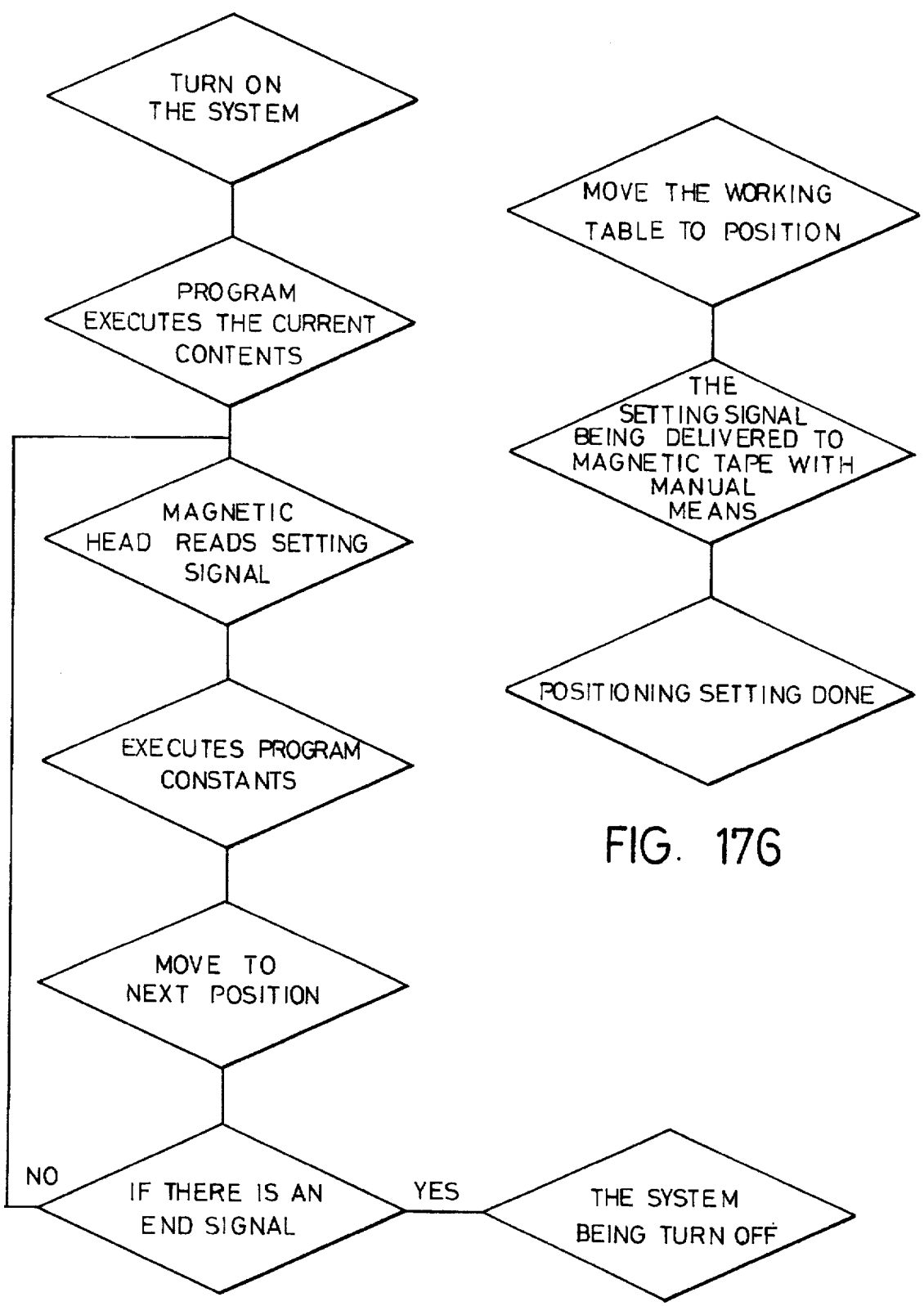

FIG. 176 shows the flow chart of the magnetic positioning setting.

FIG. 177 shows a flow chart of the magnetic sensing and program execution.

Figure 178:
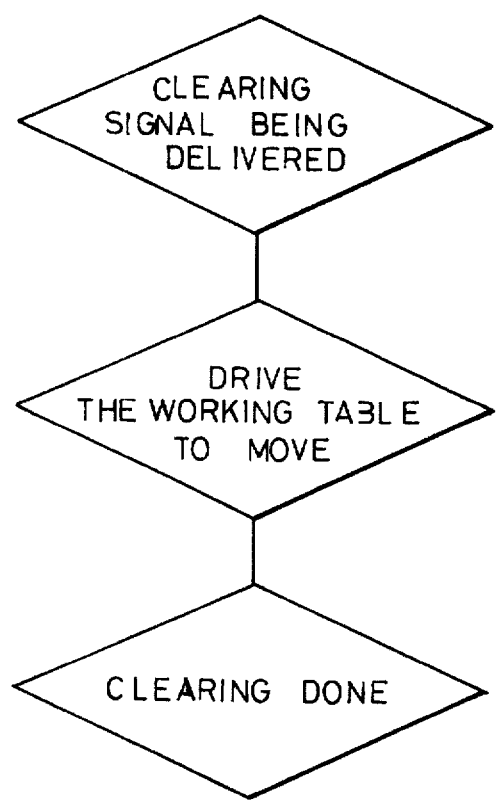

FIG. 178 shows a flow chart of de-magnetizing.

Figure 179:
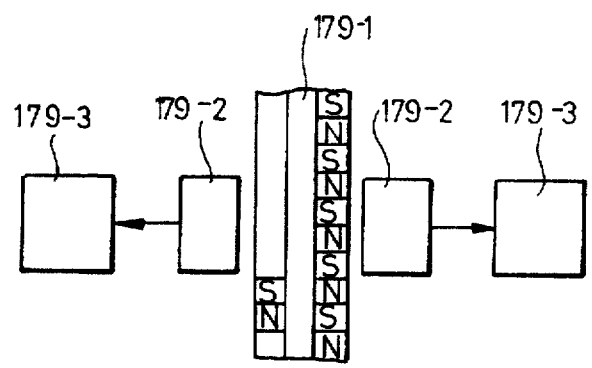
Figure 180:
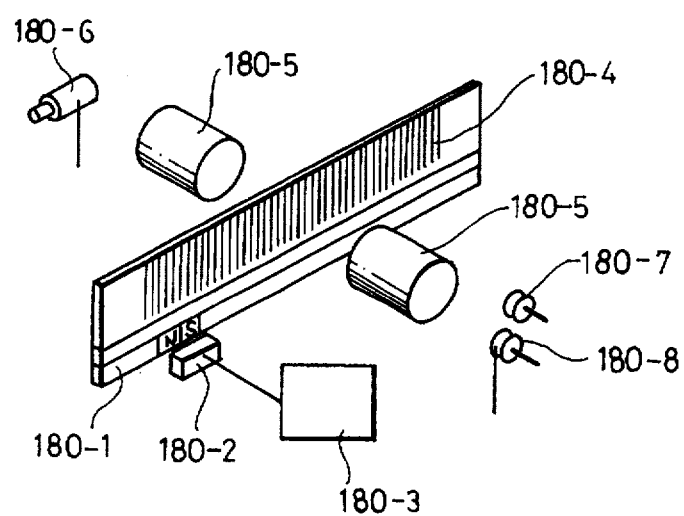

FIGS. 179, 180 shows a juxtaposed view of the magnetic tape and linear scale. Machine parts are indicated as follows:

179-1 Magnet tape.

179-2 Magnetic detecting head.

179-3 Amplifier.

180-4 Light grid.

180-5 Lens.

180-6 Light passing unit.

180-7 Light sensing unit.

180-8 Light sensing unit.

Figure 181:
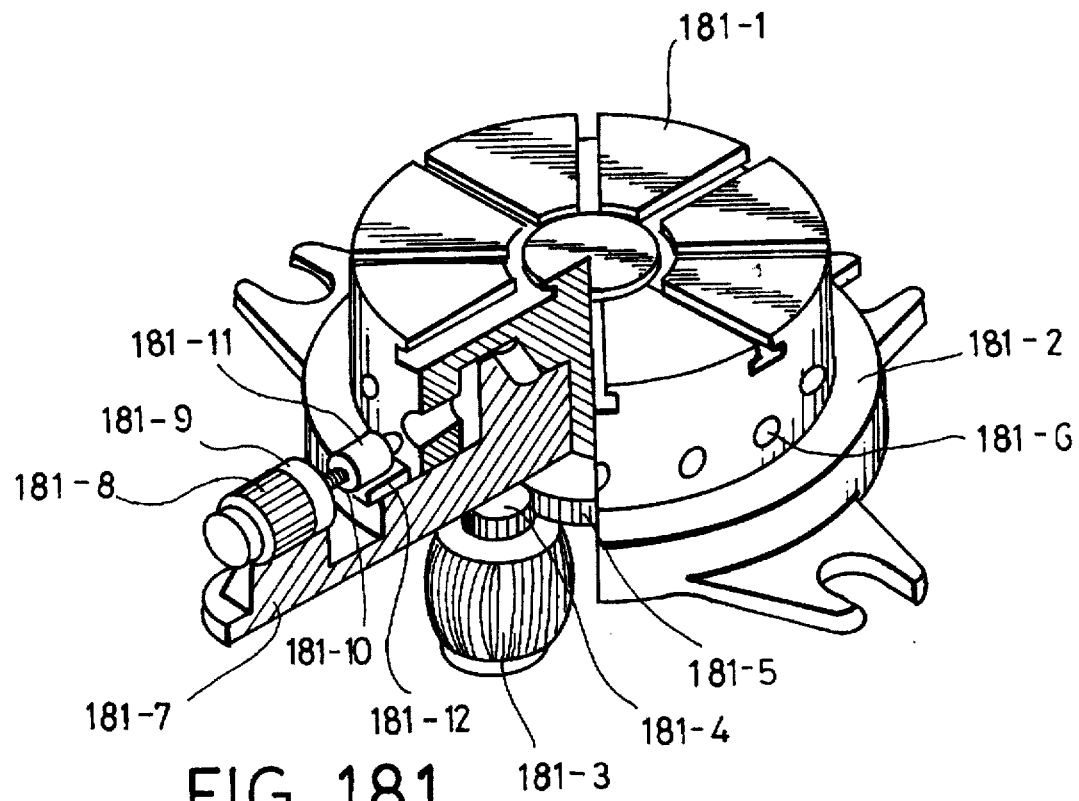

FIG. 181 shows the structure of a precision positioning and locking means including a conic catch pin. Machine parts are indicated as follows:

181-1 Rotary working table.
181-2 Base.
181-3 Driving motor.
181-4 Driving gear.
181-5 Driving gear of the working table.
181-6 Conic hole.
181-7 Positioning base of the conic pin.
181-8 Driving motor of the conic pin.
181-9 Locking means.
181-10 Driving guide screw.
181-11 Conic pin.
181-12 Rail.

Figure 182:
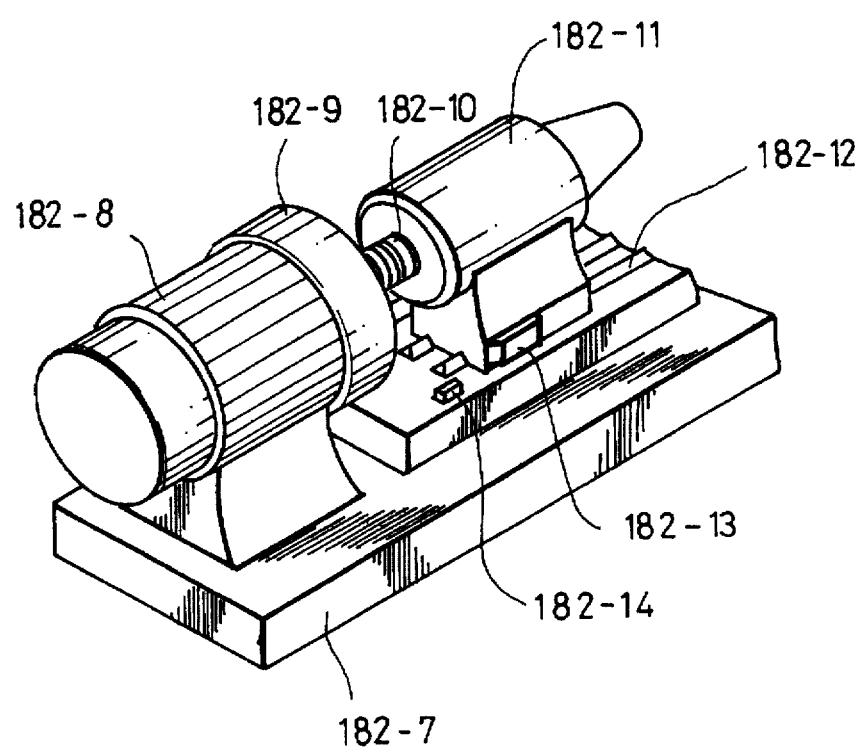

FIG. 182 shows the conic pin or sliding block driving structure for precision positioning and locking. Machine parts are indicated as follows:

182-7 The positioning base of a conic pin.
182-8 Conic pin driving motor.
182-9 Locking means.
182-10 The driving guide screw of the conic pin.
182-11 Conic pin.
182-12 Guide channel.
182-13 Contact stop.
182-14 Sensing means.

Figure 183:
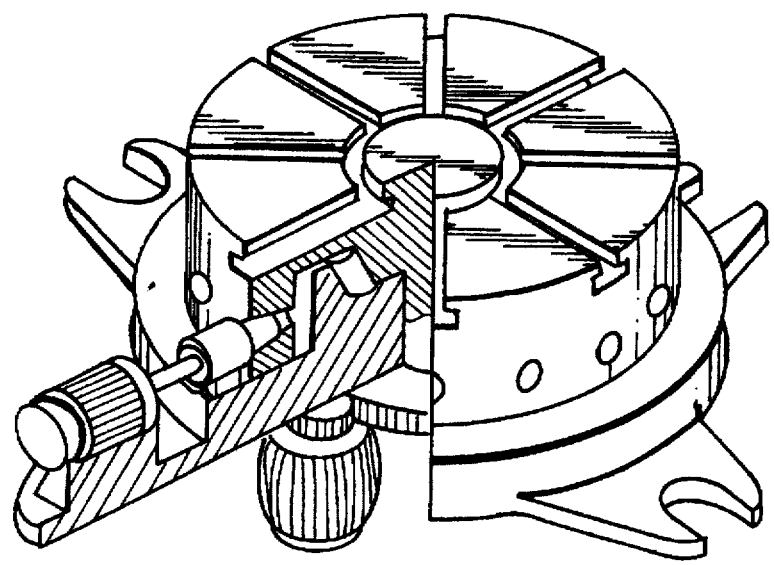

FIG. 183 shows a precision positioning and locking control means using a conic pin.

Figure 184:
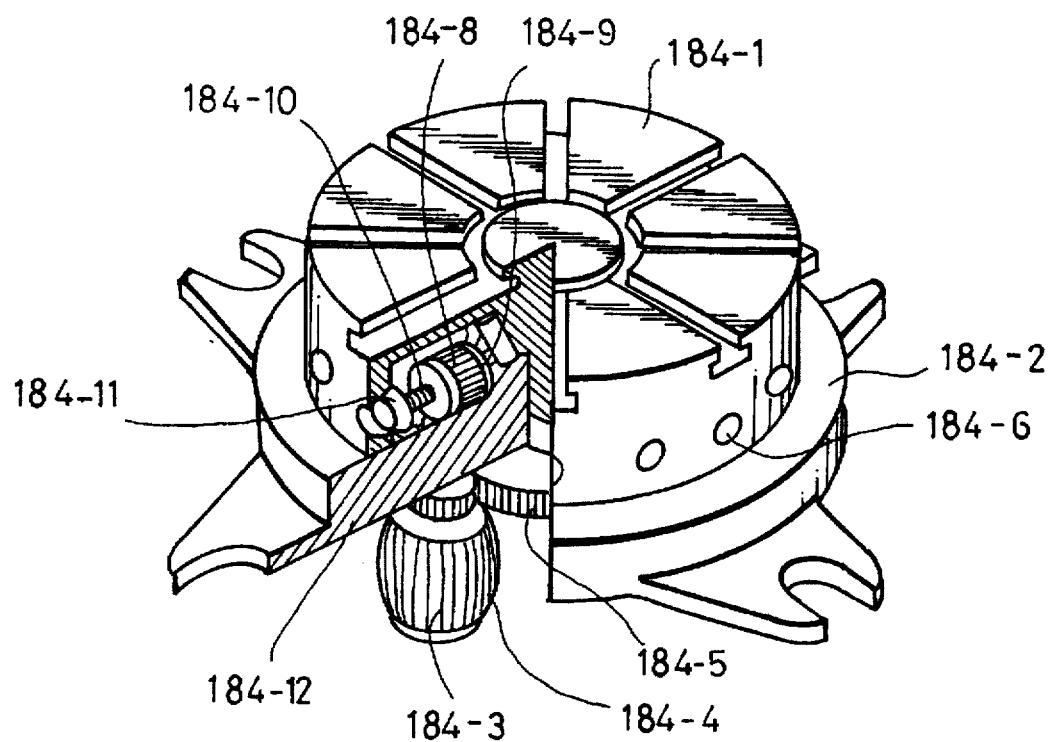

FIG. 184 shows the conic pin being installed inside the machine. Machine parts are indicated as follows:

184-1 Rotary working table.
184-2 Base.
184-3 Driving motor.
184-4 Driving gear.
184-5 Driving gear of the working table.
184-6 Conic hole.
184-7 Positioning base of the conic pin.
184-8 Conic pin driving motor.
184-9 Locking means.
184-10 Driving guide screw of the conic pin.
184-11 Conic pin.
184-12 Guide rail.

Figure 185:
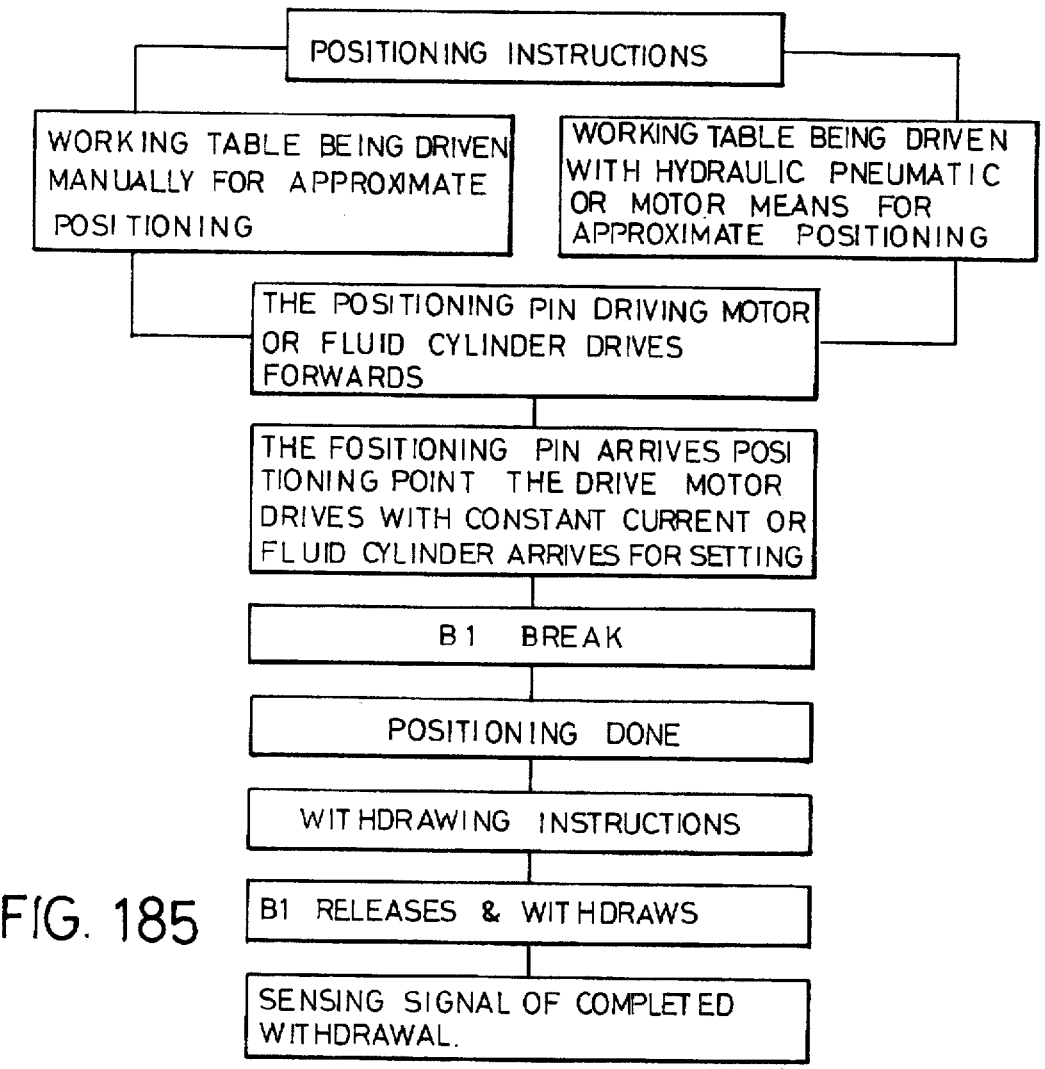

FIG. 185 shows the operational flow chart of the working table using a conic pin for precision positioning and locking.

Figure 186:
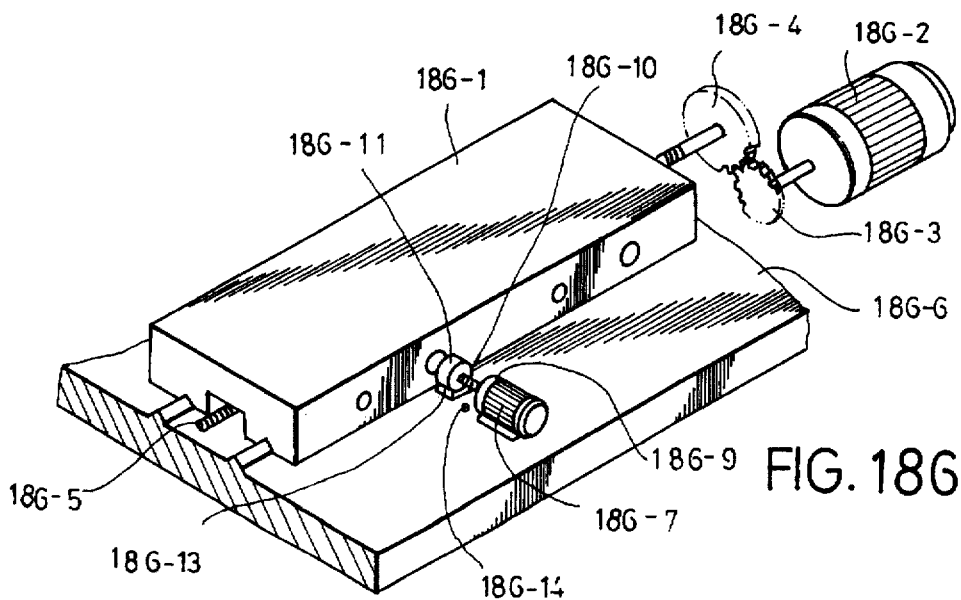

FIG. 186 shows an embodiment of a linear type of positioning method. Machine parts are indicated as follows:

186-1 Working table.
186-2 Driving motor.
186-3 Driving gear.
186-4 Driving gear.
186-5 Driving guide screw.
186-6 Lathe bed.
186-7 Conic pin driving motor.
186-8 Conic hole.
186-9 Locking means.
186-10 Conic pin driving guide screw.
186-11 Conic pin.
186-13 Contact stop.
186-14 Sensing switch.

Figure 187:
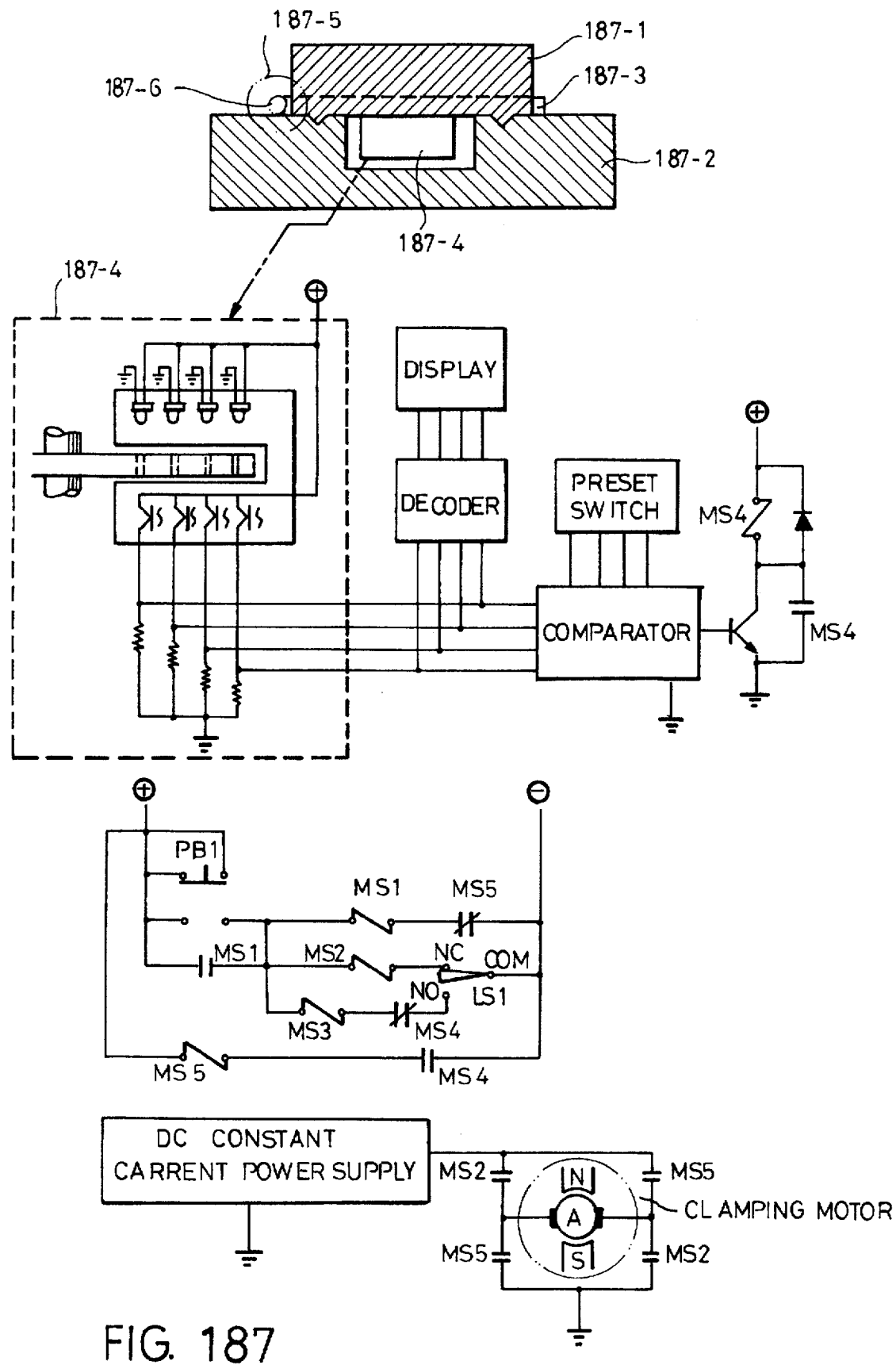

FIG. 187 shows a control circuit of the precision positioning and locking control means using encoder feedback and a conic pin. Machine parts are indicated as follows:

187-1 Working table.
187-2 Lathe bed.
187-3 Worm gear.
187-4 Photocell decoder.
187-5 Motor.
187-6 Worm.

Figure 188:
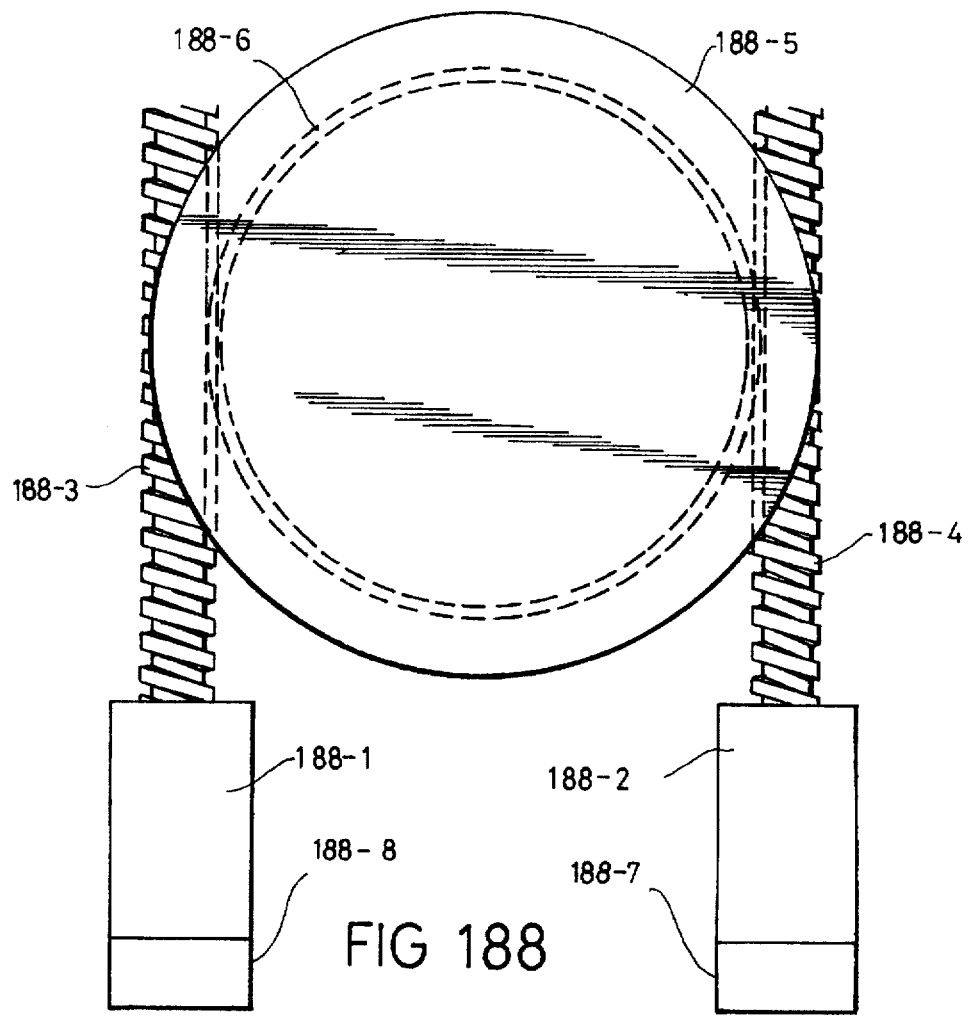

FIG. 188 shows a dual motor backlash eliminating means for a guide screw driving type of rotary working table. Machine parts are indicated as follows:

188-1 D.C. servo-motor.
188-2 D.C. servo-motor.
188-3 Worm.
188-4 Worm.
188-5 Rotary working table base.
188-6 Worm gear.
188-7 Brake means.
188-8 Brake means.

Figure 189:
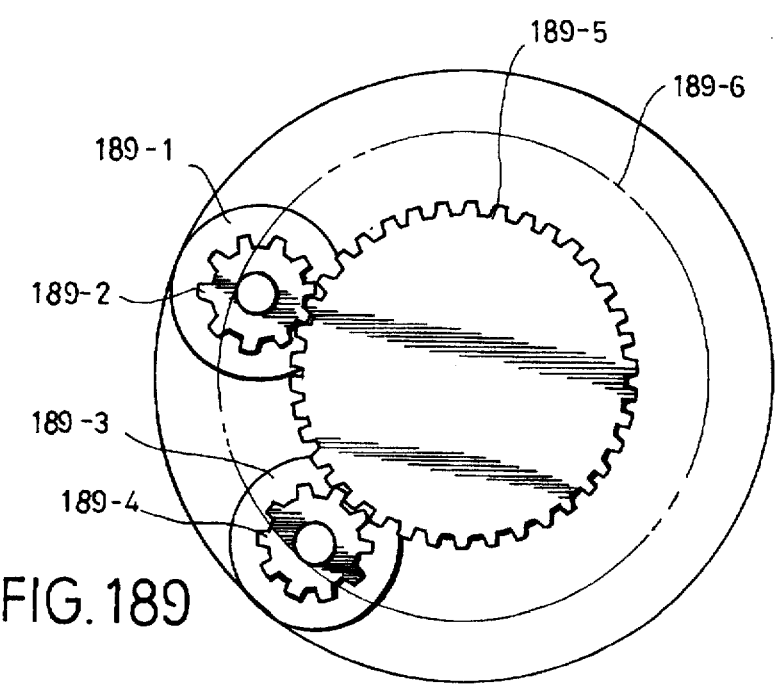

FIG. 189 shows a dual motor backlash eliminating means for a gear driving type of working table. Machine parts are indicated as follows:

189-1 Driving motor.
189-2 Driving gear.
189-3 Driving motor.
189-4 Driving gear.
189-5 Working table driving gear.
189-6 Rotary working table.

Figure 190:
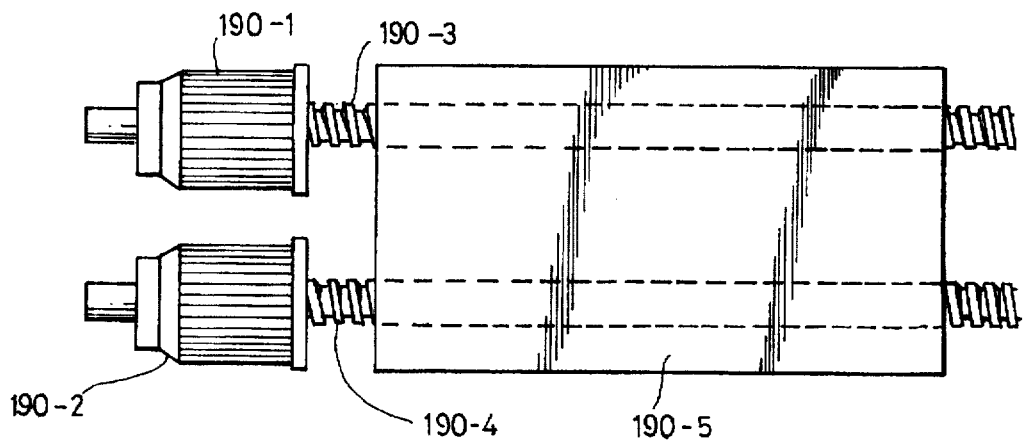

FIG. 190 shows a dual motor backlash elimination means for a guide screw driving type of working table. Machine parts are indicated as follows:

190-1 Driving motor.
190-2 Driving motor.
190-3 Driving guide screw.
190-4 Driving guide screw.
190-5 Working table.

Figure 191:
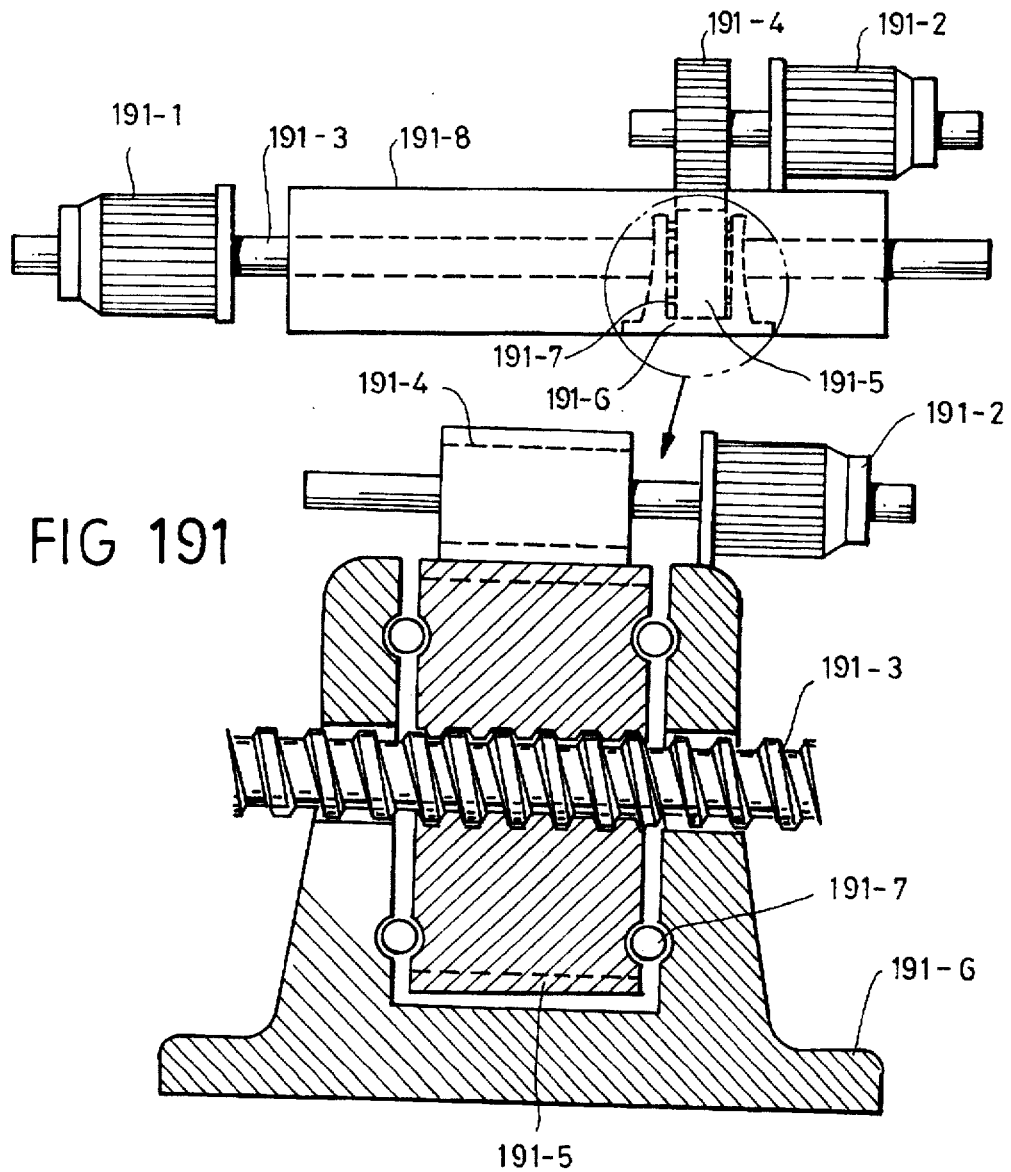

FIG. 191 shows a dual motor backlash eliminating means for a guide screw driving type of working table using an auxiliary motor. Machine parts are indicated as follows:

191-1 Driving motor.
191-2 Driving motor.
191-3 Driving guide screw.
191-4 Driving gear.
191-5 Tooth-shaped driving nut.
191-6 Bracket of the tooth-shaped driving nut.
191-7 Rolling ball.

Figure 192:
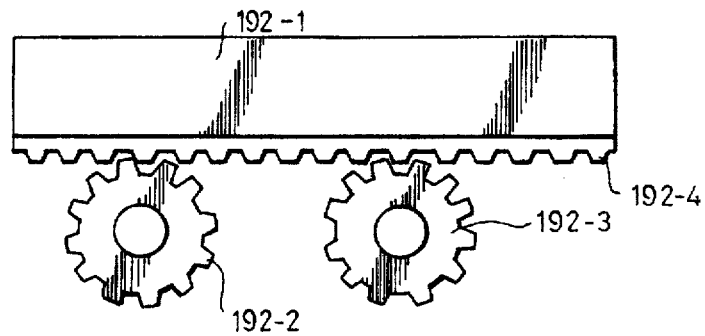

FIG. 192 shows a dual motor backlash eliminating means for a single rack-and-gear driving type of linear working table. Machine parts are indicated as follows:

192-1 Working table.
192-2 Driving gear.
192-3 Driving gear.
192-4 Gear rack.

Figure 193:
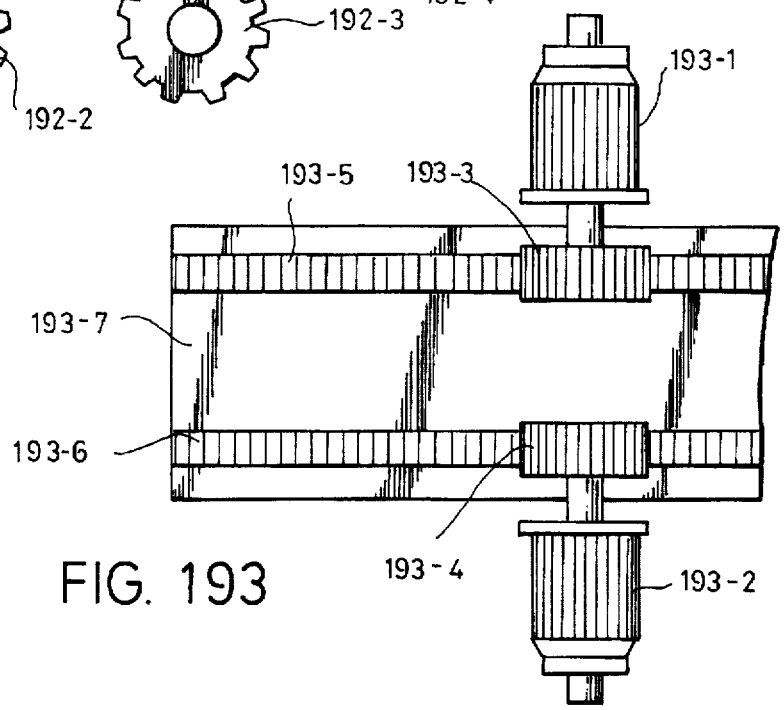

FIG. 193 shows a dual motor backlash eliminating means for a dual rack-and-gear driving type of linear working table. Machine parts are indicated as follows:

193-1 Driving motor.
193-2 Driving motor.
193-3 Driving gear.
193-4 Driving gear.
193-5 Gear rack.
193-6 Gear rack.

Figure 194:
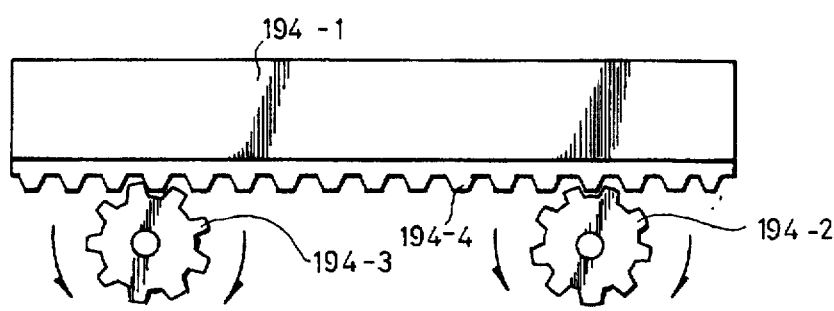

FIG. 194 shows a dual motor backlash eliminating means for a retarding type of linear working table. Machine part are indicated as follows:

194-1 Working table.
194-2 Driving gear.
194-3 Driving gear.
194-4 Gear rack.

Figure 195:
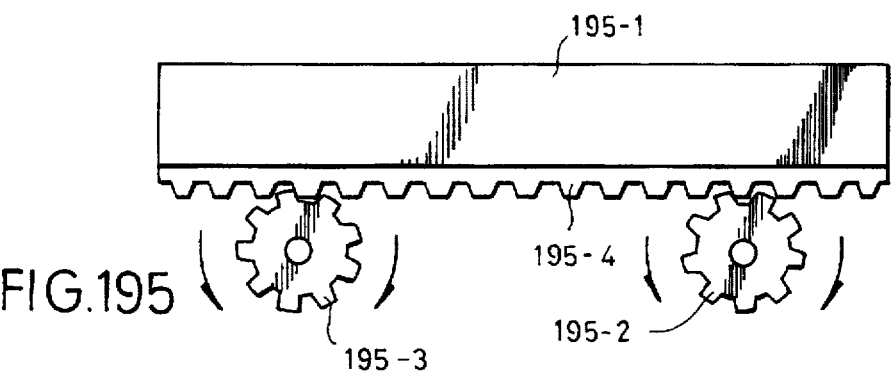

FIG. 195 shows a dual motor backlash eliminating means for an auxiliary motor and retarding type of linear working table. Machine parts are indicated as follows:

195-1 Working table.
195-2 Driving gear.
195-3 Driving gear.
195-4 Gear rack.

Figure 196:
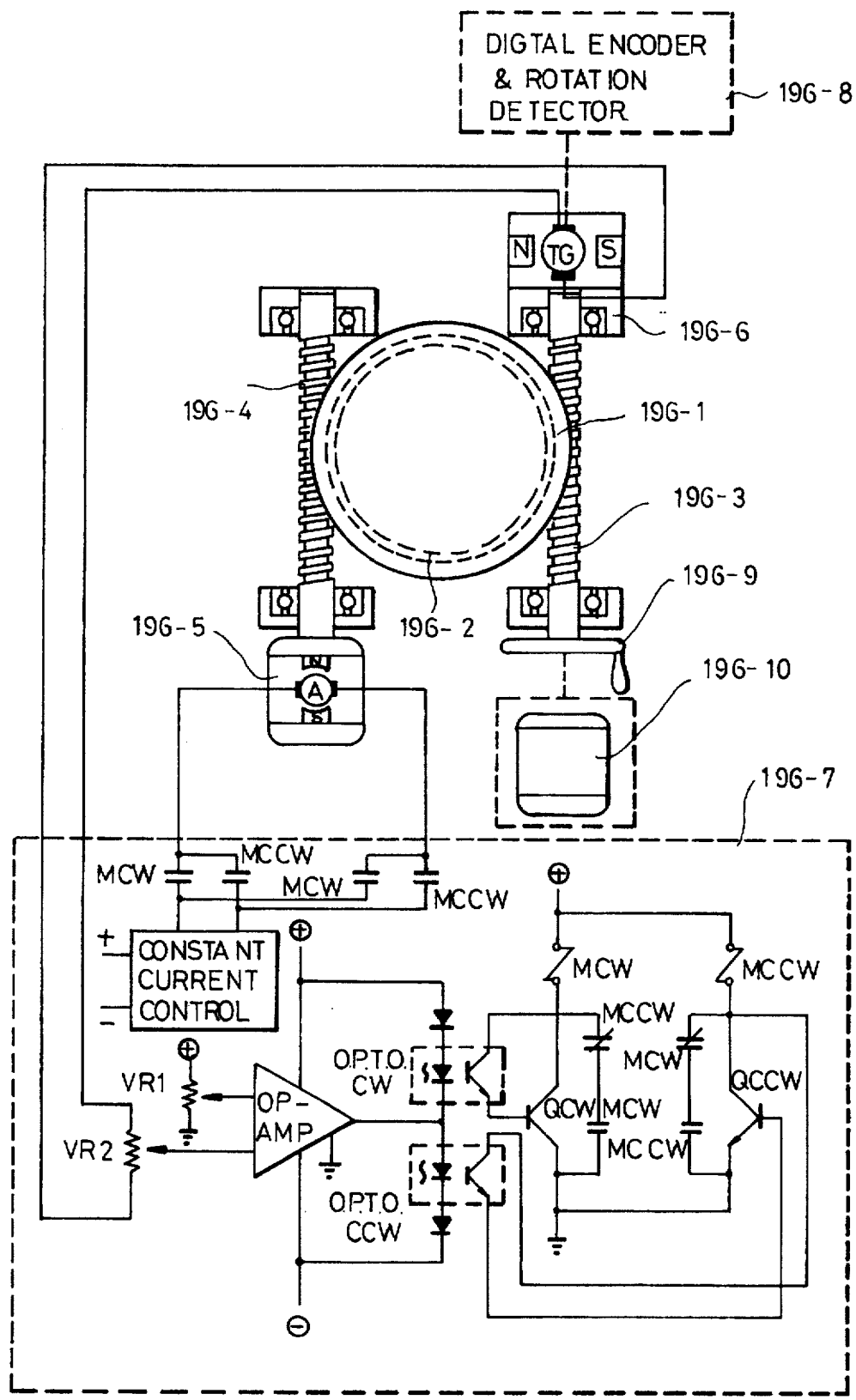

FIG. 196 shows an embodiment of backlash eliminating means and locking the rotary working table means by using a direction identification and constant torque auxiliary motor. Machine parts are indicated as follows:

196-1 Rotary working table.
196-2 Worm gear.
196-3 Input driving axle.
196-4 Worm.
196-5 Torque setting auxiliary motor.
196-6 Analog direction identification means.
196-7 The driving circuit of the auxiliary motor.
196-8 Digital type of direction identification means.
196-9 Handwheel.
196-10 Driving motor.

FIG. 197 shows a working table being driven with both ends of a guide screw. Machine parts are indicated as follows:

197-1 Driving motor.
197-2 Lathe bed.
197-3 Work piece.
197-4 Driving nut.
197-5 Driving screw of the working table.
197-6 The upper protection lid.

FIGS. 198A, 198B shows an oblique roller and thread type of guide rod. Machine parts are indicated as follows:

198-1 Movable guide base.
198-2 Movable guide base.
198-3 Combining screw.
198-4 Roller.
198-5 Guide rod.

FIGS. 199A, 199B shows an oblique roller and thread type of guide rod. Machine parts are indicated as follows:

199-1 Movable guide base.
199-2 Movable guide base.
199-3 Combining screw.
199-4 Roller.
199-5 Guide rod.
199-6 Roller bearing.

FIGS. 200A, 200B shows a guide rod with a slight concave friction type of oblique roller. Machine parts are indicated as follows:

200-1 Movable guide base.
200-2 Movable guide base.
200-3 Combining screw.
200-4 Roller.
200-5 Guide rod.
200-6 Roller bearing.

FIGS. 201A, 201B shows a guide rod with a slight concave and tooth-shaped oblique roller. Machine parts are indicated as follows:

201-1 Movable guide base.
201-2 Movable guide base.
201-3 Combining screw.
201-4 Roller.
201-5 Guide rod.
201-6 Roller bearing.

Figure 202:
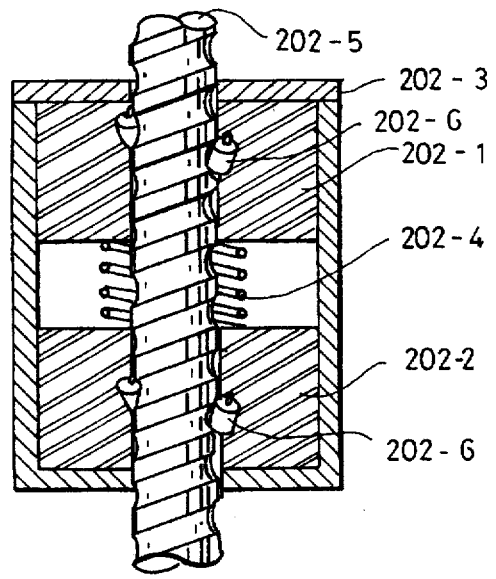

FIG. 202 shows an oblique roller with a backlash eliminating function. Machine parts are indicated as follows:

202-1 Movable guide base.
202-2 Movable guide base.
202-3 Outer case.
202-4 Spring.
202-5 Guide rod.
202-6 Roller.

Figure 203:
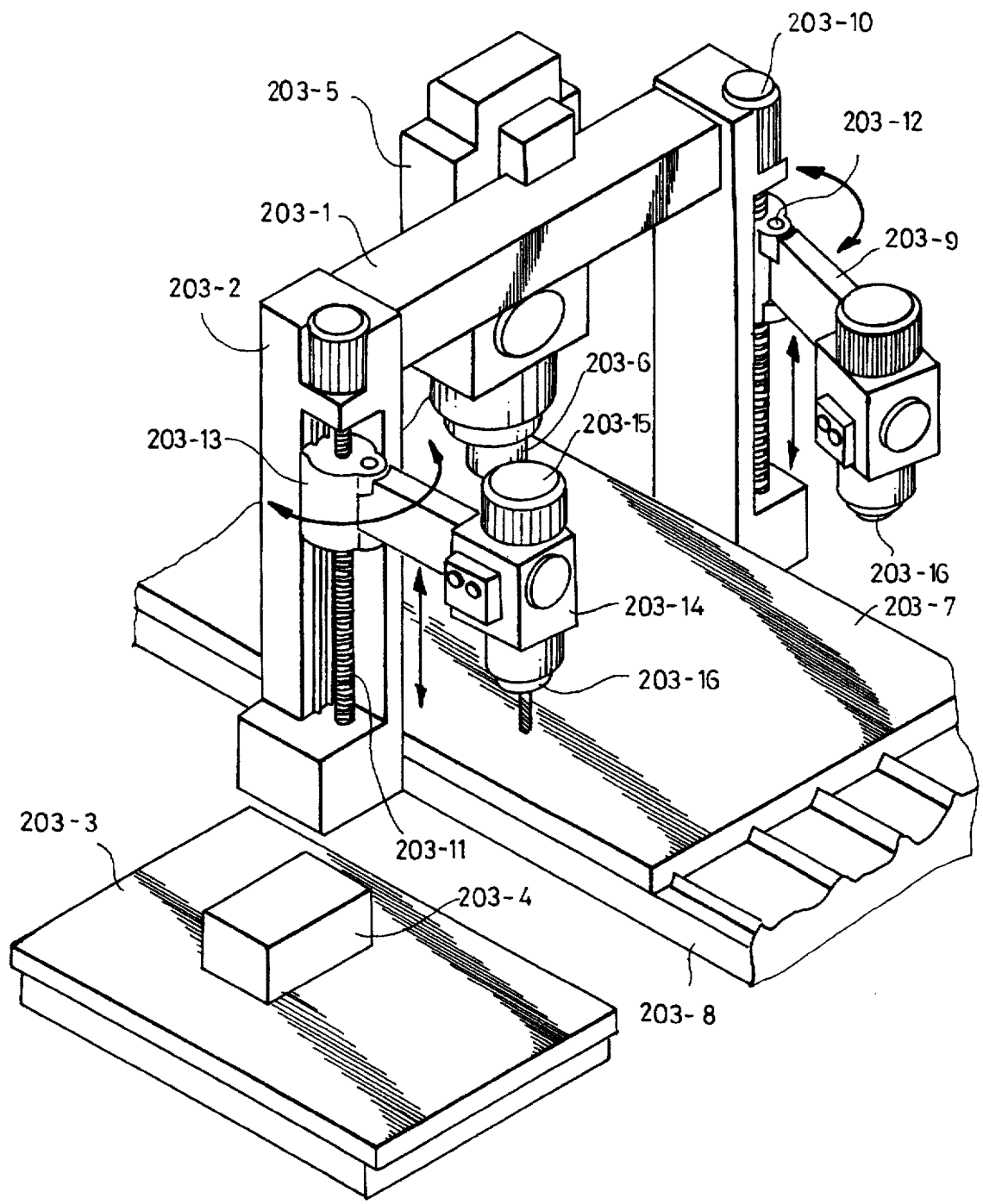

FIG. 203 shows an embodiment of the auxiliary rotary arm being installed at both sides of the dragon gate column. Machine parts are indicated as follows:

203-1 Top of the dragon gate.
203-2 Dragon gate column.
203-3 Working table.
203-4 Working table.
203-5 Tool post.
203-6 Tool mandrel.
203-7 Working table.
203-8 Lathe bed.
203-9 Auxiliary rotary arm.
203-10 The driving motor for moving the auxiliary rotary arm up and down.
203-11 The driving guide screw of the auxiliary rotary arm.
203-12 Combining pin.
203-13 Supporting sliding block of the auxiliary rotary arm.
203-14 Tool post.
203-15 Driving motor of the tool mandrel.
203-16 Tool mandrel.

Figure 204:
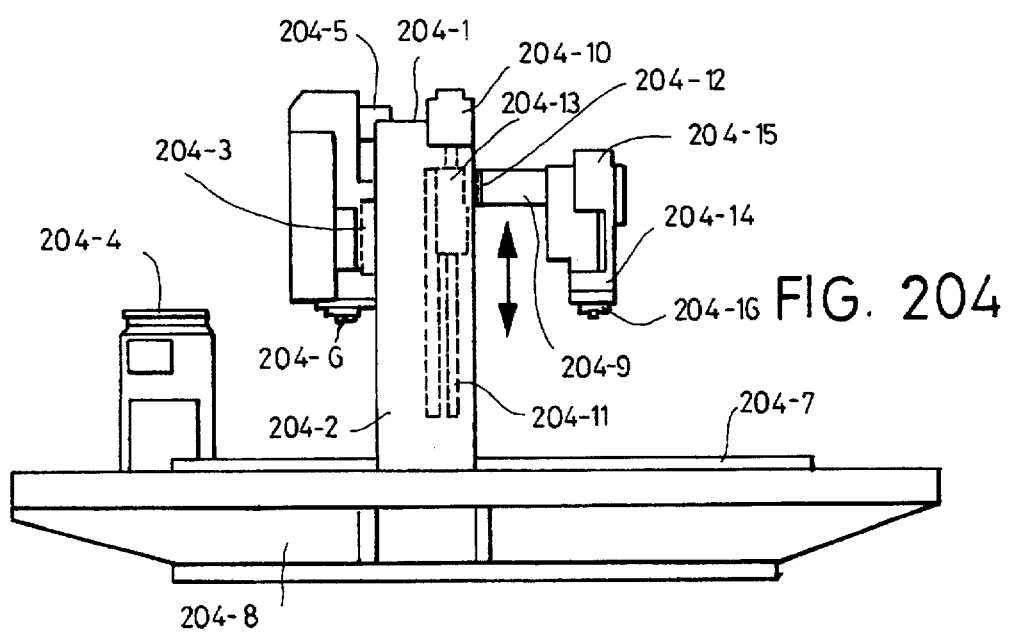

FIG. 204 shows the rotary arm coupled to the cylinder-shaped axis of the dragon gate. Machine parts are indicated as follows:

204-1 Top of the dragon gate.
204-2 Dragon gate column.
204-3 Lateral girder.
204-4 Control box.
204-5 Tool post driving motor.
204-6 Tool mandrel.
204-7 Working table.
204-8 Lathe bed.
204-9 Auxiliary rotary arm.
204-10 The driving motor for moving the auxiliary rotary arm up and down.
204-11 The driving guide screw of the auxiliary rotary arm.
204-12 Combining pin.
204-13 Supporting sliding block of the auxiliary rotary arm.

204-14 Tool post.

204-15 Driving motor of the tool mandrel.

204-16 Tool mandrel.

FIG. 205 shows the structure of the phase difference type of driving gear assembly which has a low vibration ratio. Machine parts are indicated as follows:

205-1 Driving motor.

205-2 Gear box.

205-3 Transmission shaft.

205-4 Driving gear.

205-5 Gear rack.

205-6 Driving gear.

205-7 Gear rack.

205-8 Working table.

FIG. 206 shows the phase difference when the gear and the gear rack are engaged to each other. Machine parts are indicated as follows:

206-4 Driving gear.

206-5 Gear rack.

206-6 Driving gear.

206-7 Gear rack.

FIG. 207 shows the pulse ratio upon the phase difference type and the driving type being combined together.

DETAILED DESCRIPTION OF THE PREFERRED EMBODIMENT

Figure 1:
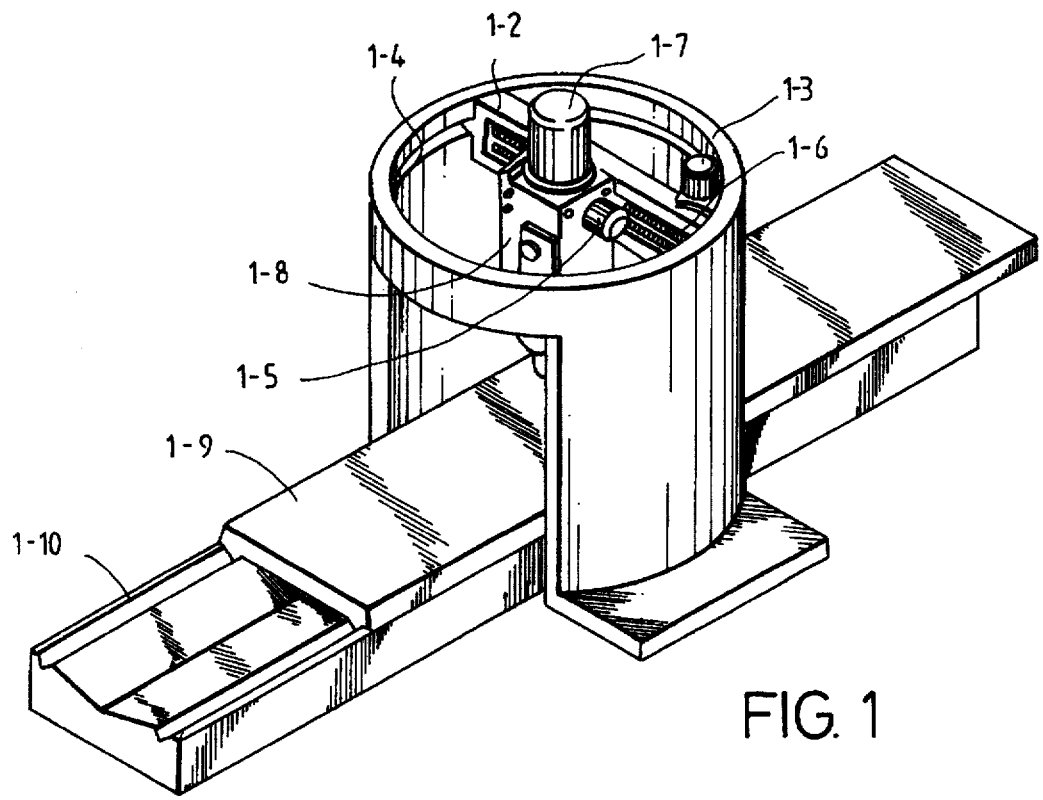
FIG. 1 shows a perspective view of a rotatively driven, lateral girder (1-2) on the top of the dragon gate. Machine parts are indicated as follows.

1) The dragon-gate lateral girder in the conventional lathe is usually coupled to the column of the dragon-gate for furnishing the tool post so as to perform planing or milling processing. In this invention, a rotary lateral girder (1-2) has been designed to be coupled to the dragon-gate top (1-1), as shown in FIG. 1. In addition to one or more sets of ring-shaped supporting structures (1-4), the rotary lateral girder and the outer supporting and sliding surface may be a partial circle (2-1) or a fulcrum structure as shown in FIG. 2. The multi-ring structure used for lathe and planing processing is shown in FIGS. 3-A through 3-C. The sliding surface of said lateral girder may use a bearing, air film, or oil film as a sliding medium so as to minimize friction. In addition, a known mechanical or hydraulic lock method may be provided so as to lock-up the said rotary lateral girder (1-2), if necessary, to perform lathe cutting, milling, planing, grinding, drilling and boring on a workpiece. The said rotary lateral girder (4—4) may be provided with a symmetrical and synchronous balance tool post (4-2) (shown in FIG. 4) or a synchronous and symmetrical balance block (5—5) (shown in FIG. 5) so as to balance the said rotary lateral girder (5-4) when it is used for lathe cutting. The center tool post (5-2) deviates from the center to cause an imbalance effect. The said symmetrical balance block (5—5) may be moved and manually locked in position, or moved by means of a transmission method (such as guide screw (5-3)) which is driven in the opposite direction to the said center tool post (5-2) so as to obtain a balanced effect at any position of the tool post (5-2). The said rotary lateral girder (6-2) may be driven with either an external driving motor as shown in FIG. 6 or with a motor (6-3) attached to the girder itself. The power supply for the girder motor (6-3), the tool post laterally feeding motor, and the mandrel motor may be introduced with a disk or a slip-ring (6-6) and a corresponding brush (6-7).

On the aforesaid structure, one or more sets of auxiliary arms (7-11) may be provided, one end of the said auxiliary arm (7-11) is connected to the said lateral girder (7-2) at a selected angle, while the other end is coupled to the guide rail to strengthen the structure and maintain the precision (as shown in FIG. 7). On the said auxiliary arm (7-11), an individually or simultaneously operating tool post may be furnished to perform milling, planing, grinding, or polishing for a workpiece (especially on the same workpiece). The operation of the tool post (7-8) may be accomplished by manual operation or well-known methods such as the guide screw (7-6). When the rotary lateral girder (7-2) is being used as a vertical lathe, the lateral tool feeding motor (7-5) on the lateral girder will feed the tool, and at the same time, the said lateral girder (7-2) is locked up at a given direction so as to have the tool on the mandrel tool post (7-8) performing planing, milling, grinding and boring processing. The said rotary lateral girder may also be installed on the dragon-gate (8-1) column (8-2) (as shown in FIG. 8) so as to perform processing work on the side of the workpiece. Further, the said dragon-gate structure may also be furnished with a conventional dragon-gate or multi-dragon gates so as to perform a series of tool feeding processing on a workpiece moving reciprocally as shown in FIG. 9. The said rotary lateral girder and the conventional dragon-gate structure may be put together with two or more sets of said girders to be installed on top of the dragon-gate (10-2) by using a guide rail in a longitudinal parallel direction, so that the tool post (10-7) moves along the guide rail of the lateral girder (10-4) to perform processing on a workpiece positioned underneath, as shown in FIG. 10. The said structure may be installed in a multi-set manner to form a rotary lateral girder group.

The aforesaid ring-shaped lateral girder (11-6) may be installed on the main lateral girder of a conventional dragon-gate type lathe as shown in FIGS. 11 and 12. Further, the conventional dragon-gate lateral girder or the main lateral girder of the ring-shaped lateral girder may be of the two-section type (as shown in FIGS. 13 and 14), of which each section is coupled to the side column (13-2) of the dragon-gate with a dove-tail and mortise that is also used as a guide screw (13-3) for up and down movement. By means of manual or motor driving means, one single side of the lateral girder may be driven; or the lateral girder may be driven with the guide screw rod (13-3) in synchronous or asynchronous manner to move up and down or to form a horizontal displacement angle to the working table. The aforesaid guide screw may also be furnished with a backlash eliminating means and a lock means on the sliding surface of said lateral girder so as to prevent said lateral girder from moving up and down during processing operation as a result of backlash. Upon doing the well-known planing, milling and grinding processes, the device in this invention may also be instructed to perform slanting surface processing as shown in FIG. 15. The device in this invention may also be instructed to perform slanting hole processing as shown in FIG. 16. When said device is combined with the rotary lateral girder, lathe cutting processing on a slanting surface may be performed as shown in FIG. 16.

Another feature of said tunnel type or dragon-gate type of mechanical processing system is the novel design in the working table which will offer more conveniences for processing, and eliminate some of dead angles in terms of processing directions. Further details are described as follows:

a) The working table may be driven singly, or simultaneously in synchronous or asynchronous operation in the longitudinal direction with divided sections. The difference from the conventional working table is that it may, if necessary, be connected in series with a plurality of sections, each of which may be similar in size and height. Each working table is driven with a separate motor, or all said working tables are driven with one motor, as shown in FIGS. 18 through 20. One set of working tables (21-7) used for hauling purposes may be connected by means of the interlock means (21-11) between the working tables (21-7), as shown in FIG. 21, or by means of a workpiece (22-10) to join the working tables (22-7). A series of tables may be driven together as shown in FIG. 22. Further, in case of a workpiece (23-10) being rather big, the working tables (23-7) may be suitably dispersed to support the workpiece (23-10) with the heavy loading points as shown in FIG. 23. Every said working table (23-7) may be driven separately, or they may be driven in asynchronous manner, or they may be driven with the given tables having coupling means or being interlocked with one another by a workpiece (23-10). The latter method is good for the machine which has only a part of working tables (23-7) furnished with driving means.

The major feature of said structure is that a workpiece (23-10) which is long in dimensions and has to be processed at its bottom may be placed on two working tables (23-7). In such a case, one set or more than one set of working tables (23-7) under said working piece (23-10) may be provided with tool post (23-11) so as to perform processing work from the bottom during the time said workpiece (23-10) is processed on top or is in a static condition, as shown in FIG. 23.

FIG. 24 shows another structure of an overlapping design in which the primary working table (24-6) is placed on the working table base (24-8), while a secondary working table (24-1), (which is separately driven, or is driven and locked up with manual means), is installed on the top of said primary working table (24-6) for processing small workpieces by operating said secondary working table (24-1) only. Upon processing a large workpiece, said secondary working table (24-1) may be driven to an appropriate position and locked thereto for supporting the gravity point of a workpiece or for processing the bottom of said workpiece. The feature is that said primary and said secondary working tables (25-1) may be driven simultaneously as shown in FIG. 25.

b) A shrapnel type working table as shown in FIG. 26 is a structure in which one or more than one set of small working tables (26-2) are provided underneath a main working table (26-1), and which are driven in the same direction as that of said main working table (26-1). Said small working table (26-2) may have the same length as that of the main working table (26-1) or may not, or may be made in section structure as mentioned in paragraph (2)(a) above so as to increase the processing efficiency. Said main or small working table may have a separate driving means, or only said small working table (27-2) may be used for processing as shown in FIG. 27. Moreover, said main working table (28-2) may be designed as a rotary driven type as shown in FIG. 28, in which may be provided one or more than one set of small working tables (28-1) in radial arrangement and to be driven in radial and axial directions.

c) A multi-set, parallel and reciprocating working table comprises the known working table surface, the base, and the driving structure as shown in FIG. 29, and may be provided with a separate driving element, or with a common driving element. A mechanical interlock means (30-9) interlocks working tables (30-7), as shown in FIG. 30. Alternatively, the working tables (31-7) may be locked with the workpiece (31-10) as shown in FIG. 31. The interlock means or the locking method may be adopted depending upon the shape of a workpiece (32-3), which is good for using a differential position locking or an opposite position locking method as shown in FIG. 32. Either of said locking methods is used for synchronous or asynchronous movement but in the same direction, or in an opposite direction as shown in FIG. 33. Each of said working tables (34-7) may be furnished with tool (34-9) so as to perform processing work on the workpiece (34-11) on the adjacent working table (34-7) as shown in FIG. 34.

Further, a working table which is similar in structure to the aforesaid overlapping type or the shrapnel type, but the functions of which are the same as those of the primary/ secondary working tables, is designed with the primary and the secondary working tables in parallel arrangement.

d) A matrix type of working table group is a combination of the types mentioned in paragraphs (2)(a), (b), and (c) above, and has a part or all of the functions of the aforesaid types.

A rotary working table:

In addition to the linearly reciprocating type working table of the aforesaid tunnel type or dragon-gate type of mechanical processing system mentioned in paragraph (2) above, a circle type, ring type, or other selected shapes of rotary working table also are provided.

FIG. 35 shows a well known rotary working table (35-1), in which the fixing base (35-2) is attached to the lathe bed (35-3) by using interconnecting or mechanical interlocking means (35-4). Therefore, the table not only can be rotated, but also can be separated in longitudinal directions as mentioned in paragraph (a) above. The table can also be arranged in a multi-row manner to expand the processing functions as shown in FIG. 36. Said rotary working table (35-1) may also be designed into one or more than one layer in a co-axial ring-shaped structure as shown in FIG. 37, and on the surface of each said layer, a driving motor may be provided for same direction or opposite direction during, for synchronous and asynchronous operation, for single or joint driving so as to perform processing work on the workpiece on the adjacent tables as shown in FIGS. 38A–38E and FIGS. 39–40. The aforesaid ring type working table may also be designed on an assembly basis to have one or more than one section with one or more than one layer, as shown in FIG. 41; or it may be combined and mixed with the circle type rotary working table as shown in FIG. 42.

4) The mixed working table with both linearly moving and rotary moving working tables has a structure shown in FIGS. 43 through 48. An important feature of this embodiment is that said two types of working tables may appropriately be used, and each type has it own separate driving motor so as to make possible selective processing.

5) A major element working table group and an exchangeable working table group structure formed by means of the aforesaid various types of working tables are described as follows:

a) The linearly moving working table group comprises multi-row and multi-section working tables having equal or unequal length, width, height, and having a same level surface or a slanting angle or configured in any suitable geometric shapes with respect to each other. The said working tables may be driven separately or in synchronous, coupled manner. This table group may comprise some driving working tables, and some working tables that may not be driven (the fixed type) as shown in FIG. 49.

b) The rotary working table group comprises a multi-set of rotary working tables with selected diameter, height, and related mechanical positions, or the ring-shaped working table; on said tables, a selected and fixed tool is provided respectively so as to process the workpiece.

c) A mixed working table group comprises the types of working tables described in paragraph (5)a and (b) above.

d) A continuous and circulating working table group comprises the working tables mentioned in paragraph (2)(a), (b), (c) above which are driven in a given sequence to have a continuous displacement along the guide rail on a base for processing the workpiece. Said working table moves from one lathe bed to another lathe bed by means of an auxiliary rail. The structure and operation of said design in this invention are described in detail as follows:

(1) A working table group having a working table exchanging station: In addition to the circular displacement method using the rail in said processing system, the working tables may be exchanged through the exchanging station as shown in FIG. 50, and the flow chart of the exchanging action is shown in FIGS. 51-52, while FIG. 53 shows an exchanging station for a multi-set type of working table, and it is designed as a matrix type.

(2) A circulating working table group having an auxiliary conveying belt: It is a working table for carrying a workpiece, after being processed on base-A, to base-B for further processing by means of said auxiliary conveyer belt. The structure and the features are described in detail as follows:

1. One or more than one set of working tables as shown in FIG. 54: At the bottom of said table (54-1), a linear or arc-shaped guide groove (55-5) having a flare at both or only one end is furnished as shown in FIG. 55. Further, a gear rack (55-2) to couple to the driving gear, or a partial circular nut (55-3) to be coupled to a guide screw is also furnished at the bottom of said table (55-1) so as to drive said table. Also, at the bottom of said table (55-1), a linear or arc-shaped notch structure or tooth-shaped notch guide groove may be furnished.

2. An auxiliary conveyor belt as shown in FIG. 58 comprises a frame, driving motor (58-4) or liquid driving means, one or more than one set of metal tracks (58-2) or a metal screen-shaped belt. In the middle of said metal caterpillar tread grid-shaped belt, it is flat, and at the both ends of said caterpillar tread or belt, there are wheels which will cause the top track or belt and the lower caterpillar tread or belt to move in opposite directions as shown in FIG. 56, The main feature of said track (58-2) or belt is that it is furnished with a salient tooth-shaped structure corresponding to the tooth-shaped notch structure in said working table so as to convey the working table when said auxiliary conveyer belt rotates. The working table may also be driven by using one or more than one set of said tooth-shaped notch coupled to a gear as shown in FIG. 57. Another preferred feature is that a base structure may be attached to said auxiliary conveyer belt, being driven with manpower, electric power or fluid pressure so as to cause a rotary angular displacement.

(3) A working table group consisting of the working table exchanging station and the auxiliary conveyor belt is shown in FIG. 59 and comprises one or more than one set of working table exchanging stations (59-8) and the auxiliary conveyer belt (59-9) mentioned in paragraph (2) above, and an auxiliary conveyer belt for rotary angular displacement. Said working table exchanging stations (59-8) may be arranged with two or more than two sets of the auxiliary conveyor belts (59-9) arranged in parallel, in circular radial shape or other selected geometric shapes. In addition, the sets may be provided in one or more than one layer placed on a common base seat. Further, each of said auxiliary conveyer belt sets is provided with a separate driving means, and said common base seat are placed on a bottom base and are connected together by means of a rotary driving circular axle, cylinder, cone or circular groove. They are driven to provide rotary angular displacement by manual means, electric means or fluid pressure, and the flow chart of said set is shown in FIG. 52.

(4) A parallel or divided section working table group: The feature of this group is that a sensing switch (60-5) made with the well-known mechanical-electric means or photocell, or electromagnetic means is installed on the edge side or on the end surface. When the working tables (60-2) (60-3) are in synchronous motion or being pulled, (and in case of any working table (60-2) (60-3) being out of synchronization or traction to cause an unstable condition), said sensing switch (60-5), as shown in FIG. 60 will generate a pre-set signal.

6) The aforesaid various kinds of working tables may be applied to the novel combinations as follows:

a) They may be used by combining with the various kinds of dragon-gate and lateral girder structures mentioned in paragraph (1) above.

b) The working table mentioned in paragraph (2) above may, in part or completely, be installed at the outer side of the dragon-gate (61-2), if necessary, as shown in FIG. 61.

c) Upon being used in the working table sets of the various dragon-gates mentioned in paragraph (1) above, the working tables may if necessary, be placed in the space at the lower portion of the dragon-gate, or try to reverse some space for the workpiece as shown in FIG. 62. A further feature is that motor may be installed, and conveying means may also be installed so as to allow processing of a workpiece (63-11) on the adjacent working table (63-7) as shown in FIG. 63.

d) When processing a bigger workpiece (64-3), it may be carried with more than one set working tables (64-2) driven synchronously as shown in FIG. 64.

e) Each of said working tables is provided with a driving motor or other driving element. Part of said working tables may, if necessary, be without driving means, and may be movable or non-movable.

f) A selected one or more than one set of said working tables may be provided with driving means which drags the rest of the working tables by means of an interconnecting mechanical interlocking means or workpiece.

g) A workpiece (65-3) may be carried by using the gravity point support method depending upon the size as shown in FIG. 65.

h) Said working tables (66-2) may be in equal or unequal size, or in different geometric shapes as shown in FIG. 66.

i) Among said coupled working tables (67-2), a mechanical interlock means (67-4) as shown in FIG. 67, or a workpiece (67-3) locking means as shown in FIG. 67 may be provided.

j) The means and methods mentioned in paragraph (6)(c) through (i) above may also be used for a lathe without the dragon-gate structure, the processing work being done by means of a working table group.

7) A synchronously coupled motion monitor switch means is used for the coupled motion working table in the processing system as shown in FIGS. 69 through 71. FIG. 72 shows said means being used with the working tables in parallel, of which the structure and operation are described in detail as follows:

a) A well-known mechanical-electric, photocell, or electromagnetic sensing switch is installed on the edge or at one side of the working table (72-2), and the installed position of said switch is adjustable.

b) A trigger means corresponding to said sensing switch mentioned in (a) above is installed on the edge or at one side of working table (72-2) opposite to that of working table (72-2) at an adjustable installation position.

A preferred feature is that there is a dead point between the two tables, and the two opposite sides are each furnished with a trigger point. When the working tables A and B are in synchronous and coupled motion, the sensing switch of working table (72-2) should be set at the dead point in said trigger means, except said two working tables are interlocked, so as to generate a sensing signal in the event of said two tables being out of synchronization because of the failure of the interlocking means between them; then, an emergency circuit will be triggered. FIG. 73 shows an embodiment of said means being installed in the multi-section type working tables. The operation and structure of said means are as follows. Between the working tables (73-2), an adjustable sensing switch and its corresponding trigger means are installed, and between said two means, there is a deal point, and both sides of the moving direction are set with trigger points. In case of said working tables (73-2) being driven out of synchronization, said trigger means will trigger said sensing switch so as to provide a control signal.

a) Automatic tool exchanging element:

In the conventional automatic tool exchanging means, there is a tool turret, a tool chest, etc. The automatic tool changing means of this invention not only can be fitted to the conventional tool exchanging means, but also possesses many new features as follows:

a) Two or more than two sets of tool exchanging and position exchanging arms (74-9) (74-10), and a corresponding tool chest (74-8) with a common tool spindle are provided. The features are that the supporting tools can furnish every tool spindle simultaneously, or each tool spindle may use one given set of tools in a specific sequence. One lathe may have a plurality of tool spindles, or the tool spindles of different lathes may commonly use a tool chest (74-8). In the processing system of this invention, one or more than one tool chest (74-8) may be furnished so as to support the need of the tool spindle group as shown in FIG. 74, and its flow chart is shown in FIG. 75.

b) The tool turret in this invention is an improved conventional tool turret. The unit not only has the conventional tool turret functions of angular rotation and locking up, but also has the features of positioning the coupling lock between the tool turrets (76-11), (76-12), (76-13) and the tool spindle driving structure, and of exchanging the tool turrets with each other through an exchanging arm (76-9), (76-10) after being unclamped from the spindle as shown in FIG. 76.

The flow chart of said tool turret exchanging operation is shown in FIG. 77. One feature of said means is that the currently used tools in a sequence process may be counted on one turret to simplify the tool exchanging operation, which is similar in nature to the microprogram in the computer software portion.

c) A tool chest motion type automatic tool exchanging device (ATC) which is directly driven by a direct type servo-means using a common base seal with the spindle tool turret as shown in FIGS. 78 through 79, is described as follows:

(1) The base seat structure may be a fixed lathe bed or a driven working table base installed on the lathe bed. On said base seat, a fixed seat for the spindle tool turret and the tool chest are provided.

(2) The spindle tool turret structure comprises one or more than one set of equal angle or unequal angle tool chuck means, and it may be driven with a motor or a fluid pressure means to rotate clockwise or counterclockwise, or to stop at a given position.

(3) One or more than one set of tool chests to be driven by a servo-means. One feature is that said structure may be installed on the lathe bed and is capable of receiving instructions for providing quantitative and reciprocating movement. On the lathe bed, a tool selecting or tool positioning and storing means able to rotate clockwise or counterclockwise and able to store specific tools, may be furnished. The exchanging procedures of said automatic tool exchanging device are shown in FIG. 78, in which "A" is the tool chest, $A_1$–$A_4$ are the stand-by tool posts of the tool chests, $K0$–$K5$ are tools, "B" stands for the tool post, $B_1$–$B_2$ stand for the tool spindle, "C" stands for the tool chest fixing seat, "D" stands for the base seat. The operational flow chart of said device is shown in FIG. 80.

The aforesaid tool chest may be designed into a tool chest system including plural sets as shown in FIG. 81. One feature is that said tool chest exchanges tools with the adjacent tool chest by means of its displacement or the automatic tool exchange arm. Another function of said system is that it may convert the rotary type tool chest into a multi-output position "ATC" system, of which a feature is that it will have two or more than two sets of exchanging arms so as to have a selected tool in the tool chest being exchanged with the other tool spindle or other tool chest. The flow chart of this device is shown in FIG. 82. Consequently, an economical tool chest system may be established.

9) Working table driving element: The synchronous and coupled driving method may be classified into types as follows:

a) Mechanical interlocking is performed by means of a mechanical means between two adjacent working tables, or external auxiliary connection means, and the screw or pressure means, or friction or known mechanical means, etc. so as to obtain mutual traction; an embodiment of which is shown in FIG. 67.

b) Interlocking by means of a workpiece is performed by means of placing a workpiece over two or more than two sets of working tables, and locking the workpiece in position as shown in FIG. 68.

In the aforesaid two types (9) (a,b), the driving structure of the working tables may be a separate hydraulic, pneumatic, or D.C. motor means. In using a D.C. motor, the armatures of the motors may be connected in series. Therefore, the load is equally divided by the motors involved, as shown in FIG. 83. FIGS. 84 and 85 show the embodiments in which a single driving motor and a clutch means are used for driving a single working table or multi-working tables with a coupled driving method.

c) Synchronous driving may be classified into two types, i.e., the feedback monitor type and the non-feedback monitoring type, and they are further described as follows:

(1) The feedback monitoring type: On the driving axle of the aforesaid D.C. motor set, a R.P.M. sensing generator is furnished as a comparator for feedback monitoring. Alternatively, the monitoring function is done by means of an encoder signal for synchronization comparison, or by means of a rotary or linear "Inductosyn" to generate a synchronous feedback signal.

(2) Non-feedback monitoring type: It is usually driven with A.C. or D.C. step motor.

d) The aforesaid feedback monitoring type or non-feedback monitoring type of driving method may, in addition to using a motor, be driven with hydraulic or pneumatic means. In using a common driving motor, the transmission elements to be used may include the known gear and clutch assembly, or the electromagnetic flexible eddy-current transmission distribution means, the belt, or other well-known transmission means.

10) Spindle driving system:

Owing to the repeated starting and stop operation, the requirements on starting efficiency, energy saving, and the brake means to stop the spindle have become more important. In addition to the known brake means, such as the A.C. motor, electric or hydraulic means, a new spindle motor brake means has been developed as shown in FIG. 86, which shows a D.C. motor. A feature of said D.C. motor is that the field iron core (86-2) is thicker than that of the armature (86-8), and the field windings (86-3) are axially overlapped multi-windings, of which each may be provided with an exciting control. The motor bearing (86-11) is an axial bearing which has the features of axial displacement and rotation. Since the length at both ends of said motor shaft has been suitably designed, the variation of exciting current applied to the axially overlapped field windings will cause the armature to make a corresponding axial displacement, which will generate the following functions:

a) Tool feeding during rotating, such as, for drilling or milling, etc.

b) Reciprocating motion during rotating, such as for boring or processing the rivet head.

c) To have the gear assembly mounted on said shaft generating a displacement so as to change the corresponding engaged gears to vary the output speed ratio. Further, it may make a micro or intermittent drive with a D.C. motor so as to prevent the gears from colliding with each other.

d) To obtain clutch or brake function by means of the axial thrust to push a friction piece.

e) To generate an axial vibration effect by means of controlling the current applied to the field winding and exciting winding, for removing the small metal wastes and reducing the cutting resistance.

11) A single driving system with auxiliary motor may be used in the tunnel type or dragon-gate type processing system in this invention, or with other mechanical spindle driving systems so as to overcome the drawbacks of the conventional spindle driving system, which is not quite safe during stopping as a result of large inertia. The new driving system of this invention comprises a suitably selected auxiliary motor (87-5) and a spindle motor (87-1), which are coupled together with a transmission means to form a driving motor assembly that can receive instructions from a "random" control device (87-11) so as to have said auxiliary motor (87-5) running as a generator during periods of no driving for the purpose of converting the mechanical inertial energy into electrical power to feedback to the power supply or to consume it in a given load, and simultaneously to obtain a regenerated feedback brake effect, or using it to run at low speed drive before changing gear, jogging rotation for positioning, as well as performance tests at low speed, etc. Said spindle driving system comprises as follows:

a) Spindle motor (87-1) is used for the driving system with its output shaft (87-10). It may be an A.C. or D.C. motor, or other suitable motors.

b) Auxiliary motor (87-5) is used for generating regenerated feedback or reverse torque for brake functions by means of changing the engaged gear, the functions of jogging rotation, positioning stop and performance test at low speed. This motor may be a multi-pole A.C. inductive motor or D.C. motor, or other motor suitable to this system.

c) Output shaft (87-10), which is used for driving the load.

d) The external brake means (87-2) for emergency stop. In case of emergency, it can receive the control instructions of a "random" control device (87-11) to provide a friction brake. This external brake means may only be provided if necessary.

e) Speed sensing means (87-14) converts the rotation speed into a signal which is input into the "random" control device (87-11), and said signal may be an analog signal, or an ON/OFF switch signal.

f) Random control device (87-11) is used for reception of external control instructions input by means (87-12), and reception of the signal from speed sensing means (87-14) so as to impose a corresponding control on the drive motor (87-1), auxiliary motor (87-5), and the external brake means (87-2), and to drive the speed gauge (87-13).

g) Speed gauge (87-13), which indicates the speed of said spindle.

h) Control instruction input means (87-12) can receive the manual operation instructions, or the instructions from other control means.

The functions of said system are as follows:

(a) If the auxiliary motor (87-5) is an A.C. multi-pole inductive motor, and when the speed ratio selected for the transmission means (between said motor (87-5) and the spindle drive motor (87-1) is providing normal speed output from the output shaft (87-10), the auxiliary motor (87-5) will run at a speed that exceeds its synchronous rotation speed so as to generate an inductive generator effect during operation as a brake means to convert said inertial motion into electric power for yielding brake torque. When said auxiliary motor (87-5) is at a low speed, the transmission means should be able to reduce the speed and increase the torque so as to provide said system with a performance test, or a low speed driving before a positioning stop, or a jogging rotation before gear changing, and to provide reverse torque for brake functions.

(b) If said auxiliary motor is a D.C. motor, the speed ratio selected for the transmission means (between said motor (87-5) and said spindle drive motor (87-1)) will be able to rotate said auxiliary motor (87-5) at a suitable speed so as to provide a generator effect upon being used as a brake means. Simultaneously, the power generated may be fed back to a power supply through an inverter, or consumed with a load; then, a torque for the brake function is provided. Upon running at a low speed to drive the system, the speed may be reduced through the transmission means so as to increase the torque for a low speed drive before a performance test, a positioning stop, and for the jogging rotation during gear changing. Further, it may provide a reverse torque for the brake function, and may be used as a D.C. generator when the spindle motor (87-1) is running, and may also provide a generated voltage that is proportional to the speed so as to drive the speed gauge (87-13).

c) As described in paragraph 11(b) above, the auxiliary motor may be used for low speed driving and jogging rotation by means of the auxiliary motor (87-5) controlled with the random control device (87-11) so as to generate low speed running and intermittent jogging rotation to smooth the gear changing and to reduce gear collision.

Further description will now be provided for embodiments:

Embodiment 1: A vertical type milling machine is provided with a spindle driving system, in which the spindle driving motor has four poles and ten horsepower, and it takes about 15 seconds to stop after being turned off. Now, said spindle driving motor is provided with an auxiliary motor having 24 poles and one horsepower so as to generate a related function through a "2:1" transmission system being coupled to said spindle driving motor. A speed sensing D.C. generator TG1 is coupled to the output shaft of said system to generate a signal proportional to output speed as a control reference and speed indicator. Further, a power-off external auxiliary electromagnetic brake means B1 is coupled to the spindle motor and is used for an emergency brake in case of the power supply being abruptly interrupted. A speed gauge SM1 is used for indicating the output speed of the spindle. FIG. 87 shows a block diagram of the control instruction input means and the random control means in said system. FIG. 88 shows the detailed schematic diagram in which the button switches PB1-PB8 from the instruction input means, and are described respectively as follows:

PB1, the push button switch to start the system;

PB2, the push button switch to stop the system;

PB3, the starting switch of the spindle driving motor;

PB4, the stop switch of the spindle driving motor;

PB5, the starting switch of the auxiliary motor;

PB6, the jogging rotation switch of the auxiliary motor;

PB7, the continuously jogging rotation switch of said auxiliary motor; and

PB8, the stop switch of the auxiliary motor.

The random control means comprises a set of electromagnetic switches M1-M5, a set of time delay switches TR2-TR3, a bridge rectifier BR1, and a rheostat R1, which are described respectively as follows:

M1, an auxiliary switch of the power supply;

M2, an electromagnetic control switch of the spindle driving motor;

M3, an electromagnetic control switch of the auxiliary motor;

M4, an auxiliary electromagnetic control switch of the auxiliary motor;

M5, an auxiliary electromagnetic control switch of the auxiliary motor for continuously jogging rotation;

TR1, a time delay switch for the regenerated power brake of the auxiliary motor;

TR2, a time switch for continuously jogging rotation of the auxiliary motor;

TR3, an intermittent time switch for continuously jogging rotation of the auxiliary motor;

BR1, a bridge rectifier used to provide the power supply for said power-off type of electromagnetic brake means B1.

The detailed operations of the aforesaid system are as follows:

(1) To start the system: Upon pushing down PB1 to apply the control power supply, M1 is "ON", and BR1 will convert D.C. into A.C. to actuate B1 to release the brake surface so as to let the system run freely. Simultaneously, the operation system will be turned on because of M1 being closed.

(2) To start the spindle: Upon PB3 being turned "ON", M2 is closed, and the spindle driving motor starts to run, driving the transmission gear to have the output shaft delivering an output. Then, TG1 coupled to the output shaft will generate a D.C. voltage corresponding to the speed, and through the rheostat R1, a speed gauge is actuated to give a corresponding speed indication. Simultaneously, TR1 will be actuated.

(3) Upon pushing down PBr, M2 will turn "OFF" to cut off the power supply of the spindle driving motor, but the system will continue to rotate because of inertia. Now, TR1 will have a delay action; then, the power supply will go through the contacts of TR1 and the normally closed contacts of M2 to close M3 so as to cause the auxiliary motor and to be out of synchronous rotation and to become an inductive generator, by which the inertial mechanical energy of the system is converted into power to be fed back to the power supply for the brake function. As soon as the preset time of TR1 is up and cuts off the power supply to cause M3 to turn "OFF", the power supply of said auxiliary motor will be cut off so as to have the system stopped naturally. The brake procedures are shown in FIG. 89.

(4) Upon pushing down PB5, M4 will turn "ON", and the auxiliary motor will continue to run.

(5) Upon pushing down PB6, M3 will turn "ON", and the reverse rotation of the auxiliary motor will be released. If M3 is "OFF", the auxiliary motor will stop. Therefore, the auxiliary motor may be driven for jogging rotation.

(6) Upon PB7 being pushed down, M5 will turn "ON", the power supply will be applied through the contacts of M5 and the normally closed contacts of TR2, to drive M3 to "ON" so as to actuate the auxiliary motor. Simultaneously, TR2 will be energized. When the preset time of TR2 is up, TR3 will cut off the power of TR2. Upon TR2 recovering its normal condition, M3 will turn "ON" because of being excited with magnetic force, and its normally closed contacts will cut off the power of TR3. In such a circular manner, the auxiliary motor will have a continuous jogging rotation so as to make easier the gear changing in the transmission means. Since the auxiliary motor has 24 poles, its low speed drive will avoid the collisions of the gear face.

(7) All kinds of rotations of said auxiliary motor may be stopped by pushing down PB8 to cut off the power supply and to have M3 turn "OFF".

(8) To make an emergency stop in the system, PB2 is pushed down to cut off the power supply and to have B1 generate the brake effect. Said procedures may also be used for normal stop.

The aforesaid embodiment is based on the operation of a milling machine spindle driving system. Therefore, the preset brake time is adopted as the brake time for controlling the auxiliary motor. Further, the system may naturally be stopped by cutting off the power of the auxiliary motor by means of the signal strength of the speed sensing means, during the time the system is put on brake, and when the auxiliary motor speed reduces to the synchronous rotation speeds. Between the power supply and the auxiliary motor, a transformer or a series reactance may be installed to adjust the strength of the torque so as to alleviate the brake effect.

Embodiment 2: FIG. 90 shows that a D.C. auxiliary motor with permanent magnet is used for the generator brake means. The detailed schematic diagram is shown in FIG. 91, in which M6 is a relay used for the generator brake effect. All the output functions, except the auxiliary motor being a stageless speed variation type, are the same as those of embodiment 1 above. The following table shows the various kinds of auxiliary motors and the various output types for the various functions:

| Types of auxiliary motor | Brake Method | External Brake means to be used | Functions | Suitable Occasions |
| --- | --- | --- | --- | --- |
| A.C. Multipole inductive motor | Regenerated power brake | If necessary | Regenerated power brake, low speed drive; jogging rotation | Heavy inertia with light friction, machine tool or the spindle or driving system |
| D.C. Motor | Generator brake | If necessary | Brake, low speed drive, | |

-continued

| Types of auxiliary motor | Brake Method | External Brake means to be used | Functions | Suitable Occasions |
|---|---|---|---|---|
| | | | jogging rotation | of industrial machine which need longer time to stop |
| D.C. Motor | Regenerated power brake | If necessary | Regenerated power brake, low speed drive, jogging rotation | |
| Permanent magnet D.C. Motor | Generator Brake | If necessary | Brake, low speed drive, jogging rotation | |
| Permanent magnet D.C. Motor | Regenerated power brake | If necessary | Regenerated power brake, low speed drive, jogging rotation. | |

12) A multi-function eddy-current coupled driving system may be used for driving the tunnel type or dragon-gate type processing system assembled with selective elements, or other machines. In the current driving device assembled with the motor and the controllable eddy-current coupled ring-shaped driving means, or E.C. motor (eddy-current coupling motor), the operation is controlled with an external output speed control means. However, in case of requiring the forward/reverse rotation output, the motor has to be stopped first prior to making reverse rotation. The procedures for making reverse rotation give rise to much inconvenience in operation, and wasted energy because the highly repeated changes of forward/reverse rotation output will cause the motor to have a high temperature. Further, since the characteristic of the motor is constant torque output, the torque at low speed is usually unable to meet the requirement. The system in this invention comprises one set or more than one set of controllable eddy-current coupled ring-shaped driving means, transmission means, feedback means, and external control means. It not only has the function of controlling the speed, but also can have a highly frequent forward/reverse rotation output under the state of the motor being continuously running, and can have the brake function as well. Moreover, said system may be expanded into a multi-output type system with a corresponding compensation effect to the increasing torque so as to facilitate driving the dragon-gate type machine tool, or the data controlled tunnel type processing machine, or the working tables of other machines, or other types of machines in other industries. The embodiment of said system is shown in FIG. 92 which comprises:

(92-1) Driving motor, which may be of D.C. or A.C. motor, or other well-known motors.

(92-9) Eddy-current coupled ring-shaped driving means.

(92-8) Eddy-current coupled ring-shaped driving means.

(92-3) The output gear of the driving motor.

(92-5) The input gear of the eddy-current coupled ring-shaped driving means (92-9).

(92-4) The input gear of the eddy-current coupled ring-shaped driving means (92-3).

(92-14) The coupling gear from (92-9) to (92-8) mentioned above.

(92-13) The drive shaft (92-9) mentioned above.

(92-15) The transmission gear of said eddy-current coupling ring-shaped driving means (92-9) to the output shaft (92-17).

(92-16) The gear of the output shaft (92-17).

(92-17) Output shaft.

(92-20) The speed-sensing means of the eddy-current coupling ring-shaped driving means (92-9).

(92-19) The speed sensing means of the eddy-current coupling ring-shaped driving means (92-8).

(92-10) The random control means of said system.

(92-2) The externally controlled brake means.

(92-18) The input means of control instructions.

The forward/reverse rotation output operation of said system is described as follows:

A. In said system, (92-10) upon receiving instructions of (92-18) will start (92-1), and will deliver a corresponding-speed driving exciting current to (92-9). At that moment, the rotation force will be coupled to (92-9) through (92-3) and (92-5) so as to have (92-15) driving (92-16) and (92-17) to generate output, of which the rotation direction is opposite to that of (92-1). In case of (92-18) giving instructions to (92-10) to convert the exciting current to (92-9) into a driving force, the rotation force will pass through (92-3) and (92-4), be delivered to (92-8) for coupling transmission to have (92-13) actuate (92-14), and (92-15) actuate (92-16), and to have (92-17) generate output, of which the direction is opposite to that of (92-1). Further, during the instant of forward/reverse rotation exchanging, the coupled torque yielded by the exciting current applied to the eddy-current coupled ring-shaped driving means in the later drive will yield a reverse brake effect to the original rotation direction. The exciting current will be increased slowly with proper control so as to prevent the system from malfunctioning. By the same token, the exciting current should be increased slowly during starting as shown in FIG. 93.

B. the brake methods of said system are described as follows:

(a) Upon (92-18) delivering instructions to (92-10) to stop the output stopping the drive of the motor, said (92-10) will cut off the original exciting current applied to the eddy-current coupled ring=shaped driving means, and at the same time, another eddy-current coupled ring-shaped driving means will be excited so as to yield a brake torque reverse to the original rotation direction. Upon the rotation of said system going to stop or having stopped, a sensing signal from (92-20) or (92-19) will be delivered to (92-10) to cut off the exciting current for stopping the system. If said system has a better stability and a non-strict brake requirement, the time for reverse direction brake torque may be controlled with a time preset circuit in said (92-10).

(b) Upon (92-18) delivering an instruction for discontinuing the driving motor and for applying a brake to the system, (92-10) will cut off the power supply of (92-1), and simultaneously excite (92-8) and (92-0) so as to have the gears in the transmission system lock up, and (92-8) and (92-9) will generate an eddy-current brake function.

(c) In case of being particularly necessary, the system may be provided with a mechanical type of friction brake means so as to have an external brake means in case of power off or other necessities of the system; said external brake means may be used with the means mentioned in paragraph 12B(b) above.

C. The system may be expanded to provide a multi-speed output range and compensation for its corresponding torque:

Said two functions may be performed by suitably distributing the transmission gear system, by using constant horsepower, two speeds, or multi-speed to drive the motor, and by applying forward/reverse rotation control to the drive motor under the possible tolerance of a time constant in the system so as to obtain a multi-output range in speed and a gradual increase in torque at the corresponding low speed as shown in FIG. 94. The method of said expansion is described as follows:

(a) If the speed ratio of (92-3), (92-4), (92-5) is 1:1:1, (92-13) versus (92-14) is 1:1, and (92-15) vs. (92-16), is 1:1, the output will be within the rated speed range and the rated torque for forward/reverse rotation.

(b) If the speed ratio of (92-3), (92-4), (92-5) is 1:1:1, (92-13) vs. (92-14) is 1:2, and (92-15) vs. (92-16) is 1:1, the speed range through (92-8) will be equal to ½ that through (92-9), and the torque will be two times. The output through (92-9) is within the rated speed range as well as the torque.

(c) If the speed ratio of (92-3), (92-4), (92-5) is 1:1:1, (92-13) vs. (92-14) is 1:2, and (92-15) vs. (92-16) is 1:1, through the system time constant the forward/reverse rotation output.

(d) If the speed ratio of (92-3), (92-4), (92-5) is 1:1:1, (92-13) vs. (92-14) is 1:1, and (92-15) vs. (92-16) is 2:1, when the drive motor is running at a double speed and the rated horsepower motor at the rated speed or at twice the rated speed, the output speed range will be rated range and ½ the rated range, and the output torque will be the rated torque and twice rated torque of the forward/reverse rotation output.

(e) If the speed ratio for (92-3), (92-4), (92-5) is 1:1:1, (92-13) vs. (92-14) is 1:2, and (92-15) vs. (92-16) is 2:1, when the drive motor is running at double speed and the rated horsepower motor at the rated speed and twice the rated speed, the output speed range through (92-8) will be ½ rated speed range and ¼, and the torque will be twice and four times that of the rated torque. The output speed range through (92-9) will be the rated speed range and ½ the rated speed range, and the torque will be the rated torque and twice the rated torque.

(f) If the speed ratio of (92-3), (92-4), (92-5) is 1:1:1, and (92-13) vs. (92-14) is 1:4, and (92-15) vs. (92-16) is 2:1, the drive motor will be at rated speed and twice rated speed of the dual speed and rated horsepower motor. The system time constant will permit the application of the forward/reverse rotation control of the drive motor, and the output speed range will be rated output speed range and ½, ¼ and ⅛ of the rated output speed range, and the output torque will be the same for the rated torque.

D. The aforesaid rated speed ranges in paragraph 12C above are the output speed ranges of (92-1) shown at the output terminals of (92-3), (92-4), (92-5) and (92-8), (92-9), and the rated output torque is the output torque.

E. The expansion of the output range and the corresponding compensation of the output torque may be obtained by changing the speed ratio of gears, increasing the gear train, increasing the speed range of the drive motor, and by furnishing more sets of eddy-current coupled ring-shaped driving devices.

In mechanical driving systems, all the brake or switching means, except the regenerated feedback brake means, will have thermal energy converted from kinetic energy loaded on themselves, such as the mechanical friction type brake means, the electromagnetic driving friction type of brake means, the A.C. motor generated power brake means, and the eddy-current brake means similar in theory to the eddy-current coupled ring-shaped drive means of this system, etc. Further, the switching means being combined with electromagnetic friction type of clutch and related gear train may be used for forward/reverse rotation output, or a three-phase A.C. induction motor may be used for forward/reverse rotation and reverse brake, or an A.C. servo-motor may be used for forward/reverse rotation drive, or a D.C. motor may be used for forward/reverse rotation. All non-regenerated power brake means have to convert the inertial motion energy into thermal energy, which will be absorbed by themselves. Therefore, such types of brake means must have better radiator means, such as the well-known air cooling, air blowing cooling, and water cooling means to prevent such brake means from being damaged by high temperature.

Now, a comparison may be made between this system and the aforesaid means that is similar in nature to this system by having a motor in continuous running and using an electromagnetic friction type of clutch together with the related gear train to switch the output direction. The function of said clutch is equal to that of the eddy-current coupled driving means of this invention, and is also the same in absorbing the thermal energy converted from the inertia motion energy as a result of direction switching. During output direction switching, the thermal impact loaded to said eddy-current coupled drive means and the impact on the transmission means may be improved by means of cutting off the original drive direction exciting current of said eddy-current coupled drive means and by providing a gradually increased exciting current to drive the eddy-current coupled drive means later. The coupled torque will vary with the strength of the exciting current, and appropriate control of the exciting current will get a smooth and mild reverse torque so as to alleviate a thermal impact and to prevent causing an instant high temperature, and to obtain a mild direction switching to avoid an impact effect on the transmission means such as the gear surface, which may cause the whole system to shake and affect mechanical precision. In such a case, the switching time may take several decades of multi-seconds or several seconds at the most, but it still can satisfy the requirements for practical use, such s to drive a sugar cane rolling machine for Taiwan Sugar Corporation, or a machine tool of the dragon-gate milling machine. The choice between the impact strength and the time delay may be judged in accordance with the switching frequency, it may also be determined by the control instruction input means.

Summing up the aforesaid descriptions, the advantages of this invention are described as follows:

(1) Upon providing a continuous forward/reverse rotational output, the thermal energy converted from the inertial motion energy in the original running direction may have to be loaded to the eddy-current coupled drive means rotating in other direction, but the random control device of this system can deliver a controllable and slowly increasing exciting current into said eddy-current coupled drive means to generate a gradually increasing reverse torque and to prevent the eddy-current coupled drive means from suffering instant high temperature and causing damage. Since the two sets of eddy-current coupled drive means in said system are used alternately, the thermal energy converted from the inertial motion energy will be shared by said drive means on a fifty-fifty basis. The coupling ring or disk in said eddy-current coupled drive means bears the heat of eddy-current loss and is made of heat-resisting metal (usually, copper or aluminium). In case the coupling ring is to be used for high frequency switching operations, a piece with a higher safety co-efficiency may be designed so as to withstand the high temperature, or a suitable radiation means should be provided.

(2) The output speed range of said system may be expanded by varying the related gear speed. For instance, the output speed ratio of a general "EC" motor is 1:10. This system may, if necessary, be expanded, and an increase in corresponding torque may also be obtained. Since the output efficiency at low speed of a general "EC" motor is very low, the expanded low speed output in this system will be improved considerably.

(3) In comparison with a system which uses the maximum number of motors in continuous running, and uses the electromagnetic friction type of clutch incorporated with the related gears for switching the output direction, this system will only have 65% cost by using a 40-horsepower dragon-gate planning machine drive system as an example, this is economical.

(4) This system using a non-friction type of driving system has a lower trouble ratio but higher reliability in operation.

(5) This system also has lower noise, which is an important requirement in heavy machinery. Since this system has many features, and low cost, widely practical uses, and is reliable in operation, it is an eddy-current coupled drive means to be used for generating power and brake functions with higher efficiency and durability so as to improve the "EC" motor. This system has two types of structures:

First Type: The "TG" of the "EC" motor outputs shaft is used as a power means. In particular, the capacity of said power "TG" should be above 1/50 of the capacity that is used for driving the "EC" motor. Upon the eddy-current coupled power supply being cut off, said means may continue to rotate by means of the power "TG" coupled to the load inertia. Simultaneously, the voltage generated by the power "TG" may be delivered to a resistance type of load for resistance type of generated power for the brake function, or delivered to a synchronous feedback means for feeding back to the power supply to generate the brake function.

Second Type: At the output terminal of said "EC" motor, a multi-pole A.C. induction winding is installed. During stopping, the induction winding is connected to the power supply so as to have it, under a high speed state, reduce the rotation speed of a multi-pole motor, and then cut off the input power supply to have the system stopped naturally.

Now, this embodiment is further described with the following embodiments by referring to the Figs. attached:

Embodiment 1: An "EC" Motor having a resistance-load generated power brake function as shown in FIG. 95 comprises a known "EC" motor, power "TG", a brake resistance and a control circuit. Upon said "EC" motor running under normal condition, the normally open contacts of MS1 are closed, while the normally closed contacts of MS 1 are open. "TG" functions as a speed sensing control means. Upon the normally open contacts of MS1 being open, the exciting power supply of the eddy-current coupling means (95-2) is cut off; at the same time, the normally closed contacts of MS 1 are closed, and the power "TG" will generate power by using the inertial rotation of the output shaft (95-3) input to the low resistance $R_1$ for the brake function. Said design may have the "TG" modified into a big power D.C. "TG" as shown in FIG. 96. FIG. 97 shows an embodiment having an A.C. generator and brake means combination.

Embodiment 2: As shown in FIG. 98, said embodiment comprises a known "EC" motor, the power "TG", and a regenerated feedback control circuit. Upon the normally open contacts of MS1 being closed and the normally closed contacts of MS1 being open, the "EC" motor runs normally. Upon the normally open contacts of MS1 being open and the normally closed contacts being closed, the power "TG" will, through rectifier, charge to "C". Upon the power supply being in the half-positive cycle, the power of "TG" will, through $Q_1$ and $Q_2$, feedback to the power supply by means of the secondary coil of the transformer. Upon the power supply being in the negative half-cycle, the output of "TG", after being rectified, will charge "C" for the brake function. As soon as the output shaft (98-3) stops, the "TG" has no power output. $Q_1$ and $Q_2$ are triggered and controlled by a photocell coupling means that is synchronous with the positive half-cycle of the power supply. During the positive half-cycle, $Q_1$ and $Q_2$ are in a conductive state, and they will be cut off during the negative half-cycle. The powered "TG" in the embodiment may be put in D.C. powered "TG" instead of A.C. powered "TG" without changing its brake function.

Embodiment 3: A multi-pole A.C. induction motor/generator brake type of "EC" motor is used in a different way as shown in FIG. 99, it comprises a known "EC" motor, an inductor at the output shaft (99-3) functioning as "TG" and a multi-pole A.C. induction motor, and the brake control circuit. The stator of said inductor at the output shaft (99-3) end of "EC" motor is an A.C. stator winding (99-6), and the rotor (99-7) consists of a part o a squirrel-cage winding and a specific permanent magnet (99-8). Before the power supply is applied, said permanent magnet (99-8) makes the stator of said inductor operate as an A.C. "TG".

The aforesaid eddy-current coupled drive means of the "EC" motor is a preventive circuit for wrongful starting operation and a means to elevate the high speed rotation efficiency. The normally closed contacts at the low setting speed are coupled to a speed setting potentiometer and are connected in series with the starting push button so as to make sure that the starting speed must be at the lowest speed to ensure a correct starting sequence. Further, the method of elevating the high speed running efficiency may be done by means of both the output and the input ends of an electromagnetic, fluid pressure or manual drive clutch means, being coupled to the eddy-current coupled drive means respectively through transmission means so as to directly deliver the output for preventing eddy-current coupling loss.

13) A servo-motor with pursuit step motor function used for driving and control purpose, and is especially good for the dragon-gate type of planing, and milling machines, and any operation which needs heavier horsepower output.

In the past, the large horsepower A.C. motor used for precision drive could not do the job freely because of its size and parts. The design in this invention will provide a mini-drive system that not only has a low cost, but also can provide considerable precision drive, and it is specially superior to large horsepower output devices.

As shown in FIG. 100, the embodiment comprises a step motor to control a known D.C. motor so as to form a pursuit running on a synchronous basis; it is further described as follows:

(100-1) A stator consists of the field iron core and the winding of the step motor for the control function.

(100-2) The rotor of the step motor.

(100-3) The winding of the D.C. motor. It may be a known winding, or a multi-set or divided set type of exciting winding in a sequence lap-winding manner.

(100-4) The armature of the D.C. motor may be a shunt excited with a separate power supply, or connected with the field winding as a series exciter or as a compound exciter.

(100-5) The brushes or the armature slip ring.

(100-6) The slip ring of the armature.

(100-7) The brushes of the step motor.

(100-8) The slip ring of the step motor.

(100-9) The commutator of the armature.

(100-10) The brushes of the armature commutator.

The aforesaid step motor and the D.C. motor are coupled with the same shaft. The stator (100-1) of the step motor and the D.C. motor output shaft are connected with a bearing that can be slid freely. The embodiment includes the slip ring of the power supply for the step motor winding, the power input slip ring for the armature (100-4) and the D.C. motor, and the brush assembly (100-10) coupled to the commutator (100-9).

In a normal state, the step (or stepper) motor is a holding condition because the polarity of the poles on the surface of the D.C. motor armature is contrary to the field. The drive procedures are as follows:

(a) In the still state as shown in FIG. 101, the armature of the D.C. motor and the poles of the field are opposite to each other in polarity and therefore hold each other.

(b) Upon the stepper motor rotating to a certain angle, its stator will actuate the brush of the D.C. motor to rotate to an angle simultaneously, as shown in FIG. 102.

(c) Once the originally balanced magnetic force of said D.C. motor is twisted, it will generate a force to cause the rotor to return to its normal position. Owning to the stepper motor being in a holding state, its stator will also be driven to move the brushes to the original position and have the D.C. motor again restored to the balanced holding condition. Thus, the angular displacement and the speed of the D.C. motor may be controlled by means of the drive to said stepper motor. The rotation characteristics of said D.C. motor are similar to that of a synchronous machine as shown in FIG. 103.

By using the aforesaid operational theory, an electromagnetic brake may be installed between the stators and the rotor of an auxiliary D.C. motor which is designed to have a small horsepower so as to generate a function the same as that of the stepper motor. However, it must drive an angular displacement within the width of a magnetic pole after the armature power is cutoff; then, the brake means is energized to have the stator and the armature of said auxiliary D.C. motor locked, and then apply power to the armature of the D.C. motor to cause it to be driven to a given angular displacement. If a suitable mechanical structure together with a brake assembly is used, it will have the same result as that of a mammal drive means.

In said design, if the armature exciting current is directly applied to the slip ring from the brush, and if the field is a multi-set or divided set type of exciting winding in a sequential lap-winding configuration, and when the pole number is varied with a control system to have a different number from that of the rotor, a pursuit stepper motor function the same as that of a stepper motor may be generated with the same control to the aforesaid auxiliary motor. Moreover, by appropriately changing the pole axis of said field, said motor may be operated as a normal D.C. motor.

In said motor, if the exciting method of the armature uses the slip ring and the commutator simultaneously, D.C. power will be applied to the commutator for the D.C. motor drive, and an A.C. output with variable voltage and frequency will be delivered from said slip ring.

FIG. 104 shows another embodiment of said electric device, in which the output motor is subject to the coupling control of a stepper motor, an auxiliary D.C. motor, or manual operation, and is running in a synchronous pursuit or stepper manner.

This embodiment is further described as follows:

(104-1) The power input slip ring of the stepper motor,
(104-2) The corresponding brush,
(104-3) The field stator of a multi-set or divided set type of exciting winding in sequential lap-winding configuration, and the power input slip ring and the stator of the stepper motor are mounted on one shaft into one assembly, (104-4) The commutator of the stator winding of said motor, (104-5) The brush commutator in a fixed configuration, and the lead wire of the brush is connected to (104-6), the slip ring, (104-7) The commutator of the rotor of said motor, (104-8) The brush to be used for funning as a conventional motor, (104-9) The input slip ring of the rotor of said motor, and is used for stepper motor running;

(104-10) The corresponding brushes, (104-11) The armature, (104-12) The output shaft, (104-13) The stator of said stepper motor, (104-14) The rotor of said stepper motor.

The operational theory of this embodiment is described as follows:

1. In the static state, the stator and the rotor of said stepper motor are locked in a position. The D.C. armature after being energized with input D.C. through the slip ring will also be locked with the stator of said motor, and the polarity and the position of the brush are as shown in FIG. 105.

2. Next, the stepper motor is driven to a given angular displacement, θ°, and the stator brushes of the lap-winding type of field are moved to an angular displacement, θ°, clockwise as shown in FIG. 106; then, the neutral line of the stator field polarity is also moved clockwise to an angular displacement, θ°.

3. In accordance with the theory of the motor, the D.C. armature will also rotate clockwise to a given angular displacement, θ° so as to have the rotor field and the stator field coincident but in reverse polarity as shown in FIG. 107. By the same token, the D.C. armature will rotate in the synchronous pursuit manner in accordance with the control of the stepper motor, and said rotation is similar to the characteristics of a synchronous motor.

In case the pole number of said field is different from those of the rotor with a suitable number of poles, said motor will, upon being controlled by the auxiliary motor, generate a synchronous pursuit function the same as the characteristics of a stepper motor.

In the aforesaid D.C. servo-motor having the step pursuit function, the motor is driven with a given current and a better frequency response will result. The said function may also be generated by means of a field having a multi-set or divided set type of exciting winding in sequential lap-winding configuration with variable pole number and axis, or by means of a field winding having a tooth-shaped iron core and ring-shaped winding with variable pole number and axis.

The wiring between the armature and the field winding in the aforesaid D.C. motor having the step pursuit function may be connected in series exciting, shunt exciting, or compound exciting fashion. Since its characteristics are similar to that of an A.C. synchronous motor, the smaller the θ angle between the field pole and the rotor pole, the smaller the torque will be. Therefore, upon starting or stopping for forward or reverse rotation, there is a dead angle before overcoming the load friction. This drawback does exist in the known synchronous motor, the brushless motor, and the stepper motor. Said dead angle may be removed in this invention by means of varying the exciting current and the polarity of the windings in the lap-winding field so as to generate a compensated displacement upon the field pole axis making forward/reverse rotation. Said field pole axis displacement may also be used for driving the rotor to rotate in a micro step manner at a small angle. The aforesaid compensation method may be obtained by adding a tolerance compensation value during the input of instruction data to drive the auxiliary stepper motor. Further, the motor of said design may be driven with A.C. or D.C. power supply when the field winding and the armature winding are connected in series.

The said design may also be applied to an A.C. motor. In the configuration, an A.C. and D.C. series repulsion stepper motor operating by means of the polarity relations of A.C. or D.C. power applied to stator (108-04) and rotor (108-6) to generate a servo-step function, and its structure is shown in FIG. 108. The major difference between the design in this invention and the conventional D.C. stepper motor is that the exciting A.C. or D.C. power of the rotor (108-6) in this invention is delivered through the slip ring (108-8), and the rotor exciting winding is connected with the stator winding (108-5) in series (shown in FIG. 109) through the step-drive polarity commutation switch. Thus, the polarity relation to the stator and the rotor connected in series may be varied together with the power supply without affecting the attraction effect between poles. Moreover, the polarity relation may be varied by sequently commutating the stator winding (108-5) and by applying A.C. or D.C. power through the polarity sequence commutation switch connected in series between the stator and the rotor, and the truth table of said commutation for the step function is shown in FIG. 110. Further, the use of said repulsion stepper motor may include the known multi-stage and over-lapped type. FIGS. 111 through 114, show another embodiment and the control circuit thereof.

14) A magnetic coupled driving device with self-exciting and self-generated power and transmission functions is described as follows:

The input shaft of said device is coupled to the mechanical shaft (115-1) of a D.C. or A.C. motor, or other rotation means, or to an engine, windmill, or watermill, and the output shaft (115-12) of said device is used for delivering output at various speeds such as synchronous, or faster, or slower speed. By means of an electric control switch, said input or output shaft may be connected together, or disengaged from each other, i.e., like a clutch operation. The embodiment of said device is shown in FIG. 115, and has as a feature is by using generated power damping for coupling, and its comprises:

(1) One set of more than one set of shaft or wheel means for rotating driving input or output. One end of said device is provided with a permanent magnet or extended D.C. excited field, which has one or more than one set of slip rings (115-3) and a brush set (115-4). Said brush set (115-4) is separately provided with the brush holder set and the related parts, which are used for the input of the exciting current of the field, and for the input or output of the current of the following armature winding. The other end or both ends of said device are furnished with terminal cases, axles, and bearings so as to mount an armature winding (115-9) and rotor (115-8) that may either generate power or may be driven with electricity. On said rotor, a commutation brush set is furnished to couple the commutator segment set (115-10) of said armature.

(2) One or more than one set of armature winding rotor (115-8), which may be a tooth-shaped iron core armature and printing type or cup-shaped rotor, or a rotor without a slot but with a lap winding, a wave winding or frog leg winding; it may be connected with the field winding (115-7) in shunt excitation, series excitation, or compound excitation. The commutator segment (115-10) of said rotor is coupled to the said field structure. The shaft of said rotor is opposite to the input or output end of said field structure. Another feature of said rotor is that its output shaft (115-12) end is furnished with a separate induction D.C. or A.C. speed sensing generator, or a photocell electro-magnetic type of angular displacement sensing means so as to obtain a direct proportional signal to the output speed. The fixed end and the rotary end of said means may respectively be installed on the input end and the output end so as to obtain a direct proportional signal to the rotation difference by means of a slip ring and a brush set.

The coupling and speed output function of the aforesaid device may generate a coupling torque by means of the generator effect, or use a mixture of both to attain the goal. The output control method of said device is as follows:

When coupled by means of a generated power for self-excitation, a switch means may be connected between the slip ring or slip disk brush input terminals and the commutation segment brushes of the armature for coupling or decoupling control. The switch may also be connected in series with a variable resistor or a feed back-to-power supply synchronous current transformer to adjust the feed back so as to vary the speed. By means of a thyristor, such as TG, or SCR, or other mechanical-electric switches, said devices may have a chopper type of output speed variation. Further, by means of the feedback comparison of the aforesaid speed sensing means, it may generate a preset linear or non-linear speed output. Another feature of said device is that D.C. having a plus polarity to the generated power is applied as input so as to elevate the starting frequency response and to obtain an output speed higher than that of the input shaft. By means of a mechanical or electro-magnetic brake means to lock the input shaft, it may operate as a motor, or by means of applying a reverse polarity D.C. power supply, the output speed of the output shaft may be lowered. The coupling torque of said coupling device may also be obtained by controlling the current in the armature winding, of which the characteristic are shown in FIG. 116.

The aforesaid rotor may have an A.C. winding with the same number of poles as those of the field as shown in FIG. 117, and its feedback may be adjusted by adding a series resistor or a synchronous current transformer which can feed back to the power supply so as to control the speed of the coupling output shaft as shown in FIG. 118; or it may obtain an approximate synchronous rotation output speed by means of a short-circuit method that generates a squirrel cage rotor function; or an input current is applied so as to obtain a synchronous drive the same as that of the synchronous motor.

If the prime mover of this design is an engine, said engine will be caused to run at its best performance. If this device is mounted in series with the output shaft of an engine, it may be used as an output speed regulator. Further, the coupling torque of this device may be controlled by means of the current amount and polarity being applied to the field excitation.

An inertial motive energy and proportional transmission means comprises a generated power self-excitation and speed varying electro-magnetic coupling transmission means, or other mechanical and electro-magnetic clutch means, and flywheel, etc. as shown in FIG. 119. Its structure is described in detail as follows:

(119-1) A driving input shaft, which is to be driven with a motor, or other rotary driving means, such as engine, watermill, and windmill, etc.

(119-2) Clutch means, of which the input end is to receive the input of the input shaft (119-1), and the output end is provided with an inertial flywheel (119-3).

(119-3) Flywheel, of which he other end of the spindle is connected to the input end of another clutch means (119-4).

(119-4) The clutch means, of which the input end is connected to the inertial flywheel (119-30, while its output end is connected to another flywheel (119-5).

(119-5) The flywheel is installed at the output end of the clutch (119-4), and the mass of said flywheel (119-5) is equal to "X" times that of the inertial flywheel (119-3), and its spindle is used as an output shaft (119-6).

(119-6) The output shaft.

(119-7) The source of drive may be a motor, engine, watermill, or windmill which are all well-known driving means. The operational sequence of said device and the transmission cycle of the drive dynamics are as follows:

When the input shaft starts to rotate, the clutch (119-2) will be "ON" to have the flywheel (119-3) rotate up to a speed nearly synchronous to the speed input of the input shaft (119-1). Then, the clutch means (119-2) turns "OFF" and the clutch (119-4) turns "ON", and simultaneously the drive dynamics of flywheel (119-3) are coupled to the flywheel (119-5). Then, the speed of flywheel (119-3) goes down, while the speed of flywheel (119-5) goes up and will reach a stable speed equal to 1/x+1 of that of flywheel (119-3). Then, clutch (119-4) turns "OFF", while the clutch (119-2) turns "ON" to start another cycle. The speed of said device may be regulated by varying the opening and closing time so as to have the transmitted quantity of the intertial dynamics obtain a pulse type transmission. A further feature of said device is that, between the flywheel and the spindle, a flexible transmission means without bayonet joint or pin is furnished, and said means may be a metal coil spring, of which the inner end is connected to the spindle, while the outer end is fixedly attached to the inner hole of said flywheel. Between the flywheel and the spindle, a freely rotating bearing is provided so as to obtain a flexible coupling for minimizing the pulse transmission effect. Said means may be two or more than two sets, either in series or parallel, being installed for different time sequence transmission so as to minimize the pulse effect.

15) A high frequency response brake method with flexible transmission means will be described as follows:

This method is used for alleviating the peak inertia value during starting and braking so as to provide a higher frequency response braking function. The structure mainly comprises: (shown in FIG. 120).

(120-1) Driving motor.

(120-2) The transmission system.

(120-3) The flexible transmission means, which may be a well-known flexible transmission structure, such as a structure with mechanical flexibility, or fluid compression flexibility, etc.

(120-4) The output shaft of the flexible transmission means.

(120-5) The brake means, which may be hydraulic, pneumatic, or electromagnetic driving means coupled to the output end of the flexible transmission means mentioned in (120-3) above.

(120-6) The driving gear.

(120-7) The rack gear coupled to the working table.

(120-8) The working table.

The functions and the features of said device are as follows:

(a) Starting function: The driving function is started with the drive motor (120-1) applying power through the transmission means (120-2) and the flexible transmission means (120-3). At that moment, said flexible transmission means (120-3) will apply gradual accelerative torque to its load so as to have a moderate starting.

(b) The function of high frequency response brake operates as follows: When stopping the system during its running, the power supply of motor (120-1) is cut off and simultaneously the brake means (120-5) is driven. Now, in the total inertial force received by the brake means (120-5) at that instant, the portion received by the rotor of the motor and the transmission means will have a little delay because of the flexible effect. Thus, the peak inertial force of the system received by the brake means at that instant will be alleviated, and the brake means will slide so as to have a shorter braking time as shown in FIG. 121.

16) A positioning system being set with an accumulative analog feedback signal, and the structure of said positioning system is described, by referring to FIG. 122, as follows:

(a) Driving motor, which is an A.C. or D.C. motor to be used for rotary drive.

(b) Speed sensing generator, which may be a D.C. or A.C. generator able to generate an analog or digital signal in direct proportion to the rotation of the driving motor.

(c) An analog signal integrating circuit, which is used for accumulating the analog signal, corresponding to the driving speed, into the integrating capacitor, and for delivering said signal to a comparator amplifier.

(d) Setting, comparator, and control circuits, which comprise a rheostat to generate a potential to be coupled to a linear comparator and an amplifier for comparison with the integrated signal for generating a corresponding output to timely drive a control relay. The said setting and comparison method may also be converted into a digital value by processing the voltage in said integrating capacitor with an A/C converter. The setting method may also use a digit value, which is to be delivered to a digital computer so as to generate a digital signal for control purposes.

(e) The driving circuit of the driving motor comprises electromechanical parts and solid state switches so as to receive the instructions from the control relay for starting and stop functions.

(f) The generated power braking (or dynamic braking) circuit of the driving motor comprises an electromechanical or solid state switch connected in series with a resistor and connected in parallel with both terminals of the armature. Upon receipt of braking instructions, the said switch will be turned on so as to generate power for the braking function.

The operation of said device will be described as follows:

Push the starting button to turn on the device, and $MS_1$ turns on to have $Q_2$ conducting and $Q_4$ cut off. Now, the motor starts to run, and TG will generate a voltage corresponding to the speed to charge $R_1C_1$ in an integrating charging manner. As soon as the voltage across $C_1$ is equal to the prest voltage on $VR_1$, $Q_5$ will be cut off, and $Q_6$ will become conductive to actuate $MS_2$ which will cause $Q_2$ to cut off, and $Q_4$ to be conductive to start the dynamic braking. Simultaneously, $MS_1$ is cut off to have $C_1$ discharged. If the driving power of the motor is A.C. to be rectified through a D.C. power supply, said circuit will generate a given width sample signal by means of a zero or a valley point sensing circuit and time base (sweep) circuit when the counter-EMF is higher than that of the power supply, and said sample signal will go through an opto-electronic means to drive $Q_7$ so as to pick up a sample of the counter-EMF from the armature for a control reference and for preventing using a speed sensing generator. The embodiment of said device is shown in FIG. 123.

Since the aforesaid positioning circuit is operated with the analog integrating method of the voltage charged to the R.C. circuit, its operation counter is based on such a condition that the counter-EMF of the tachogenerator or the armature must constantly be higher than the voltage across said integrating capacitor during running. Consequently, the selection of said B.C. values is a requisite condition in limiting the running time and the speed variation range during running. Another embodiment of said system that may break through said limition is the digital type of sampling and accumulative method as shown in FIG. 124, of which the main structural components comprise:

(a) A/D converter: It will convert the counter-EMF voltage of the tachogenerator or the armature into a digital signal, and deliver it to the CPU.

(b) Value setting means: It is used for generating a value setting signal, and it may be a digital switch, numeral push-button, photocell, or magnetic data card, or potential type signal, which is then delivered to the CPU.

(c) Time sequence circuit: It will provide a reference of operation cycle for said CPU.

(d) CPU: Upon delivery of the sampling cycle, it will accumulate the instant values being delivered to the A/D converter comprared with the setting value. When the two comparing values are equal or exceeded for the first time, a corresponding output signal will be generated to control the driving motor.

17) A non-contact synchronous driving stepper type of setting control means is described as follows:

It is a sensing means to be coupled to a rotary displacement or a linear displacement mechanical means for generating a digital sensing signal which will go through a related signal processing means to drive a setting stepper type of electromagnetic setting control means so as to obtain a high frequency response function in order to increase the serviceable life.

The function of the conventional mechanical setting means such as an electromagnetic counter is often limited because of its frequency response and mechanical life factors. For instance, the maximum time setting of the timer of a general synchronous stepper motor is always limited in a constant range because of the limits of the gear assembly. The design in this invention has eliminated the aforesaid drawback by means of a non-contact synchronous driving stepper electromagnetic means and the related setting means so as to obtain high frequency response function and to increase its serviceable life. In said design, the cup-shaped rotor and the printing type of stepper motor are the example for improving the frequency response. Further, the flat-plate-shaped rotor having an encoder function has the advantage of saving space to lower the basic cost. Moreover, said design uses photocell or electromagnetic coupling means for obtaining synchronous transmission, and also is added with other related means so as to form a stepper setting control means, as shown in FIG. 125, of which the structure comprises:

(1) Photocell sensing means, which includes four pairs of photocell coupling means (or optical coupling means).

(2) Encoder, of which the structure is shown in FIG. 126; of course, it may be composed in other ways.

(3) Optical circuit, which, after receiving the signal of the photocell sensing means, will directly generate a signal for the driving circuit.

(4) Driving circuit, which is a stepper motor being driven by the signal from the optical circuit.

(5) Setting means, of which the structure is shown in FIGS. 127-A and 127-B, and which uses the contact stop and the limit switch or other parts having a position sensing function to generate the sensing signal to be coupled to the preset and reset.

(6) Individual zero setting means, which receives the reset instruction separately from the setting means. Upon the zero setting sensing element of the setting means sending out a signal, this means will discontinue to drive the stepper-motor type of counter.

(7) The main drive control unit, which, in addition to receiving external control, will receive controls from the preset "AND" circuit and from reset and the reset "AND" circuit. Upon the preset "AND" sending out a signal, this control unit will have the main drive motor stop running. Upon the reset "AND" sending out a signal, said control will prevent the main drive motor from receiving external control as soon as the reset period is over so as to stop running. Upon said reset "AND" sending out the signal again, said control unit will remove the reset instructions so as to continue receiving the external control.

(8) Stepper motor driving circuit operates upon receipt of instructions from reset and the reset "AND". Upon the reset sending out a signal, this circuit will generate a signal that drives the stepper motor. As soon as the reset "AND" sends out a signal, the supply of said driving signal will be discontinues.

(9) The external reset—preset selection circuit is included in he external control circuit, and is used for selecting the instructions of reset or preset.

(10) The main drive means is installed in the aforesaid mechanical loads and which may be a D.C. or A.C. servomotor, a stepper motor, or other rotary means such as a shaft or wheel, etc.

(11) The external control unit is used by the operator to manipulate this system.

(12) The stepper motor is used for position sensing or counting numerals. Since it has very small load, a stepper motor having very small horsepower and torque may be used. In this embodiment, the specifications of the small stepper motor is 8 OZ-IN 200 pulses.

The operation of this embodiment is described as follows:

If this system controls the motion of the working table for positioning, the momentum of said main drive motor, after being coupled with gears, should be converted into R.P.M. of the motor, i.e., 1210¼ R.P.M. The converting encoder selected is four pulse signals for R.P.M., and then, among the three contact steps of the preset sensing means, the position of the first preset contact stop (the one being most close to said main drive motor) is equal to the R.P.M. of said main drive motor divided by 50, i.e., 1210¼+50=24 41/200. Then, the position should be adjusted to a point from where the stepper motor starts to rotate 41/200 away from the cardinal point (zero point). The position of the second preset contact stop is equal to the quotient obtained when calculating the first preset contact stop position divided by 50, and the answer of the calculation is 24/150. By the same token, the position of the third preset contact stop is zero (the cardinal point). Then, the Reset—Preset selection means is set at the Preset position, and is controlled with the external control unit so as to have the main drive motor rotate to drive the working table to the first preset sensing means. Whenever said main drive motor rotates one revolution, four pulse signals will be generated. The sensing means of the second preset, whenever the main drive motor rotates 50 revolutions, also rotates one revolution and sends out four pulse signals. Since the contact stop of the sensing means of the third preset is set at the cardinal point, as soon as the main drive motor starts to run, a signal will be sent out. As soon as the various sets of said sensing means all pick up a signal to form a preset "AND" circuit, and send out a signal, the control unit of the main drive motor will receive an instruction to cause said main drive motor to stop running. At this moment, the momentum of the working table is the point to be positioned. Then, the external Reset—Preset selective means is set at the "Reset" position, and the stepper motor will operate to have the third stepper motor individually and simultaneously run to the spot being set by its "Reset", and stopped there.

When the three sensing means all pick up a signal to form a Reset "AND", the zero setting drive means turns off to remove the stop-running instructions of the main drive motor, and system circuit is in the stand-by state, waiting for the next control instruction.

Further, the encoder, through proper design, not only can generate the corresponding pulse, but also can provide variation in the analog signal, such as variation of the sine value so as to have coil current, which drives stepper motor, varying correspondingly, and to have the angular displacement of the stepper motor obtain a more fine setting analytic quantity by means of the variation of the analog signal during its stepping displacement. This method may be applied to the driving of the stepper motor, or to the selection of the pulse rotation displacement of the stepper motor so as to meet system requirements. FIG. 128 shows the embodiment of the encoder. FIG. 129 shows the multi-set structure of the setting means contact stops and its corresponding sensing means, and a program control means which can select the column and the row in accordance with the program. Through said structure, the setting means and the zero setting displacement setting means of the aforesaid photocell type synchronous drive method may be set on a multi-stage basis, of which the emebodiment is shown in FIG. 130. In the event of necessity, the setting method of said structure may be expanded by, for example, increasing the contact stop and the setting switch so as to obtain a two-stage and three-set setting output for early slow-down sensing and positioning stop. For a setting control having only one set of setting values, the said setting method may properly be modified as shown in FIG. 131 by adding a signal processing means to control the polarity, phase and the phase sequence of the signal so as to have the aforesaid stepper motor type of electromagnetic counter furnished with setting functions during the up and down counting operation. The "Reset" function may not be used in this circuit. The operation of said setting method is described as follows: The "UP" counting and the setting steps have been described in the aforesaid embodiment. Upon the "UP" counting having been completed and intending to perform a counting with the same setting value, do not make "Reset", but let the signal picked up by the photocell sensing means, which couples to the input shaft, go through the signal processing means to change the phase sequence of the reverse driving means so as to drive the low decimal number stepper motor type of counting means into "Down" counting, and the numerals coupled to said means will also generate the "Down" counting function. Therefore, the function of reaching the "Reset" zero point is the same as that of "Up" counting, and the reset "AND" signal corresponds to the setting signal.

The aforesaid stepper motor type of mounting means, having the capability of Up/Down setting and counting, may also be used for the multi-stage output function by means of a multi-setting means and some program control means. Further, an auxiliary counter may be furnished to re-count the continuously finished setting times of the Up/Down counting. Then, said data re-counted will be delievered to the aforesaid program control means. The aforesaid input shaft may be treated as a low decimal number to have the setting means coupled thereto so as to generate the setting function. On the input shaft of said setting and sensing methods and on the output shaft of said every stepper motor type of counting means, a rotary decoder may, in addition to the original encoder, be installed to display the numerical value so as to compare with the external digital setting signal, such as the signal of a thumbwheel switch or the logic elements for generating a preset function as shown in FIG. 132.

When said system needs a higher frequency response, this means may, if necessary, be provided with more than one set for replacement in use, aid said stepper motor type of counting means may be a linear stepper motor. In said means, if the input shaft is used as the lowest decimal number, and when it drives, in the same axial movement, the continuous similar setting output of a same setting value, a mechanical type of direction switching means may be furnished between the input shaft and the encoder and the setting sensing means so as to have the next numeral operational phase changed into a reverse return setting drive as shown in FIG. 133. The aforesaid driving method may also be of a synchronous servo-driving means as shown in FIG. 134, in which a mini D.C. servo-motor is used to drive a step-code encoder so as to have the sensing means coupled thereto generate a corresponding-sequence step signal for driving the power step electromagnet as a driving load. Another feature of said means is shown in FIGS. 135 to 136, which comprises a stepper motor, the driving circuit, and the contact point means, and which is used as a time switch or counting means for setting operation time by means of driving signal cycle control, the corresponding mechanical angle and distance settings. The main structure of said means consists of the adjustable cyclic pulse circuit, the step displacement electromagnetic means, the adjustable angle and distance circuit switch and contact point, and the related mechanical parts. When being used as a counter, the external pulse input terminal should be reversed.

In this design, said cup-shaped rotor stepper motor with low inertia and high frequency response is shown in FIG. 137. FIG. 138 shows a front view of the cup-shaped magnetic conductor that is to be used in the combined tunnel type or dragon-gate (or planner type) processing system or other mechanical device, and the general industrial servo-drive means. It comprises a conventional stepper motor stator, a cup-shaped rotor (137-2), and the related mechanical parts. A feature of said cup-shaped rotor (137-2) is that it comprises two or more sets of cup-shaped rotors having a selected size and number of teeth around its outer circumference, and an output shaft to form a rotor assembly, in which the angle relation between the salient teeth is determined by the corresponding structure of the stator. Said cup-shaped rotor assembly is to be excited with a permanent magnet (137-7) that is attached to the output shaft through a bearing, and between said permanent magnet (137-7) and the said cup-shaped rotor assembly. A switchable play is furnished. Therefore, when said cup-shaped rotor assembly is driven by the stator to have the output shaft rotating, said permanent magnet (137-7) will only be imposed upon by the friction damping mechanical force so as to lower the mechanical inertia of the rotor assembly and to obtain higher frequency response. FIGS. 139 through 142 shown the other embodiments of this design, in which the rotor may be developed in a flat shape or into a conical shape, but the operation and functions are the same as those shown in FIGS. 137 to 138.

In this design, the printing type stepper motor is a motor having high frequency response, and its feature different from that of the conventional stepper motor is shown in FIG. 143, which, in addition to the mechanical assemblies such as the axle (143-1), bearing (143-5) and case (143-3) in a conventional stepper motor, is provided with a printing type flat rotor (143-8), of which one side is furnished with a switchable number of poles of permanent magnet (143-6), and the other side is furnished with a flat iron-core magnetic circuit. On the insulating board (144-1) of said flat printing rotor (143-8), some eddy-current-shaped conductors (144-2) as shown in FIG. 144 are attached and arranged. A feature of so arranging said eddy-current-shaped conductor (144-2) is that said conductors are attached on both sides of said insulating board (144-1), and they may be in eddy-shape or other selected geometric shape with a selected number of poles and conduction ring; the phase difference between the magnetic poles of said two sides is at an angle of 90° so as to receive the external drive for the conventional step drive function. Operation of this embodiment is shown in FIGS. 145 to 146. FIG. 147 shows an embodiment of said motor being furnished with a pulse signal generating winding, which may cut the field of the permanent field to generate a corresponding A.C. signal, or may provide an induction function together with the external sensing winding. FIG. 148 shows an embodiment of the laminae of said motor being furnished with photocell encoder sensing holes (148-3).

A feature of said printing type motor with the encoder function is that the outer rim of the disc-shaped rotor is furnished with one or more than one hole (148-3) being specifically arranged for passing and analyzing a photocell signal. Said hole (148-3) (or holes) is coupled to the corresponding photocell sensing means. When the rotor of said printing type motor rotates, an encoder function may be generated simultaneously. The number, the arrangement, and the number of rows may be determined in accordance with the actual requirement as shown in FIG. 149. Said encoder function may also be obtained through a load induction type of sensing means or other known method.

18) A dynamic error-compensation system that can perform compensation functions by means of a controllable coupling means may be installed and used in the combined tunnel type or dragon-gate type processing system of this invention, or other mechanical structure, so as to obtain the maximum precision dynamic error-compensation function. Although the drive of a precision machine or a sero-system always needs the highest requirement that the precision tolerance must be within a certain given range, yet the precision error becomes aggravated as usual because of the accumulated errors generated from the prime mover end through the transmission system, the non-linear backlash, the errors in manufacturing and assembling, the temperature variation and long time use. The precision may be improved by using a minimum gear train, by using a precision drive element, such as precision gear or ball screw, but the problem cannot be solved without a high basic cost. In view of the aforesaid drawbacks, this invention therefore uses a micro-computer that is lower in cost but has increased capabilities and functions, and uses a controllable coupling means and related assemblies. In said system, the error is processed with a separate software method so as to facilitate a user adjusting the precision of the drive system as any time.

The operational theory of this design is described as follows:

(1) The operational theory of this system is to use one point in the displacement course of the output portion of the driving terminal of a machine such as a working table or a rotary working table, etc. as a reference point.

(2) The drive reference shaft: Measure the angular displacement of the reference shaft and the corresponding value of the displacement of the terminal output portion so as to find the error value of backlash and displacement.

(3) According to the error situation, list a series of displacement reference values of the equal terminal displacement error value, or the terminal displacement error value of the equal reference angular displacement. Then, designate their address and deliver them, from (150-15) and through (150-5), to (150-14) so that they are used as references for error compensation.

(4) By means of the aforesaid method, designate addresses for the error value of the temperature variation, the wear and tear compensation, the weight and processing stress deformation, and the tool adjustment, and to other error correction values, and deliver the addresses into (150-14).

(5) The series error value data addressed in the aforesaid error value memory means are used as a reference error for compensation. A rotary angular sensing means is used to measure the angular displacement of the reference shaft, and then deliver the data measured to CPU (150-5) so as to determine the time of error compensation.

(6) When the aforesaid error compensation time is present, the CPU (150-5) will, from the error storage means, read out, in accordance with the address, the reference point compensation data so as to order the control unit of the controllable coupling means to drive the controllable coupling means moving forwards or backwards timely at a suitable angular displacement for compensating the error. The aforesaid error may also be compensated simultaneously.

(7) The output of the aforesaid controllable coupling means is the correct output which has been compensated. Said output may also be converted into other forms such as a linear displacement output.

(8) In the aforesaid system, said controllable coupling means comprises an inner ring made of a permanent magnet and a tooth-shaped ring, an outer ring including a tooth-shaped iron core, and a coil that forms a magnetic field. The structure of the inner and the outer ring may be exchanged. Said inner and outer rings with coils may be furnished with slip rings, brush holders, and brushes so that said device may be controlled by external current during in motion. The distribution of teeth number between said inner ring and outer ring is based on the principle of generating step rotation and maintaining torque by means of the polarity, phase and strength of the control current.

As mentioned above, a lot of accumulative error may appear in the transmission system of a machine because of manufacturing, processing, assembling, long time wear and tear, and temperature variation. In order to eliminate said errors, this design is provided.

FIG. 150 shows the complete block diagram of this system. FIG. 151 shows the operation flow chart of this system. FIG. 152 shows the detailed structure of the CPU in said system. FIG. 153 shows the error input flow chart. FIG. 154 shows an embodiment of the compensation drive circuit. Further descriptions of the various blocks in said block diagram are given as follows:

(150-1) A control data and logic input means, which is used for delivering the control data to CPU (150-5) so as to have the rotary drive means (150-3) operating;

(150-2) A drive means controller, which will cause the rotary drive means (150-3) to operate upon receiving a signal from CPU (150-5);

(150-3) A rotary drive means, which will operate upon receiving the control signal contents delivered by the drive means controller (150-2);

(150-4) and (150-3) all stand for a rotary angular sensing means, in which (150-4) is used for sensing the angular displacement of the rotary drive means (150-3), and then deliver the data to CPU (150-5) so as to be used as a reference of the error ratio; (150-8) is used for sensing the differential angular displacement generated by the controllable coupling means (150-7) to be described in the following paragraph, so as to monitor the execution state of the controllable coupling means (150-7); the signal sensed will be delivered to CPU (150-5);

(150-5) the CPU, which is the control center of said system to collect the data from various means and respond to them respectively with a timely control signal to control said related means;

(150-6) the driver of the controller coupling means, which, upon receipt of a control signal from the CPU (150-5), will send out corresponding control electric power to drive said controllable coupling means (150-7) forwards or backwards an a switchable angular displacement for error compensating purposes;

(150-7) the controllable coupling means, which is a mechanical rotary coupling means. When the rotary power is transmitted from terminal shaft A, through the coupling means, to terminal shaft B, the rotary power appearing at terminal shaft 3 and that input from terminal shaft A may be synchronous or asynchronous. Said terminal shaft B may be controlled to move forwards or backwards at a switchable angular displacement by means of a driving signal from the driver of said controllable coupling means (150-6);

(150-9) the gear train or other transmission means, which is used to transmit the output power of the rotary driving means (150-3) to the input terminal shaft of said controllable coupling means (150-7);

(150-10) the working table, which is driven by the guide screw of the output shaft of the controllable coupling means (150-7) to generate displacement;

(150-11), the displacement distance indicator, which is used for indicating the output displacement value of the system terminal after being compensated with the dynamic error-compensation system;

(150-12), the temperature sensing means and the input transducer;

(150-13), the lock means, which is used for locking up the working table (150-10) in position so as to prevent sliding caused by vibration, and the control signal of said locking operation comes from the CPU (150-5);

(150-14, the error memory means, which is used for storing a series of error data of the reference points, or a series of angular displacement reference data of equal error values;

(150-15), an input means which is used for delivering said series of error data to said memory means (150-14), and said input means may be a keyboard or other means with similar functions.

A further description to this system is given as follows:

A. The method of dynamic error compensation includes:

Use one point in the displacement course of the output portion at the driving terminal of a machine such as a working table or a rotary working table, etc. as a reference point, and the rotary sensing means shaft in the transmission system is named as a reference shaft. Drive said reference shaft to obtain its angular displacement and its corresponding value to the terminal output portion displacement, and then find the error value of the backlash and the displacement; list the angular displacement reference value of a series of equal terminal displacement error values or the terminal displacement error value of the equal reference angular displacement; then, designate the address and deliver it, through (150-15) and (150-5), to (150-14). By means of the aforesaid method, designate addresses for the error value of temperature variation and other error correction values and deliver said values into (150-14).

The running procedures of this system are that (150-1) sends out the control data and logic to (150-5), which will instruct (150-2) to drive (150-3) for generating a rotation to actuate the rotary sensing means of (150-4). The signal of (150-4) will be delivered back to (150-5) for counting. Whenever passing through the reference point, it will compare with the control logic, and read out, with the proper address, the error compensation data which is to be delivered to (150-6) for driving the controllable coupling means (150-7). The input and output of (150-7) will generate a differential displacement to have the output of (150-10) compensated with error compensation processing. (150-8) is the operation monitoring means of (150-7), and will deliver the execution condition of (150-7) to (150-5). (150-13) is the locking means of (150-10).

If the system has no backlash elimination means, and when the system completes its operation, said means (150-13) is used to prevent position sliding as a result of backlash and quake.

B. In the dual axial drive system or the multi-coordinate axis system such as a lathe, a milling machine, a boring machine, etc., a ball screw or a displacement sensing and display means is generally installed in order to obtain precision and accurate displacement and transmission. Unfortunately, the precision is always limited by the manufacturing maximum precision limit of each element aside from the high cost. Moreover, the precision between the coordinate axes is subject to the limits of casting, heat treatment, processing facilities, assembling skill level, temperature variation, and internal stress, etc. This system may be installed in the general precision mechanical driving elements for dynamical error compensation so as to have the driving system become more accurate in displacement. The compensation means may, in addition to the driving system, also be applied to temperature variation, wear and tear compensation, weight and processing stress deformation, and tool adjustment, etc.

In the multi-coordinate axis system of a milling machine, if a backlash eliminating means or a precision transmission element is installed, one of the coordinate axes may be used as a reference axis. After the error between said reference axis and the related axis is measured, its address is designated, and delivered to (150-14) so as to have the system being compensated under a dynamic state by means of the software compensation function for obtaining precision between the coordinate axes. In case this system is installed in a precision machine together with precision transmission elements, the result would be excellent. The accumulative error of a precision element such as a ball screw may also be stored in (150-14) for compensation. In addition, this system may, through (150-1), be provided with control logic, data and any program instructions for oblique, or arc drive.

C. FIG. 150 shows a displacement display system including (150-1) (150-4) (150-5) (150-8) and (150-11). The contents of the display unit include the reference shaft angular displacement value, feedback from (150-4), and a value corresponding to the terminal distance displacement value or the instruction value of (150-1) through dynamic error compensation. In case (150-2) (150-3) (150-4) are removed, the reference shaft may be driven manually. A complete displacement display system may be formed with (150-4) (150-5) (150-6) (150-7) (150-8) (150-11) and (150-4).

D. The controllable coupling means is shown in FIG. 155, and includes an inner ring made of a permanent magnet and a tooth-shaped ring, and the outer ring includes a tooth-shaped iron core and a coil to form a magnetic field. The structure of said inner and outer ring may be interchanged. The ring with coil may be furnished with slip rings, brush holders, and brushes so as to have this device controlled by the external current during motion. The distribution of teeth between the inner ring and the outer ring is made on the basis of generating step rotation and maintaining torque by means of the polarity, the phase, and strength of the control current. When the polarity of input current remains unchanged, the strength of the control current. When the polarity of input current remains unchanged, the strength of the control current will maintain the torque to generate a setting variation. When the torque is overloaded, sliding will be generated as a protection means. When the input is a pulse current, a differential motion of forward or reverse rotation will be generated depending upon the polarity, the phase relation, and the number of pulses. If the input is a programmed value, a programmed output will be generated. The output end may be added with a rotary angular sensing means to sense the feedback signal of the control operation so as to have the dynamic error compensation converted from an open ring type to a closed ring system.

E. Said controllable coupling means may singly be coupled with the drive means to form a controllable drive means as shown in FIG. 156, in which case said controllable coupling means is singly combined with a driving motor to form a linear or non-linear output, and it comprises:

(156-1) The control data and logic input means.

(156-2) The driving motor control unit.

(156-3) The driving motor.

(156-4) The rotary angular sensing means.

(156-5) CPU.

(156-6) Controllable coupling means driver.

(156-7) Controllable coupling means.

(156-8) Rotary angular sensing means.

(156-9) Output shaft.

When used in the system, multi-sets of said controllable coupling means (156-7) may be connected in series and in parallel together with the related mechanism so as to provide multi-shaft output. FIG. 157 shows a diagram of said system.

FIG. 158 shows multi-sets of said controllable coupling means being connected in series and in parallel together with the related mechanism to provide multi-shaft output in the system. It comprises:

(158-1), the driving motor;

(158-2) and (158-3), the rotary angular sensing means;

(158-4), the controllable coupling means;

(158-5), the output shaft;

(168-6), the transmission gear train.

FIG. 159 shows a disk type of controllable coupling and driving means, which comprises:

(159-1), the input shaft;

(159-2), the output guide screw;

(159-3), working table;

(159-4), the input end of the controllable coupling means;

(159-5), the output end of the controllable coupling means;

(159-6), the slip ring;

(159-7), the brush.

The coupling surface of input terminal (159-4) of the aforesaid disk type of controllable coupling and driving means is in a round disk shape, on which there is given number of magnetic poles (159-8). Said magnetic pole sets (159-8) are excited in alternate sequences by two windings through the slip ring (159-6). The coupling surface of its output terminal (159-5) is also in a round disk shape, on which there are poles of permanent magnets (159-9). The number and the positions of said poles (159-9) are disposed in such a way that when the excitation current of the input shaft (159-2) remains unchanged, it will be in a locked and balanced state. When the excitation current sequence varys, it will move with corresponding displacement.

FIG. 160 shows a controllable coupling and driving means to be used between shafts and its operational theory is the same as that mentioned above.

F. A static holding stepper electromagnetic means that may be used in place of a controllable coupling means or a stepper motor comprises a given number of permanent magnets arranged at equal distances and angles to form the rotor and the stator. Between the stators and the rotors, there is a predetermined suitable difference of pole numbers. One or more than one set of poles of the stator and rotor are provided with exciting windings. A feature of said electromagnetic means is that it is in a static holding condition prior to being provided with power. It will generate the step operation by means of the polarity and strength variations of the excitation current. FIG. 161 shows the structure of said means, in which the four "N" salient poles on the stator are permanent magnets, while the five "S" poles on the rotor are also permanent magnets. On each of the rotor salient poles, a winding is provided. When said winding is not applied with power, the rotor may be held at any angle as a result of the magnetic effect. When the coil is provided with power, the magnetic balance state will be varied and moved to a further point by moving the rotor. By said theory, this means will run continuously.

FIG. 162 shows the wiring diagram of said means.

FIG. 163 shows the pulse truth table of said means during running. FIG. 164 shows the operational course of said means, in which:

(a) shows the balance state before running;

(b) shows that, upon a pulse appearing, the pulse truth table circuit will have Phase 1 and Phase 2 converted into forward excitation, and have the stator magnetic pole generate a polarity contrary to the original permanent magnet. Simultaneously, Phase 3 and Phase 4 are in reverse excitation state, and the stator magnetic pole will generate a polarity similar to that of a permanent magnet. Therefore, a new balance point is generated to cause the rotor to rotate 18° clockwise. When the pulse is completed, i.e. the excitation of the coil is discontinued, said rotor holds at the existing point;

(c) shows that when the next pulse appears, the pulse truth table circuit will have Phase 2 and Phase 3 converted into the forward excitation state, while Phase 1 and Phase 4 are in the reverse excitation state. Therefore, a new balance point is generated to move the rotor 18° further clockwise. When the pulse is cut off, i.e., the coils not being excited, said rotor will hold at the existing point;

(d) shows that when the third pulse appears, the Phase 3 and 4 will be in forward excitation state, while Phase 1 and 2 are in reverse excitation state. Then, the rotor will rotate another 18° clockwise.

When the next pulse appears, the pulse truth table will again start from the same state as the first pulse did. By using said cyclic pulse generation sequence, the rotor will rotate continuously. In FIG. 163, the pulse truth table of counter-clockwise rotation is the same as that mentioned above.

The structure of the aforesaid means may include two stages as shown in FIG. 165. Since its torque is increased, the exciting current has to be increased.

FIG. 166 shows a rotor having four stages, of which the functions are the same as that mentioned above.

Suitable variations of the polarity of the permanent magnet and the pulse truth table circuit may also be applied to larger angle rotations as shown in FIG. 167, which is a modified embodiment of FIG. 161. FIG. 167 shows the state prior to rotation. When the input pulse is applied in accordance with the clockwise wiring sequence as shown in FIG. 168, and the pulse truth table as shown in FIG. 169, the rotor will rotate 72° and stop in the same state as that prior to rotation. Therefore, four pulses will be generated each time, and the rotor will rotate 72° each time. When there is excitation, the stator and the rotor remain in the holding state as a result of permanent magnet effect.

This means may be used for controlling tool feeding to prevent displacement caused by mechanical shake because of being naturally locked in position after stopping without spending any electric power. The uses of said means may be as broad as that of the aforesaid "controllable coupling means" except the step function being in the static holding state.

In the aforesaid controllable coupling means, a lock means may be provided at its input end. When this means is used as a stepper motor, the lock means used may be of any well-known mechanical, electromagnetic, or hydraulic means, of which the structure may be developed into a coupling means having multi-laminate rings as shown in FIG. 170 which has three laminae. In said FIG. 170, the inner lamina and the mid-lamina may be used as a controllable coupling means. The outer lamina has the same effect to the mid-lamina. The function is similar to two sets of controllable coupling means being connected in series. Whenever the outer ring lamina is locked, it is equal to a stepper motor being connected with a controllable coupling means in series. It may be the well-known stepper motor structure, or said static holding means, or the both means.

FIG. 171 shows a cyclic gear train begin used as an error compensation device in which one input shaft of the cyclic gear train is driven with a driving motor (171-1), and the other input shaft of said gear train is driven with an auxiliary motor (171-4). Then, the output of the compensated cyclic gear train will generate a dynamic error-compensation function. Said auxiliary motor (171-4) is usually a stepper motor or an A.C. or D.C. servo-motor provided with an angular displacement sensing means. Further, the backlash in the gear train may be eliminated with a well-known method so as to obtain higher precision.

The aforesaid system may be provided with a magnetic tape (172-11) attached in parallel to a working table (172-9) or a rotary working table. When the reference point is found with a manual control magnetic head (172-12) for measuring error, an exciting signal is delivered so as to generate a magnetic point on every corresponding reference point. Upon the gear train being driven, the signals of said reference points will be delivered to CPU (172-13), and said signals may be used in place of the reference signals generated by the rotary angular displacement sensing means that is coupled to the drive means as shown in FIG. 172.

G. The advantages of the dynamic error-compensation data control system and the controllable coupling means are described as follows:

Software and the tacking type of dynamic error-compensation is used to compensate the errors caused by the temperature variation, the wear and tear, the weight and the processing stress deformation of the transmission system. If a backlash eliminating means is added to said system, the precision error between the coordinate axes in the multi-coordinate axis system may also be compensated with the aforesaid means, and said compensation system will be formed in a closed loop that is isolated from the external input control data and logic.

Since the controllable coupling means is merely used for error compensation functions, its frequency response may be designed a little lower; however it has a higher torque and a smaller size. When being used as both a drive means and a reference shaft to drive the multi-coordinate output shaft, and when each shaft is provided with controllable coupling means, (172-1) may send out instructions to the controllable coupling means to perform oblique or arc drive. Moreover, said controllable coupling means and the driving means may be combined into a controller output driving means to provide the linear and non-linear variations of the output speed, and to provide a sliding function for protection to control the uses of the coupling means in case of the torque being overloaded. Since the precision of the dynamic error-compensation system can be adjusted by the user, and a software type of tracking compensation is used, the embodiment provides a mechanical precision with a lower cost.

Since this system is an isolated error compensation and driving system that comprises a controllable coupling means, a driving means, a displacement sensing means for feedback and monitor functions, an error memory means, an error value input means, and a CPU, it can be directly coupled to the mechanical transmission structure of the main drive system, and its error compensation method, and the results and functions are as follows:

(1) Since said error compensation system is an isolated system, it has higher frequency response, especially during high speed driving, and provides striking result.

(2) The overloaded torque may be controlled by controlling the setting excitation current of the controllable coupling means.

(3) As a result of an isolated error compensation system, it has no particular requirement with regard to the driving means. Even if the input shaft is driven manually, the error compensation function still works.

(4) If the system has a transmission means such as a gear train, the controllable coupling means may be installed at any position or at the output terminal so as to have the minimum compensation displacement selected to be smaller than the minimum displacement of the driving means in order to increase the precision.

A Comparative Table Between The Compensation Method of This System and That of the Well-known Compensation System

| Name of Structure | Other Compensation Methods | The Dynamic Error Compensation |
|---|---|---|
| The driving means | 1. It must be a stepper D.C. servo-motor, hydraulic driving elements, etc. that can provide linear or non-linear quantitative drive. | 1. Any driving elements including manual drive. |
| Compensation time sensor | 1. When the sensor of the compensation system is installed at the terminal, an expensive sensing element must be used.<br>2. When said sensor of the compensation system is installed at the driving terminal, the error compensaion must be considered when designing the operation program. | 1. The sensor of the compensation system may be installed at the output driving terminal, therefore, said compensation system is an isolated system which has no relation with the operation program. |
| To perform the compensation. | 1. By the driving means itself. | 1. It may be performed with the controllable coupling means. |
| Non-linear drive compensation | 1. The system must be a closed loop control system that has terminal displacement sensing sensing means. | 1. It can perform dynamic error compensation in the driving state, and can perform appropriate error compensation under linear or non-linear motion. |
| The compensation accuracy | 1. The minimum displacement of the driving means itself. | 1. By means of the selection of the controllable coupling means or the selection of the coupling transmission system, this system can obtain a compensated displacement smaller than the minimum displacement of the driving means itself. |
| The frequency response of compensation. | 1. The frequency response is low, especially under high speed. | 1. Owing to the controllable coupling means having a higher frequency response and having a compensation effect.<br>2. The data processing is much faster |
| The compensation of multi-shaft simultaneous drive. | 1. Each must have independent driving means. | 1. They may commonly use the driving means throught a multi-set and controlandlable coupling means and through a transmission system. |
| Miscellaneous | | 1. When the driving means is a general drive motor, a linear or non-linear output may be obtained by means of the controllable coupling means for simultaneous driving.<br>2. A combined high speed drive may be obtained by means of the controllable coupling means to run in the same direction simultaneously.<br>3. The coupling torque may be set by appropriately selecting the excitation current of said controllable coupling means. |

(19) A positioning control setting system (shown in FIG. 173) using point excitation by means of a magnetic tape that may be magnetized and demagnetized, and that may be installed on a movable mechanism is described as follows: It can provide a magnetic means on a fixed base with a magnetic reference point for setting positioning control as shown in FIG. 174. The excited point of said system may be demagnetized by means of demagnetizing means. The magnetic positioning setting method may be used separately and singly, or may be used together with the well-known magnetic sensing means, the photocell means, the electromagnetic induction means, and the rotary encoder, or the liner scale as shown in FIGS. 179 and 180. Further, as shown in FIG. 173, it may form a preset or positioning control system by means of a setting magnetic sensing means, and said system may be used in the combined tunnel type or dragon gate type processing system, or in other machines for the positioning sensing function, and it comprises:

(173-1) Magnetic tape: It and a magnetic head form a pre-setting means which is installed at a selected position on the working table to sense the magnetic point on the corresponding magnetic tape. It may be a well-known electromechanical reed switch of electromagnetic sensing type, an induction means, or a sensing means by using the variation between the field strength and the resistance.

(173-2) Magnetic head: It and a magnetic tape form a presetting means to be installed at a selected spot on the machine base.

(173-3) Amplifier: It is used for amplifying the signal picked up by said magnetic head so as to provide to the program controller for the reference.

(173-4) Main control: It is used for controlling the writing-in of the preset signal and for washing out the signal.

(173-5) Program control: It comprises a program counter and a matrix circuit. Said program counter is used for counting the program number so as to facilitate said matrix circuit selecting the corresponding preset instructions to drive a circuit as shown in FIG. 175.

(173-6) Drive: It performs the corresponding drive operation upon receiving instructions from the matrix circuit; for instance, it is used to drive a motor, or other hydraulic of pneumatic driving means.

(173-7) Motor: It may be a D.C. Motor of a D.C. servo-motor, or any other controllable A.C. or D.C. motor.

(178-8) Power supply: It will provide each device with power. The operational procedures are that when the working table (173-9) stops at zero point, a writing-in instruction is input through manual control so as to have the point on the magnetic tape (173-1). Then, the working table (173-9) is moved to the next positioning point and repeats the aforesaid operation until all the settings are completed. The operational sequences are shown in FIG. 176 and have the magnetic tape (173-1) furnished with all the magnetic sensing points for control use.

Upon turning on the power to start the positioning, the program control means will, at the corresponding position, perform its program contents. As soon as a magnetic signal is sensed by the magnetic head, the program control means will move to the next work and perform its program contents. The operational procedures are shown in FIG. 177.

FIG. 178 shows the flow chart of the clearing signal. The operational procedures are that when clearing the tape contents, a clear magnetization signal is sent from the main control. Then, the working table is driven from one end of the magnetic tape to the other end to complete the clearing work.

In the aforesaid preset type positioning control system using means for setting the magnetic sensing point, the magnetic tape and head may be a multi-set type so as to provide two sets of sensing heads and two lines of signals, in which one set will provide a series of data signal codes, while the other set will provide operationable instructions.

20) In the aforesaid combined tunnel type or dragon-gate type of processing system, the positioning and locking system may, in addition to the known positioning and locking method, use a new method as shown in FIG. 184, in which a conic catch pin or a sliding block is used for precision positioning and locking as shown in FIG. 182. During operation, a working table (181-1), which has a conic hole (181-6) or a channel at the positioning spot, is driven to the setting position. Then, the driven catch pin (181-11) or sliding block is attached to the base (181-7) or other appropriate position insert of said conic hole (181-6) or channel so as to have the working table (181-1) accurately positioned and locked thereto. FIG. 183 shows an embodiment of a rotary type of positioning and locking means.

FIG. 184 shows another embodiment of said positioning and locking means to be operated from inside to outside. The disengaging procedures of said locking means is to have the catch pin (181-11) or sliding block driven in the reverse direction, and it will stop moving upon touching the sensing switch. The conic hold (181-6) or channel (i.e. the groove of the working table) on said working table (181-1) and the conic catch pin (181-11) or block (the salient piece) may interchange these positions.

The structure of elements in said design is described in detail as follows:

(a) One or more than one set of transmission elements is provided for receiving reciprocating, or forward or reverse drive, and one or more sets of linear type working tables or rotary disks for carrying a work piece, such as a rotary working table, a tool chest or tool turret, of which the edge, the inner side, the outer side or bottom is provided with one or more than one set of conic holes (181-6) or channels.

(b) A base (181-2) is used for installing the elements mentioned in paragraph 19(a) above, such as a power motor, the hydraulic or pneumatic driving means, and the known gear and worm means, etc., for driving the working table (181-1) or rotary disk. The transmission means may be so selected that the driving means can have the working table (181-1) or rotary disk driven reversely. The clutch means may be driven with electric power, hydraulic, pneumatic or manual means. During the time of the positioning drive, said transmission means will be closed to transmitting the drive power. When using said catch pin (181-11) or block for precision positioning, the transmission means will be disengaged to have the working table (181-1) or rotary disk move freely.

(c) One or more than one set of conic pins (181-11) or blocks, are channel furnished on the working table (181-1) or disk so as to have their smaller front tip inserted into said conic hole (181-6) or channel. Said conic pin (181-11) or block is installed in a parallel sliding channel, or hole or rail, and may be driven with an electric motor, hydraulic, or pneumatic means in a steady reciprocating motion to insert said pin or block into the aforesaid conic hole (181-6) or channel so as to have the working table (181-1) or rotary disk accurately positioned and locked. Said conic pin (181-11) and sliding block not only can be provided on the base (181-2), being opposite to the corresponding conic hole (181-6) and channel on the working table (181-1) or disk, but also can be a separate mechanism to be adjusted by means of a sliding channel or a long slot and locking nut. The locking method of said conic pin (181-11) or block may include power motor (181-8) driven by a constant torque or constant current or a constant pressure to drive a hydraulic, pneumatic means, or a manual means. A well-know electromechanical or photocell position sensing means instruction may be used to have a brake means (181-9) lock the motor axle.

(d) The positioning drive and setting control means of the working table or disk is described as follows: the quantitative drive may be accomplished by using a motor, or hydraulic or pneumatic means, or by means of a constant speed motor with time setting, or by means of the well-known photocell, electromagnetic effects, or electromechanical switch, or analog or digital displacement sensing means, or "N" carry encoder feedback sensing means which are able to be installed on a selected position on the working table or disk, or the driving motor axle, or the transmission machine, etc. for positioning drive.

(e) The display and the position setting control means comprises the well-known digital display elements such as the gas tube, lamp bulb, LED, LCD, etc. together with the decoder and the counter. The positioning driving control of the driving means may be accomplished by means of an analog setting circuit. Said decoder, counter, and comparative circuits may include the well-known electromechanical, solid state logic elements, or microcomputer. The method of setting the input may be accomplished by using a key, a digital switch, a punch tape, a magnetic tape, or one set of signals representing digits.

When it is necessary to have said catch pin (181-11) or sliding block disengaged, said driving means (181-8) drives reversely, and it will stop upon touching the sensing switch, its operational flow chart is shown in FIG. 185. When the working table (181-1) or other driven structure reaches the positioning point, the catch pin (181-11) or sliding block will be tightly engaged to stop the working table (181-1) from moving further. Since the driving force of the catch pin (181-11) from or sliding block is always moving towards the original driving direction, said working table (181-1) or other driven structure is in a kinetic locking and positioning state. Said positioning locking system that is used for the linear working table is shown in FIG. 186. Further, said working table or other driven structure may also use the well-known limit switch, the photocell means or the encoder for approximate positioning drive, of which an embodiment is shown in FIG. 187.

Said design may use a stepper motor or other auxiliary motor having brake means for the locking function under normal conditions, for the function of eliminating backlash. When the handwheel is driving, a sensing means coupled to the driving shaft of the handwheel will generate a signal to instruct the stepper motor or auxiliary motor to make reverse or forward movements with respect to the handwheel so as to obtain backlash elimination and kinetic locking functions.

21) A dual driving motor type of backlash elimination and locking means is described as follows:

It is to be used in this invention for the combined dragon-gate type or the tunnel type of processing machine, or used in a general machine such as the working table, tool post or other moving parts, for the backlash elimination and locking functions. In the tool machine, between the driving elements and the driven elements of the working table or other driven part, an error is apt to arise during the process, and the driving performance will be affected. The object of this design is to improve the aforesaid drawback by using two driving motors having brake means. Said two motors will mutually drive the working table with their individual transmission elements, and said two motors are driven with a selected differential value in order to eliminate backlash and to obtain locking functions.

This design includes two embodiments, which are described as follows:

A. The position locking and the kinetic backlash elimination method of a rotary working table:

FIG. 188 shows the embodiment of said method, of which the functions and theory are described as follows:

When the rotary working table needs to rotate counterclockwise, the motor (188-1) and motor (188-2) will have their correspondingly coupled worms (188-3), (188-4) drive the working table (188-5) counterclockwise. Between the rotation speeds of said two motors, a switchable different value is selected. When the speed of motor (188-1) is higher than that of motor (188-2), the rotary working table (188-5) is driven by motor (188-1), but it will be retarded with the worm (188-4) of motor (188-2). Therefore, the angular displacement of the rotary working table (118-5) is determined by the drive of motor (188-2). By the aforesaid retarding effect, a backlash elimination function is obtained under a kinetic state of driving. For the locking method, as soon as the working table (188-5) reaches the displacement target value, the motor will enter into a locking preparation state. At the same time, the brake means (188-7), (188-8) are driven, and the motor power supply is cut off. Said motor locking preparation state is a super-low speed driving state, and the locking current is under the rated range of the motor current.

Another locking method is that when the working table (188-5) arrives at the displacement target value, the power supply of motor (188-2) is cut off first so as to maintain the system in a non-destructive retarding state, and then cut off the power supply of motor (188-1), and simultaneously let the brake means (188-8) coupled to the shaft of motor (188-1) operate to lock up the whole system.

If the requirements of the system are not quite rigid, the power supply of the motor may first be cut off, and then drive the brake means. The desired positioning and locking requirements may be obtained through suitable selection and configuration of the motors (188-1) and (188-2), and the brake means (188-7) and (188-8).

FIG. 189 shows a second embodiment of said means in which the gear is used for driving. The theory is similar to that mentioned above, i.e. using the differential speed of two motors (189-1), (189-2) to control the kinetic backlash elimination operation of the working table, and the locking method is the same as that mentioned above.

B. The position locking method and the kinetic backlash elimination method of the guide screw of working table are described as follows:

FIG. 190 shows one of the embodiments, and the operation of said embodiment is described as follows:

When the two motors (190-1), (190-2) respectively drive their coupled guide screws (190-3), (190-4) to move the working table (190-5), a suitable differential value between the rotation speeds of said two motors is determined. When the speed of motor (190-1) is higher than that of motor (190-2), the motor (190-2) will drive the working table (190-5), and it will be retarded by the guide screw (190-5) actuated by motor (190-2). Therefore, the displacement magnitude of motor (190-5) is determined by the driving magnitude of motor (190-2). The kinetic backlash elimination is therefore obtained through said retarding effect, and the locking method is the same as that of the aforesaid embodiment.

FIG. 191 shows another embodiment that has a small auxiliary motor, and its operation is described as follows:

It comprises a primary driving motor (191-1) to drive the working table (191-8) and a secondary small motor (191-2), which is used for driving a guide nut (191-5). Said guide nut (191-5) and its fixing frame are fixedly attached to the working table (191-8). Between the motors (191-1) and (191-2), there is a speed difference to be set. The motor (191-1) driving the working table (191-8) will be retarded with the guide nut (191-5) actuated by motor (191-2). Therefore, the displacement magnitude of the working table (191-8) is determined by the driving magnitude of motor (191-2). The aforesaid retarding effect will fulfill the kinetic backlash elimination when the working table (191-8) is driven. The locking method is the same as that mentioned above.

The feature of said embodiment is that the auxiliary motor (191-2) may have a smaller power consumption because of said motor being used merely for retarding the guide screw (191-3) actuated by motor (191-1), but not for driving the working table (191-8). Moreover, low speed with greater torque may be obtained through a gear train.

FIG. 192 shows the third embodiment of said method in which two driving motors are used for driving the working table (191-1) through the gears (192-2), (192-3) mutually driving the gear rack (192-4). The operation is described as follows: The theory of the backlash elimination in kinetic state and the position locking is the same as that mentioned above.

FIG. 193 shows the fourth embodiment of said method in which two sets of motors are used for driving two gear racks respectively. The operation is described as follows: By means of a theory similar to those discussed above, the speed of motor (193-1) is greater than that of motor (193-2). Therefore, the motor (193-1) that drives the working table (193-7) is always retarded by motor (193-2) which drives the gear with lower speed. In other words, the displacement magnitude of working table (193-7) is determined by the driving magnitude of motor (193-2). By means of said retarding effect occurring during driving, a kinetic backlash elimination is obtained. The position locking function is the same as that mentioned above.

For the aforesaid two kinds of working table, six embodiments have been given. In said embodiments, all, except the second embodiment described in paragraph 21B (which uses one primary driving motor and one small secondary motor), use two main driving motors. It may also use one primary and one secondary motor, but the precision will be reduced as a result of the change of driving direction and of the contact area between transmission elements.

FIG. 194 shows that when using dual motors to drive the working table (194-1) to move left or right, the driving point will not change, and therefore a higher precision may be obtained. Whenever using one driving motor and one auxiliary motor for the retarding function, the driving point and the retarding point will change when the working table (195-1) moves left or right, and a lower precision will result as shown in FIG. 195.

Further, the driving motor or auxiliary motor in said system may be an E.C. motor, a D.C. servo-motor, a stepper motor, or A.C. servo-motor. The brake means for position locking and kinetic backlash elimination may be provided, if necessary.

If the transmission elements are reverse elements, such as a gear or gear rack, the auxiliary or retarding motor may, during position locking, not be operated. As soon as the target point is reached, the power supply is turned on, and it rotates in the direction opposite to the driving direction to such an extent that it can merely overcome the backlash without having enough torque to drive a load. After the backlash has been eliminated, the shafts of said two motors are locked with the brake means. However, said method will not provide the kinetic backlash elimination function.

A rotary working table which can eliminate the backlash and can be locked in position by means of a direction identification and constant torque auxiliary motor is described as follows:

FIG. 196 shows its structure, which is described as follows:

(196-1) Rotary working table.

(196-2) A worm gear or a general gear that is combined together with the rotary working table on one axle.

(196-3) An input driving shaft, which may be driven with the working table driving motor or be driven manually, and which is coupled with the working table, and is provided with a worm or gear.

(196-4) Worm or gear, which may be driven by the auxiliary motor, in which the torque may be set.

(196-5) An auxiliary motor, in which the torque may be set.

(196-6) The direction identification means which may be an electromechanical or photocell type, or an analog or digital type.

(196-7) The direction identification and the auxiliary motor driving circuit, which comprises an amplification circuit, drives the direction relay, and through the contact points of the relay, a self-protection circuit is formed. Before the other direction signal appears, a constant torque toward the original direction always prevails.

The operation of said means is described as follows: Upon the input driving shaft (196-3) rotating towards the driving direction, and sending out a directional signal, said direction identification and the auxiliary motor (196-5) driving circuit (196-7) will output driving instructions corresponding to the driven direction so as to have the worm or gear (196-4) driven by the auxiliary motor drive towards the direction that the working table (196-1) drives.

When the input driving shaft (196-3) stops, a constant thrusting force will be applied continuously to the gear (196-4) so as to generate a backlash elimination and locking function, 22) A dual-end driving working table or other mechanical structure is described as follows: The object of this design is to minimize the phenomena of bending and deformation in conventional machine systems. A feature of this embodiment is that two driving motors (197-1) are installed at both ends of the driving guide screw (197-5) of working table (197-3) to drive the working table (197-3) simultaneously. The thrust applied to the driving nut (197-4) of working table (197-3) is from both ends of the guide screw instead of from a single end as in a conventional transmission method. Therefore, when a similar load is applied, the guide screw of this design will only be loaded with one-half the torque as that of the conventional single end driving method. Consequently, the bending and deformation and the mechanical flexure and deformation will be minimized as shown in FIG. 197.

Another embodiment of this design is to use a single motor and specific transmission means to drive both ends of the guide screw simultaneously so as to obtain the aforesaid function.

23) An oblique roller and guide screw means comprises three or more rollers (198-4) fixedly attached to a movable guide base (198-1), (198-2), and a guide screw (198-5) coupled with said rollers (198-4) at a given oblique angle. Upon said guide screw (198-5) rotating, it will generate a linear displacement as a result of the thrust of said rollers (198-4) as shown in FIGS. 198A, 198B and 199A, 199B. Said roller (198-4) may also be designed in a slightly concave shape so as to come in a close and linear contact with the guide screw, as shown in FIG. 200A, 200B, to increase the loading capacity of the sliding guide base (200-1), (200-2).

Another design of said means is to provide teeth around the roller (201-4), and to provide corresponding threads around the guide screw (201-5) so as to engage the teeth.

Figure 201:
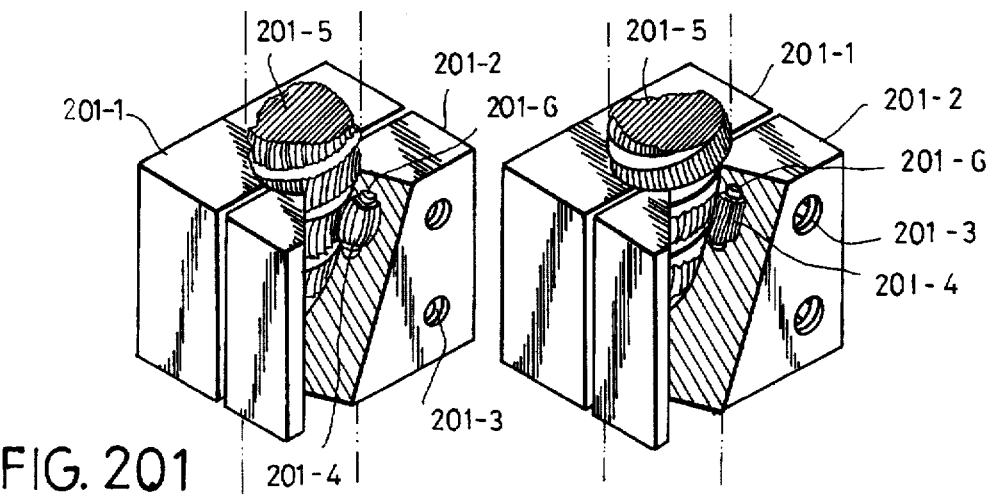

Another feature of said design is to have a roller (201-4) with slightly concave teeth engaged with the guide screw (201-5) at a given angle so as to have additional thread engagement, as shown in FIG. 201-A, 201-B. The roller (202-6) of this means may be fitted at one or both sides of the sliding base (202-1) (202-2); it may use several sliding bases and several sets of rollers to connect into a series sliding bases and several sets of also pre-apply a pressure between two sets of sliding bases, the same as the method used in the well-known steel ball type of guide screw, for the purpose of eliminating backlash as shown in FIG. 202.

24) An auxiliary interface means for the dragon-gate machine series is described as follows: It is an auxiliary rotary arm mechanism to be attached to said dragon-gate type machine so as to freely and conveniently process a workpiece on the working table as shown in FIG. 203. Said rotary arm mechanism may be a well-known rotary arm means. The auxiliary rotary arm mechanism in said dragon-gate type of machine may include embodiments as follows:

(a) A rotary arm mechanism having a cylinder-shaped axle coupled to the dragon-gate as shown in FIG. 204. The end of the rotary axle center of said rotary arm is attached to the coaxial support structure mounted to the dragon-gate; and on which a hydraulic or locking means and driving means, as in the known rotary arm drilling machines, may be furnished. Said auxiliary rotary arm structure may also be coupled to the rear side of said dragon-gate, i.e. on the sides of the dragon-gate vertical column without the lateral girder (204-3) or on the lateral girder of said (204-2).

(b) On the vertical column without the lateral girder (204-2) or on both sides of the vertical column, as mentioned in (a) above, a guide rail is furnished so as to have the cylinder-shaped co-axial structure move up and down and lock. On the structure mentioned in (a) above, a sliding channel is provided so as to couple with said guide rail. Further, a guide screw or a hydraulic means may be furnished to drive said auxiliary rotary arm mechanism to move up and down.

25) A driving gear assembly having a low vibration ratio by means of a phase difference is described as follows: It is used for minimizing a vibration phenomenon generated between the tunnel type or dragon-gate type of processing system and the general tool machine when the working tables are driven, as a result of backlash or distortion of the transmission elements. FIG. 205 shows the embodiment of said gear assembly (205-4), (205-6), in which two or more than two sets of co-axial gear assemblies are engaged with the rack (205-5), (205-7) at a given phase difference, as shown in FIG. 206. When driving the working table (205-8), a synthetic pulse drive with a lower vibration ratio may be obtained as shown in FIG. 207.

Summing up the aforesaid descriptions, it may be seen that this invention has many novel means combined together to form a multi-function mechanical processing system that may be designed and manufactured on a basis of standard specifications and simplicity. Particularly, a series of new designs, such as, the energy-saving working table, the ATC system of the common tool chest, and the common-use dragon-gate main mechanism assembled with functional elements will use a minimum number of assemblies to provide many functions, such as lathing, drilling, planing, milling, grinding and boring. This invention has eliminated the drawbacks of conventional machines and broken through the limits of the known universal machines that have low efficiency and a single use nature. Moreover, the mechanical processing system design in this invention may be handled with the standard management methods by means of management software. Since the operator of this invention may participate in the design work, the machine will have no difficulty in operation on a particular workpiece, and this is another feature of this invention.

I claim:

1. A dragon gate type of processing system, comprising:
   a dragon gate structure;
   at least one lateral girder coupled to said dragon gate structure, for mounting a tool holding means and an automatic tool exchange means for supplying tools to at least two tool spindles, each spindle being adapted to cooperate with a workpiece, said automatic tool exchange means including at least two common tool chest each having a tool exchange position, a tool exchanging arm and a tool output position, a tool exchange device including a tool turret, and a movable tool chest;
   a plurality of working tables mounted below said dragon gate structure, wherein the workpiece may be disposed on the respective work table;
   driving means for driving said working tables, said driving means including an axial displacement D.C. motor, electro-magnetic drive and coupling means, ratio transmission driving means, a pursuit stepper servo-motor, and a high frequency response braking means having a flexible transmission;
   control means for controlling the operation of said dragon gate structure, said lateral girder, said working tables, and said driving means, said control means including a positioning system having an analog feedback signal accumulative quantity setting means, a non-contact synchronous drive stepper type of setting control device, a differential type dynamic error-compensation system, controllable coupling means, a magnetic tape type of positioning control and processing circulation system having magnetizing and demagnetizing means and magnetic sensing devices, a positioning control means using a catch pin for precision positioning and locking, and a dual motor type of kinetic backlash elimination and locking means;
   a mechanical transmission interface coupled to said drive means and including a dual-end drive device coupled to said working tables, at least one oblique roller, at least one guide screw, and a driving gear assembly having a low vibration ratio; and
   an auxiliary rotary arm coupled to said dragon gate structure.

2. A dragon gate type of processing system, comprising:
   a dragon gate structure;
   at least one lateral girder coupled to said dragon gate structure, for mounting a tool holding means and an automatic tool exchange means, said automatic tool exchange means including at least two common tool chests each having a tool exchange position and a tool output position, a tool exchange device including a tool turret, and a movable tool chest;
   a plurality of working tables mounted below said dragon gate structure;
   driving means for driving said working tables, said driving means including an axial displacement D.C. motor, electro-magnetic drive and coupling means, ratio transmission driving means, a pursuit stepper servo-motor, and a high frequency response braking means having a flexible transmission;
   control means for controlling the operation of said dragon gate structure, said lateral girder, said working tables, and said driving means, said control means including a positioning system having an analog feedback signal accumulative quantity setting means, a non-contact synchronous drive stepper type of setting control device, a differential type dynamic error-compensation system, controllable coupling means, a magnetic tape type of positioning control and processing circulation system having magnetizing and demagnetizing means and magnetic sensing devices, a positioning control means using a catch pin for precision positioning and locking, and a dual motor type of kinetic backlash elimination and locking means;
   a mechanical transmission interface coupled to said drive means and including a dual-end drive device coupled to said working tables, at least one oblique roller, at least one guide screw, and a driving gear assembly having a low vibration ratio;
   an auxiliary rotary arm coupled to said dragon gate structure,
   wherein said working tables include shrapnel-type working tables, and wherein said shrapnel-type working tables include a main working table and at least one small working table mounted beneath said main working table, said at least one small working table being driven in the same direction as said main working table.

3. An apparatus according to claim 1 wherein said field windings are connected in a compound excitation mode.

4. An apparatus according to claim 1 wherein said field windings are connected in a shunt mode.

5. A dragon gate type of processing system, comprising:
   a dragon gate structure;
   at least one lateral girder coupled to said dragon gate structure, for mounting a tool holding means and an automatic tool exchange means, said automatic tool exchange means including at least two common tool chests each having a tool exchange position and a tool output position, a tool exchange device including a tool turret, and a movable tool chest;
   a plurality of working tables mounted below said dragon gate structure;
   driving means for driving said working tables, said driving means including an axial displacement D.C. motor, electro-magnetic drive and coupling means, ratio transmission driving means, a pursuit stepper servo-motor, and a high frequency response braking means having a flexible transmission;
   control means for controlling the operation of said dragon gate structure, said lateral girder, said working tables, and said driving means, said control means including a positioning system having an analog feedback signal accumulative quantity setting means, a non-contact synchronous drive stepper type of setting control device, a differential type dynamic error-compensation system, controllable coupling means, a magnetic tape type of positioning control and processing circulation system having magnetizing and demagnetizing means and magnetic sensing devices, a positioning control means using a catch pin for precision positioning and locking, and a dual motor type of kinetic backlash elimination and locking means;

a mechanical transmission interface coupled to said drive means and including a dual-end drive device coupled to said working tables, at least one oblique roller, at least one guide screw, and a driving gear assembly having a low vibration ratio;

an auxiliary rotary arm coupled to said dragon gate structure, wherein said working tables include multi-set, parallel, and linearly reciprocating drive-type working tables.

6. An apparatus according to claim 5 wherein said D.C. motor armature includes a plurality of poles which are arranged contrary to said field windings when said stepper motor holds said D.C. motor stationary, when said stepper motor rotates said D.C. motor to a given angle, said brush set of said D.C. motor is actuated to generate the pursuit and stepper operation.

7. An apparatus according to claim 6 wherein the rotation to the given angle, and a speed of said DC motor are controlled by said stepper motor.

8. An apparatus according to claim 6 wherein said stepper motor includes an auxiliary DC motor having a stator and a rotor, and further including an electromagnetic-brake installed between said auxiliary DC motor stator and rotator.

9. An apparatus according to claim 8 wherein said auxiliary DC motor drives said DC motor to an angular displacement within a width of said magnetic poles after power has been cut-off from said armature, said brake being simultaneously energized to lock the stator and armature of said auxiliary DC motor.

10. Apparatus according to claim 1 further including a slip ring receiving armature exciting current from said brush to cause said armature to become a rotor with polarity.

11. An apparatus according to claim 10 further including a control system for varying the number of said poles to provide a number of poles different from a number of poles of said rotor to cause said DC motor to operate in accordance with said stepper operation.

12. An apparatus according to claim 1 further including means for changing a pole axis of the field of said DC motor.

13. A dragon gate type of processing system, comprising:

a dragon gate structure;

at least one lateral girder coupled to said dragon gate structure, for mounting a tool holding means and an automatic tool exchange means, said automatic tool exchange means including at least two common tool chests each having a tool exchange position and a tool output position, a tool exchange device including a tool turret, and a movable tool chest;

a plurality of working tables mounted below said dragon gate structure;

driving means for driving said working tables, said driving means including an axial displacement D.C. motor, electro-magnetic drive and coupling means, ratio transmission driving means, a pursuit stepper servo-motor, and a high frequency response braking means having a flexible transmission;

control means for controlling the operation of said dragon gate structure, said lateral girder, said working tables, and said driving means, said control means including a positioning system having an analog feedback signal accumulative quantity setting means, a non-contact synchronous drive stepper type of setting control device, a differential type dynamic error-compensation system, controllable coupling means, a magnetic tape type of positioning control and processing circulation system having magnetizing and demagnetizing means and magnetic sensing devices, a positioning control means using a catch pin for precision positioning and locking, and a dual motor type of kinetic backlash elimination and locking means;

a mechanical transmission interface coupled to said drive means and including a dual-end drive device coupled to said working tables, at least one oblique roller, at least one guide screw, and a driving gear assembly having a low vibration ratio;

an auxiliary rotary arm coupled to said dragon gate structure, wherein said working tables are rotary working tables mounted on a base, said base being attached to a lathe bed guide rail and is driven therealong.

14. A servo-compound machine apparatus having capable of pursuit and stepper operation, comprising:

an output motor having a magnetic field, and field stator windings having fixed commutator segments and brushes, said brushes being mounted on a stepper motor; and the stepper motor coupled to said output motor for providing coupling control to said magnetic field to control said output motor in accordance with said pursuit and stepper operations, when said stator of said stepper motor is driven, said brushes will cause a pole axis of said magnetic field to change.

15. A dragon gate type of processing system, comprising:

a dragon gate structure;

at least one lateral girder coupled to said dragon gate structure, for mounting a tool holding means and an automatic tool exchange means, said automatic tool exchange means including at least two common tool chests each having a tool exchange position and a tool output position, a tool exchange device including a tool turret, and a movable tool chest;

a plurality of working tables mounted below said dragon gate structure;

driving means for driving said working tables, said driving means including an axial displacement D.C. motor, electro-magnetic drive and coupling means, ratio transmission driving means, a pursuit stepper servo-motor, and a high frequency response braking means having a flexible transmission;

control means for controlling the operation of said dragon gate structure, said lateral girder, said working tables, and said driving means, said control means including a positioning system having an analog feedback signal accumulative quantity setting means, a non-contact synchronous drive stepper type of setting control device, a differential type dynamic error-compensation system, controllable coupling means, a magnetic tape type of positioning control and processing circulation system having magnetizing and demagnetizing means and magnetic sensing devices, a positioning control means using a catch pin for precision positioning and locking, and a dual motor type of kinetic backlash elimination and locking means;

a mechanical transmission interface coupled to said drive means and including a dual-end drive device coupled to said working tables, at least one oblique roller, at least one guide screw, and a driving gear assembly having a low vibration ratio;

an auxiliary rotary arm coupled to said dragon gate structure, wherein said working tables include rotary working tables mounted on a plurality of horizontal planes in a co-axial ring-shaped structure, each said horizontal plane including a driving motor for driving said rotary working tables on said each plane.

16. An apparatus according to claim 14 wherein said output motor includes an armature having commutator segments, and further including a slip ring for providing DC excitation to said armature.

17. An apparatus according to claim 14 wherein said stepper motor includes an armature and a rotor which are coupled together with a co-axle.

18. An apparatus according to claim 14 further including control means for controlling DC field excitation power applied to said commutator segments and brushes, and further including a sensing means to sense angular displacement of said stepper motor stator so as to control magnetic field excitation.

19. An apparatus according to claim 18 wherein said stator and rotor of said stepper motor lock-up with said DC armature in a nonoperational state of said apparatus.

20. An apparatus according to claim 14 wherein a constant current is applied to said output motor.

21. A differential dynamic error compensation apparatus, comprising:

a central processing unit;

control data and logic input means for delivering control data to said central processing unit;

rotary drive means for providing driving power;

drive means controller for controlling said rotary drive means in response to a control signal from said central processing unit;

a rotary angular displacement sensing means coupled to said rotary driving means, for sensing the rotary angular displacement of said rotary driving means, and for providing a angular displacement signal corresponding to said angular displacement to said central processing unit;

transmission means coupled to said rotary drive means for providing rotary power;

controllable coupling means coupled to said transmission means, for providing output power, said coupling means having an input shaft coupled to said transmission means, and an output shaft providing said output power;

controllable coupling driver means for controlling said controllable coupling means in accordance with a control signal from said central processing unit;

at least one working table driven by said output shaft of said controllable coupling means, and for converting said output power from rotary motion to linear motion;

a temperature sensing device;

lock means;

error memory means coupled to said central processing unit; and input means for delivering error data to said error memory means.

22. An apparatus according to claim 21 wherein said transmission means includes a reference shaft having a reference point, and wherein said rotary angular displacement sensing means detects said reference point and provides a reference signal to said central processing unit, and wherein said central processing unit compares said reference signal with control logic to determine rotational error of said rotary driving means, when said error is detected, said central processing unit delivers a correction signal to said controllable coupling driver means which controls said controllable coupling means to eliminate said rotational error.

23. An apparatus according to claim 21 wherein said controllable coupling means includes a plurality of output shafts, one of which is designated as a reference shaft, and wherein said rotary angular displacement sensing means senses an error value between said reference shaft and the remaining plurality of output shafts and provides an error signal, and wherein said central processing unit receives said error signal and provides a control signal to said controllable coupling means driver which controls said controllable coupling means to eliminate said error.

24. An apparatus according to claim 23 wherein said rotary driving means is selected from a group consisting of a stepper motor, a hydraulic motor, a combined stepper-hydraulic motor, a hydraulic driver, and a manual driving means.

25. An apparatus according to claim 24 further including a plurality of controllable coupling means drivers, each one of which is associated with one of said plurality of controllable coupling means output shafts, all of said controllable coupling means drivers coupled to said CPU whereby rotation of said plurality of output shafts may be coordinated.

26. An apparatus according to claim 22 wherein said controllable coupling means includes an inner ring and an outer ring, said inner ring including a permanent magnet and a tooth-shaped ring, said outer ring including a tooth-shaped iron-core and a coil forming a magnetic field.

27. An apparatus according to claim 26 wherein one of said outer ring and said inner ring includes locking means for locking together said inner ring and said outer ring in a stepper fashion.

28. An apparatus according to claim 27 further including at least one middle ring interposed between said outer ring and said inner ring, and wherein said outer ring includes locking means to drive said at least one middle ring in a stepper fashion.

29. An apparatus according to claim 22 wherein said controllable coupling means includes a round disk having a plurality of slots and a predetermined number of flat magnetic poles thereon, said coupling means further including a plurality of windings for exciting said magnetic poles in alternate sequence.

30. An apparatus according to claim 29 wherein said controlling coupling means includes a case, and wherein one end of said windings is fixed to said case so that said controllable coupling means may be used as a stepper driving device.

31. An automatic tool exchange system for supplying tools to at least two tool spindles, each spindle being adapted to co-operate with a workpiece on a work-table, the system comprising a tool supply and at least two tool exchanging arms, whereby each spindle is associated with a respective, distinct tool exchanging arm which is independently controllable to provide to its associated spindle the tools required for the specific operational sequence of that spindle, the tool supply comprising a plurality of tool turrets mounted on a carrier, the turrets being transferred by the tool-exchanging arms to the machining positions, and being rotated to bring the tools mounted on the turrets successively into operation.

32. An automatic tool exchange system according to claim 31, wherein a common tool supply serves two or more machine tools concurrently.

* * * * *